(12) United States Patent
Veazey

(10) Patent No.: US 7,373,892 B2
(45) Date of Patent: May 20, 2008

(54) PRODUCTION, TRANSPORT AND USE OF PREFABRICATED COMPONENTS IN SHORELINE AND FLOATING STRUCTURES

(76) Inventor: Sidney E. Veazey, 8267 Lighthouse La., King George, VA (US) 27485

( * ) Notice: Subject to any disclaimer, the term of this patent is extended or adjusted under 35 U.S.C. 154(b) by 0 days.

(21) Appl. No.: 11/370,074

(22) Filed: Mar. 6, 2006

(65) Prior Publication Data
US 2007/0283866 A1 Dec. 13, 2007

Related U.S. Application Data

(60) Continuation-in-part of application No. 10/731,263, filed on Dec. 8, 2003, now Pat. No. 7,007,620, which is a continuation-in-part of application No. 10/314,099, filed on Dec. 7, 2002, now Pat. No. 6,659,686, which is a division of application No. 09/776,971, filed on Feb. 5, 2001, now Pat. No. 6,491,473.

(51) Int. Cl.
*B63B 3/08* (2006.01)
(52) U.S. Cl. .................... 114/77 R; 114/65 A
(58) Field of Classification Search .......... 114/77 R, 114/65 A, 266, 267, 258, 259
See application file for complete search history.

(56) References Cited

U.S. PATENT DOCUMENTS

| | | | |
|---|---|---|---|
| 984,285 A * | 2/1911 | McNeillie, Jr. ............ 114/65 A |
| 1,173,879 A | 2/1916 | Shearer | |
| 1,177,381 A | 3/1916 | Case | |
| 1,229,152 A | 6/1917 | Shearer | |
| 1,247,750 A | 11/1917 | Upson | |
| 1,489,428 A | 4/1924 | Cushing | |
| 1,778,574 A | 10/1930 | Thornley | |
| 1,847,043 A | 2/1932 | Ball | |
| 2,159,685 A | 5/1939 | Buzzell | |
| 2,348,508 A | 5/1944 | Wells | |
| 2,369,615 A | 2/1945 | Smith | |
| 2,390,940 A | 12/1945 | Hull | |
| 2,981,219 A | 4/1961 | Winslow | |

(Continued)

FOREIGN PATENT DOCUMENTS

WO     WO 90/08059     7/1990

OTHER PUBLICATIONS

B & W photocopy of floating drydock containing docked cruise ship.

(Continued)

*Primary Examiner*—Sherman Basinger
(74) *Attorney, Agent, or Firm*—James K. Poole, Esq.

(57) ABSTRACT

Novel prefabricated structural components such as precast concrete boxes having forms including rectangular parallelepipeds and hexagonal cylinders are disclosed which can be assembled together and/or with structural shapes disclosed in U.S. Pat. Nos. 5,697,736 and 5,697,473 to form waterfront structures such as seawalls, levees and breakwaters. Novel methods of waterborne transport and installation of the boxes and arrays thereof are disclosed, including modular vessels having bow and stern sections which can be connected directly together or mounted to a mid-section containing assemblies of such boxes, other structural elements or other vessels such as floating drydocks. Modular vessels can be assembled with any or all of the bow, midship and stern sections comprising honeycomb arrays of vertically-oriented hexagonal boxes.

12 Claims, 73 Drawing Sheets

U.S. PATENT DOCUMENTS

| | | | |
|---|---|---|---|
| 3,344,609 A | 10/1967 | Greiser |
| 3,490,407 A | 1/1970 | Demster |
| 3,557,742 A | 1/1971 | Gainsley |
| 3,640,075 A | 2/1972 | LaPeyre |
| 3,665,882 A | 5/1972 | Georgiev et al. |
| 3,722,222 A | 3/1973 | Rinkel |
| 3,802,205 A | 4/1974 | Dickinson |
| 3,878,806 A | 4/1975 | Garcia |
| 3,951,085 A | 4/1976 | Johnson et al. |
| 3,957,098 A | 5/1976 | Hepworth et al. |
| 3,969,900 A | 7/1976 | Plodowski |
| 3,974,789 A | 8/1976 | de Groot |
| 4,067,285 A | 1/1978 | Jones et al. |
| 4,152,875 A | 5/1979 | Soland |
| 4,157,695 A | 6/1979 | Knutsen |
| 4,165,197 A | 8/1979 | Postma |
| 4,375,928 A | 3/1983 | Crow et al. |
| 4,440,527 A | 4/1984 | Vidal |
| 4,607,985 A | 8/1986 | Matsushita |
| 4,643,618 A | 2/1987 | Hilfiker et al. |
| 4,712,944 A | 12/1987 | Rose |
| 4,820,079 A | 4/1989 | Wheeler |
| 4,911,585 A | 3/1990 | Vidal et al. |
| 4,914,876 A | 4/1990 | Forsberg |
| 4,940,364 A | 7/1990 | Dlugosz |
| 4,964,750 A | 10/1990 | House et al. |
| 5,087,150 A | 2/1992 | McCreary |
| 5,158,395 A | 10/1992 | Holmberg |
| 5,178,493 A | 1/1993 | Vidal et al. |
| 5,697,736 A | 12/1997 | Veazey et al. |
| 5,908,265 A | 6/1999 | Mostkoff |
| 6,167,827 B1 * | 1/2001 | Keehan | 114/74 A |
| 6,491,473 B2 | 12/2002 | Veazey |

OTHER PUBLICATIONS

B & W photocopy of supply boat which could be fitted to carry precast concrete boxes on after cargo deck.

B & W photocopy of tug pushing barge.

Color photoprint showing (1) apparent floating breakwater; (2) loaded container ship; (3) MSC cargo ship offloading container to barge by crane; and (4) container on ship deck with ISO fitting on corner.

Photo of large movie screen assembled for Walt Disney Studios from 180 shipping containers, ca. 1995.

Photo of large arch assembled for bike race in Phila., date unk.

Photo of shipping container adapted for shelter use; date unknown.

Photo of interior of shipping container converted to workshop, date unknown.

Photo of shipping container converted to "berthing van," date unknown.

Photo of two story office building constructed of shipping containers, built ca. 1989.

Photo of an elephant house constructed from adapted shipping containers, date unknown.

Photo of "deluxe" backyard shed based upon converted shipping container, date unknown.

All above photos printed from website of Sea Box, Inc., www.seabox.com, visited most recently on Jul. 8, 2006.

\* cited by examiner

1"=10'
VARIABLE SIZE MODULAR STACKING IN FRACTIONAL INCREMENTS ON SHIP

TOP VIEW

SIDE VIEW

END VIEW

LEGEND

| BOX | WIDTH | HEIGHT | LENGTH |
|-----|-------|--------|--------|
| A | 4' | 4' | 10' |
| B | 8' | 4' | 20' |
| C | 8' | 8' | 40' |
| D | 8' | 4' | 40' |
| E | 4' | 4' | 20' |
| F | 4' | 2'8" | 20' |
| G | 8' | 8' | 20' |
| H | 8' | 2'8" | 20' |

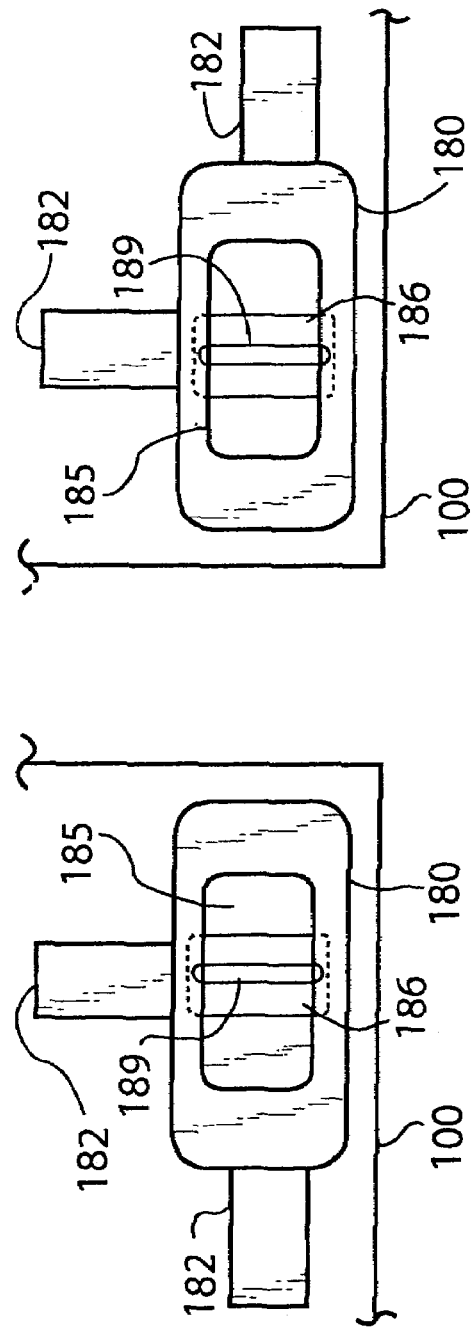
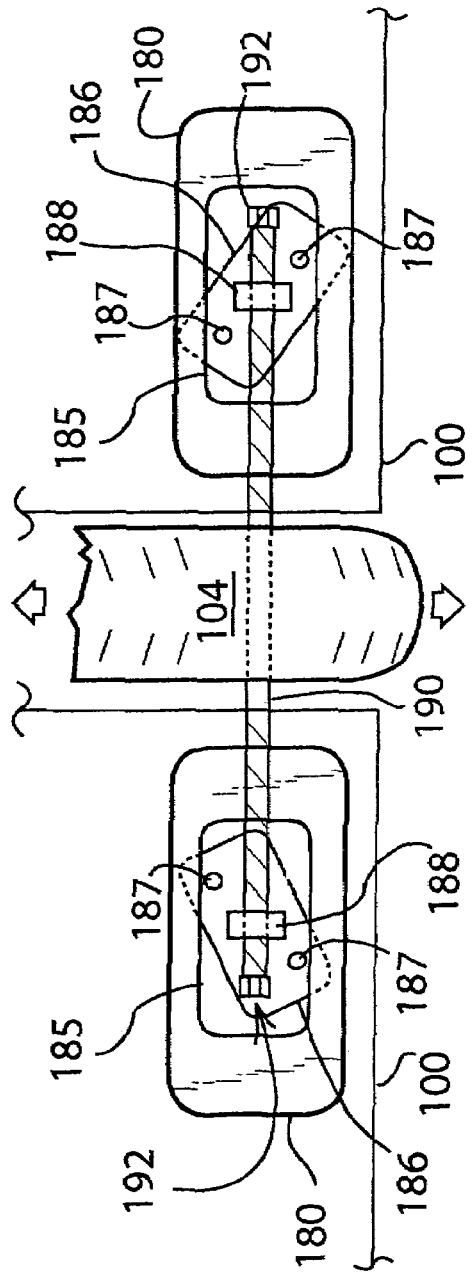

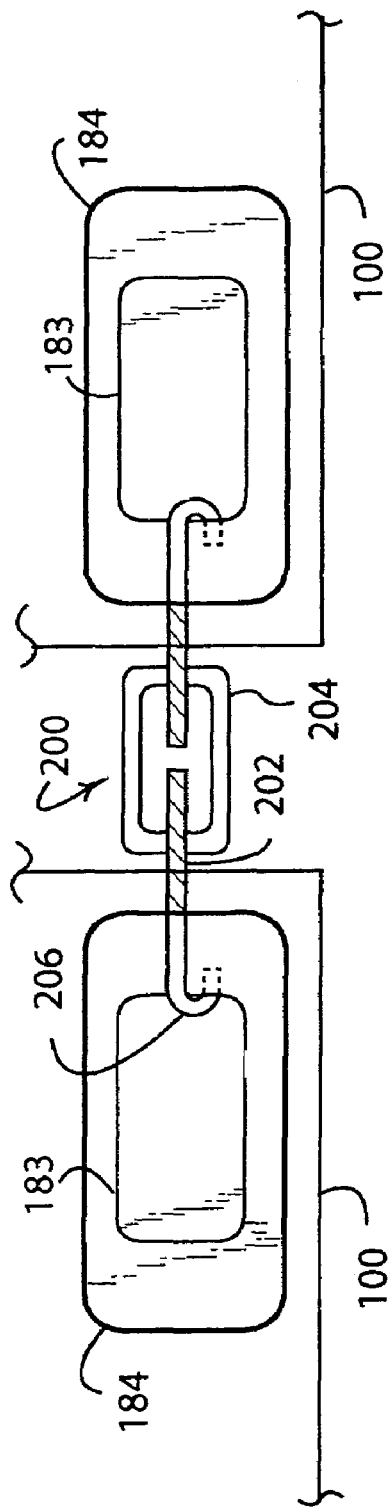
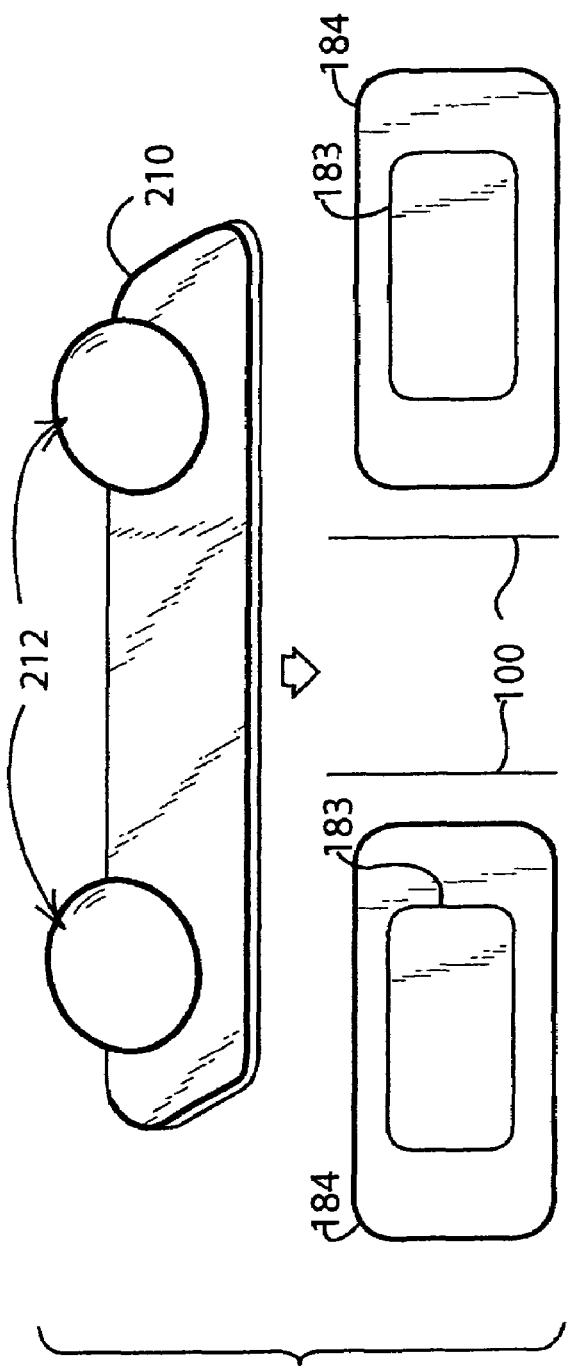
FIGURE 28
FIGURE 29

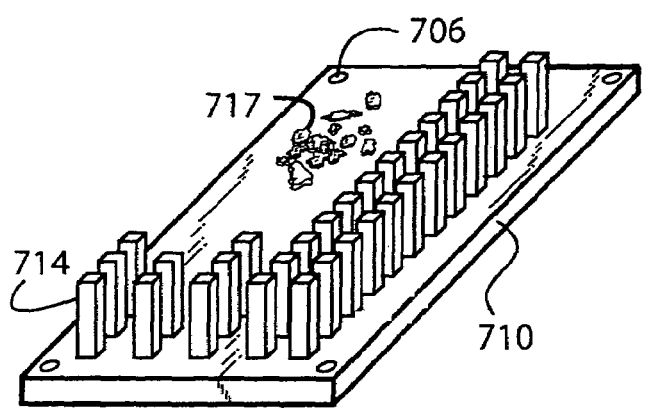
FIGURE 52
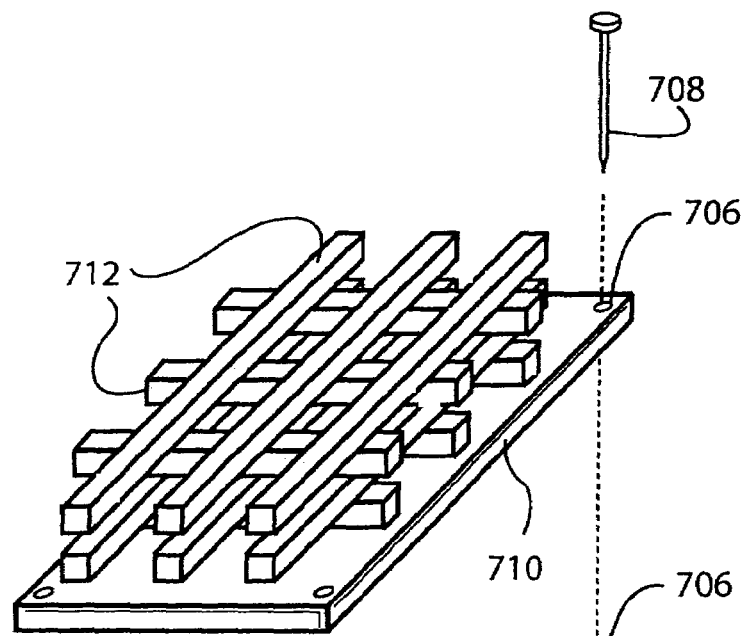
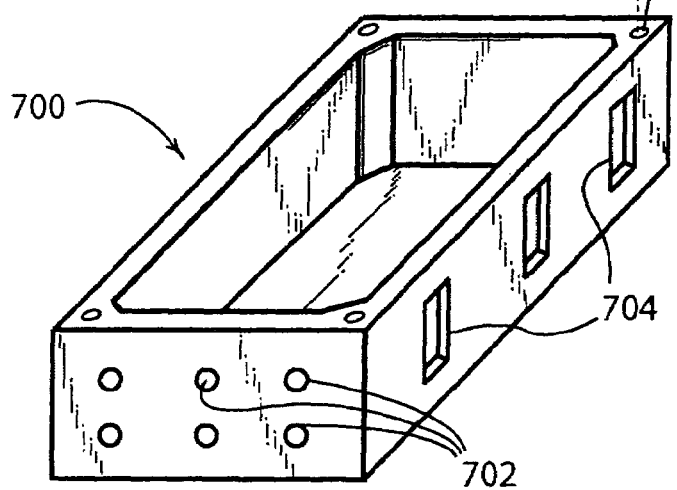
FIGURE 51

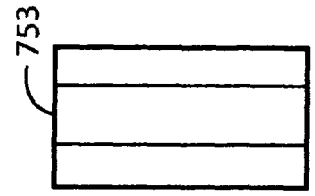
FIGURE 59C
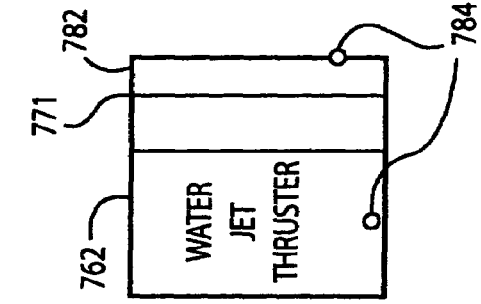
FIGURE 59F
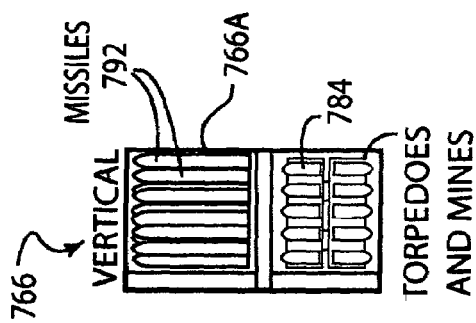
FIGURE 59B
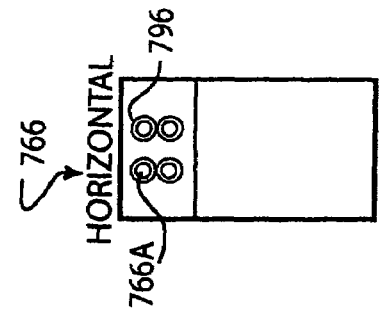
FIGURE 59E
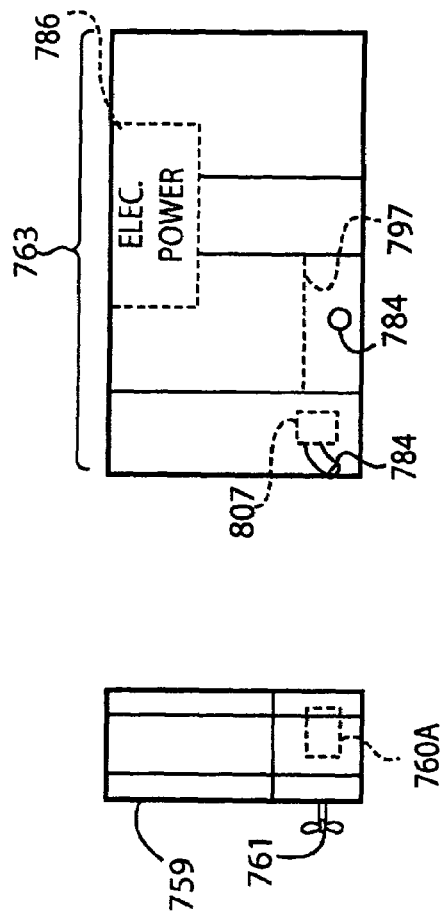
FIGURE 59A
FIGURE 59D

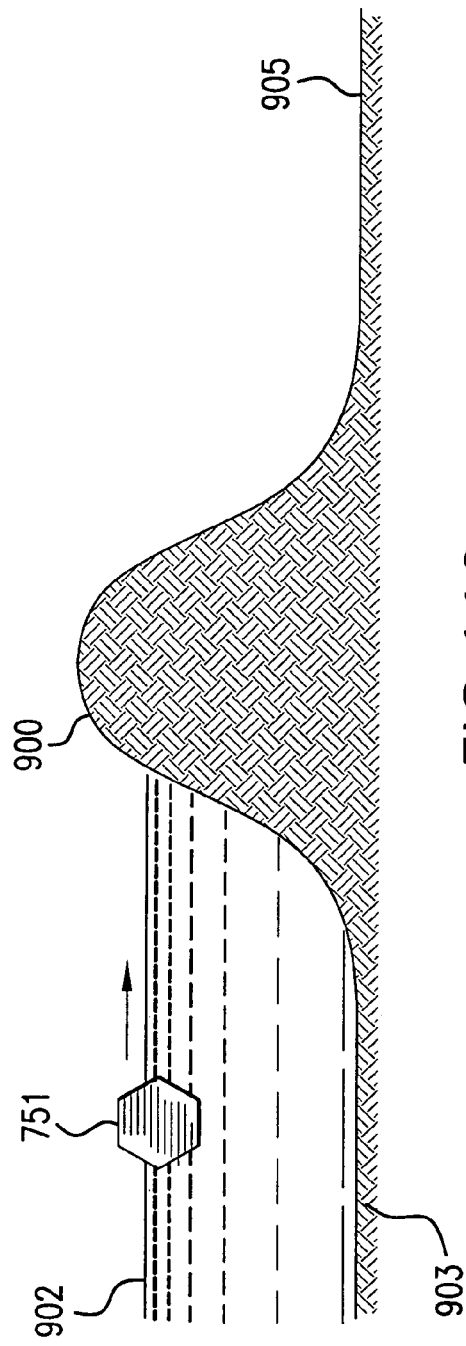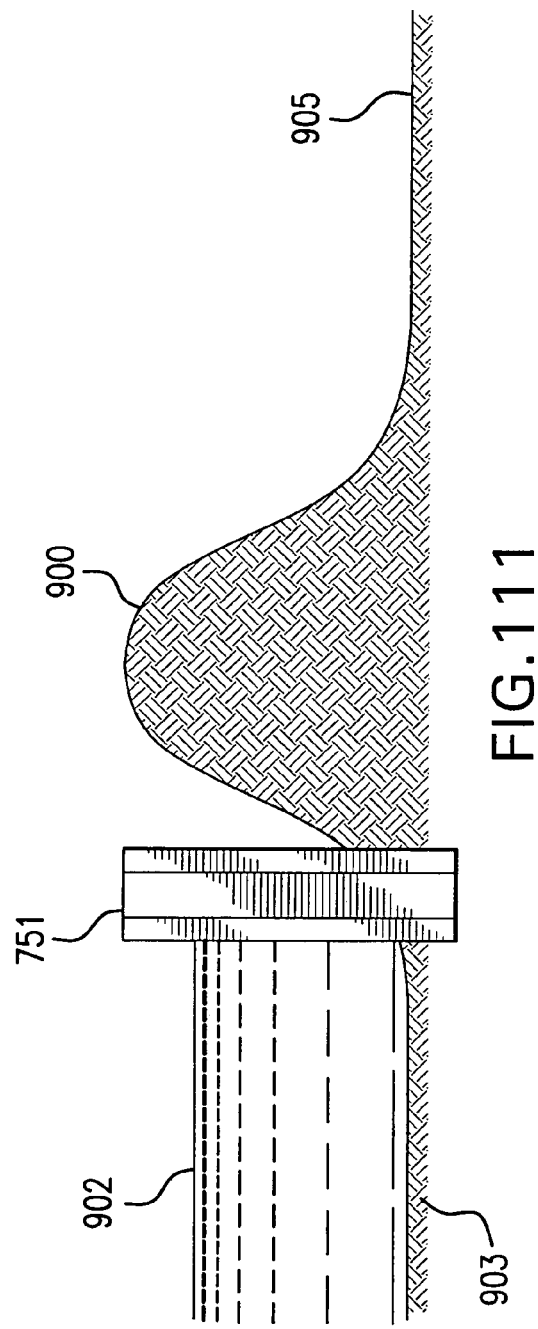

PRODUCTION, TRANSPORT AND USE OF PREFABRICATED COMPONENTS IN SHORELINE AND FLOATING STRUCTURES

REFERENCE TO RELATED APPLICATIONS

This application is a continuation-in-part of Veazey's U.S. Ser. No. 10/731,263 filed on Dec. 8, 2003, now U.S. Pat. No. 7,007,620 which is itself a continuation-in-part of Veazey's Ser. No. 10/314,099 filed on Dec. 7, 2002, now U.S. Pat. No. 6,659,686, which is a divisional of Veazey's U.S. Ser. No. 09/776,971 filed on Feb. 5, 2001, now U.S. Pat. No. 6,491,473. These patents are all incorporated herein by reference. Also incorporated herein by reference is U.S. Pat. No. 5,697,736 of Veazey et al.

BACKGROUND OF THE INVENTION

1. Field of the Invention

This application pertains to the manufacture, transport, use and installation of a variety of prefabricated boxlike components to form terrestrial, shoreline and floating structures for various purposes, including hurricane and flood pre-event mitigation and post-event recovery, national defense and homeland security.

This application also pertains to ships and methods for transporting precast concrete structures of various sizes and shapes which are suitable for installation as integrated systems to form seawalls and various shoreline reinforcement systems for limiting shoreline erosion by rivers, lakes, oceans, sounds and other major bodies of water, as well as terrestrial structures for terracing, dams, bridges, buildings, etc. The application further relates to ships which are at least partially formed of precast concrete structures, preferably structures which have hexagonal cross sections and can be assembled into honeycomb arrays to form portions of the ship hulls which have relatively high strength-to-weight ratios.

2. Summary of Relevant Art

The parent patents referred to above provide a summary of relevant prior art.

Additionally, International Publication No. WO 90/08059 (Jul. 26, 1990) discloses "Floating Concrete Modulate [sic] Platforms" assembled of hexagonal modules with stiffness walls between opposite vertex(es), joined by prestressed cables in the "enlargement spaces". Some uses have been made of commercial metal shipping containers for terrestrial structures such as shelters, sheds, offices, workshops and the like; see, e.g. publications of SEA BOX INC. of New Jersey, recently viewed at www.seabox.com.

While many techniques have been developed for reinforcing shorelines, as described in that patent and various publications of the U.S. Army Corps of Engineers, there is still considerable room for improvement. Applicant's company Seament Shoreline Systems, Inc. of Virginia and its subcontractors have completed several shoreline installations using the components and methods disclosed in the above patents. The Corps of Engineers publication "LOW COST SHORE PROTECTION . . . a Property Owner's Guide" discloses at page 154 the use of precast open concrete boxes filled with sand to form waterfront sills to retain perched beaches. U.S. Pat. No. 5,697,736 discloses in columns 8-9 the use of precast concrete boxes as alternatives to Double "T" units (discussed below) for constructing pier-groins extending seaward from a seawall and for use in forming underwater and near-shore) breakwaters. Columns 12-13 and FIGS. 20 to 25 discuss the use of such concrete boxes to form floating pier assemblies.

Catalogs of Admiral Marine Co. (Staten Island, N.Y., New Orleans, Oakland, CA and Chicago) and Peck & Hale (West Sayville, N.Y. and Kowloon, HONG KONG, PRC) disclose various metal fastening devices which could be employed to connect certain components of the present invention to form structures.

Normally, large stone rip-rap revetments, groins or breakwaters have been used for such protection. However, these methods require that a large total mass of materials be transported to the site. Such rocks are difficult to handle, cannot be interconnected or floated into place and are not easily relocatable. Furthermore, such rocks are not amenable to intermodal transport or use in a modular system.

Despite the state of the art and improvements such as those disclosed in Applicant's patents cited above, recent natural disasters and international conflicts have demonstrated the need for continuing improvements in the construction of shoreline and floating structures to protect shorelines from storms, floods and the like and to protect critical areas of national coastlines or military positions in operating areas.

SUMMARY OF THE INVENTION

An object of the present invention is to provide easily transportable construction components which can be used to control shoreline erosion. As another object, such components should be provided in sizes, shapes and proportions which are compatible with existing trucks, railcars and maritime transportation modes (i.e., intermodal transportation) as well as adapted to existing materials handling equipment. As a further object, the components should be transportable in segments so that they can be moved into positions for installation through crowded beachfront areas, by land, water or aircraft such as heavy lift helicopters, blimps or dirigibles.

Another object of the invention is to provide such construction components as partially-closed containers which are light in weight but can be filled with available liquid or solid materials at the installation site to substantially increase their mass at little cost. A further object of the invention is to provide construction components which can be filled with solids, gases or liquids to increase their masses when installed as part of a structure, simultaneously serving as sealed storage containers for such materials for later use.

An additional object of the invention is to provide construction components which have the largest masses practicable when filled with ballasting material and installed to form structures. Maximizing the mass of such components is desirable to equip the structures to resist the large forces generated by storm waves, currents, floods, mudslides, earthquakes and other natural disasters. Such maximizing of mass can have similar applications in combat engineering, where enemy artillery, bombardment and demolitions may be encountered.

Still another object of the invention is to provide intermodal sets of precast concrete boxes which can be used as fixed or floating construction components for various civil, marine, commercial or military construction projects. Such components could be connected together to form causeways, fixed or floating bridges, dams, drilling rigs, floating or fixed airport runways or helicopter pads, temporary or permanent shipping ports, temporary military or naval facilities such as port, repair, supply or airport installations, "container ships", relocatable modular waterfront structures such as houses, and many other applications.

Still another object of the invention is to provide methods of installing precast concrete boxes in underwater positions by transporting them on floating vessels and/or floating them into approximate position and sinking them into their final installed positions or assembling them into floating structures. A related object is to provide vessels which are suitable for transporting such boxes, either as deck cargo or as a floating, removable component of the vessel itself. Another related object is to provide precast concrete components which can be interconnected to form portions of the hull structures of such vessels.

Certain of these objects and aspects of the invention are achieved by embodiments described below.

In accordance with the present invention, precast concrete boxes are provided, preferably having the form of rectangular parallelepipeds, which can be transported by water and assembled to form shoreline structures. As alternatives to such precast concrete boxes, similar boxes can be formed of materials selected from the group consisting of metal, wood, plastics and polymeric composites. Boxes of such materials can be coated on at least their outer surfaces with concrete to form boxes having the properties of precast concrete boxes. Boxes of metals, concrete or plastic can be coated with various suitable materials to make them resistant to weathering, liquids and corrosion. Any of these boxes can be formed with closed cross-sections which are hexagonal or half-hexagonal (i.e., a hexagon cut in half, from edge to edge or from side to side).

When precast of concrete, these boxes can contain reinforcements of metallic and/or nonmetallic materials, and preferably include supports cast into at least a portion of the outer edges of the boxes. Reinforcing materials can include fibers, strands, cords, meshes or rods comprising metals, polymer composites and carbon, polymer or glass fibers. Such supports can comprise angle or bar stock comprising metals, composites or other suitable materials. Additionally or alternatively, the hexagonal and half-hexagonal boxes can contain such reinforcements in at least a portion of the top, bottom and side panels thereof. The metallic and/or nonmetallic reinforcements can comprise cables, reinforcing bars and beams of various suitable sizes and cross sections. Such boxes used for assembling floating platforms and/or vessels preferably have a completely open and unobstructed cross section to facilitate their employment for useful spaces within such platforms or vessels. This is facilitated by the use of suitable reinforcing means as discussed above.

Hexagonal and half-hexagonal boxes to be used for such floating structures can have either hexagonal or circular inner cross sections, and optionally can include longitudinal holes or channels cast into their side panels or corner portions thereof to provide for running cables, tubing and the like. Alternatively, if a completely unobstructed inner cross section is not required, structures can be installed within the boxes and attached to the bases or bottom surfaces thereof to carry such wires or the like. As with other precast concrete boxes disclosed herein and in parent applications, the side walls and/or bottoms of the hexagonal and half-hexagonal boxes can have suitable drain/vent holes, fittings and the like. The sides of the boxes can contain passages adapted for the introduction of pressurized water and/or air from the top to assist in "jetting in" the bases of the boxes on the bottom of a body of water or in soft soil. The boxes can be cast of concrete by conventional means using forms, as discussed further below, and where desired can be cast without bottom surfaces or bases to form hexagonal or half-hexagonal open cylinders.

Mobile apparatus for casting concrete boxes of any of the shapes discussed above can be assembled aboard barges, floating platforms or floating drydocks. Floating drydocks having bottom hulls with flat inner bottom surfaces, upright side walls and at least one crane mounted thereon (or separate sections thereof) can be transported to remote sites carrying such molding apparatus, using the modular vessels discussed above, and then provided with materials and workers from shore and/or by barges to manufacture quantities of the precast boxes near their points of use.

The precast concrete boxes of the invention can be interconnected by mechanical fastener means to form bundles or assemblies like log booms to be towed or otherwise transported over water. Further in accordance with the invention, such interconnected groups of concrete boxes which form a large rectangular mass can be transported by a self-propelled vessel for transporting floating objects which comprises separate bow and stern sections adapted to be removably fastened together using mechanical means to form the vessel alone. When used for transporting such assemblies of boxes (or other interconnected groups of floating objects such as logs, containers, tanks, floating drydocks or the like), the two sections of the vessel are separated and connected to the ends of the group of boxes to form a "stretched" vessel in which the group of boxes forms a midship section. The vessel is provided with conventional propulsion systems (in at least the stern section), thruster propulsion units to aid in maneuvering, anchors and power supplies for their operation and at least one crane for unloading and emplacing the boxes or other cargo at destination.

A preferred embodiment includes the bow and stern sections described above removably attached to at least a portion of a floating drydock (some larger drydocks can be moved in sections) which is fastened to the bow and stern sections using similar mechanical fasteners as employed for arrays of rectangular boxes or other cargo. This permits the transport of floating drydocks safely to remote locations where they may be used for their conventional purposes or to set up mobile concrete molding operations for the modules of the present invention.

The group or array of boxes forming the midship section for transport by such a vessel can be either boxes forming rectangular parallepipeds of intermodal sizes and proportions, or boxes of hexagonal and half-hexagonal cross sections which are oriented vertically and interconnected to form a honeycomb array. Furthermore, such boxes of hexagonal and half-hexagonal cross sections can be interconnected in honeycomb arrays to form at least a portion of the bow and stern sections of such vessels as well as a midship section for transporting cargo. Such bow and stern sections (and optionally, designated individual boxes or arrays thereof) are preferably constructed and installed so as to be removably attachable from the midship section along defined lines of separation. Such honeycomb arrays can be assembled by interconnecting the boxes with mechanical connectors and installing optional tensioning cables to maintain the form and integrity for the various sections to form an integrated hull structure consisting essentially of precast concrete boxes having hexagonal or half-hexagonal cross sections. Such hull structures can be configured to have at least one removably attachable portion such as the bow and stern sections and individual boxes or arrays thereof discussed above.

In addition to forming portions or substantially complete hulls of self-propelled vessels as described above, horizontal arrays of vertically-oriented hexagonal and half-hexagonal modules (and vertical arrays thereof) can be assembled to serve a variety of functions while afloat in water such as coastal waters, estuaries and along shorelines. They can be emplaced along shorelines to form at least temporary ports or harbors offering shelter and working areas for vessels of any size, given sufficient draft in the water where installed. They can be emplaced and anchored offshore to form platforms for mooring vessels of various sorts to load and/or off-load cargos ranging from large shipping containers to petroleum products and other liquids, break bulk cargo or smaller shipping crates. Where necessary, mooring space can be provided for lighters, landing craft and small craft for transportation and/or security purposes. Such platforms can be provided with power plants, electric utilities and other auxiliary services, propulsion means for at least maneuvering into position, electronic communications means and a variety of sensors, including radars and detectors for electromagnetic radiation in various frequency ranges.

Further in accordance with the invention, the precast concrete boxes of the invention can be installed in the water along a shoreline by sealing all inlets below the expected waterline of the installed boxes, placing the boxes in the water and floating them into position, then opening sufficient water inlets and air outlets to allow the boxes to sink into their assigned places. In preferred embodiments, these inlets and outlets can be opened remotely by signal means, and directional guidance can be provided to the boxes while they are being sunk into position. A group of such boxes can be interconnected and emplaced beneath the water to form a submerged breakwater or reef by positioning the connected boxes atop a flat deck of a vessel, emplacing an anchor on the bottom near the planned installation position and attaching same to a cable slidably connecting the boxes on deck, launching the boxes into the water while the vessel proceeds forward away from the anchor, then maneuvering the boxes into end-to-end contact and clamping the resulting string of boxes into place on the cable, placing the resulting floating string of boxes into position directly above the planned installation position, and finally, sinking the boxes while guiding them into final position by securing the forward end of the cable to a second anchor at the opposite end of the string from the first anchor and applying tension to the cable from the vessel. These methods and techniques can also be employed for installation of the hexagonal and half-hexagonal boxes disclosed herein, either individually or in arrays.

The vessel used can be a barge, a vessel with a bow door and ramp [such as Navy landing ship tank, (LST) landing craft mechanized, (LCM) landing craft vehicle and personnel (LCVP) and the like] or a vessel with an after well deck affording access to the water for floating boxes directly into the water [such as a Navy landing ship dock (LSD)]. A container ship with a flat deck and cranes to hoist the boxes from deck level to water level can also be used. The Military Sealift Command has several suitable types of ships available, including a "crane ship".

Additionally, vessels can be custom designed to transport and/or install boxes of rectangular, hexagonal and other shapes, either individually or in arrays, based upon the modular vessels disclosed herein, including those comprising sections incorporating honeycomb arrays of hexagonal and (optionally) half-hexagonal modules.

Further in accordance with the invention, hexagonal and half-hexagonal concrete boxes can be precast with metal and/or nonmetallic reinforcing means in at least the sides thereof by steps comprising precasting individual modules either right side up or upside down using metal forms sometimes called tunnel forms. When desired to form a vertical array of modules, Such modules can be poured sequentially atop the previously cast modules with connecting reinforcing means to form an integrated structure much like a multi-story tower or building. Alternatively, individual modules can be cast, cured, removed from the forms and later connected together by interconnecting notches or grooves at one end sized to fit the open end of an adjacent module and various mechanical connecting means to form vertical arrays. Linear arrays can also be produced at the casting site by fastening pluralities of modules together edge-to-edge, with the size limited only by hoisting and transport means. The finished precast hexagonal and half-hexagonal boxes preferably offer the advantage of an open and unobstructed internal cross section from top to bottom, permitting the use of such interior spaces for a variety of purposes in structures comprising such boxes.

Precast concrete boxes of hexagonal, half-hexagonal and rectangular cross sections can be produced in quantity using assembly plants comprising forms, concrete mixers, cranes or other suitable lifting equipment, and reinforcing materials. The process includes steps of positioning reinforcing materials in the forms, mixing concrete (optionally with fiber or other suitable reinforcement included), pouring suitable amounts into the forms, curing the cast units, stripping the forms from the units and allowing the cast units to harden sufficiently to allow moving or use. Such plants can be permanent or can be set up temporarily near suitable sources of sand, gravel and navigable waterways and/or near sites where shoreline or floating structures are to be assembled and/or repaired. As discussed elsewhere herein, barges or floating drydocks can be used to set up such mobile plants.

Another aspect of the invention involves the use of transportation or shipping containers of metal or other materials as components for the assembly of temporary or permanent shoreline or shallow water structures much as disclosed in Applicant's previous patents and further below, which employed precast concrete boxes having the form of rectangular parallelepipeds. Such containers of metal or other materials can be coated, either on site or prior to transport to a construction site, with layers of concrete, using conventional spray techniques such as "Gunite" or Shotcrete technologies. Alternatively, they can be coated with rust resistant synthetic coatings such as three part mixtures containing zinc, coal tar derivatives, polyurea coatings and epoxy resins by conventional means including spraying, brushing, dipping and the like. These rectangular containers of metal or other materials can be fitted with partitions, watertight lids or closures, valves and fittings for admitting water and blowing water out to float the containers, as disclosed below and in Applicant's previous patents.

In addition to the shoreline structures previously disclosed, prefabricated rectangular boxes of the invention, whether precast concrete or standard metal shipping containers having certain modifications, can be used for the construction and repair of levees (the embankments or berms bordering riverbanks to prevent overflows at high water levels), dikes, dams, breached barrier islands and the like. The adaptation and use of surplus metal shipping containers, which often accumulate in port areas such as New Orleans and Houston, can be particularly advantageous. Arrays of rectangular boxes can be floated into place, positioned and sunk into place under water to form the central support for a levee under construction or repair, for example. When urgent repairs to ruptured levees, breached barrier islands or similar structures are required, floating arrays of boxes can be moved into position by suitable means, sunk into position where needed, secured in place and the process repeated to form at least a temporary barrier to reduce or prevent the flow of water through the damaged levee portions. Similar construction and repair techniques can be employed with the prefabricated rectangular, hexagonal and half-hexagonal modules of the invention, under non-emergency conditions.

When the hexagonal modules of the invention are used to provide permanent construction or repairs or levees, dams and the like, at least one horizontally divided section can be installed which provides a "water gate" to permit water to pass from one side to the other, normally from the river towards the bank or from the upstream side of a dam downstream. Such gates can comprise linear arrays of modules positioned on guide means to permit their movement up and down, their movement above or below a certain level allowing water to flow. Ballasting means comprising suitable water and/or air pumps, plumbing and valves are provided to allow such gates to be ballasted so as to sink downward, shutting off water flow through the "gate;" when desired, the modules in the gate can be deballasted or blown to increase buoyancy so that the gate rises to allow water flow. Suitable means are provided to secure such gates in position when open and closed. In a preferred embodiment for use in river delta areas, instead of flowing directly over the river bank, water flowing through the gate enters a reservoir formed by an array of vertical hexagonal modules arranged in a semicircular or any other suitable pattern. This permits excess water to be drawn from the river at high flood stages and retained for a time. The module array(s) forming such reservoirs can provide further fluid control means to allow water (and entrained silt) to be released from the reservoir at various desired rates depending upon circumstances, escaping into surrounding wetlands to maintain their desired state of flooding with entrained silt.

In addition to forming shoreline structures including seawalls, erosion control arrays, piers and breakwaters, the rectangular and hexagonal modules disclosed herein can be used to construct or improve dwelling structures or other buildings near the shoreline, e.g. in barrier island or flood-prone areas. Such modules can be used in various arrangements, whether singly or in linear arrays, to provide elevated supports for buildings (like the "stilts" used in the tropics and certain beach communities) to allow waves or floods of predetermined height or depth to pass under the structure without significant harm. Such modules can be ballasted with sand, gravel or the like, and can have openings above ground level to permit flooding at high water to provide further ballast.

In an alternative embodiment, rectangular modules can be used to provide watertight foundations or basements for houses or other small structures in storm or flood-prone areas, comprising watertight outer sidewalls and floors substantially corresponding to the outer walls of the house or other structure and fastened securely thereto to provide support for the full weight of the structure. Access from at least the first or ground floor of the structure can be provided via normal doors and stairways. Partitions within the basement can comprise portions of the modules used. Optionally, watertight doors which can be closed tightly against resilient gaskets by means of a lever or other convenient mechanical actuators (such as commonly used aboard seagoing vessels) can be used for access to the basement, whether horizontal doors from outside or between basement rooms or vertical access from the structure above.

Boxes assembled and interconnected to form an array which is then connected to separate bow and stern sections of a vessel to form the midsection of such a vessel can be transported from an origin to a destination for installation to form shoreline structures by serving as part of the vessel en route. At destination, the boxes can be removed from the vessel midsection, either individually by crane(s) or by disconnecting the midsection from the vessel, and floated into positions for installation to form shoreline and/or underwater structures as described elsewhere herein. Boxes can be disconnected from the adjacent boxes in the array, whether the midsection array is removed from or still connected to the vessel, and deposited in the water by using the crane(s). When the midsection is removed and the bow and stern sections of the vessel reconnected to form a more compact vessel, the vessel can be maneuvered to tow groups of boxes or to remove them from the independently floating midsection array and place them into the water by use of the crane(s). Alternatively, small tow or pusher boats can be carried on deck by the vessel and used to tow or maneuver the boxes, individually or in connected groups, into position for installation.

Arrays of rectangular and/or hexagonal and half-hexagonal modules can be installed along shorelines above and below the normal tidal range (where applicable) or water levels to prevent or repair erosion, provide secure seawalls or bulkheads, breakwaters and shoreline structures such as piers, wharves or similar moorings for small craft or larger vessels and to connect same with the shore. The use of hexagonal and half-hexagonal modules offers many options for emplacing linear arrays firmly in shorelines where desired, and also to easily form extensions of such arrays forming angles of either 60 or 90 degrees to the original array. Such arrays can be useful as both seawalls and breakwaters, depending upon their location and mode of installation. Half-hexagonal modules can be used to fill in areas between adjacent hexagonal modules to form a substantially smooth or flush contour, although there are also advantages to leaving a surface with V-shaped grooves or "notches" exposed to the water. Such modules can be employed underwater and/or protruding above normal low tide or water levels to provide breakwaters to shield such shoreline structures from surf, storm surges or other waves.

Many types of floating platforms can be constructed using prefabricated modules and the modular ship concepts disclosed herein. Hexagonal and half-hexagonal modules are preferred for assembling such vessels, due to the high strength-to-weight ratio of the resulting honeycomb arrays. One embodiment provides a hull structure comprising vertical arrays of hexagonal modules forming honeycomb array structures (and preferably consisting essentially of same), preferably shaped to have defined bow and stern sections which are removably attached along lines of separation and using half-hexagonal modules to provide smooth side contours. Such hull structures can optionally have at least one module and/or section (such as bow or stern sections) which is removably attachable along defined lines of separation. Separable modules can be equipped and used as escape vehicles or the like. Portions of the hull modules can be employed for engineering spaces, tanks, storage spaces and the like. Rectangular and/or hexagonal modules can be installed atop the hull structure to form a superstructure which can be subdivided into spaces for operations, berthing, dining and other uses, depending upon the size and assigned mission of the vessel. Preferably at least one elevated portion is provided above the superstructure (using, e.g. at least one large hexagonal module) to provide an observation tower and/or pilot house for operating the vessel. Such vessels with hulls comprising hexagonal and half-hexagonal modules and superstructures of various configurations can be used as houseboats, temporary carriers of navigation aids, observation platforms and in many other useful applications. Single hexagonal modules or vertical arrays thereof can be used as ocean sensor buoys floating vertically in the water and similar devices.

Floating platforms of the invention can be equipped with many accessories for the missions assigned, including military and fishing equipment, sensors, navigational aids and recreational equipment. Many of these items can be installed in a modular fashion in the interior of one or more vertical module, so that they can be readily removed and replaced for repair, upgrade or mission change. Floating platforms of even relatively modest size, whether self-propelled or stationary, can be outfitted as "service stations" for small patrol craft and helicopter pads, permitting prompt extension of required forces into areas of combat or natural disasters requiring search, rescue and medical evacuation services or offshore observation and intercept.

Floating platforms or vessels of various types comprising rectangular and/or hexagonal and half-hexagonal modules may be employed or emplaced in ocean or offshore areas where they will be exposed to rough waters, swells, high winds and other characteristics of stormy weather. To alleviate the effects of such winds and waves, they can be outfitted with sections on at least two sides which can take on water from waves impacting the side, taking on energy which can be harnessed and put to use, e.g. through employment of pressurized water in various applications. Further, apparatus can be installed (including pumps, lines, valves, sensors and control systems) which permits ballasting and deballasting (or blowing) portions of the side modules to place the vessel at the desired draft and control roll and/or pitch.

An embodiment of the floating platforms disclosed herein comprises a hull section comprising vertical honeycomb arrays of hexagonal (and optionally, half-hexagonal) modules having an opening in the bottom open to the water in which the platform floats, of a size and configuration suitable for accommodating a submarine within the water which enters to form a "moon pool". A superstructure comprising similar arrays of hexagonal modules forms a roof or canopy over at least a portion of the moon pool, allowing a submarine to enter from a submerged state without observation from above water. A related embodiment provides a removable stern portion or portions which can be removed by disconnecting along defined separation lines, ballasted and lowered below the level of the bottom of the platform, or opened and moved aside on hinges. This embodiment permits a variety of small craft or surface vessels, as well as submarines, to enter from the stern area of the platform for shelter, maintenance or the like.

Additional objects and advantages of the present invention are described in, and will be apparent from, the following detailed description of preferred embodiments together with the drawings and appended claims.

BRIEF DESCRIPTION OF THE DRAWINGS

FIGS. 26-29 illustrate the employment of various connecting devices to connect such boxes.

FIGS. 51 and 52 are perspective views illustrating shellfish habitats based upon precast concrete boxes of the invention, with two types of removable concrete tops.

FIGS. 59A to 59F are side views of individual hexagonal modules of the ship of FIGS. 57 and 58.

FIG. 110 is an end sectional view of a hexagonal module being floated into place to reinforce a levee.

FIG. 111 is a side sectional view of the hexagonal module of FIG. 110 being emplaced vertically against the levee.

DETAILED DESCRIPTION OF PREFERRED EMBODIMENTS

It should be understood that the following description of presently preferred embodiments of the present invention is merely representative of many possible embodiments and thus is not intended to limit the scope of the invention. In the following description, like structures will be referred to by similar numerical designations.

Figure 1:
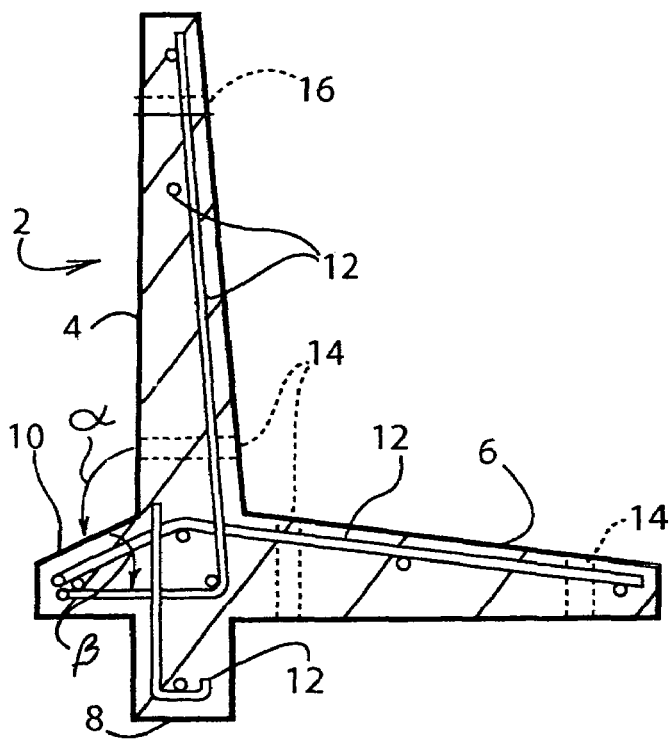
FIG. 1 is a sectional view of a prior art "L-wall" from U.S. Pat. No. 5,697,736.

Referring now the drawings, FIG. 1 is a sectional view of an L-wall as disclosed in the earlier patent. FIG. 1 illustrates an L-shaped structural member (2) of the above patent, intended for use in retaining walls, seawalls and the like. Vertical wall or stem portion (4) is substantially perpendicular to footer (6), and vertical key (8) extends below the lower surface of the footer, essentially in line with the vertical wall portion. Angular splash plate (10) protrudes from wall (4) opposite footer (6), forming an obtuse angle ( ) downward from the wall and forming an acute angle ( ) with the plane of the footer base. The thicknesses of the vertical wall and footer portions can vary, being thickest near their intersection where stresses are greatest and tapering toward their extremities. For optimum strength, such structural members are cast with fiber or metal reinforcing bars (rebar) (12) emplaced vertically and horizontally as shown as shown to increase the strength of the member in operation. Holes (14) are preferably formed in the vertical wall and footer portions to provide drainage for liquid collecting behind the retaining wall or seawall. Holes (16) can also be placed to facilitate handling and temporary interconnection of the L-members as well as drainage.

The L-shaped members and other components disclosed herein can be precast by conventional methods known in the art, and in some cases existing commercial components can be utilized to assemble the novel shoreline reinforcement systems of the invention. When the components are to be exposed to salt water, it is preferred that all rebar be at least about 2 inches from any surface of the cast bodies. Fiber reinforcement should be included in the concrete for strength, a relatively high proportion of Portland cement should be used in the mix, and the forms should permit a smooth finish to be obtained on the finished molded objects. The forms should be subjected to vibration, using commercially available mechanisms, after the molds are filled to consolidate the concrete and minimize voids or defects. Preferably, fly ash and other recycled materials should be used in the concrete to the extent it is physically and economically beneficial.

Figure 2:
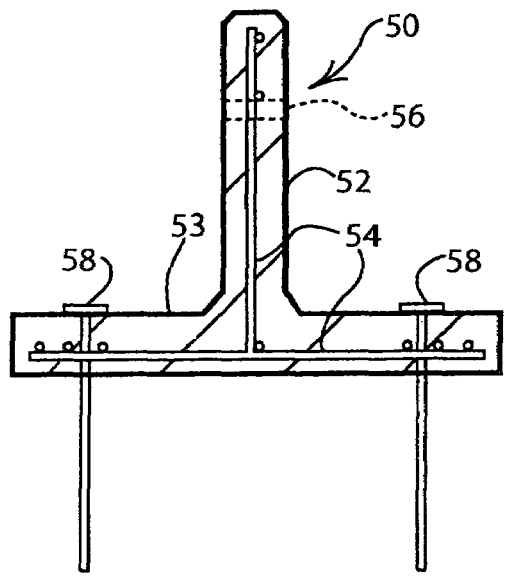
FIG. 2 is a sectional view of an inverted T-shaped unit from the same patent.

FIG. 2 is a sectional view of an inverted T-shaped unit as disclosed in U.S. Pat. No. 5,697,052 FIG. 2 illustrates a cross-sectional view of an inverted "T" wall or structural member (50) as disclosed in U.S. Pat. No. 5,697,736, having a vertical wall (52) and a symmetric base or footer (53). Such components can be cast of concrete, preferably containing rebar reinforcement (54) as illustrated above for the "L" walls, in various sizes and proportions to suit the application. For example, for shoreline reinforcement systems exposed to water, such "T" walls can range from about 2 to about 6 feet high and from 2 to about 6 feet wide, the ratio of height to width of the base ranging from about 0.6 to about 1:1. The sections can range from about 6 to about 16 feet in length. Particularly when the installed structures will be exposed to tidal flows, strong currents, surf or pack ice, the width of the base and the lowness of the center of gravity should be emphasized to minimize the risk of tipping. A plurality of holes (56) can be formed in the wall to facilitate handling, some sand and water bypass and interconnection. Similar holes in the base permit the use of pins, harpoon type anchors or stakes (58) to secure the units to the beach.

In the present systems, these inverted "T" walls are used to form groins extending seaward from a seawall or bulkhead, and may optionally be used in rows parallel with the seawall as well, as part of a system to reinforce the shoreline, form a "perched beach" or the like. Such groins are typically installed substantially perpendicular to the seawall and are used in pairs or greater numbers. The spacing and length of such groins must be carefully selected to encourage sand, gravel and other material to collect on the beach. In some cases the effects of groins, seawalls and other beach reinforcement systems can be difficult to predict even after careful analysis. If necessary, the "L" walls and inverted "T" walls described above can be disconnected and relocated. Such analyses are beyond the scope of the present disclosure, but some guidelines may be found in "Low Cost Shore Protection", published by the U.S. Army Corps of Engineers.

Figure 3:
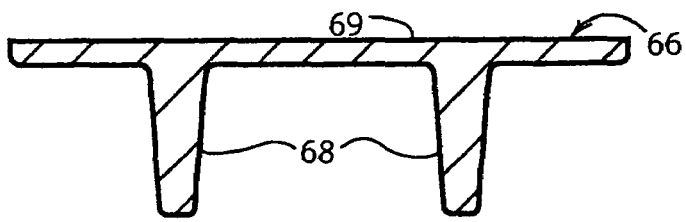
FIG. 3 is a sectional view of a conventional "double T" or pi-shaped unit from the same patent.

FIG. 3 is a sectional view of a conventional "double T" or pi-shaped unit from U.S. Pat. No. 5,697,052. FIG. 3 illustrates in cross-sectional view conventional "Double T" cast concrete structural members (66) which may be used in systems of the present invention. Such structural members are used in constructing parking garages. The lengths of such units can range from about 20 to about 60 feet, with length limited mainly by the difficulties of handling such heavy components over the road and along shorelines where they are to be installed. Because of their dimensions, the two tapered upright sections (68) joined to the flat base portion (69) give the appearance of two "T" shapes joined side-to-side. The units are also known as "pi" units because of their resemblance to the Greek letter pi.

Figure 4:
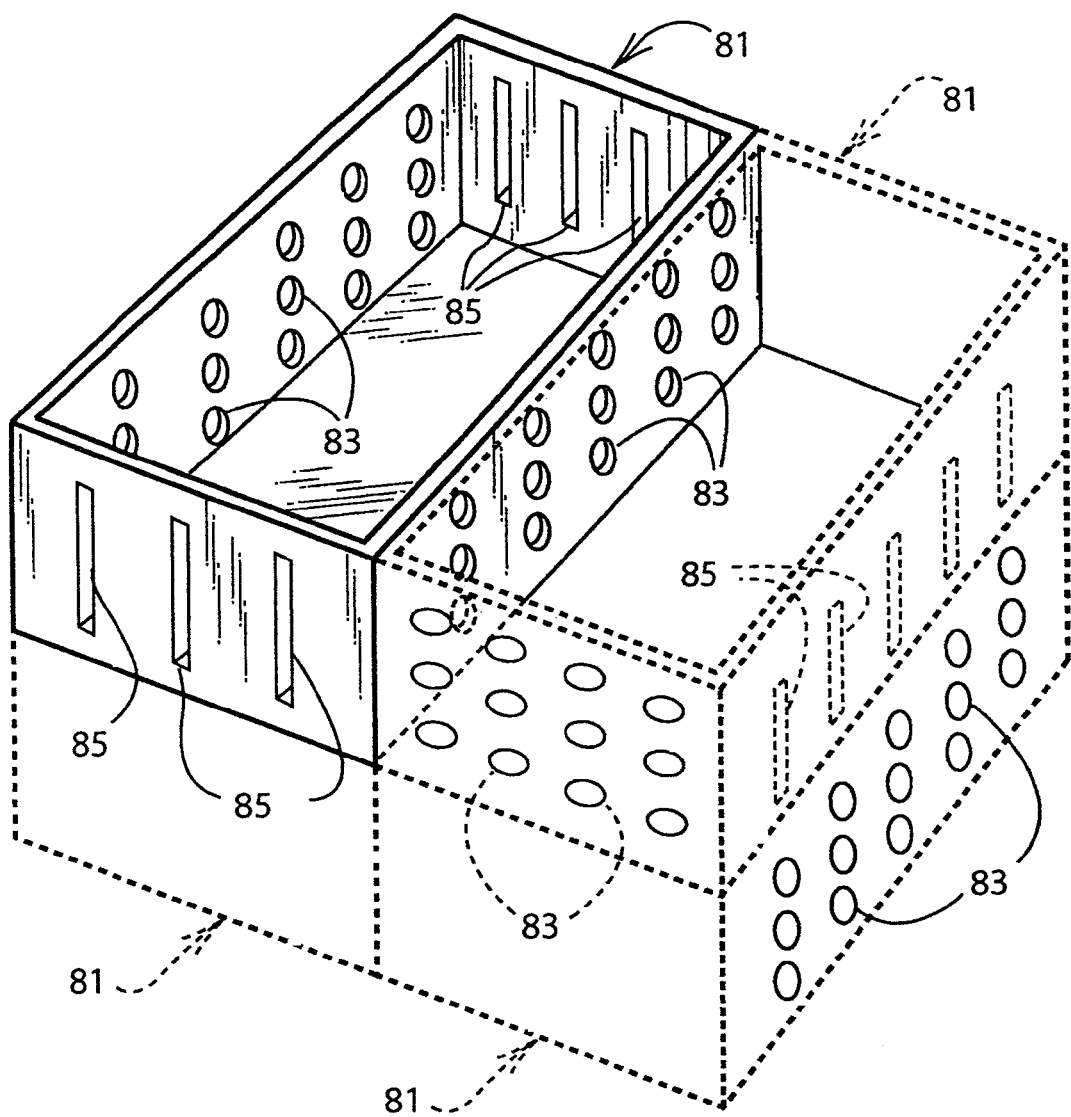
FIG. 4 is a perspective view of precast concrete boxes from the same patent.
Figure 24:
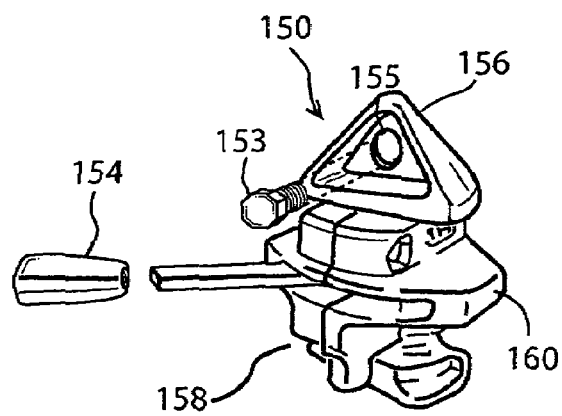
FIGS. 24 and 25 illustrate connecting devices for use with the precast concrete boxes of the invention.

FIG. 4 is a perspective view of a precast concrete box which was disclosed in the Veazey et al. patent for use in constructing breakwaters and the like. As an alternative to arrangements of inverted double "T" units to form pier groins, precast concrete boxes of various sizes can be used for various site-specific conditions. For instance, precast septic tank forms come in various sizes, e.g. approximately five feet wide by eight feet long and three feet depth, with walls four inches thick. Concrete boxes made from these existing forms can be used with modifications of openings, stronger and more waterproof concrete, reinforcements, connecting devices and the like, being sunk in position to form the base of pier-groins and the like and filled with water, rocks, sand or rubble. However, preferably they are adapted as shown in FIG. 4 and disclosed in U.S. Pat. No. 5,697,736, where the box (81) has four sides which have been perforated or slotted with circular holes (83) and/or rectangular slots (85) of a few inches diameter or width. This will make the boxes easier to sink and anchor in position. As with the inverted T units shown in FIG. 2, the boxes can have holes formed in the bottom to accommodate anchoring stakes of rebar, screw anchors such as shown in FIG. 24 of the previous patent, or other suitable anchoring means. Preferably plugs are used in the casting molds to form holes (83) or slots (85) which are sealed by thin layers of concrete. Such holes will also make it easier to sink the boxes in the water, as the thin "knockout" portions of the concrete can be punched out once the boxes have been floated into position. Once sunk, of course, it is difficult to refloat such boxes.

Such perforated and/or slotted boxes can serve an additional function beyond anchoring the foundation of a pier groin or other component. Since waves striking the surfaces of such boxes will be partially interrupted or deflected and partially absorbed by passage through at least one side of the box (i.e., the perforations or slots), their force will be at least partially dissipated. The water inside the boxes remains largely restricted or "dead" during the time periods of the waves. Thus, such boxes may be used as "wave degeneration cells" as components of the foundations of pier-groins, groins parallel or perpendicular to the shoreline, or even breakwaters. The dimensions and arrangement of the boxes as well as the dimensions and locations of their perforations and/or slots are of course selected to suit expected conditions. Additionally, these boxes with openings could also serve as protected nurseries for baby fish, crabs, oysters, etc. Such boxes, and other precast concrete boxes described below, can also be used on the sea bed to support racks, baskets or other substrates above siltation levels for shellfish to adhere and grow. Providing such elevated shellfish beds may permit the shellfish to be placed at the optimum depth of water to avoid pollution and siltation and obtain maximum benefit from currents, sunlight and nutrients. The perforations and/or slots should not extend too close to the base, where they might hinder retention and/or accumulation of anchoring material.

Such a breakwater can be built by anchoring a linear array of the precast concrete boxes so as to form a wall either, e.g., five or eight feet wide, then stacking the units as shown in FIG. 4 and lashing or otherwise fastening them together to form a breakwater of suitable height. At least the lower layer of the boxes should be at least partially filled with sand, rock or other anchoring material, but vacancies left in some of the boxes will provide shelter for marine life, thanks to the perforations and/or slots which allow easy access.

Figure 5:
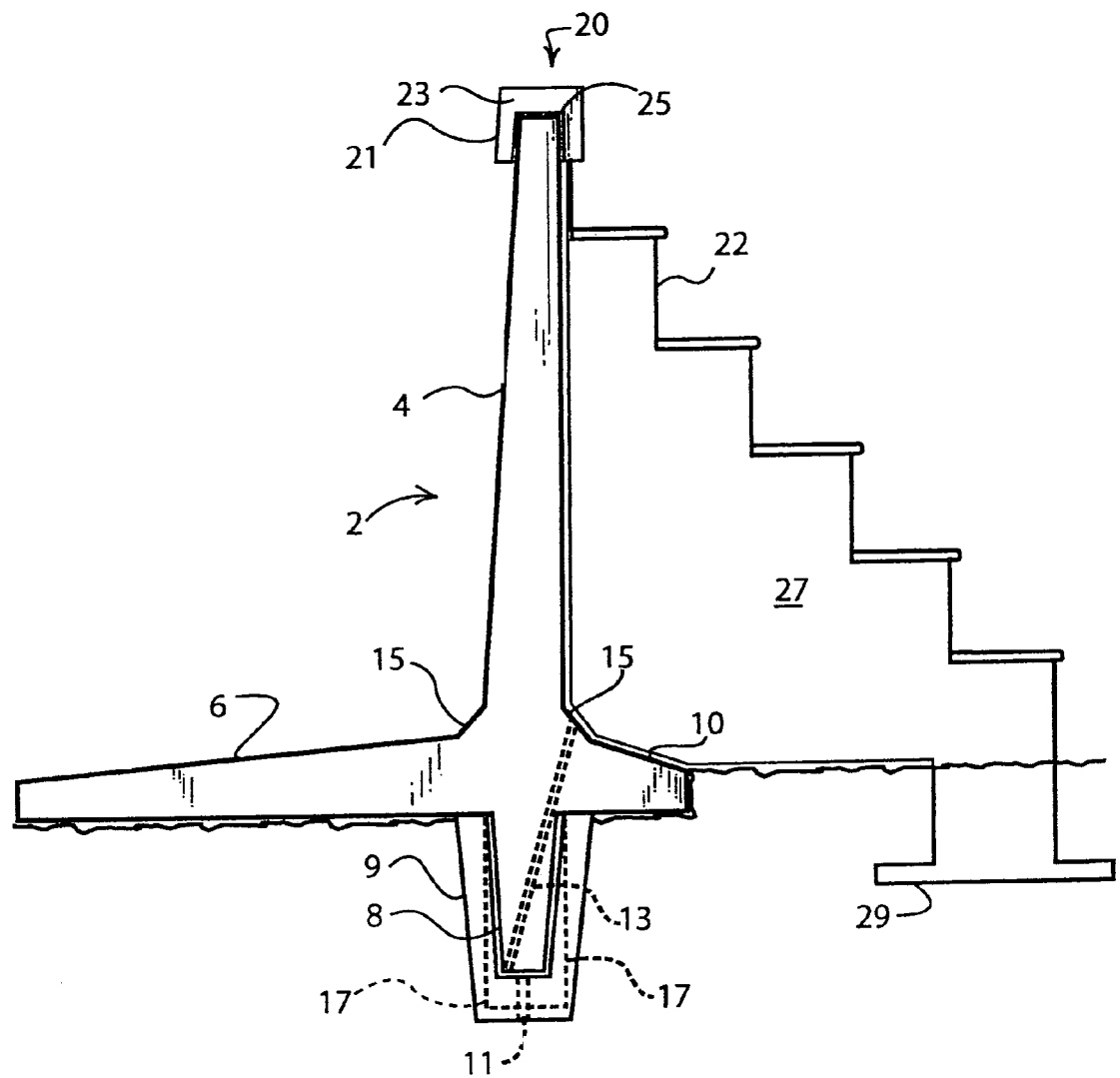
FIG. 5 is a side view of an improved "L-wall" for use in the present invention.

FIG. 5 is a side view of an improved L-wall in accordance with the present invention. Reinforcing bars, drain holes, securing holes and the like can be included as shown in FIG. 1, and are omitted here for clarity. Fillets (15) can be formed of concrete between wall (4) and footer (6) (and/or splash plate (10) to increase the strength of the unit and provide more cover for the steel reinforcing bars. L-wall (2) is shown with vertical key (8) placed in a concrete culvert or "trench" (9) of various depths which has been dug, leveled and backfilled to facilitate installation of the L-wall. Pipe (13) is cast into the portion of the L-wall between splash plate (10) and footer (6) to provide a channel for pressurized water (or water-air mixtures) to be used for "jetting" the key (8) into place in sand and/or for flushing the key trench. Only one pipe (13) is shown in this view, but a series of pipes are to be cast into the L-wall along its length to facilitate jetting the unit into the sand which has been cleared of rock and debris. Any suitable arrangement of hoses and/or manifolds can be used to introduce water and/or air through pipes (13) during "jetting in" the L-wall. Such "jetting in" procedures are described in columns 9/10 of U.S. Pat. No. 5,697,736. Another series of pipes (11) are included in trench (9), also to assist in jetting the trench (9) into the sand. Expanded metal or heavy wire mesh is bent into lengths of rectangular reinforcement (17) which are open at one end and cast inside trench (9) to form a reinforcing structure.

Improved L-wall (2) is shown here with a precast concrete tip cap (20) placed atop the vertical or stem portion (4). Tip cap (20) is formed much like a household rain gutter, with sides (21) and bottom (23) defining channel (25), and is preferably cast in appropriate lengths to cover the entire length of the L-wall, although they can also be formed in shorter units. Among other uses, such caps (20) can be placed atop a series of L-walls to hold the tops of their stems (4) in alignment. Also shown schematically with this improved L-wall (2) is a set of precast concrete steps (22) cast with cap (20), a precast body incorporating a series of right angles which can form steps when aligned with one side of stem (4) of L-wall (2). The steps are braced on both sides by solid sidewall units (27) which are cast on each side of the step ends and contact L-wall (2) on the seaward face, respectively, of stem (4) and splash plate (10). Such a step installation can be conveniently used by persons to climb to the top of the L-wall, which may form a portion of a seawall, bulkhead or the like. Such steps could be placed near the upstream or uncurrent side of a groin, where they would be covered by more sand on the lower steps for stability.

Figure 6:
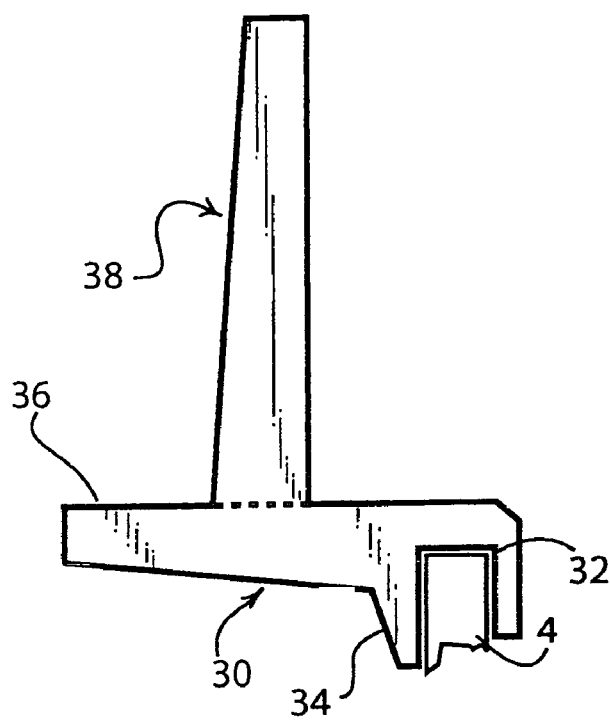
FIGS. 6 and 7 are sectional views of accessories in use with the L-walls of FIG. 5.

FIG. 6 is a side view of another accessory for L-walls (2), namely a precast concrete sidewalk cap 30 having a channel (32) formed therein to fit atop stem (4) of L-wall (2), a cantilever support (34) and a flat walking surface (36) extending to one side of the unit. When L-wall (2) is built into a seawall or the like and the landward side is filled in, such sidewalk caps (30) can be installed atop the L-walls to provide a flat surface suitable for use as a sidewalk or the like. Furthermore, precast concrete terrace retaining walls (38), having a slightly tapered rectangular cross-section, can be cast into such a sidewalk cap (30) to extend the height of the L-walls. This is also convenient for forming a low wall separating a sidewalk or walkway from the seaward side of a seawall constructed of L-walls, if not backfilled. Optionally, retaining walls (38) could be separately cast and mechanically attached to sidewalk cap 30. In addition to providing a flat surface atop a seawall or the like which can serve as a sidewalk, sidewalk cap (30) covers the area immediately behind the L-wall to prevent scour from waves or rain. Terrace retaining walls (38) can be backfilled to provide retaining walls atop sidewalk cap (30), or left freestanding as safety rails.

Figure 7:
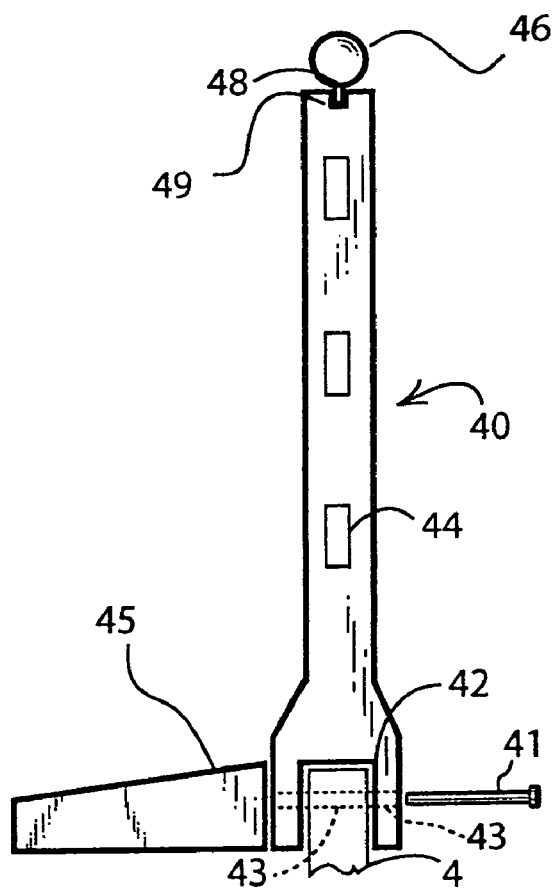

FIG. 7 shows a side view of the top of stem (4) of an L-wall (2) which has been topped with a railing cap (40). Railing cap (40) has a broadened lower end containing a channel (42) adapted to fit the top of stem (4) (as with the sidewalk cap discussed above), and is secured in place by slipping channel (42) over the top of stem (4). Cap (40) can be mechanically fastened to stem (4) by any suitable mechanical means, such as pins or bolts (41) passing through holes (43) in both the base of cap (40) and stem (4). A cantilever section (45) can be added to cap (40), either cast integral therewith or attached by any suitable mechanical means, to add strength and provide a narrow walkway landward of cap (40). As with the sidewalk caps, these railing caps can be fabricated in various lengths, and can be used to keep the tops of the stems of adjacent L-walls in alignment in addition to providing a railing or terrace wall atop an array of L-walls. Railing caps (40) can also be fabricated in much shorter lengths or as posts (i.e., a foot or so in length and width), with railings (not shown) inserted through holes (44) in adjacent units and mechanically secured in place. Optionally, for ornamental and personal comfort purposes, an ornamental railing 46 can be secured to the top of such railing caps by inserting mechanical connection strip (or pins) (48) into groove or holes (49) in the top of railing cap (40). Railings (46) can be made of materials such as wood, metal and polymeric compositions, preferably those which can be made smooth to the touch and durable when exposed to the elements.

The sidewalk, terrace and railing caps described above can be precast concrete as discussed in U.S. Pat. No. 5,697,736, and can be connected together if desired, by mechanical devices also disclosed in that patent.

Figure 8:
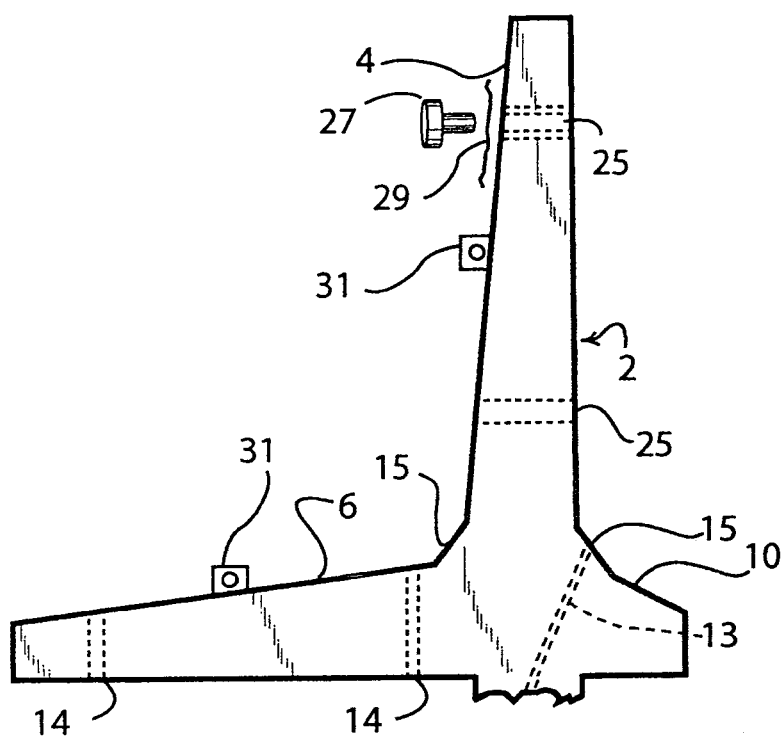
FIGS. 8 and 9 illustrate further refinements of the L-walls of FIG. 5.

FIG. 8 shows a side view of the improved L-wall of FIG. 5, with additional features. Holes (25) are included in the stem (4) of the L-wall during casting, to provide for drainage through the L-wall from the landward side to seaward. These holes can be plugged if necessary (e.g., when L-walls are used to form a dam or dike) with solid plugs (27) (formed of any durable polymer such as polyvinyl chloride), or hollow plugs retaining in place a filter cloth soil retainer (29). Filter cloth retainers (29) are used in lieu of a larger continuous piece of filter cloth or geotechnical material to cover holes (25). If such filter cloth or geotechnical fabric should deteriorate over time, additional solid or hollow plugs could be inserted from the accessible seaward side of the L-wall. Perforated metal or polymeric fittings (31) are cast into stem (4) and/or footer (6) at each end of the L-wall to provide means for interconnecting the L-walls via bolts or other suitable mechanical fasteners. Drain holes (14) can be left open or plugged with solid plugs (27) or hollow plugs with filter cloth, as described above.

The improved L-walls of the present invention can incorporate the extended angular splash plates, disclosed in column (6) of U.S. Pat. No. 5,697,736 and the figures cited, which are incorporated herein by reference.

Figure 9:
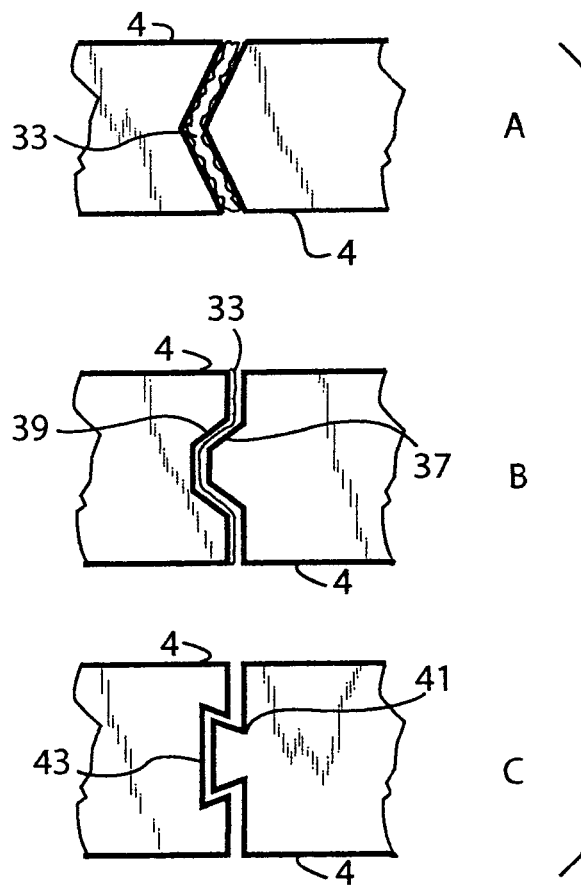

FIG. 9 provides a top view of the stems (4) of two L-walls (2) which are to be fitted together. In A, the edge of the stem (4) at the right is beveled so as to fit into a corresponding groove in the stem (4) on the left, backed by filter cloth for drainage or filled with bead caulk (33) or other suitable material to be inserted between their surfaces to provide a good seal between the two L-walls if used as a farm pond dam or the like. The L-walls of the present invention can be cast with one end of the stem beveled and the other grooved, as described, to facilitate such fitting together during installation. At B, the stem (4) at right has a trapezoidal projection (37) which fits into a corresponding groove (39) in the other stem (4). Caulking material (33) can be used as in A. The C version uses a dovetail method, with projection (41) and groove (43) in the two stems (4), to provide a more secure fit. One L-wall must be lifted to join the two stems in this case, and caulking is optional.

Figure 10:
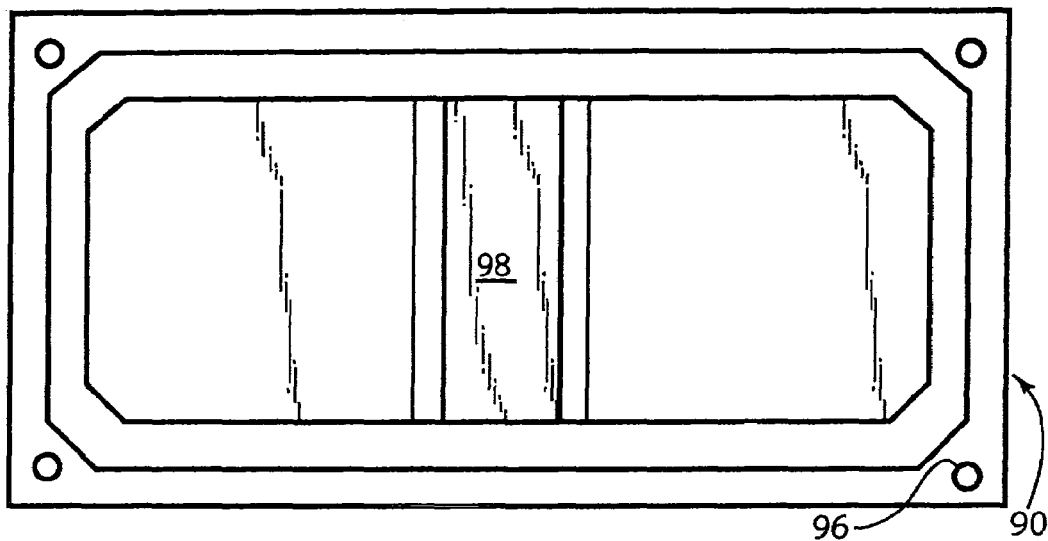
FIGS. 10-12 are plan, side and end views of improved precast concrete boxes of the present invention.
Figure 11:
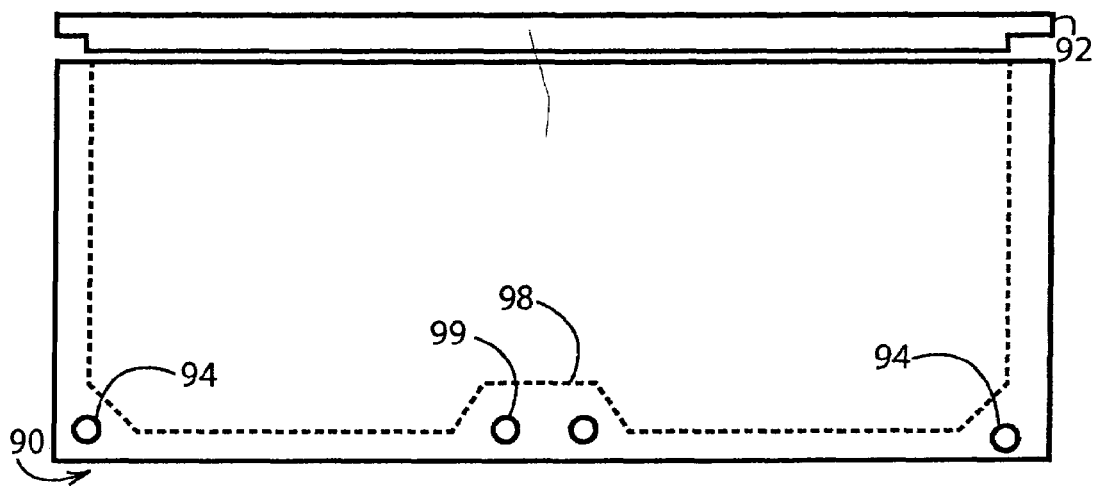
Figure 12:
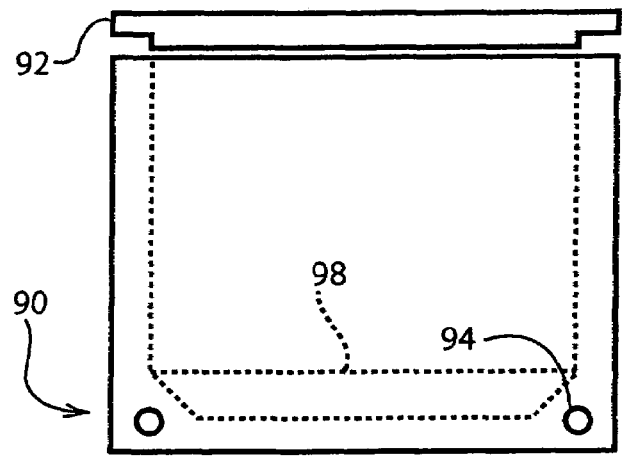

FIGS. 10 to 12 are plan, side and end views of precast concrete boxes of the invention which can be employed on shorelines, underwater and in intertidal zones. The boxes (90) take the form of a simple hollow box of rectangular parallelepiped form with sides, ends, bottom and open top, which can be optionally capped with a tight-fitting top (92), held in place by gravity or optional mechanical fasteners (not shown here). Top (92) is omitted in Fig. (10) for clarity. Holes (94) are provided in the lower corners of the sides and ends to be used for connecting cables or rods (not shown here). Vertical holes (96) are provided in each corner of the box at the top to assist in securing top (92) when used or for mechanical connecting devices when the boxes are stacked or secured to the bottom. A low sill (98) on the inside bottom divides the box into halves for connecting overlapping boxes alongside, and holes (99) extend laterally from side to side through this sill to accommodate connecting devices such as cables or rods and also handling means. The boxes shown here are intended to be fluid tight (when capped), in contrast to the boxes of FIG. 4, which are open to the water in which they are immersed. The boxes can be positioned adjacent each other (side-by-side and/or end-to-end) and fastened together using holes (94), (96) and (99) and various mechanical fasteners. When interconnected side-by-side, the boxes are preferably positioned in overlapping fashion (with the ends of two boxes positioned adjacent the center of a third box) to form a stronger structure. These boxes can also be stacked as shown in FIG. 4.

Figure 66:
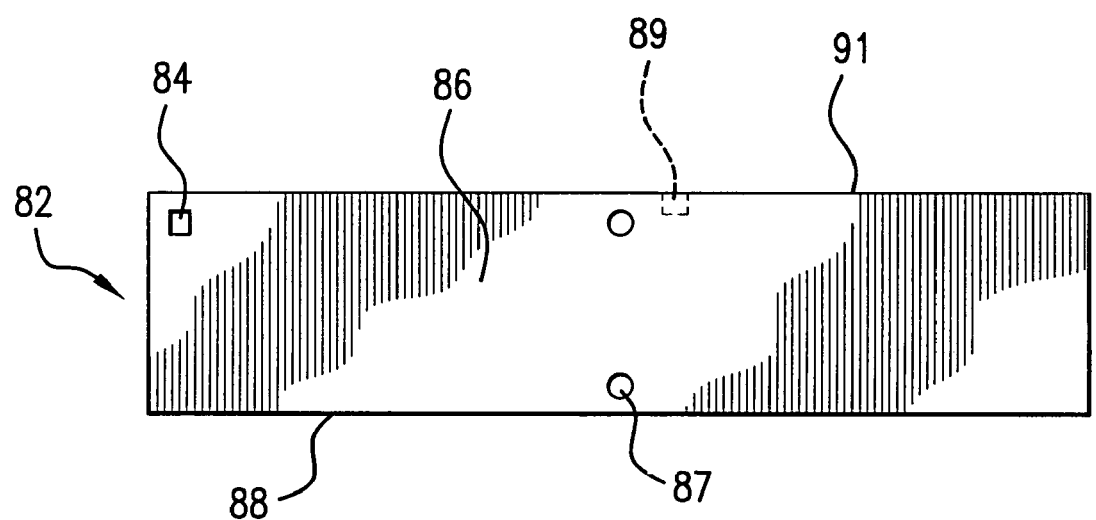
FIG. 66 is a side view of a metal shipping container adapted for use in structures of the invention.

Conventional metal shipping containers can be used in place of or in addition to precast concrete boxes in forming the shoreline structures of the invention, with slight modifications. Such modifications are illustrated in FIG. 66. The shipping containers 82 normally have small vent holes 84 approximately ½ inch diameter in a plate approximately 1"×2" in each upper corner on opposite sides 86 of the container, one forward and one aft. The access doors (not visible here) are in one end only. The arrangement in a line could be such that the access doors could be on the ends for access to check the internal condition when in the water or for storage underwater. Alternatively, with the door access facing inboard and doors therefore blocked by the adjacent container, the potential for damage or accidents would be reduced.

In cases where older or damaged shipping containers do not seal well at the doors, or are not airtight, an accessible door can be opened and a large elastic air bladder (such as fuel bladders widely used in the military) inserted. With the neck of the bladder extending through a top hole in the container, the bladder can be inflated and sealed to float the container for removal or relocation.

To easily install flood and drain openings, short lengths of steel pipe can be inserted and welded into holes 87 cut into the steel side of the box near the bottom 88. The size of the inside diameter (ID) of the pipe is such that it is the same that would accept standard plugs or valves. For instance the pipe could accept 4" plumbers' plugs in a 4" ID pipe.

The blow and vent valves could be installed in at least one hole 89 on the sidewall 86 near the container top 91 or on the top itself. In either case the valve and/or plug as well as the pipe should extend more on the inside than protruding externally so as not to interfere with the stacking of the units one above the other or side by side on a container ship for transport.

Figure 30:
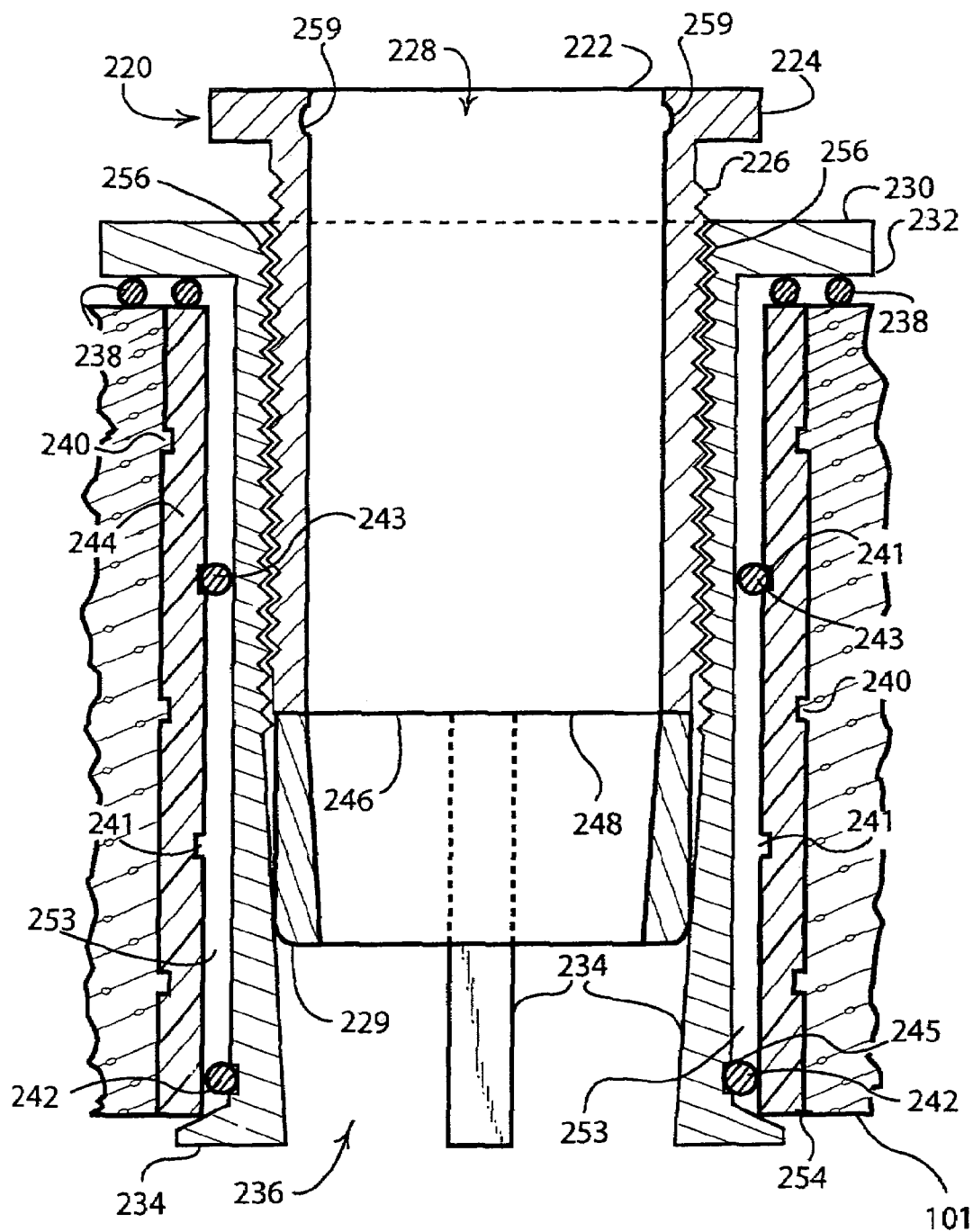
FIG. 30 is a sectional view of a quick connection for an air hose inserted into a hole in the tank which can be employed to refloat the precast concrete boxes of the invention.

A quick-connect valve such as disclosed in FIG. 30 of Applicant's earlier U.S. Pat. No. 6,491,473 (not shown here) can then be inserted into the pipe just as in an opening lined with pipe cast into a similar sized precast concrete module having the form of a regular parallelepiped. Suitable mechanical connections are added to the edges and/or corners of the boxes for interconnection, as disclosed herein for the precast concrete boxes.

These boxes and those described below are preferably "intermodal" shapes which can be conveniently handled and shipped by at least two modes of transportation, including trucking, railcar and surface water transportation including container ships and barges. That is, they have dimensions (length, width, height) which will permit them to conveniently fit into the allowable spaces in such transport media, either singly or in combination. For example, currently standard containers measuring approximately eight feet wide by 8.5 feet high and either twenty or forty feet long can be easily transported by ship, rail and trucks. Furthermore, these boxes can be produced as sets of at least two different sizes, having proportional dimensions which facilitate their use in standard size transportation media and together to form structures such as seawalls and other shoreline reinforcing systems of various sizes.

Figure 13A:
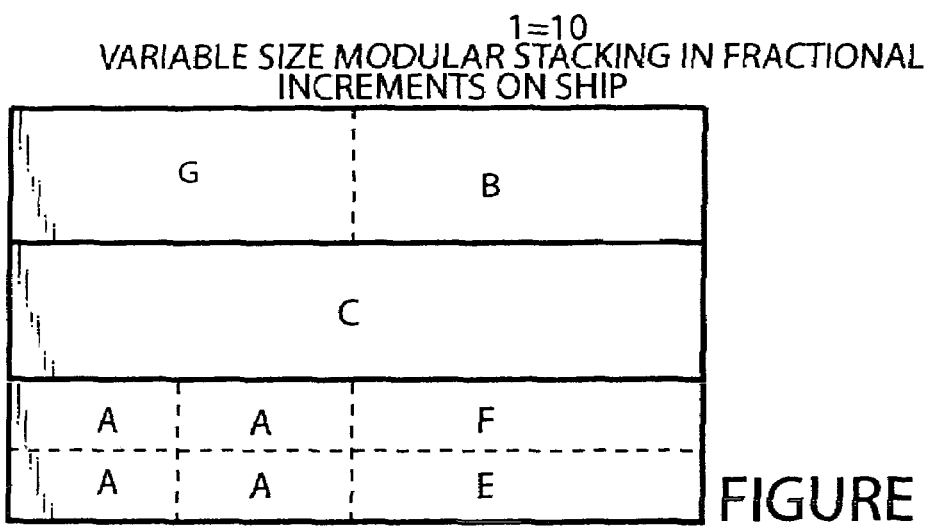
FIGS. 13A, 13B and 13C are plan, side and end views, respectively, of intermodal boxes of the invention arranged on deck for transport.
Figure 13B:
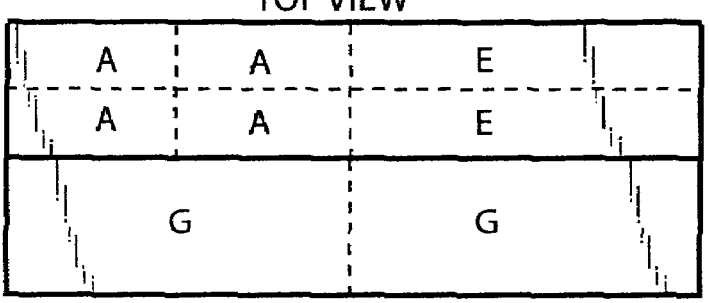
Figure 13C:
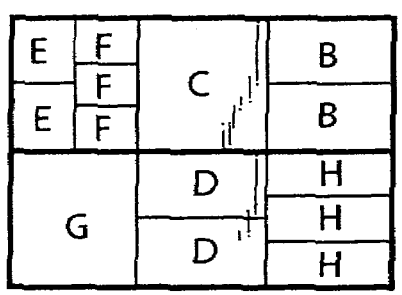

For example, FIGS. 13A, 13B and 13C provide top, side and right end and plan views, respectively, of boxes of several dimensions positioned on deck for transport in a space forty feet long and 24 feet wide, with boxes stacked to a uniform height of about 8.5 feet. The dimensions of boxes of types A through H are indicated in the legend. Clearly, where boxes having dimensions as large as about eight feet square by forty feet long can be conveniently transported, a number of boxes having at least one dimension a suitable fraction (e.g., one half) of these can be assembled to fill the same space for transport within frames. Thus, for an intermodal set of boxes, the maximum dimensions are determined by the maximum space available on deck and/or inside a truck trailer or railcar, and smaller boxes can be designed with similar proportions but having at least one dimension which is, e.g., one half or one third of those of the largest box of the set. In other words, the smaller boxes are produced with one, two or three dimensions which are a fraction (preferably divided by a whole number) of the corresponding dimensions of the largest box of the set, which may be described as the "master" box.

Figure 14A:
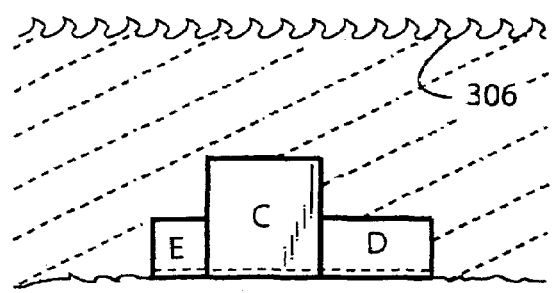
FIGS. 14A and 14B are end and plan views, respectively, of an underwater breakwater assembled of such boxes.
Figure 14B:
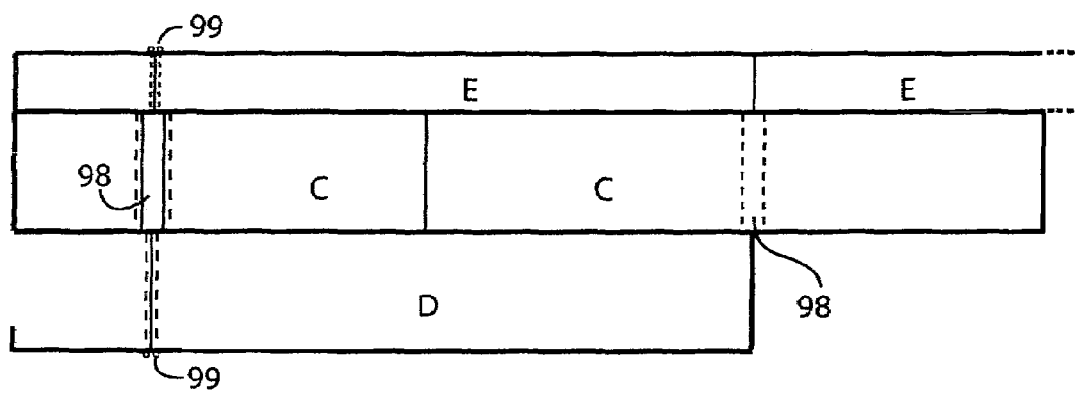

Similarly, FIGS. 14A (left end) and 14B (plan view) illustrate the use of boxes selected from those of FIGS. 13A and 13B to form a structure under the surface (306) of the water. Two "C" boxes with inner partitions (98) are positioned end-to-end, and are overlapped by box "D". Two "E" boxes are similarly placed, with their midpoints overlapping the junctions of the "C" boxes. Pairs of boxes can be interconnected by mechanical fasteners (99).

Figure 15:
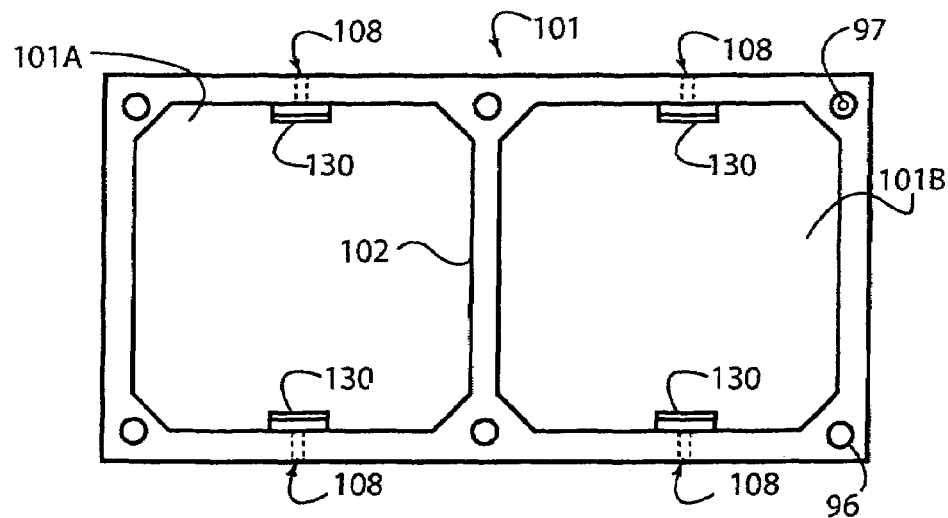
FIGS. 15-17 are plan, side and end views of such precast boxes with provisions for sinking same in water and raising them thereafter.

FIG. 15 is a top view of an improved version of the box (90) of FIGS. 10-12, with a partition wall (102) dividing the box (101) into halves 101A and 101B. The box has the general shape of a rectangular parallelepiped, with certain preferred ratios of dimensions which are discussed above. Vertical, horizontal and longitudinal sections of conduit are cast into the walls to form holes (96) in the corners and midpoints of the walls. These formed pipes can be used for reinforcement (shown as 97), lifter and stacking attachment points and post tension cables or conduits for wires or fluids when used as building modules. Slab tops (92) (not shown here, but similar to those of FIGS. 11/12) can be used to seal the boxes. Alternatively, such boxes could be cast in two halves, either top and bottom or front and back portions. Pressurized fluid (water and/or air) could support an internal expendable lightweight form to support the wet concrete being cast atop the cured bottom half to create a unitized watertight structure. Flood and drain holes (108) pass through the sides of box half 101A for flooding or draining, as discussed below, and are protected by internal grates (130).

Figure 16:
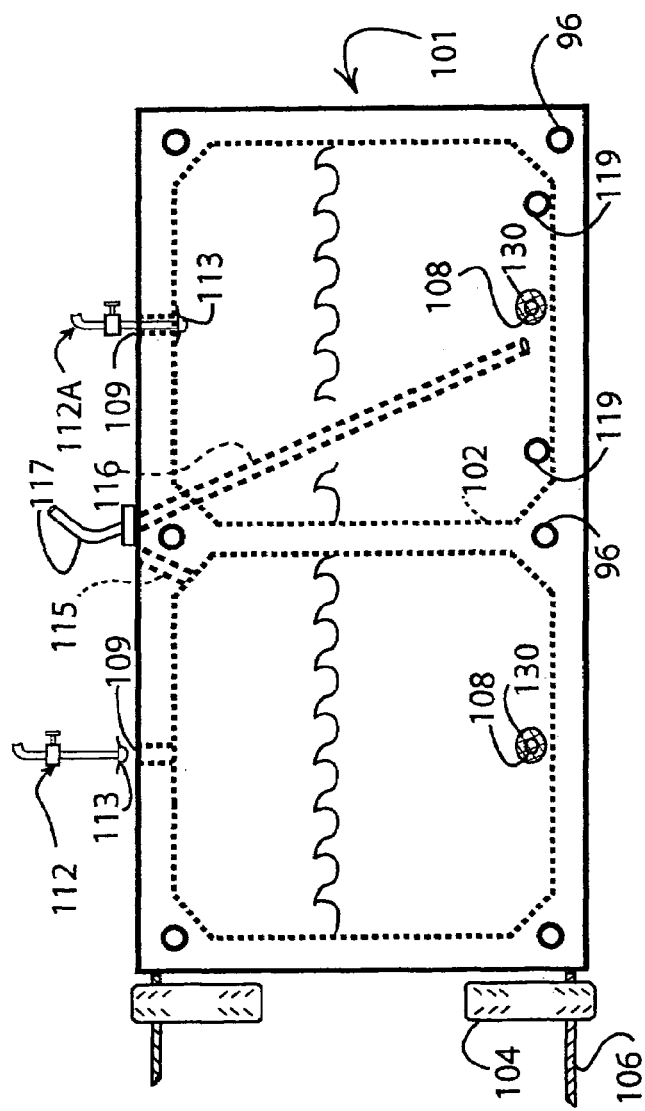
Figure 17:
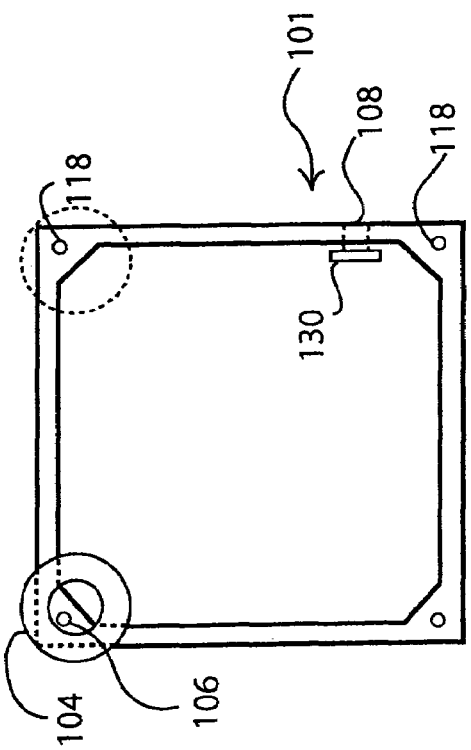

FIGS. 16 and 17 are side and end views of an improved box (101), similar to box (101) of FIG. 15, illustrating devices for flooding and blowing the box when in the water, and for fastening such boxes together to form a structure. The boxes are completely enclosed, including a solid top or top half bolted and sealed with gaskets, elastomeric sealants or other suitable sealing means. Cables (106) are connected to the left side of box 101 through holes 118 in the corners and tensioned to compress a line of boxes together, and are also connected to the adjacent box in an array thereof. Resilient cushioning materials such as used tires (104) are preferably suspended from cables (106) between the boxes to minimize impact damage where desired. Such cushioning materials should be placed at each corner between adjacent boxes.

FIG. 17 is an end view illustrating the placement of such tires, using holes (118) in the corners of the box. Flood/drain holes (108) (shown as one method for 101A) at the bottoms of the sides of the box half 101A are penetrated by knocking out a thinner casting of concrete should the box need to be flooded and sunk or later blown and surfaced. These holes are protected by inner grates (130) to keep out gravel, etc. Valve assembly (112) with an expandable washer which seals inside against air pressure, an example of which is shown inserted as (112A), is held in place in blow and vent hole (109), and sealed by a flexible "bayonet" anchor washer (113). An expandable and threaded quick connect blow fitting (shown in FIG. 30) is an alternative. Holes (115) penetrate the reinforced section adjacent to partition wall (102), and can be unplugged and fitted with pipe snap-in connections (116). To flood the box, hose (117) can be attached to the discharge of a pump or inserted into the sea and used as a siphon with hole (108) open, or alternatively inserted in valve (112A) open as a vent. To deballast water, this is used if the flood/drain holes (108) are intact and are covered by accreted sand. Also, these holes (115) can be interconnected to equalize pressures between the two sections of the boxes to float level. One end only could be deballasted to raise that end and break the bottom suction forces to surface the box. Alternative flood/drain holes (119) can be included in the bottoms of the boxes, with external plugs which could be uncovered and removed to permit deballasting. The box can be made to float unevenly if needed by partially flooding the portion at the end to be deeper.

Figure 18:
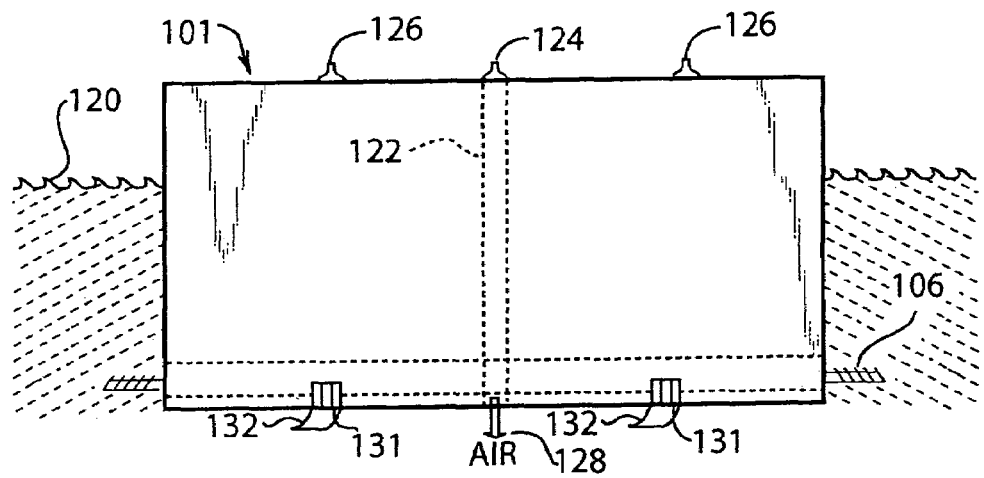
FIG. 18 is a side view of a precast concrete box of the present invention floating near the surface of a body of water.
Figure 19:
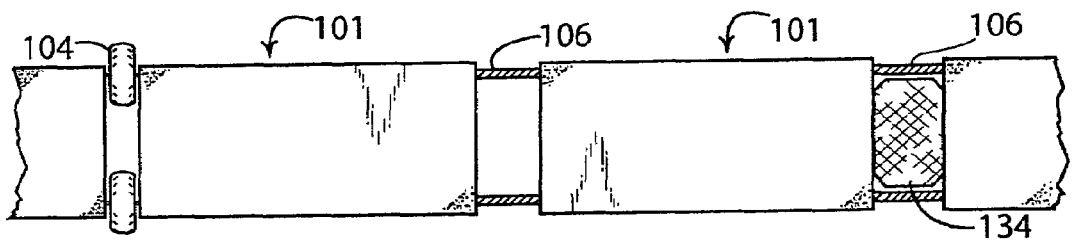
FIG. 19 is a top view of a series of precast concrete boxes connected together to form a structure.
Figure 20:
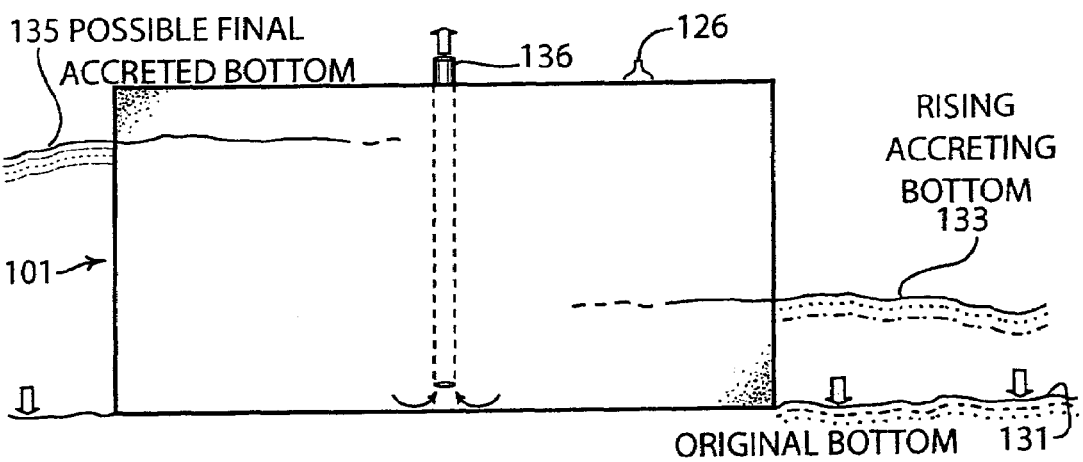
FIG. 20 is a side view of a precast concrete box of the invention which has been sunk to the bottom in a body of water.

FIGS. 18 to 20 illustrate a method of floating single compartment boxes into position and sinking them in place for installation. FIG. 18 is a side view of a box (101) floating near the surface of a body of water (120). Box (101) can be attached to a similar box via cables (106) attached at the corners or passing through holes (118) at the corners (only partially shown for clarity). High pressure blow/vent valves (126) (similar to valve 112 in FIG. 16) are fitted to the top of box (101). As an addition, a septum with an air pipe or simply an air pipe (122) with valve (124) can be used to break suction, and air can be ejected through the bottom at (128). Grated flood/drain check valves (131) are fitted with rubber flapper covers (132) which close after the box has sunk to the bottom to prevent sand entry, but open when air pressure forces water out of the box for deballasting.

As shown in FIG. 19, several boxes (101) can be interconnected to form an array, with cables (106) and tires (104) between adjacent boxes. Alternatively, larger cushioning materials (134), such as an inflatable fender, rope fender or the like, can be employed. In operation, a single box (101) or an array thereof (FIG. 19) is placed in the body of water near the proposed underwater or tidal installation and moved into position. The box or array can be pushed or towed by tugboats, small boats or any other suitable force. Once in position directly above the proposed installation site, the box or boxes are sunk in place by opening vent valves (126).

Figure 46:
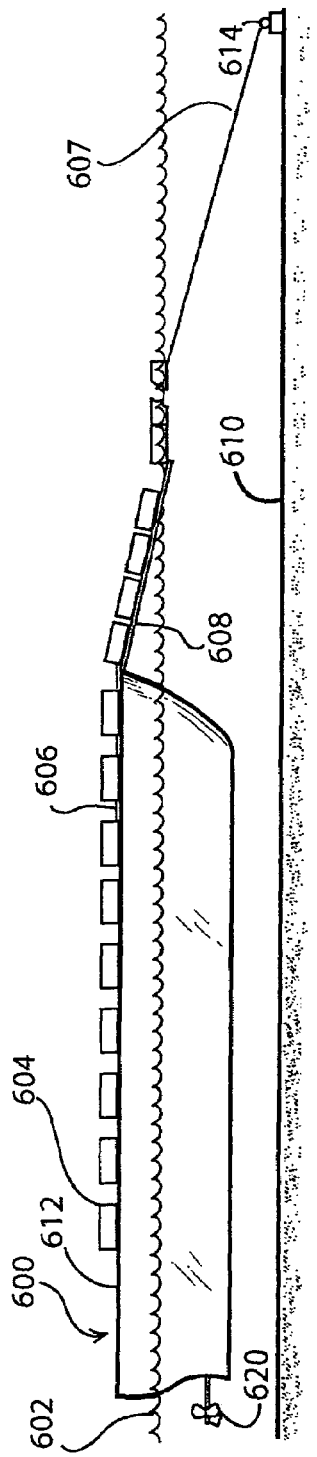
FIGS. 46-48 are side views illustrating the launching of floating precast concrete boxes of the invention from a ship or barge and the sinking thereof to form an underwater structure.
Figure 47:
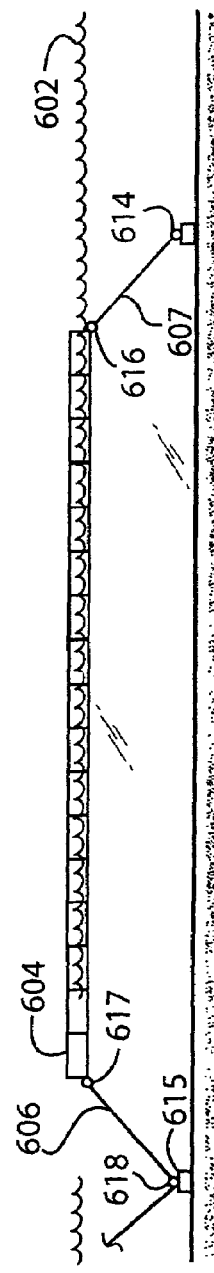
Figure 48:
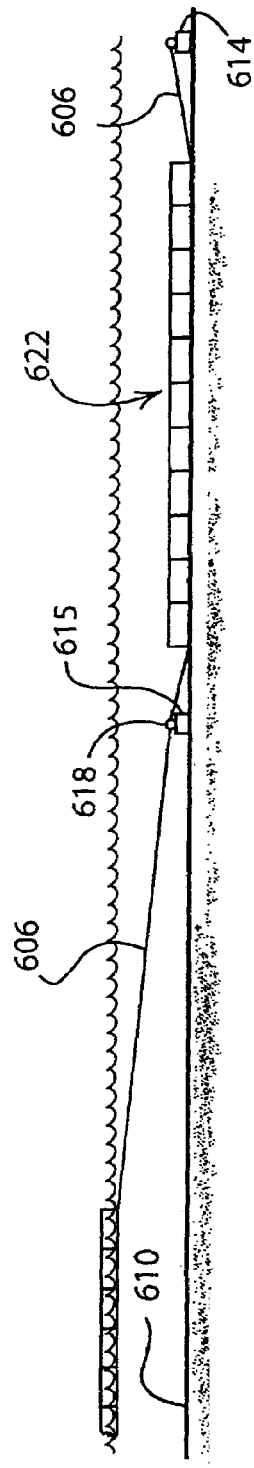

Hydraulic or electrically operated valves, actuated by suitable signals conveyed by electrical, acoustic or optical (i.e., fiber optics) means, can be opened sequentially for a controlled and coordinated sinking of the boxes. The box or array will normally require some longitudinal restraint or guidance, such as anchors, to ensure that it sinks into the desired spot. Lines tended by anchored boats or divers should suffice for side-to-side alignment of the boxes. Alternatively, anchors and small craft or tugs can be used, as illustrated in FIGS. 46-48.

FIG. 20 is a side view of a box (101) which has been sunk in body of water (120) to rest upon the bottom (131). Rock, gravel, sand and other materials can be added in and around the structure to create great mass inside (if (101) is an open box) and a higher sea bottom around the box or array thereof, as indicated at (133), and with time and tide, additional sand, silt or other materials may collect around the structure to create an even higher bottom surface, as at (135). Also shown in FIG. 20 is a pipe or tube (136) extending from top to bottom of box (101), providing an alternative method of flooding and draining the box. Air can be vented through valve (126) while water is siphoned into or is pumped in through pipe (136) to initiate flooding of the box, until pipe (136) is submerged when air venting through valve (126) will suck water in through pipe (135). Suction can be applied to substantially drain the box when needed, with air admitted through a hose, or while air under pressure through valve (126) will also do the job. Pipe (136) is permanently installed or can be inserted through unplugged precast holes.

Figure 21:
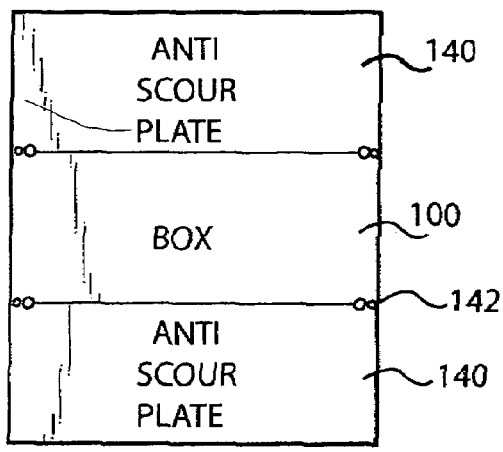
FIGS. 21-23 illustrate anti-scour plates for use with the precast concrete boxes of the invention.
Figure 23:
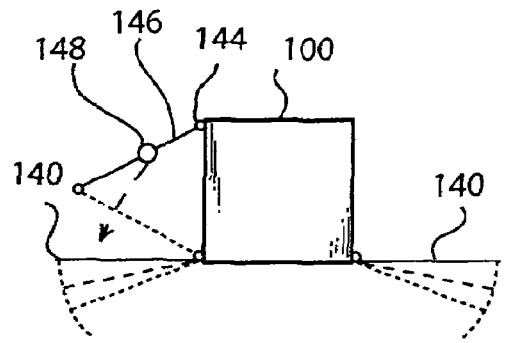
Figure 22:
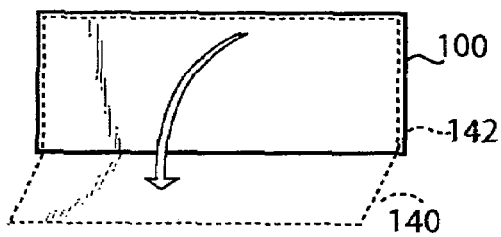

FIGS. 21, 22 and 23 illustrate the use of anti-scour plates in conjunction with the boxes of the invention. As described for the L-walls of the invention in U.S. Pat. No. 5,697,736 at columns 5/6, waterfront structures subject to waves, tidal action or storms may require devices to prevent water from "scouring" or eroding the beach material from under the seaward edge of the structure. FIG. 21 is a plan view showing anti-scour plates (140) attached to both sides of box (100) at the lower edges by mechanical means (142) such as hinges, hooks, rings, cables or the like. When both sides of a box incorporated in a waterfront structure are exposed to water, anti-scour plates on both sides may be required, as seen in FIG. 21. As shown in FIG. 22, when installing box (100), anti-scour plate (140) can be lowered into a position to contact the beach or underwater bottom surface beside the box. Prior to installation, anti-scour plate(s) (140) can be retained in place against the sides of box (100) by suitable mechanical means such as lockable lashing eyes (170) (shown in FIG. 25). As shown in FIG. 23, the anti-scour plates (140) can be raised or lowered into position by any suitable mechanical means, e.g. using cables (146) attached to attachment points (144) and winch (148) (or other hoisting means). Once lowered to contact the beach surface, such anti-scour plates may be covered by deposited sand and gravel or scoured and lowered to a position of stable equilibrium and embed themselves in the beach or underwater bottom surface to prevent water from removing beach material from under the edge of the box. Such anti-scour plates can be formed from precast concrete, corrosion-resistant metals, geotextile materials, polymer composites, or any suitable material which has the required properties of stiffness and durability. The boxes can be shipped with anti-scour plates attached, or the components can be shipped separately.

Figure 25:
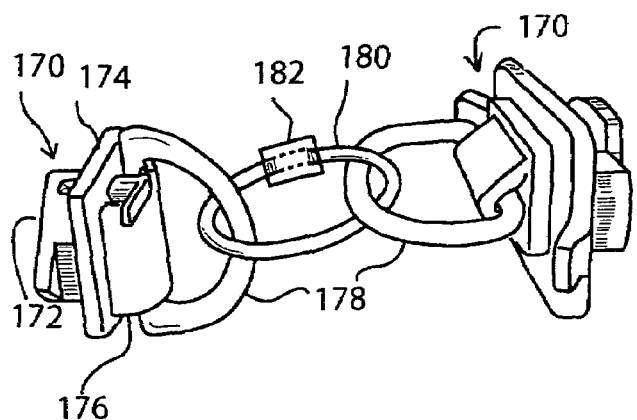

FIGS. 24 and 25 illustrate mechanical attachment means which can be used to fasten such anti-scour plates to the boxes. FIG. 24 is a perspective view of a commercially available "twistlock stacker" (150) used to interconnect containers on container ships. These units include locking plate (158), attached to body (160). Handle (154) is used to manually rotate locking plate 158. To form a hinge, a large bolt (153) can be inserted through eye (155) of one unit (on top 156) and through the eye of a similar unit. The hinge is suitable for one-time uses, as in securing anti-scour plates to boxes.

FIG. 25 is a perspective view of two D-ring lockable lashing eye units (170), having D-rings (178) attached to D-ring hinge (176), which can be attached to boxes (100) by divers, or on the ship before offloading, and linked by mechanical means including chains, U-bolts or detachable links (180), closed by nut (182), to form a hinged attachment of the anti-scour plates to the boxes. The units can include lock (172), and the D-rings (178) are attached to plate (174). Such fittings are commercially available from many marine supply houses.

FIGS. 26 to 29 illustrate methods of attaching adjacent boxes (100) and/or (101) together to form arrays. FIG. 26 is a side view of two adjacent boxes (100), each having a locking plate receptacle (180) cast into the corner of the concrete box and anchored by steel connectors such as reinforcing bars (182). Such units consist of a hollow metal box with a smaller racetrack opening (185) embedded in the concrete to receive locking plate (186) of a twist lock inserted through opening (185) and twisted with lashing eye (189). Chains, cables, turnbuckles or other suitable mechanical connecting means (not shown here, for clarity) can be fastened to locking plate (186) to connect the boxes. These connecting means can be used in lieu of or in addition to tensioned cables (106) (see FIGS. 16, 18, 19) for interconnecting the boxes. Such connecting means can be connected onboard the ship or barge before offloading, or by divers on the bottom.

FIG. 27 is a side view of two boxes (100) held together by a differential screw (190) and cushioned by used tire (104) or the like. Female twist-lock locking plate receptacles (180) which are welded to reinforcing bar and cast into the concrete box (same as in FIG. 26) contain an oval or oblong lip and recessed larger opening underneath. Nuts (188) are included and attached pivotally to locking plate (186) through which differential screw (190) can be threaded through a twist-lock lug (188) to fasten the boxes together. Holes (187) in locking plate (186) provide recesses for a tool to apply torque to the lock. Fittings (192) for a power-driven drill socket are provided to tighten differential screw (190) and produce the desired spacing of the boxes and screw tension.

FIG. 28 is a side view of a simpler connecting system in which boxes (100) are fastened together by a turnbuckle (200) connecting recesses (187) in bases (184). Many standard commercial turnbuckles can be used, with hooks (206) of turnbuckle screws (202) inserted into recesses (187) and tightened by rotating turnbuckle screw (204).

FIG. 29 is a side view of two boxes (100) having recesses (187) in bases (184) installed in each corner, which are to be connected by a strong metal plate (210) (or the like) and two twistlock stackers (212), shown schematically in perspective as attached to the plate. The boxes are connected simply by positioning them the correct distance apart and inserting and tightening twistlock stackers (212) (shown in detail in FIG. 24) into recesses (187) and locking them therein.

FIG. 30 is a sectional view of a quick-connect fitting (220) inserted through a hole (254) in box (100) or (101) (formed by pipe (244) cast in place or placed in hole 254) for venting and blowing. A hole (254) is molded or otherwise formed in the wall, top or bottom of box (101), and is lined with or cast with a polymeric pipe insert (244) which is formed of polyvinyl chloride, another suitable polymer or other suitable material. Grooves (240) in the outer surface of insert (244) will retain part of the wet concrete and bond the insert (244) to the concrete hole if inserted during molding. Grooves (241) on the inner surface of pipe insert (244) can be fitted with elastomeric O-rings (243) to provide a seal between pipe insert (244) and locking fitting (230). A larger tight O-ring (242) fits in groove (245) to provide a force to squeeze locking arms (234) of the locking fitting (230) inward to allow a fit into pipe insert (244).

Locking fitting (230) is fitted with top flange (232) and flexible locking arms (234). Additional O-rings (238) are fitted between top flange (232) of locking fitting (230) and the concrete wall of box (101) and pipe insert (244). Locking fitting (230) is formed so that the upper portion of its inner aperture is threaded (256) and the lower portion of this aperture has a smaller diameter than the threaded upper portion. This allows unthreaded cylinder (229) to fit through locking fitting (230). Inner spreader insert (222) has a top hexagonal flange (224) and is externally threaded (226) to be screwed into threaded aperture (256) of locking fitting (230). Inner spreader insert (222) has a lower, unthreaded cylinder (229) which contacts the tapered insides of the locking arms (234) of locking fitting (230) when it is screwed in and spreads the locking arms (234) to contact pipe insert (244) with a cam action to lock and compress O-rings (238). With the quick-connect fitting secured and sealed to box (100) or (101), an air line with shutoff valve (not shown) can be inserted into hole (228) and locked into groove (259) to form a quick connect coupling to permit air to blow the water ballast out of the box or connect to vent valve to contain air to float the box or release air to permit flooding and sinking.

Figure 31:
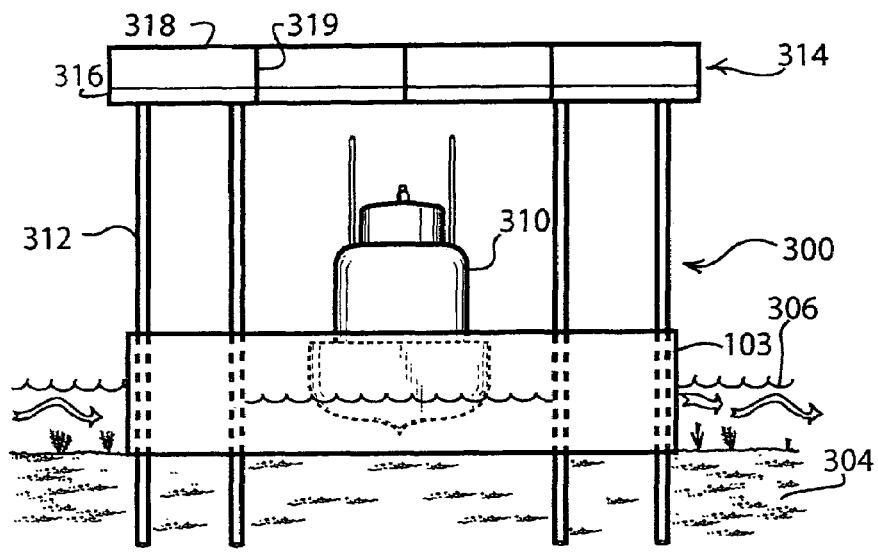
FIGS. 31-33 are end, plan and side views, respectively, of a waterfront boathouse constructed with precast concrete boxes of the present invention, resting upon the bottom.
Figure 32:
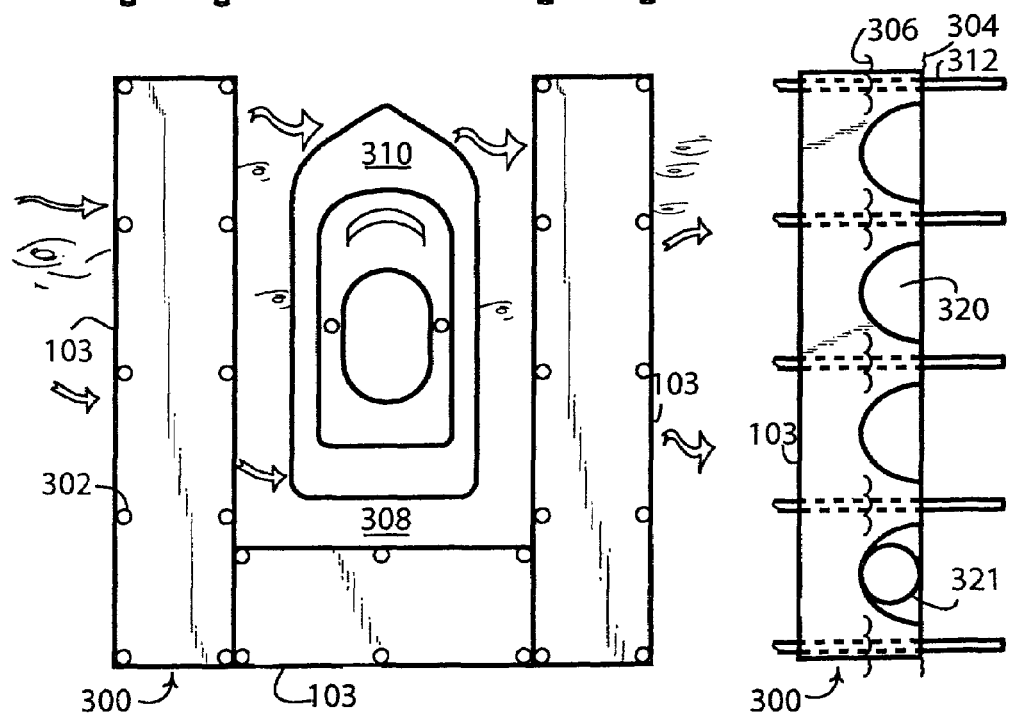
Figure 33:
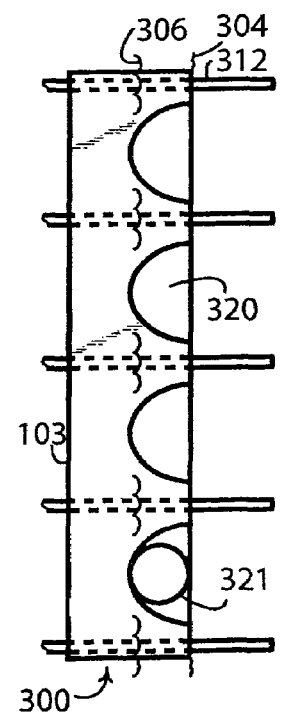

FIGS. 31 to 33 illustrate the use of such concrete boxes to construct a waterfront boathouse. Plan view FIG. 32 (without roof deck (314) for clarity) shows three or more concrete boxes (103) of suitable size and proportions assembled open side up, optionally fitted with concrete or wooden tops (e.g., as shown in FIG. 12) upon the bottom (304) of a shallow harbor or other body of water (306) in a U-shaped configuration forming a mooring area 308 to shelter a boat (310). The upper surfaces of the boxes (103) can be fitted with standard mooring fixtures and the like (not shown here), and allow passengers to easily embark and debark on or from the boat. Boats may be moored on the outer sides of the boathouse as well, if desired. As shown in end view FIG. 31, boxes (103) are higher than the depth of water (306), but for deeper water or locations where minor tides occur, boxes (103) can be stacked two or more layers deep to provide an upper surface which will lie above the highest normal water level. Holes (302) are provided in the closed bottoms and/or tops of boxes (103), or alternatively outside of the boxes, to accommodate pilings (312), which are driven into bottom (304) to retain boxes (103) in place. The boxes can also be interconnected by mechanical means, as discussed above.

The pilings are hollow tubes of metal or plastic pipe, which are filled with concrete when all boxes and pilings are in place to provide permanent structural strength. Since the main strength is provided by the concrete thus cast, the material for the pipes is not critical, but they are preferably made of durable plastic materials such as PVC so that they will not corrode. The boathouse structure here is emplaced with the closed end toward the shore (with normal walkways or the like provided for access, but not shown here) and the open end toward the water for boat access. The closed end of the boathouse is shown in FIG. 31.

Optionally, a roofdeck (314) can be provided, comprising a solid deck (316) perched atop pilings (312) and secured in place mechanically. Deck (316) can also be of precast concrete of suitable thickness such as precast sections spanning the distance between pilings (312) and any necessary supports, wood, recycled plastic "lumber" or any suitable building material. Preferably roofdeck (314) includes an open railing (318) suspended from posts (319) for safety, and is provided with access by stairs or ladders (not shown) for use by the owners. Movable or fixed side curtains or other closures such as fixed walls (not shown) can be provided for privacy and protection of boats using the structure.

Since such a structure with completely solid sides underwater could be vulnerable to scouring and forces exerted by local currents, as shown in FIG. 33, arched passages (320) and/or pipes or culverts (321) are cast or cut into the sides of boxes (103), extending approximately as high as the expected water level (306), to allow any currents to flow through as indicated by arrows in FIGS. 31 and 32. These boxes are preferably cast with a solid surface extending along arch (320) to provide a bottom of the box to hold sand which can be added for ballast. A flat bottom can also be included to spread the weight of the structure over a larger area, and the structure can also be mechanically attached to piles (312) for support to prevent settling.

Figure 34:
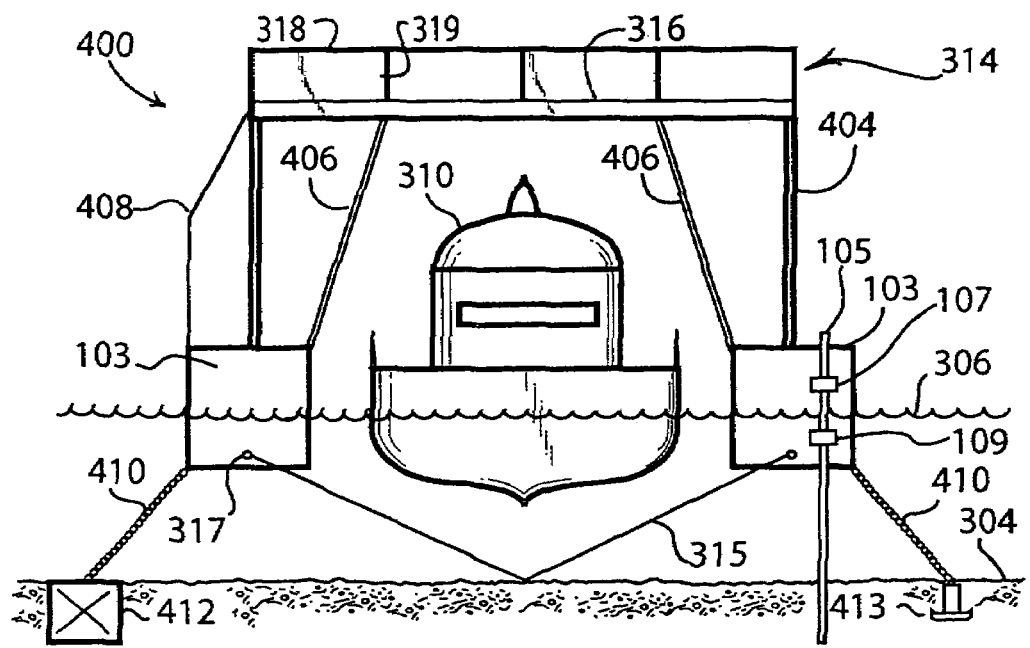
FIGS. 34 and 35 are end and plan views of a larger floating boathouse constructed using three large precast concrete boxes of the invention.
Figure 35:
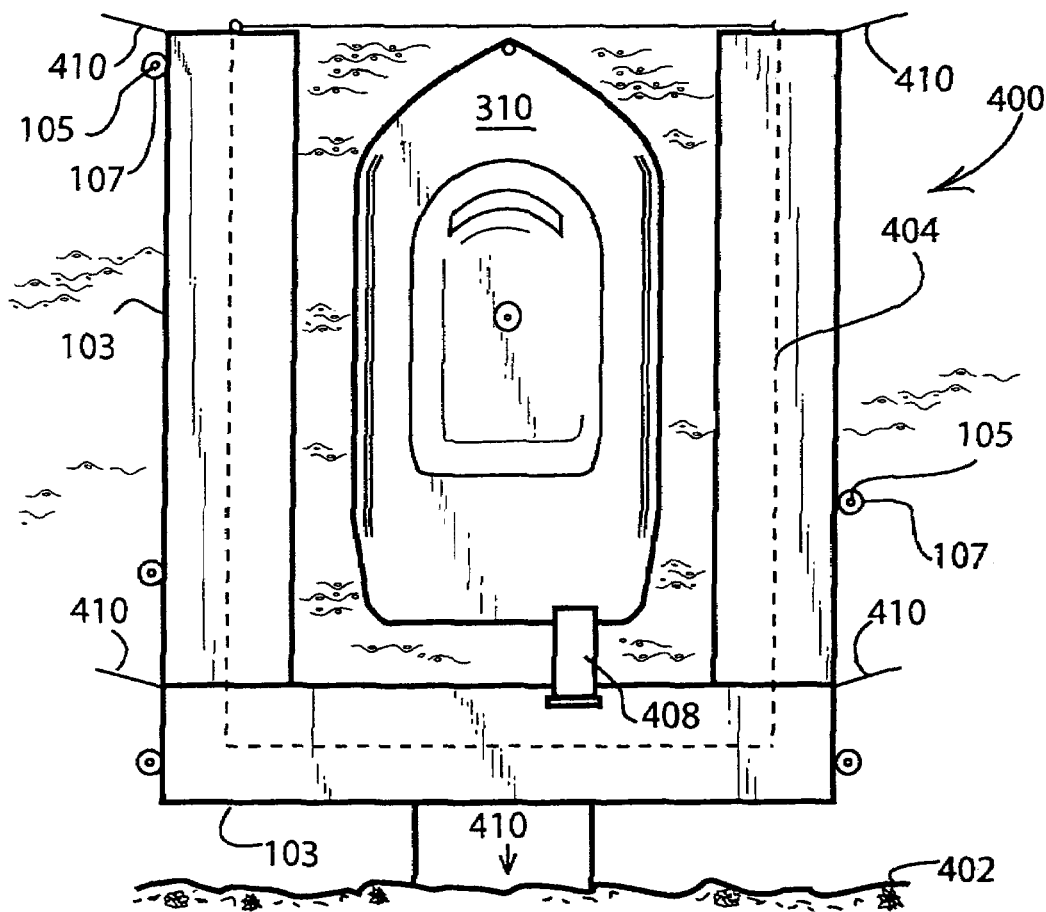

FIGS. 34 and 35 are open end and plan views of a floating boathouse (400) employing enclosed boxes (103) of the invention. Boxes (103) are again assembled to form a U-shaped structure to accommodate a boat (310) therein. The boxes are interconnected by suitable cables or connectors as shown in FIGS. 26, 27 and 28. Boxes (103) float in water (306) adjacent to shoreline (402). The boxes can be completely precast or enclosed by adding precast concrete covers as described in FIGS. 11/12 or decks of wood, recycled plastic lumber or the like. To help the boxes to float, they can be sealed to retain air, can be compartmented as shown in FIG. 15 and/or filled with foam, ping-pong balls, Styrofoam packing materials or other buoyant materials. Intermodal-sized boxes which measure eight feet square by forty feet long can conveniently be used. Boathouse walls (404) are erected upon the upper decks of boxes 103 to form a boathouse structure thereon. Walls (404) are preferably strong weight-bearing solid walls (using suitable construction materials discussed above) to support an optional deck (314) as described above, but can be cut out to form windows, doors, etc. Roof deck (316) supports rails (318) supported by posts (319). Beams (406) extend from the inner upper edges of boxes (103) to the lower surface of roof deck (316) to increase strength and rigidity.

The top decks of boxes (103) can be fitted with appropriate mooring fixtures for boat (310) (not shown here), allowing mooring both inside and outside the walls. The boathouse itself can be secured to bottom (304) by standard mooring systems such as a four point moor, chains (410) to clump anchor (412), or screw anchors (413). The boathouse can also be retained in place by a number of piles (105) passing through rings or brackets (107) which are attached to the sides of boxes (103). Ramp (408) or other suitable means can be used to provide access from the deck of box (103) to boat (310). Similarly, optional pier or walkway (410) connects the floating boathouse to land (402). Two or more rigid spacing bars (315) are provided between the arrays of boxes and mechanically attached at (317) to keep them in alignment. This boathouse design can provide a relocatable, permanent or temporary facility for pilots, marine patrols, military forces, Coast Guard, and the like.

Figure 36:
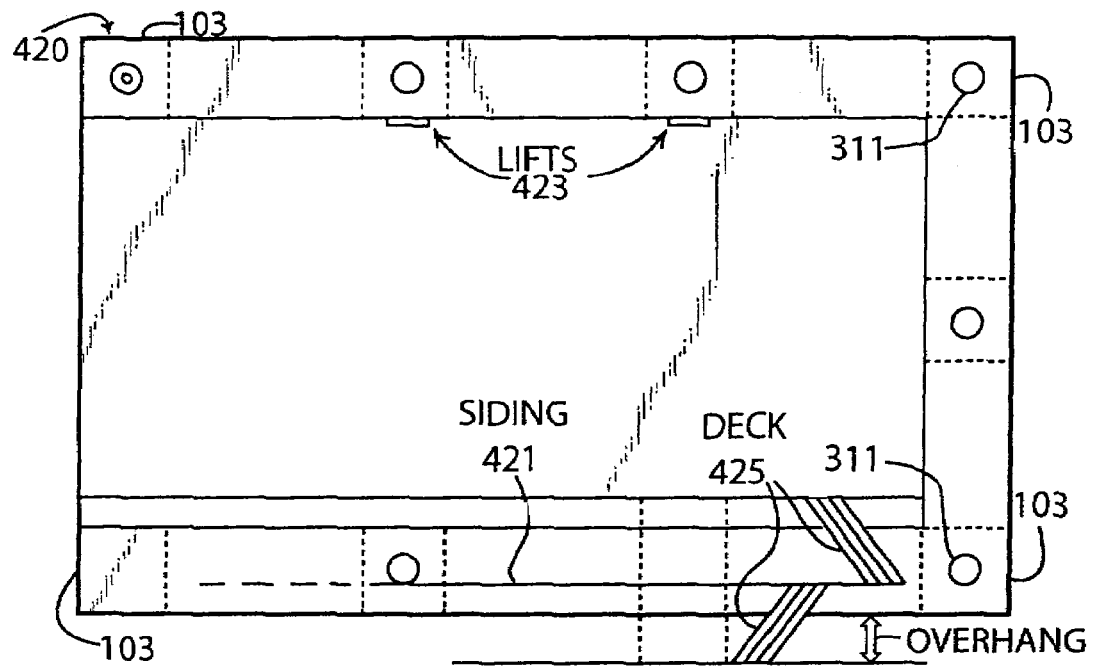
FIGS. 36 and 37 are plan and side views of a conventional fixed boathouse using piles surrounded by concrete boxes to protect the boathouse from ice.
Figure 37:
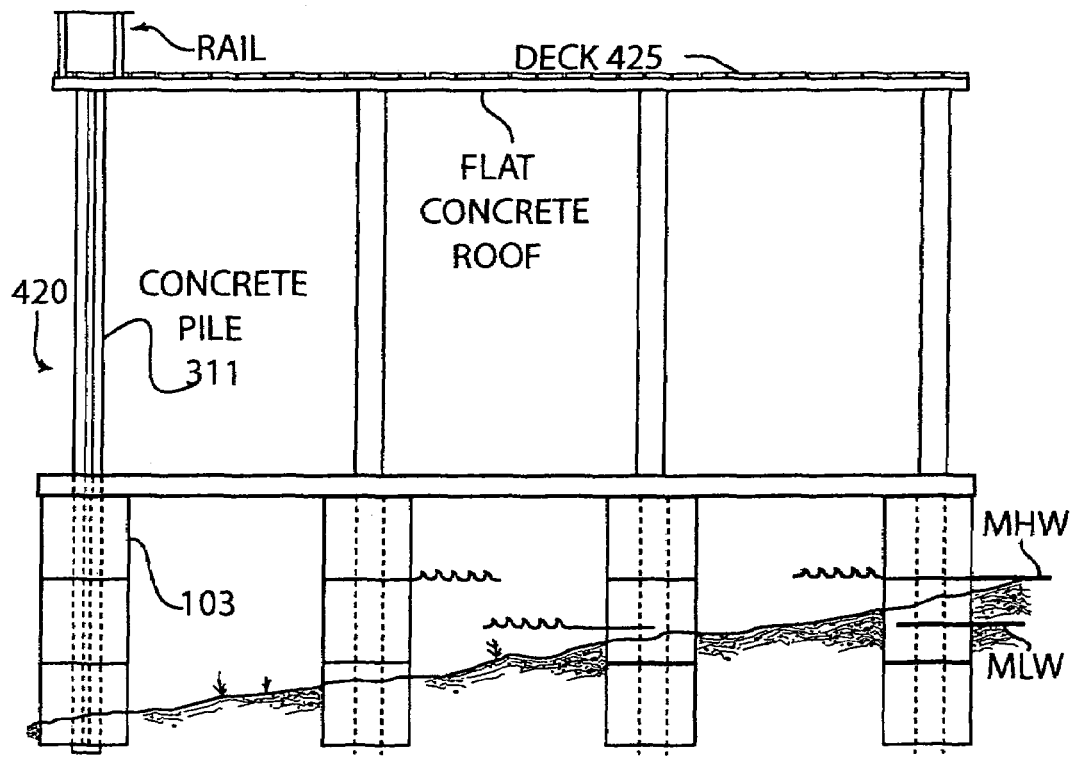

FIGS. 36 and 37 (plan and side views) illustrate a standard fixed boathouse design (420) with a series of concrete boxes (103) added around the supporting piles (311) to protect them from ice and storms by adding mass to the structure and deflecting floating objects. The piles can be any conventional type of wood, metal or concrete, or pipe filled with concrete as discussed in FIGS. 31-33. The concrete boxes which are placed about the piles are precast concrete boxes as described above, which can have either closed or perforated sides, and are approximately square in cross-section, preferably being approximately cubical. The piles are inserted through holes placed in the bottoms (and tops, if present) of the boxes, which are stacked in the positions where the piles are to be driven. Once the piles are driven and the boxes filled with water and sand or gravel, the assemblies form a support for the boathouse (or other structure) that is almost impervious to floating ice or other debris, waves or currents. The boxes are stacked and interconnected by methods discussed above. Such precast concrete structures extending from the bottom to the waterline or higher can be employed to protect various types of waterfront structures, such as decks, mills, dam or power plant components and the like. Lifts (423) can be provided to lift boats out of the water.

Figure 38:
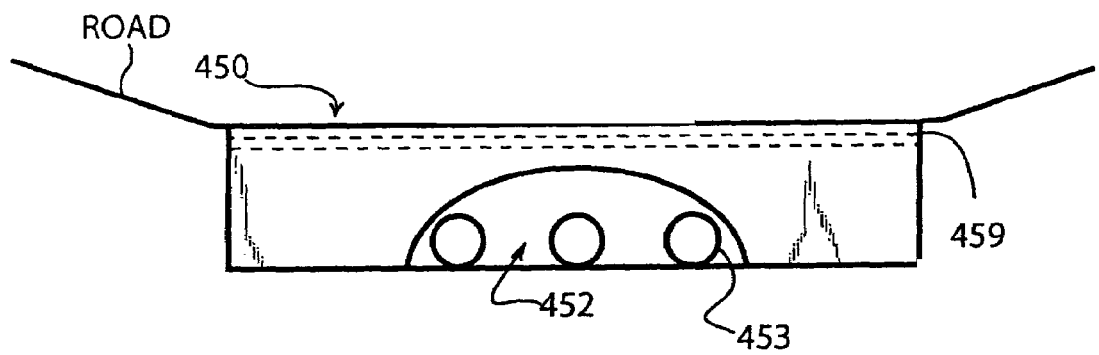
FIGS. 38-40 are side, top and end views of a modified precast concrete box of the invention which is suitable for building bridges.
Figure 39:
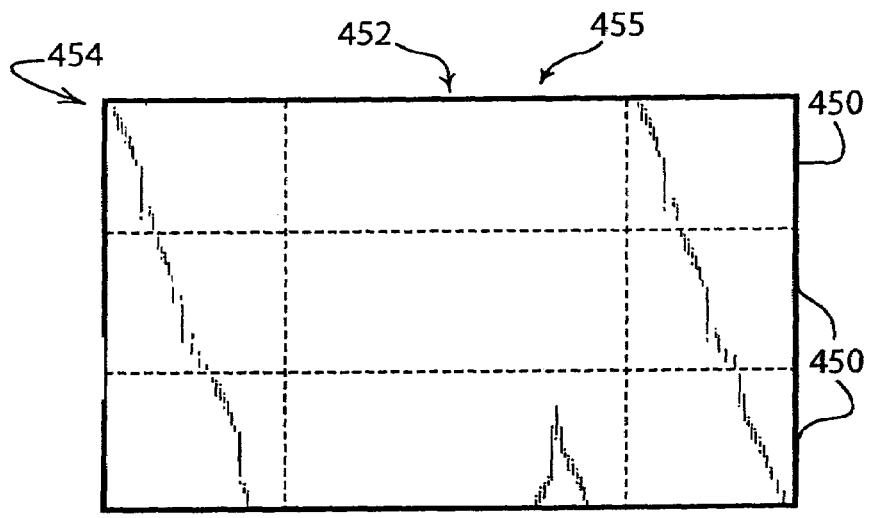
Figure 40:
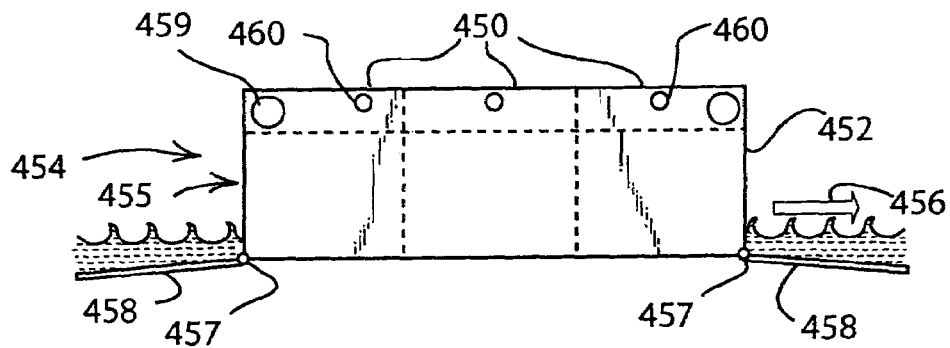

FIGS. 38 to 40 illustrate a precast concrete "bridge box" 450 which is a long, flat rectangular parallelepiped in form, including a hemispherical, round, rectangular or oval cutout portion (452) in both of the longer sides. The box can be closed on all sides except where cut out, or can be open on the bottom below cutout (452). Preferably the box is cast with a solid bottom along cutout portion (452), to retain sand which may be added via suitable inlets for ballast. Alternatively, pipes (453) of appropriate number and size can be cast into an otherwise completely enclosed bridge box. FIG. 38 is a side view of a single bridge box (450), while FIG. 39 is a top view of a bridge (454) assembled from three boxes (450) placed side by side to form a roadbed or path, cutouts (452) coinciding to form a culvert (455) for a stream or other running water to pass under.

FIG. 40 is an end view of the bridge (454) of FIG. 39, showing a water flow (456) through the culvert. Preferably concrete anti-scour plates (458) are fitted by hinges (457) on both sides of boxes (450) to protect the lower edges where water flows through the culvert. Additionally, large or small pipes (459) and (460) cast into the boxes as conduits provide ready-made and protected means for installing utility lines. Such bridges or structures can be incorporated into shoreline reinforcement systems constructed in accordance with the invention. They can also be used to construct structures requiring bases which will accommodate water flow, such as the boathouse illustrated in FIGS. 31-33. This bridge box structure and method could provide for much cheaper and faster construction of bridges, addition of traffic lanes, or replacement of old bridges over small streams and rivers. They could also be post tensioned over a wider stream or marsh. This design could also be used as a box penetration for storm water to pass from beachfront roads through "boardwalk" boxes and berm boxes to allow storm water to flow to the sea.

Figure 41:
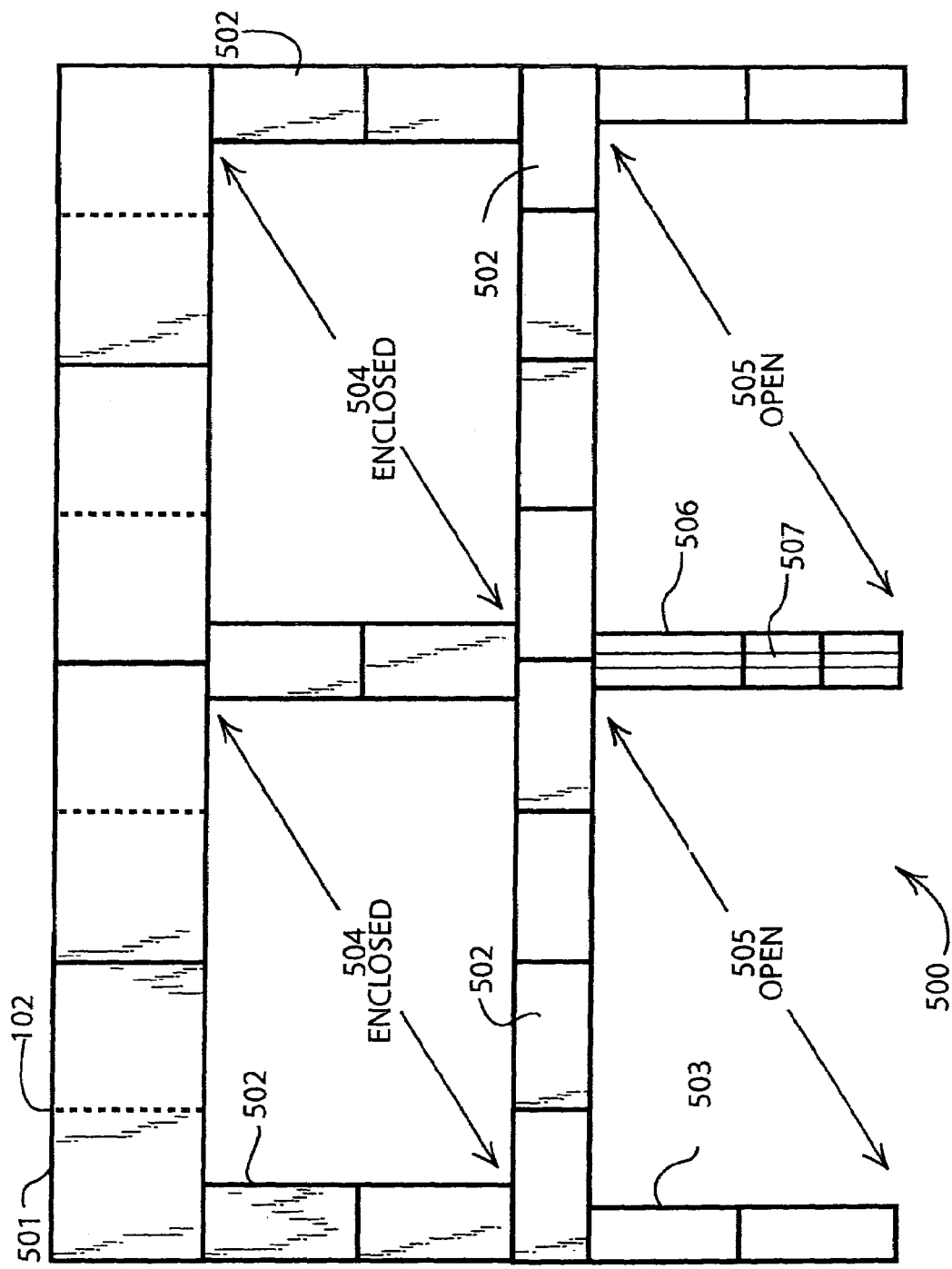
FIG. 41 is a top view of a shoreline reinforcement system assembled from precast concrete boxes of the present invention.
Figure 42:
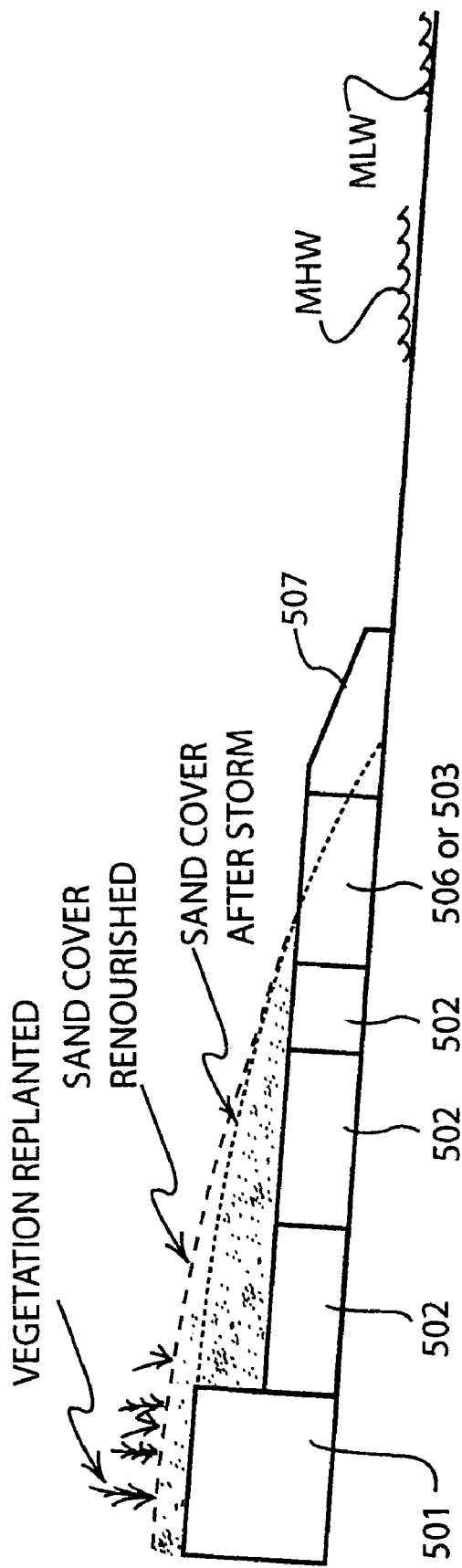
FIG. 42 is a side sectional view of the shoreline system of FIG. 41.

FIGS. 41 and 42 illustrate a shoreline reinforcement system constructed primarily of precast concrete boxes in accordance with the invention. In form and effect, this system resembles the systems disclosed in U.S. Pat. No. 5,697,736 in columns 11/12 and FIGS. 18/19. FIG. 41, the plan view, shows an array of boxes of various sizes assembled along the shoreline to form a seawall and a "backbone" structure for a berm or sand dune seaward of the seawall. These boxes, in suitable sizes and proportions and numbered (501), (502) and (503), will generally be installed by heavy equipment such as cranes or tracked excavators, either from seaward or shoreward, and are filled with sand to provide permanent ballast. They can then be topped with permanent precast concrete covers if desired to form a walkway atop the seawall and prevent scour of the fill inside the box. These boxes can be described as "boardwalk boxes" (501) and are described in detail and illustrated in FIGS. 10-12. The boxes can take the form of rectangular parallelepipeds, typically about eight to twelve feet wide by twenty to forty feet long by eight to twelve feet high, or can be nearly cubical units half that long. The large boxes (501) shown are segmented (with partitions 102) and can be about eight to twelve feet square by forty feet long. Using boxes in at least two lengths facilitates their installation in lengths suitable for the construction site and local conditions. Also, as described above, it is convenient for shipping to use intermodal units having lengths of ten, twenty or forty feet.

Extending laterally down the beach from the seawall are at least two arrays of "berm boxes" (502), which can be about four to eight feet high by eight feet wide by twenty feet long, to provide berm groins and closed berm cells (504) much like those employed in the systems in the patent cited. Smaller box groins (503) form open groin cells (505). These may be open boxes which are filled with sand and then fitted with tops, or if local tidal conditions permit, can be floatable boxes which are floated into position and then sunk in place, as described above. Another lateral row of berm boxes (502) is installed perpendicular to the berm groins and approximately parallel to the seawall, filled with sand and left open or covered. The beach spaces between the berm groins and lateral rows of boxes are partially filled with sand and preferably covered with filter cloth and articulated concrete mats as disclosed in the patent cited, in columns 10/11 and FIGS. 16/17, then covered with more sand.

Alternatively, the spaces can simply be partially filled with gravel, rip-rap and/or sand, and local winds, tides and waves allowed to deposit additional sand, etc. with time. The result will be a stable structure that prevents erosion of the shoreline and actually tends to build up sand and gravel to form additional beach under most conditions. Storm protection is also provided for the boardwalk (or seawall) boxes and the landward buildings and other structures.

Additional smaller groins (503) can be added to seaward of the lower lateral row of boxes described above. Such groins (503) can be formed of arrays of at least one "beach box" (503) (which can be about four feet wide by four feet or 2' 8" to 4 feet high and ten or twenty feet long) at the right and left sides, as described above for the berm boxes, and filled with sand or gravel for ballast. Such boxes are preferably set from the land, or if intended to extend into the sea, floated into position and sunk in place for installation. In addition, or as an alternative, T-walls (506) and beveled T-walls (507) can be used as shown in the center and described in the patent cited, in column 7 and FIGS. 8, 9 and 18. Such T-walls could be used for the entire pier-groins as disclosed in the patent cited, or simply to provide the seaward components of this system (in which case the beveled ends of the outward T-walls minimize potential damage to boats and the like which approach closely). In general, with no beach existing, it will be easier to install beach boxes where they can be floated into position, so they are preferred for most components of the systems of the present invention. With an established beach, installation from landward is preferred. The double T or "pi" units of FIG. 3 can also be used as components of such shoreline systems, arranged parallel and/or perpendicular to the shoreline.

FIG. 42 shows the system of FIG. 41 in side view, the entire structure lying above mean high water, and the level of sand expected to build up after storms and after renourishing by normal tidal action or by artificial methods. This system can be installed before renourishing an eroded beach to retain a large percentage of the new sand, which might otherwise be washed out to sea during a storm. Even if some of the sacrificial sand is lost, these massive interconnected boxes and other structures are not easily moved by storm waves. However, if necessary, the boxes can be disconnected and relocated, using suitable heavy equipment.

Figure 67:
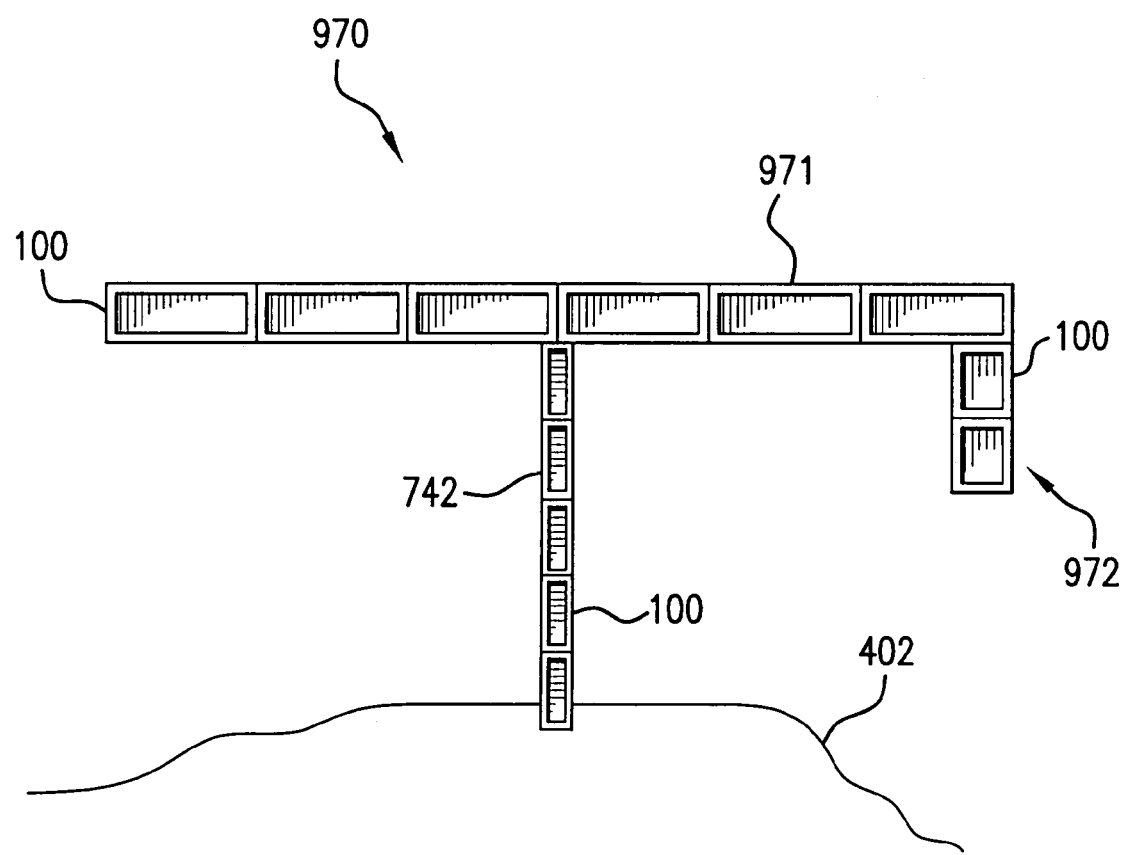
FIG. 67 is a top view of a breakwater and groin structure constructed of rectangular boxes.
Figure 68:
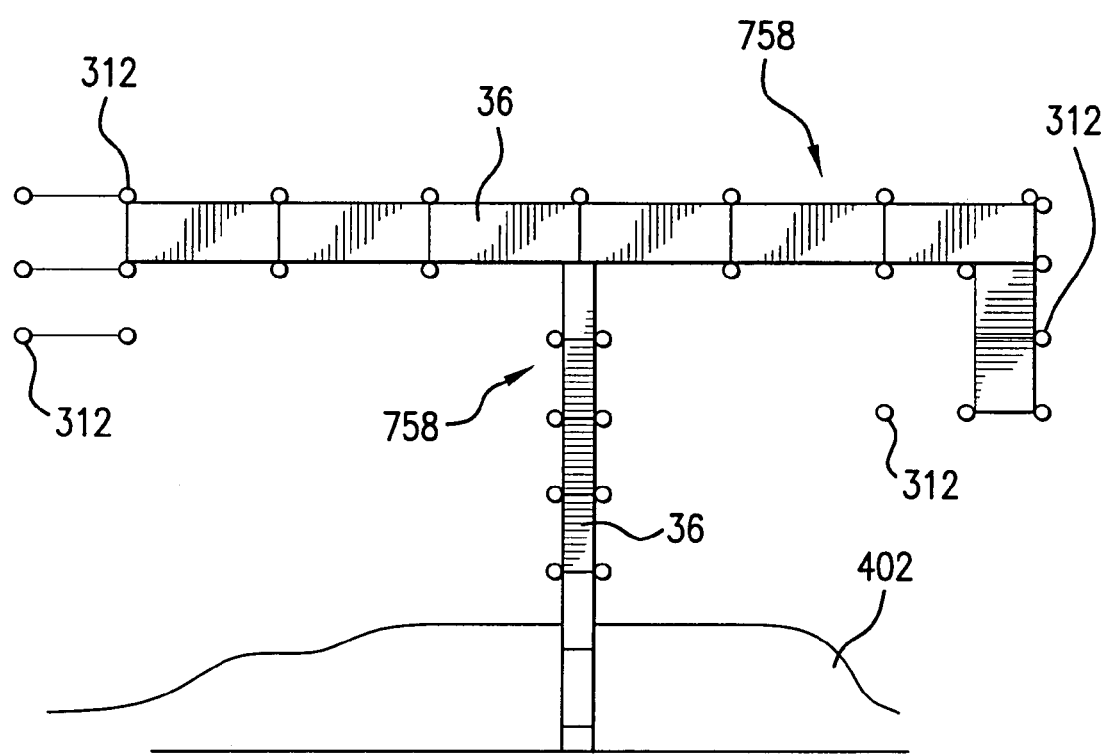
FIG. 68 is a top view of the structure of FIG. 67 covered over with a pier.

Further uses of rectangular boxes (optionally in combination with hexagonal and half-hexagonal boxes), whether metal, precast concrete or fabricated of other materials, are illustrated in FIGS. 67 and 68. Once a breakwater has been installed, with or without a groin installed from the middle of the breakwater perpendicular to the shore, a pier can be installed over the top of the breakwater. First the piles are installed over the breakwater boxes, preferably at the junctions of the boxes. If there is a groin, then the piles are installed on either side from the shore out to the breakwater. Next the structure of the "T"-head pier as illustrated in FIG. 68 and the deck are built.

FIG. 67 shows a breakwater-groin assembly 970 comprising a breakwater 971 formed of at least one layer of rectangular boxes 100 with open tops and an optional extension 972 connected to breakwater 971 and extending shoreward. A groin 742 connects the breakwater 971 to shore 402 and also comprises rectangular boxes 100 with open tops. Boxes of various sizes and proportions, preferably of intermodal sizes as discussed above, can be used, and can be fabricated of any suitable materials including metal, plastics and precast concrete, the latter being preferred for permanent installations. Hexagonal boxes can be used to form at least portions of the breakwater and groin, optionally in combination with half-hexagonal boxes to form flush outer surfaces where desired. Especially with permanent installations, as shown in FIG. 68, at least one layer of solid materials such as concrete, wood or plastic decking can be installed atop at least of portion of groin 742 to provide walking surface(s) 36 and convert groin 742 and/or breakwater 971 to piers 758. Piles 312 are used to install and secure this surface layer and to provide moorings for small boats.

There are several mutual benefits from this arrangement. First, the piles notify any boater of the location of the breakwater during a storm's high water or flood. Secondly, the piles help maintain the boxes in place before sand has built up to secure them in place. Also, initially the boxes are filled with water, which is lighter than the sand and silt that will eventually replace some of the water. As high storm tides overtop the boxes and deposit some of the suspended sand, the mass in the boxes increases, thereby increasing the stability of the breakwater. Thirdly, the mass of the boxes protects the pier from ice, large floating debris and hurricane strength storms.

The breakwater (and groin if installed) protect the land from erosion by naturally building a beach. Boats can make landings and moor on the seaward side of the breakwater, whereas this would be impossible with a stone breakwater. Additionally, smaller boats can be moored on the protected landward side of the breakwater near the ends where the water is deeper. Hence this combination yields not only preservation of land, but optimum utilization for land-water access.

Environmentally, the arrangement has benefits as well. Sub-aquatic vegetation will grow inside the boxes, where the box provides a protective nursery from the storm waves crashing on the beach. Barnacles and other plant material will grow on the inside, and crabs and fish have access through holes in the boxes to find sanctuary from their predators. The inside bottoms of the boxes form ecosystems of their own to replace a large percentage of the sub-aquatic river or sea bottom covered by the outside bottoms of the box covers. Finally, in an actual installation on the Potomac River, it has been found that large masses of sub-aquatic vegetation are taking up residence outside the boxes between the breakwater and the land in the calm water provided by the breakwater.

Figure 43:
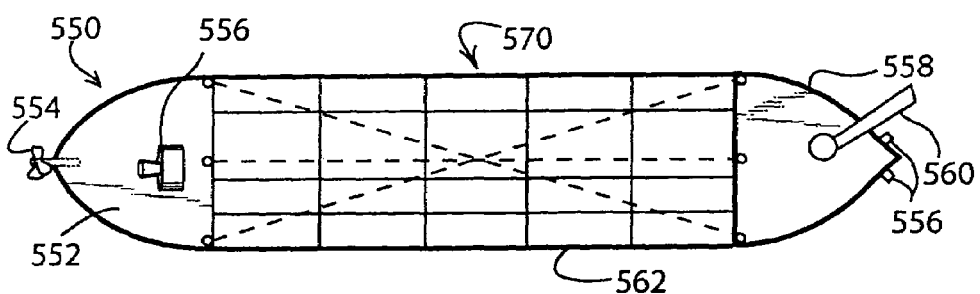
FIGS. 43-45 are side views of a ship designed to incorporate a module assembled of precast concrete boxes of the invention as the parallel midbody of the ship in order to transport same.
Figure 44:
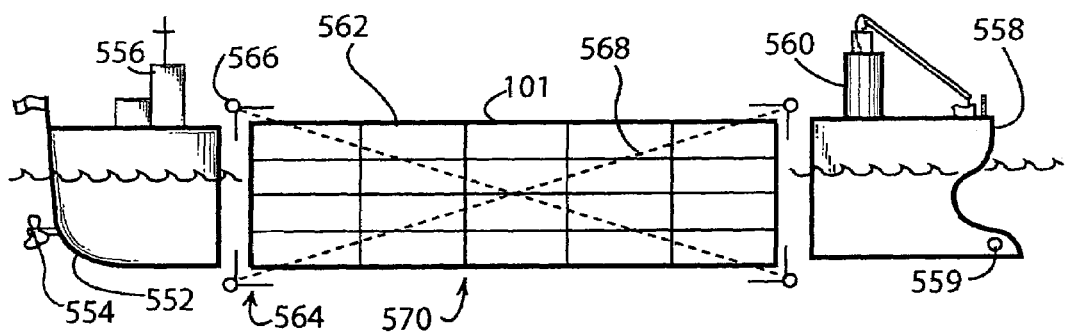
Figure 45:
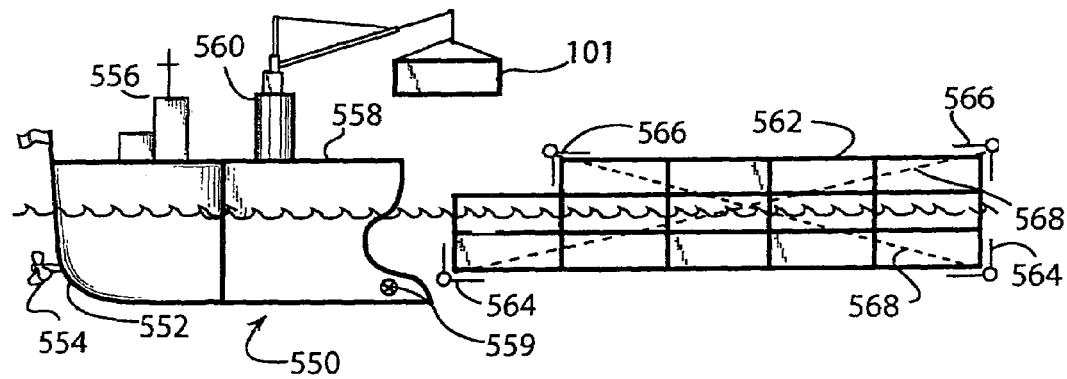

FIGS. 43 to 45 illustrate a novel vessel (570) and method for transporting and installing precast concrete boxes of the invention to locations for installation to form shoreline structures, breakwaters and the like. Plan view FIG. 43 and side view FIG. 44 show a vessel (570) comprising two portions, bow (558) and stern (552), fastened to midsection (562). Stern portion (552) comprises the conventional propulsion system (not shown), at least one propeller (554) and pilot house (556) with appropriate controls. "Thruster" type propulsion unit(s) (559) can also be provided to improve maneuvering. Bow (558) comprises storage spaces for supplies, at least one anchor (not shown here) and a crane unit (560). Both sections have flat vertical surfaces comprising primarily watertight bulkheads with a minimum of openings which can be secured to permit them to float independently. Bow (558) and stern (552) can be fastened together as shown in side view FIG. 45 to form vessel (550) and secured by appropriate mechanical means such as larger twistlock stackers (as shown in FIG. 28), turnbuckle locks, bolts, cam locks and the like. Thus secured, vessel (550) can travel under its own power to a port where a stacked and securely interconnected floating array of precast concrete boxes of the invention can be attached between the bow and stern sections as a midsection for the vessel for transportation.

As shown in FIG. 44, a large group of such boxes (101) can be stacked and grouped together to form a box module (562), which is fastened together under longitudinal and lateral tension by a tensioning system comprising, e.g., corners (564) and (566) and cables (568). Similar locking connections on the corner plates permit the array of boxes to be secured to the bow and stern sections of the vessel. Once assembled, box module (562) is moved from an onshore assembly site (e.g. on a pier, wharf or ramp) by large crane or other suitable means into the harbor waters and floated into deeper water alongside a pier or within the harbor where the vessel may freely enter. Such a module can be maneuvered around such restricted waters using mini-tugs (e.g., converted military landing craft) or other suitable small craft and suitable attachment points which are provided on the outside surfaces of the module (not shown here).

With the module held in place by such tugs, anchored or moored to buoys, vessel (550) can be brought alongside, bow section (558) detached from stern section (552) and the stern section maneuvered against the rear surface of the module (562), using propeller (554), thruster propulsion (559) or tug assistance if necessary. Contemporaneously, tugs or other craft hold bow section (558) in position until stern section (552) is attached to module (562). The vessel's anchor can be used to anchor bow section (558) during this period if desired, provided that an auxiliary power source is provided to power the anchor windlass. Then bow section (558) is maneuvered into position against the front surface of module (562) by tugs and secured in place. The same systems used to fasten the bow and stern sections of the vessel together can be used to attach the bow and stern sections to the array (562) of boxes. The result is a "stretched" vessel (570) (shown in FIGS. 43 and 45 assembled, FIG. 44 in disassembled state) which can travel under its own power to the location where the boxes are to be disassembled and/or installed.

In addition to transporting and unloading such floating arrays of concrete boxes as described above, the vessel of the invention can be used to carry a variety of other floating objects or arrays of objects, provided they are sufficiently buoyant, have appropriate proportions and can be fitted with attachment devices to attach them securely to the two hull sections of the vessel. Various types of containers and tanks, floating bridges, pontoons, caissons and other floating construction components can be incorporated in the vessel and transported. This could be of particular value when transporting and installing components to form structures in areas of military landings. Furthermore, such a vessel could be constructed to have the appropriate size, proportions and attachment fittings to transport floating drydocks, whether commercial or military. Floating drydocks are described in *The Naval Institute Guide to Ships and Aircraft of the U.S. Fleet*, published in annual editions by the U.S. Naval Institute of Annapolis, Md. Most U.S. Navy floating drydocks are open-ended "through-deck" models, except for the ARD models, which have one end closed by a ship-shaped bow structure. The larger Navy models are sectional, allowing disassembly for easier towing. Some navy floating drydocks are on lease to civilian salvage firms.

Figure 64:
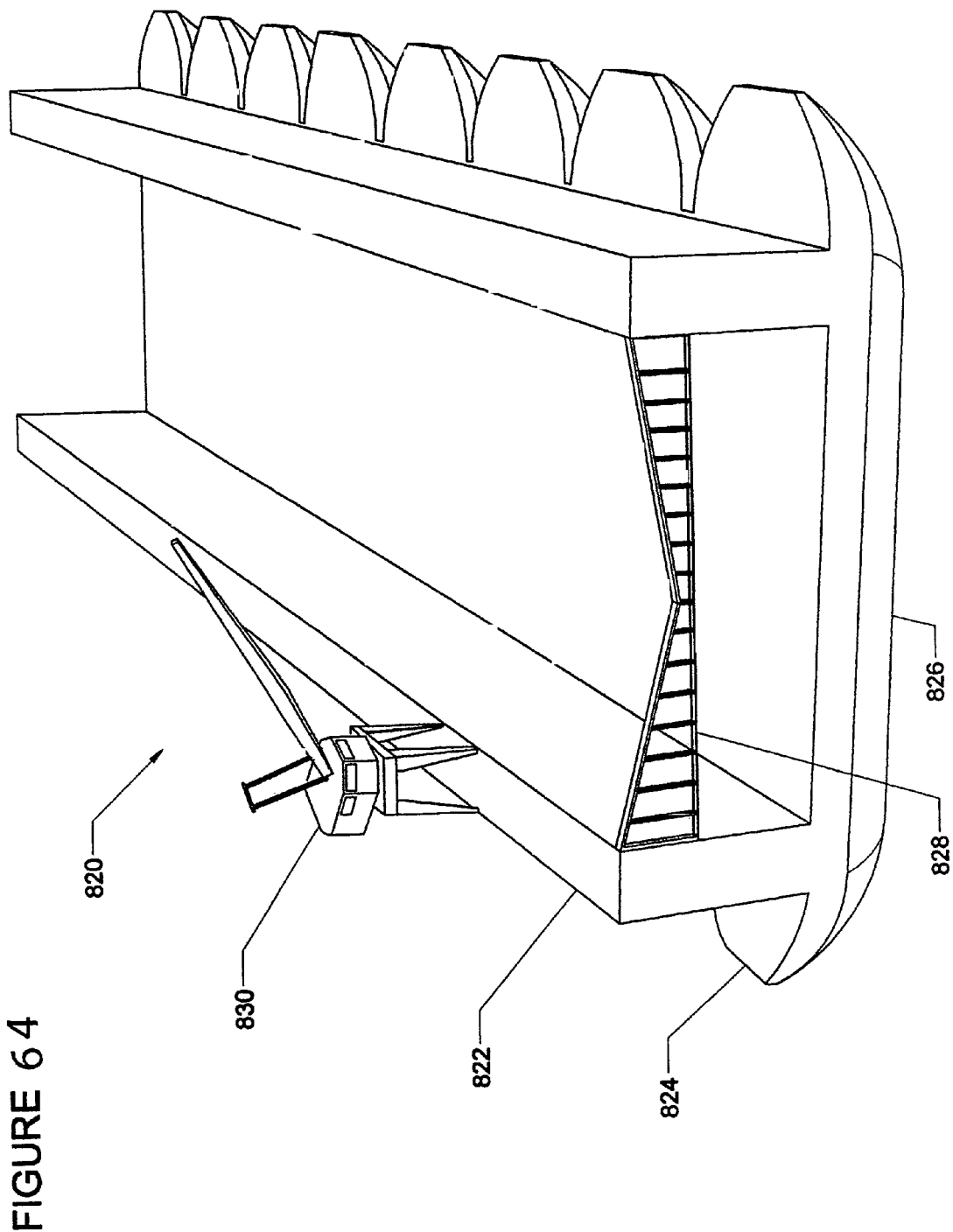
FIG. 64 is an overhead perspective view of a floating drydock.

A representative floating drydock is shown in FIG. 64. FIG. 64 illustrates a floating dry dock 820 comprising bottom pontoons 826 (The lower hull portions of floating drydocks are typically referred to as "pontoons," whether flush or protruding from the outer boundaries) with protruding portions or sponsons 824, side or "wing" walls 822, gates 828, interior bottom 829 and a crane 830. This particular floating drydock has a bottom fabricated of a series of floating pontoons 826 arranged transverse to what would normally be the keel of the vessel, but commercial and military drydocks are available which have flush sides and are more suitable for towing or propulsion through the water for significant distances. Some models of floating drydocks have wing walls which fold downward onto the pontoon hull for easier transport.

Applicant considers the essential components of a floating drydock to be a hull with a bottom which is substantially flat inside and is joined to side "wing" or hull portions extending vertically upward from this flat surface on their inner sides and preferably joined smoothly to the bottom on their outer sides. The vessel thus formed has a cross section like an open-topped box, with at least one end normally left open and unobstructed to allow the entry of vessels to be drydocked. Optional accessories include cranes or other hoisting equipment atop at least one of the side hull portions for working on drydocked vessels and gates or other enclosures at bow and/or stern to help retain these vessels in place and prevent the free entrance of water during towing at sea.

The operation of floating drydocks is simple in theory but can be difficult in execution. When at least one vessel is to be drydocked, the drydock is anchored, moored or otherwise secured in place as firmly as possible to limit movement during the docking and undocking procedures. Suitable blocks and supports are carefully placed on the drydock bottom and secured in place so that the vessel to be docked can be emplaced thereon to hold it firmly in place without damage, much like placing an automobile without wheels on blocks. Using valves and pumps as necessary, the bottom and sides of the drydock are flooded sufficiently to sink it to a level where the upper surface of its bottom is far enough below the water's surface to allow the entry of the vessel to be docked without touching any of the blocks.

The docking officer carefully supervises the movement of the vessel into the flooded drydock and its positioning directly above the blocks and supports upon which the vessel's bottom is to rest. Then, maintaining the relative position of the vessel to the drydock as exactly as possible with the aid of mooring lines or other suitable means, the flooded portions of the drydock are pumped free of water or "blown" so as to raise the drydock to bring the blocks and supports into contact with the docking vessel's hull. After a diver carefully checks underwater that all blocks and supports are in proper position, more water is pumped from the drydock's tanks to raise the upper surface of the bottom well above the water surface. The vessel can then be worked on from top to bottom and stem to stern. When repairs, painting or other services are complete, the process is essentially reversed to undock the vessel. Floating drydocks can be very helpful in providing drydock services to relatively small vessels such as submarines, patrol craft or fishing vessels in advanced overseas operating areas or temporary bases.

An article in *Towline* (Moran Towing Company, ca. 2001, of record) relating an operation of towing a floating drydock from China to Maine illustrates the potential difficulty of towing such a vessel, with high freeboard and considerable sail area, over long distances with unpredictable weather, and thus highlights the advantages of the present invention for enabling worldwide operations with floating drydocks as well as the "bundled" groups of prefabricated construction components which can be transported as components of a modular ship. By incorporating a floating dry dock as the midship section of a vessel of the present invention, it can be transported faster and with better control. In addition to providing a transportable floating drydock for conventional docking applications, such drydocks can also be employed as platforms for mobile plants for the production of precast concrete modules, as described below.

Figure 65:
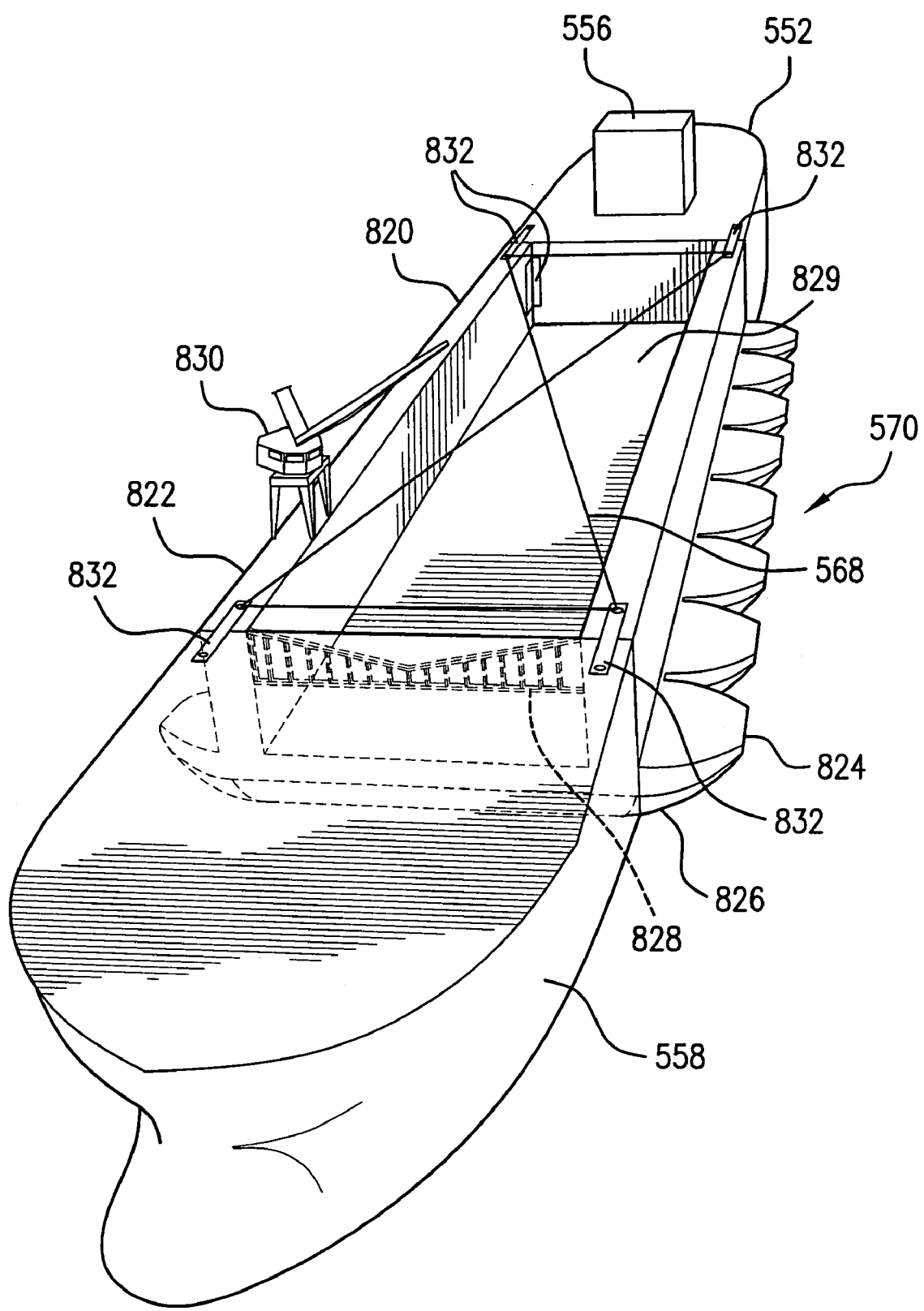
FIG. 65 is an overhead perspective view of a modular ship of the invention incorporating a floating drydock as the midship section.

FIG. 65 shows a floating drydock 820 incorporated into the modular ship of FIGS. 43 and 44 as the midship section 570, the drydock 820 being secured between the bow and stern sections (558 and 552, respectively) of the vessel with suitable modular mechanical fasteners 832 as described for the securing of assemblies of floating rectangular boxes in the discussion above of FIGS. 43 and 44. Cables 568 can optionally be used to supplement these connectors as shown in FIGS. 43 and 44 and herein. Suitable mechanical fasteners for hull inserts in modular vessels are also disclosed in U.S. Pat. No. 2,369,615, which is incorporated herein by reference. The floating drydock 820 of FIG. 64 is shown in FIG. 65 as incorporated into a modular ship comprising bow section 558 and stern 552. The drydock comprises representative accessories including a crane 830 and gates 828, but such items could be removed and stowed for towing, or shipped separately to make the complete vessel more seaworthy. Similarly, drydocks without projecting sponsons or pontoon parts 824 would provide a more streamlined vessel for navigating over substantial distances. With larger, sectional drydocks, at least one separate section of the dock could be carried as midsection 570. Since floating drydocks sometimes need to be transported long distances to areas were they may be needed urgently, it should be apparent that integrating such unwieldy vessels into a modular ship would provide for faster, smoother and safer transport overseas. An example of the perils of direct towing of a floating drydock is found in the *Towline* article cited above.

During the period from after Hurricane Katrina (August, 2005) until approximately June of 2006, there has been a project underway to temporarily enhance and strengthen the levees along the Mississippi River. In that there is little capacity for volume production of concrete products in the heavily damaged Gulf region and a minimum cost system is desirable, it is proposed to utilize readily available and perhaps partially damaged shipping containers. Such containers often accumulate in port areas such as New Orleans because it is more cost effective for shipping companies to produce and utilize new containers at overseas origins than to return and reuse the containers which have reached U.S. ports. Their empty weight is about 4,600 pounds for 20 foot containers and 9,400 pounds for 40 foot containers. They are readily transportable by truck, train, barge, and ships of the intermodal transportation system. Secondly, helicopters can lift and transport the empty containers to the levees.

The containers can be used to raise the tops of the levees to prevent overtopping by higher category hurricanes. While they are mostly watertight, they may need an impervious liner or sealant to hold water when used above sea level. For longer service one might want the containers treated with an approved coating such as Coal-Cat or a polyurea. They would be placed atop or dug partially into the levee, along with water-impervious plastic or sheet pile as necessary to reduce undermining (or any other revetment, weakened dam, etc.) to be reinforced or repaired. Screw anchors could be used to secure them in place and suitable mechanical attachment means used to connect them together. Then they could be pumped full of water and/or sand to present a large mass to impinging waves or storm surges. They could be backed by earth and/or rock revetments on the seaward and/or landward sides to assist in maintaining the boxes' position. Pipes with valves or plugs can be installed on the top and bottom sides of containers to facilitate flooding and draining the boxes, as disclosed elsewhere herein.

Secondly, in addition to the temporary or permanent use of recycled shipping containers, prefabricated rectangular and/or hexagonal containers made of precast concrete, plastics or metal as disclosed herein can be installed at the toes of levees, dams, or revetments to prevent scour on the waterside and leak-through or blow-out protection on the landward side. Here they could be filled with sand and/or water and connected together to form a very large integrated mass. Impervious sheet material on the riverside and semi-permeable geotechnical material on the landward side (as illustrated and discussed in regard to FIGS. 115 and 116) can control water entry into the dam or levee and control washout on the landward side, respectively.

Thirdly, such prefabricated containers can be used to help prevent or plug breaches in levees, barrier islands or dams. In emergencies, shipping box containers can be transported and airlifted into place, connected together, and floated into place. Then they can be sunk into place by opening valves, plugs, or in emergencies using mechanical or explosive means to break the watertight integrity, as disclosed herein for precast concrete modules. Cables on the ends of a linear array of connected boxes can be tended to guide the "plug" into place and then secure it in place. To strengthen the tops of weak spots in dams and levees, such arrays of boxes can be used as buffers near weak spots as floating, semi submerged, or submerged containers.

Figure 69:
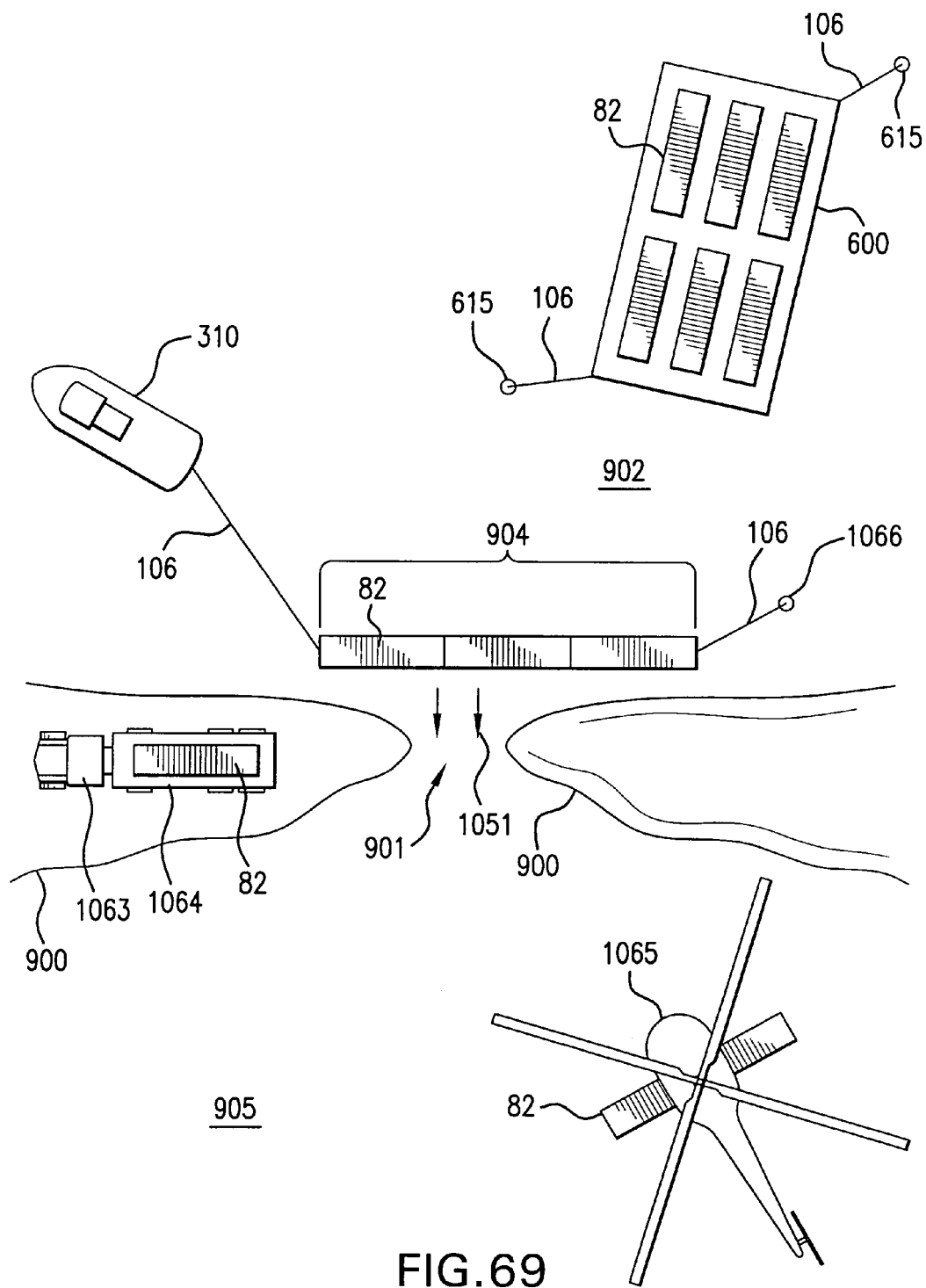
FIG. 69 is an overhead view of a levee or barrier island breach repair operation.

Examples of such operations are illustrated in FIG. 69, where levee 900 has been breached and quantities of metal shipping containers 82 are being maneuvered into place to repair the breach. Water is surging from river 902 through the breach 901 as shown by arrow 1051 and flooding land areas 905 on the other side. On the leftmost portion of the levee 900, a truck 1063 has delivered a single container 82 using trailer 1064. The container could be unloaded and positioned atop levee 900 or in the breach area by using a crane (mobile, floating or installed on the truck, not shown here) or easily lifted off and emplaced by a heavy lift helicopter 1065, which is shown carrying a container 82 from another source. Barge 600 has been employed to deliver six containers 82, temporarily anchored in place by at least one cable 106 and anchor 615. Tugboat 310 is towing an array 904 of three containers 82 via cable 106, using another cable 106 and attached anchor 1066 astern of the array to assist in maneuvering array 904 into position across breach 901 where they can be sunk into position to assist in closing the breach. The current created by water escaping from 902 through breach 901 can assist in maneuvering such an array into position, given a skillful tug operator and other aids to positioning. Once large arrays 904 are in place, additional containers of various sizes and shapes, sandbags and the like can be placed as necessary to effect at least a temporary repair and reinforcement.

Figure 115:
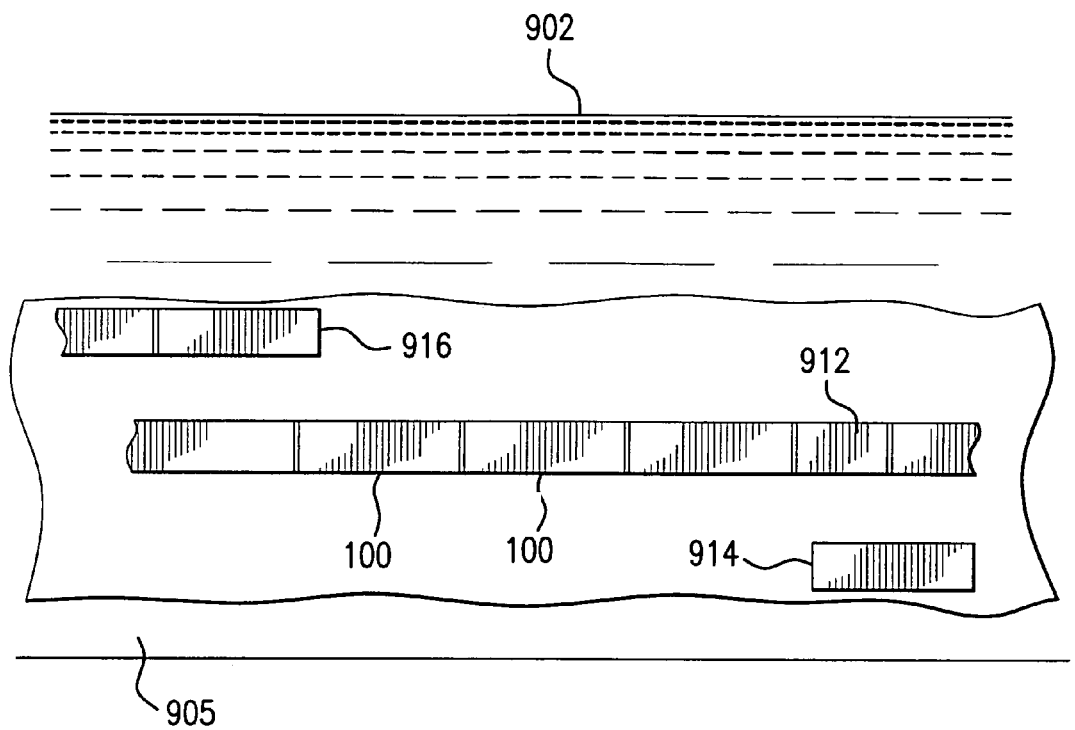
FIG. 115 is a top view of a levee with rectangular boxes being emplaced for repairs or reinforcement.
Figure 116:
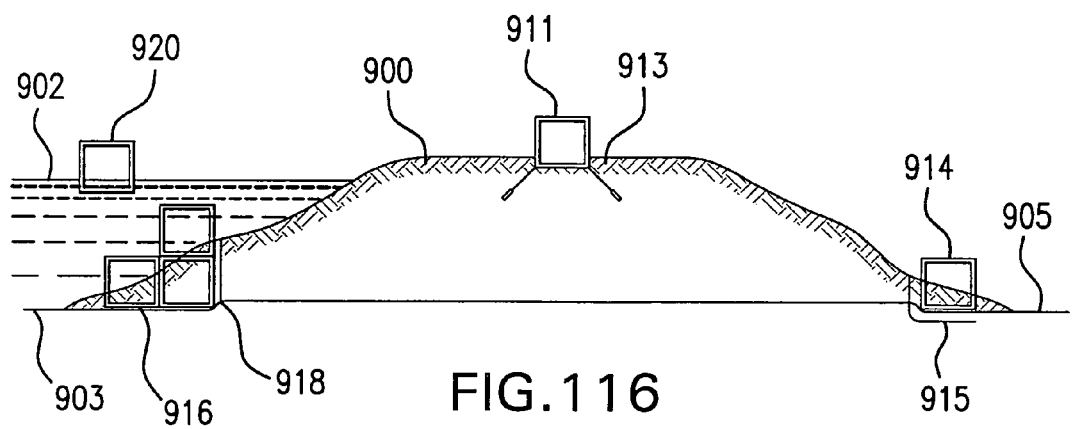
FIG. 116 is an end sectional view of the levee and modules of FIG. 115.

FIGS. 115 and 116 illustrate other arrangements of rectangular boxes 100 to reinforce an existing levee 900 standing between a river with surface 902 and bottom 903 and the ground surface 905 on the other side. A linear array 911 or row of boxes 100 of various suitable sizes can be emplaced atop levee 900 to prevent surges of water from overflowing, preferably with the boxes securely interconnected by mechanical means (not shown here) and anchored to the levee surface by suitable mechanical fasteners 913 extending into the upper surface of levee 900. Single boxes 100 or arrays 911 thereof can be emplaced at the inshore side of the levee as shown at 914 to prevent and/or plug leaks and/or prevent erosion of this side of the levee when and where required. Preferably sheets of filtering material 915 such as woven or nonwoven fabrics are installed between box 914 and the earth of levee 900 and ground surface 905. Similarly, single boxes 100 or groups arrayed linearly and/or stacked as shown at 916 can be installed underwater at the riverside base of the levee in areas vulnerable to erosion to protect it from erosion and hydrostatic pressure. Sheets of water resistant or waterproof materials 918 are installed between the boxes 100 in stack 916 and the levee to prevent leaks. Additional boxes 920 or arrays thereof can be floated on the surface into position to be sunk, where they are filled with water and installed in the riverside to strengthen a weak spot or to plug a breach in the levee.

Figure 70:
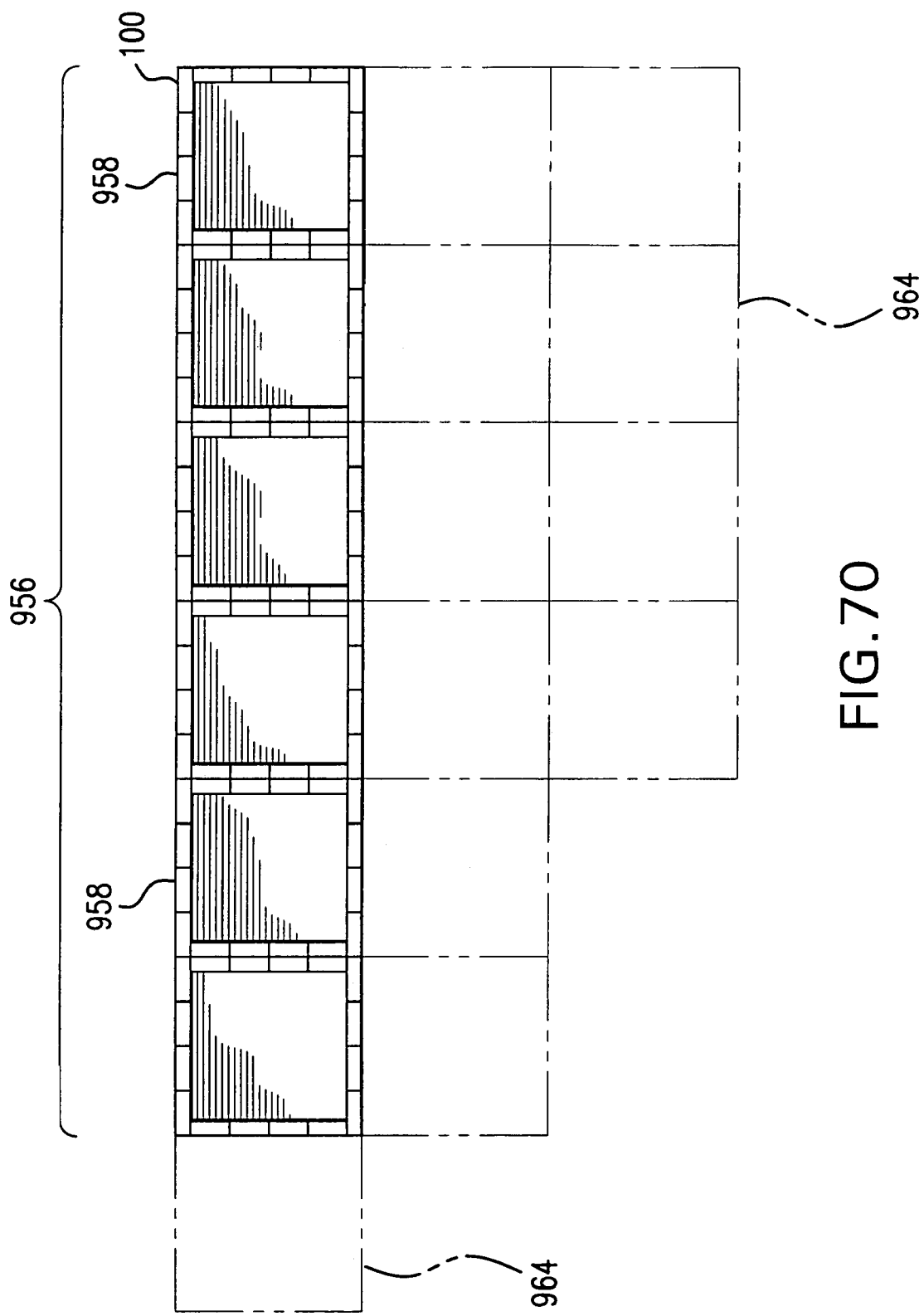
FIG. 70 is a top view of barrier island rebuilding, using rectangular box modules.
Figure 71:
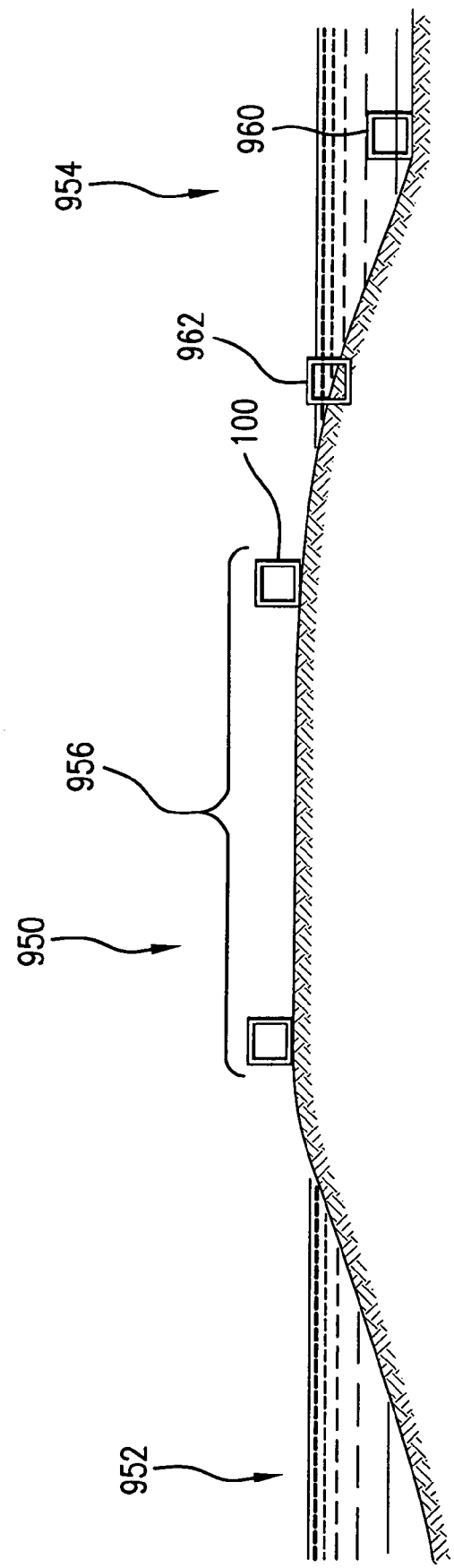
FIG. 71 is an end sectional view of the installation of FIG. 70.

A specialized system of containment using rectangular modules can be used to rebuild barrier islands on the Gulf Coast to mitigate hurricane wave damage. These shipping container-sized (i.e., about eight feet square by forty feet long) modules are sized to be easily transportable within the intermodal transportation system on trucks, trains, ships and barges, as disclosed above and in previous patents. The components of this system are disclosed in U.S. Pat. No. 6,491,473. They can be used to build structures including underwater "reef" breakwaters, semi-submerged breakwaters, and concrete "backbones" within sand dunes on the back beach of an existing barrier island or similar formation, as described above with regard to FIGS. 41 and 42.

Where a barrier island 950 lying between, e.g., a sound or bay 952 and an ocean or gulf 954, is eroded below sea level or is just awash (imminent as shown in FIG. 71, depending upon tide levels), an opportunity exists to further engineer, test and later build a full scale system to rebuild the island. An array 956 of rectangular modules 100 is laid out and connected together in square or rectangular subarrays 958, as shown in FIGS. 70 and 71, top and side views, respectively. Although they may be closed during transport to the site to be repaired, generally the modules will be installed with open tops to facilitate their filling with sand, during installation and/or by succeeding storms.

The rectangular modules 100 used can be transported to the barrier islands aboard container ships, barges or similar vessels, or by tugs towing arrays of floating watertight modules. On calm days, they can be brought ashore in barges or suitable landing craft or simply floated ashore by themselves. On the beach, heavy equipment such as crawler cranes or large excavators can move the boxes to their final sites for assembly of the arrays described herein. Alternatively, specialized tracked "high lift" container movers such as used in port facilities can be used. Once arranged in the desired arrays and patterns, the modules are securely fastened together and to the beach using suitable mechanical fasteners disclosed herein. Initially the boxes can be at least partially filled with water to provide additional mass. The boxes can be filled with sand as the grid is filled when the beach is nourished with sand pumped from nearby sand deposits. Alternatively, natural processes during storms will tend to fill the open modules and the grid cells as the waves containing suspended sand are slowed by the structure.

The individual rectangular subarrays 958 can be on the order of 200 feet square, or similar sizes as required by the particular location and installation, and can be repeated as required to "cover the ground". Dotted lines 964 in FIG. 70 indicate potential expansions of the arrays to form a grid pattern to rebuild the beach areas as required or desired. As storm tides overtop these containment modules with open tops, sand will accrete. Further, the containment area(s) can be renourished by pumping sand from offshore borrow areas. In addition, once rebuilt, further accretion and erosion prevention can be achieved by using such modules to form submerged "reef" breakwaters (960 in FIG. 71), semi-submerged breakwaters or sills (962 in FIG. 71), and a backbone of a new sand dune, as shown in FIGS. 41 and 42 of U.S. Pat. No. 6,491,473. Thus one can repair and "regrow" a much larger "barrier island breakwater" incrementally by judicious placement of arrays of prefabricated rectangular modules to help control the accretion and erosion of sand.

Alternative techniques may be required where the barrier islands and/or bottoms of the bay and/or sea contain more silt than sand. In such areas, e.g. the Mississippi delta of Louisiana, it has been found that many structures emplaced to build up or repair barrier islands simply sink deep into silt and mud. One solution to this problem is to employ rectangular boxes similar to those described above, but with closed tops and carefully placed holes for flooding, draining and venting the boxes under various tidal conditions. Such boxes can be emplaced with open tops, ballasted, and then "tuned" to a weight which will keep the boxes in place during most conditions, but delay their sinking into mud or silt.

Figure 72:
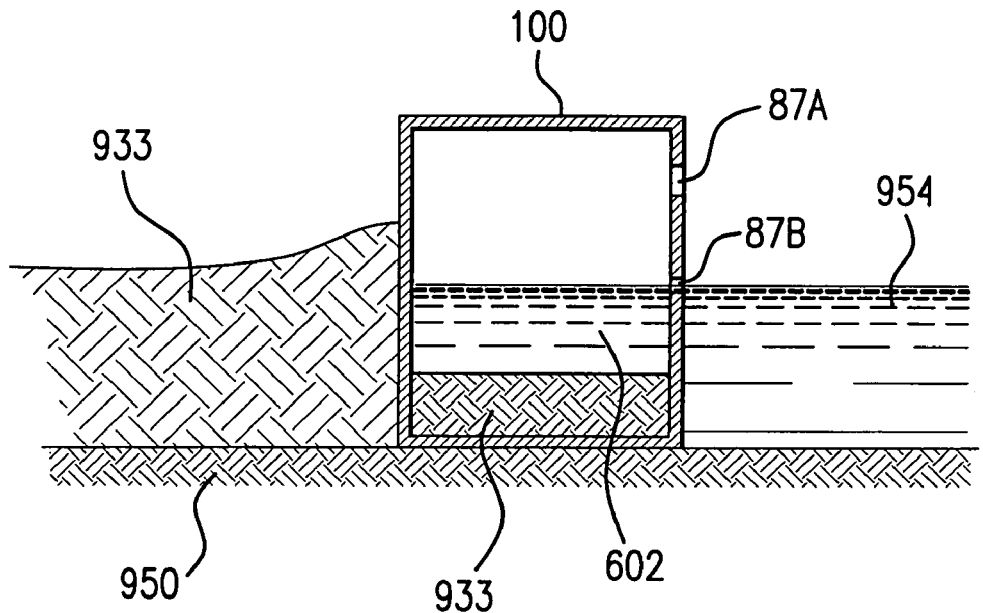
FIG. 72 is a side view of an installation of rectangular box modules on a sandy bottom.
Figure 73:
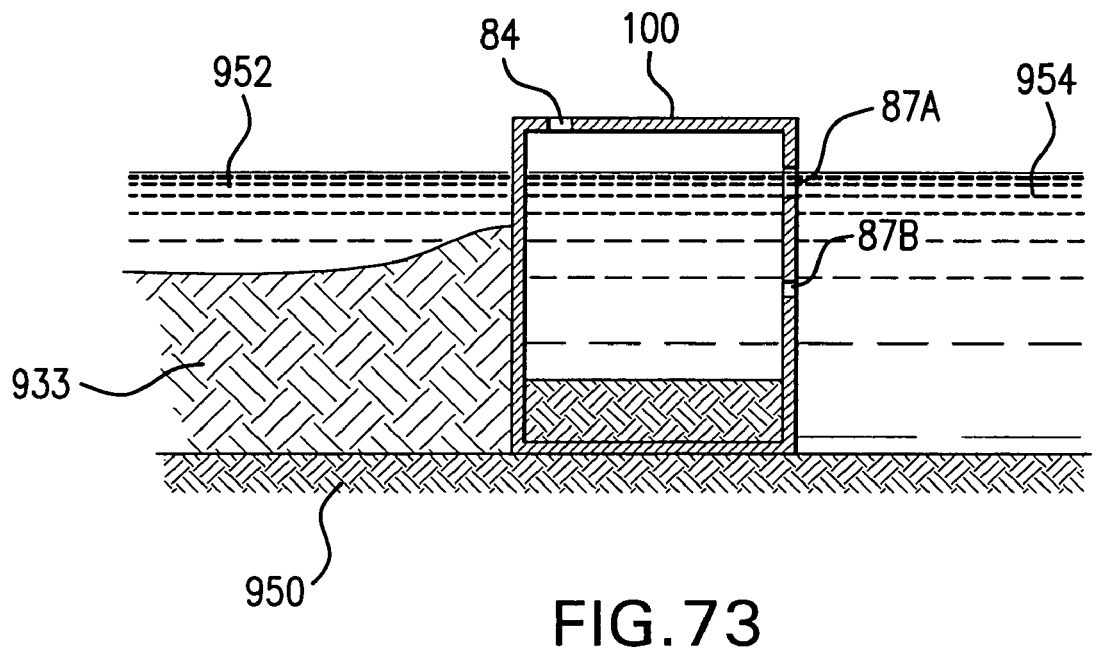
FIG. 73 is a side view of the installation of FIG. 72 at higher water level.

FIG. 72 shows a closed or open top box 100 placed atop a barrier island 950 adjacent ocean 954, with some sand 933 having accreted on the bay side of the box. Sufficient sand 933 and water 602 have been pumped into the box during installation to provide the desired mass to control buoyancy. At least one large drain hole 87A, and preferably a plurality of same, are provided near the top of the box on the seaward side, at a height where storm surges or high surf (as shown in FIG. 73 will allow more water to enter and ballast the box to keep it in place. Under such conditions water may pass over box 100 (or arrays thereof) to bring the water level of bay 952 up to the level of the boxes. Optionally, a plurality of vents 84 can be placed in the tops of boxes 100 to allow air to vent easily as water enters large flood holes 87A, and then to allow waves passing over the boxes to completely fill them through the vents. Smaller drain holes 87B are provided near the normal expected mean low water level of ocean 964, to allow the water entering during storms to gradually drain as the high waters recede, returning the box to an appropriate ballast state for conditions as they develop. The reduced mass of the boxes resulting from drainage after the storm passes will again mitigate subsidence.

Concrete or metal boxes of rectangular or hexagonal cross sections could be used as vertical cores for levees, dams or similar structures. Their width, height and length would be commensurate with the site-specific conditions needed for the structure. The rectangular sizes most convenient for intermodal transportation would be boxes with outside dimensions about 8.5 feet high, 8 feet wide, and 10, 20, or 40 feet long. Containers or modules 12 feet wide and having fractional cross sectional dimensions totaling about 8.5×8 feet are also possible, as disclosed in U.S. Pat. No. 5,697,052 cited above. Boxes shipped within modular steel frames can be smaller than the standard intermodal size. The boxes can be compartmented for strength as needed. Further, they can be equipped with suitable pipes and valves to allow them to be filled with a liquid such as water or a slurry of sand, cement or other flowable fills as desired for strength and mass.

Where a variable mass is desired a pumpable liquid is used. In this later case, the boxes are installed vertically and jetted down in soil, which may be unstable. They are then filled with a liquid, most likely water or seawater. This extra weight will assist in "pumping" the unit down in sand or alluvial soils. Pipes can be built into the boxes to pass gas and liquids (normally air and water) to assist jetting material from under the box, using the air acting as a "lift pump" to lift the displaced material upward. When in place the boxes are linked together by suitable mechanical fasteners such as disclosed above. Should the core of the levee tend to subside, the water used can be pumped or blown out of some of the compartments in order to achieve "neutral buoyancy" and to "tune" the mass of the core commensurate with the base soil conditions.

Where the soil conditions dictate, a pair of horizontal "collar" boxes on each side of the vertical levee boxes can be clamped by cables to each other. This provides a greater base area at some point, probably on the lower portion of the vertical levee boxes, to impede subsidence in soft soils.

The hexagonal and/or rectangular modules of the invention can be used to form, reinforce or repair a levee or dam. They can be dug into hard ground or pumped down with air and water jets in certain soils that may be unstable, as described above for "jetting in" the L-walls of Applicant's prior inventions. Hollow modules can be installed empty and then filled with water, or a slurry of sand or cement. They can be filled with a liquid such as water or water-sand slurries for weight and then "pumped" down using external jetted water and air mixed or water alone. When the module has reached the proper depth, pumping is ceased. Then to prevent further subsidence, some of the water can be pumped out of the module until the weight is equal to the "buoyant force" of the unstable soil in which they were placed. In other words, the effective weight or displacement of the modules can be varied over their life in order to maintain a "neutral buoyancy" by pumping or blowing water in or out of a module located in unconsolidated soils. This procedure is analogous to pumping or blowing the tanks of a submarine to modify its displacement in water and maintain neutral buoyancy at a particular depth.

Figure 117:
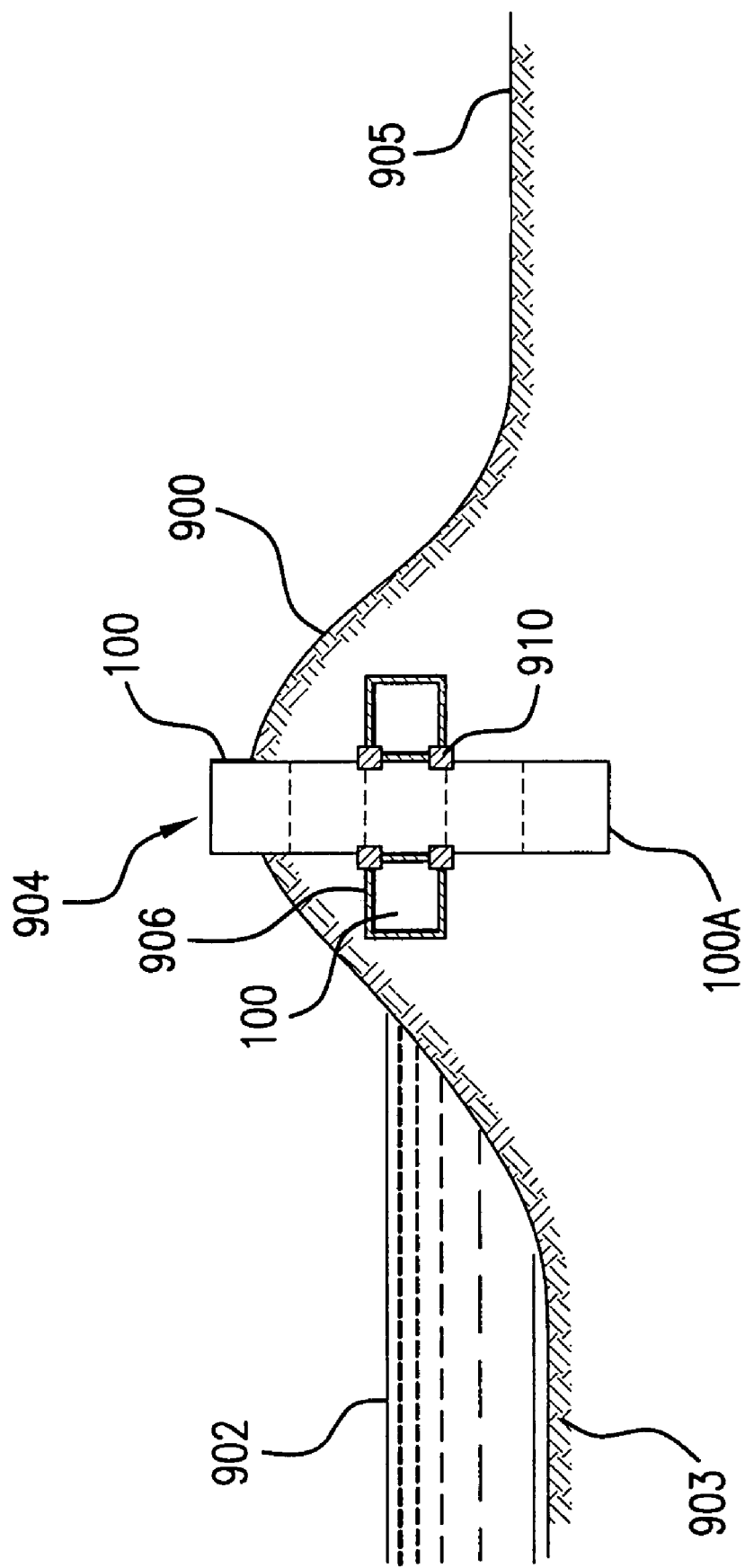
FIG. 117 is an end cutaway view of a levee containing a spine of vertical arrays of rectangular boxes with horizontal collars attached.

FIG. 117 illustrates in cross section the use of an array 904 of rectangular modules 100 to build or reinforce a levee 900 forming an embankment or berm to prevent the waters of river 902 from overflowing the banks. The river bottom 903 slopes up gradually to levee 900. The ground level 905 on the opposite side of the levee may be higher or lower than river bottom 903 or river surface 902. Rectangular boxes 100 can be arranged vertically and/or horizontally in an array 904 to create a vertical wall inside levee 900 to strengthen it, even in the face of the hydrostatic pressure of high water and/or erosive forces of rapid currents. Such reinforcements are most effective if built into the berm forming levee 900 early on, so that the modules can be firmly implanted without the need for extensive excavation. The bottoms 100A of boxes 100 can be open or closed; open bottoms may facilitate the firm emplacement of the boxes in soil, especially when installed during construction of the levee 900. Additional modules 100 can be added to the top of array 904 as it becomes necessary to raise the levee. Optionally, a reinforcing "collar" or support 906 of rectangular modules can be installed on at least one side of this wall to help reduce subsidence.

Figure 118:
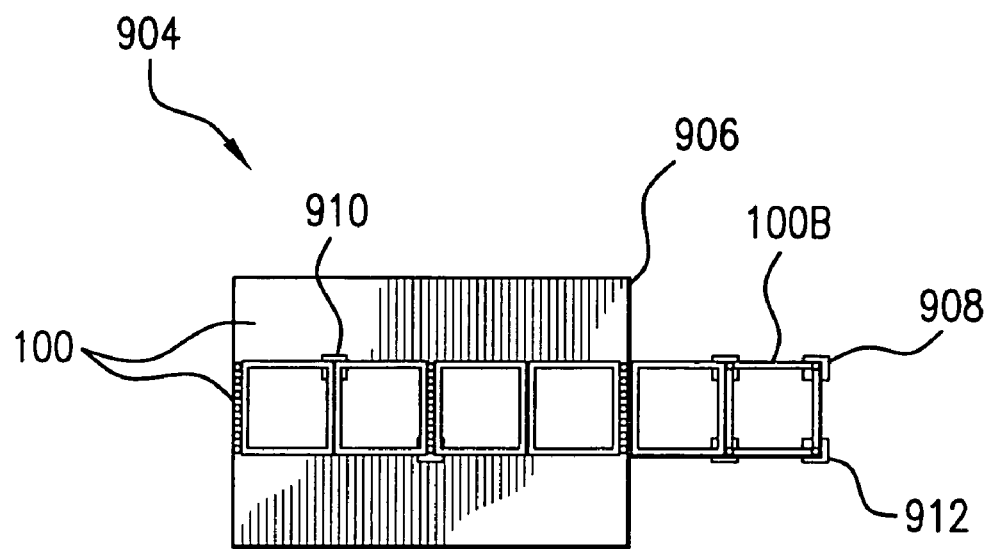
FIG. 118 is a top view of the spine removed from the levee of FIG. 117.
Figure 119:
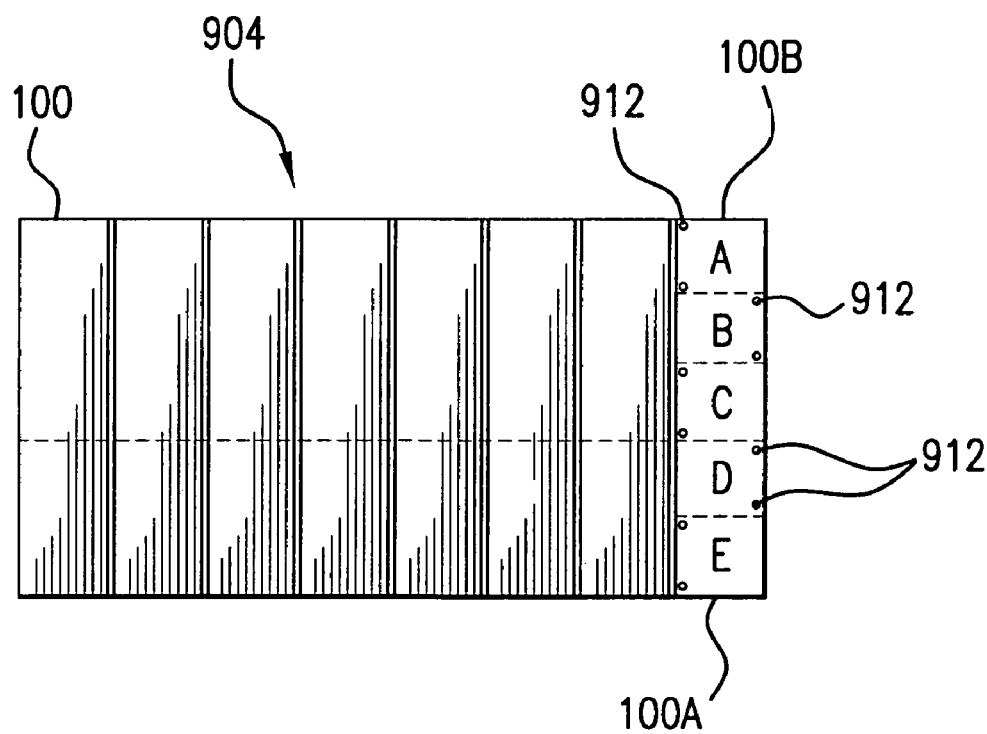
FIG. 119 is a side view of the spine of FIG. 118 with the collars detached.

FIG. 118 is a top view of a portion of array 904 and collar 906, showing the ends of upright modules 100 forming the wall and the tops of horizontal modules 100 forming a double-sided collar 906. Vertical pipes, braces or tubes 908 are provided in at least a portion of the upright modules 100 to aid in their installation. As shown in these and FIG. 119, the modules are all securely interconnected by suitable mechanical connection means 910, as disclosed above and shown in FIG. 117. FIG. 122 shows a side view of the wall 904 alone, with collar 906 removed for clarity. At least a portion of vertical modules 100, shown in partial cross section on the right, are divided up into a number of interior compartments (here, A through E) and fitted with pipes or tubular openings 912 which are fitted with plugs and/or quick-connect fittings for the ready passage of air and/or water in the installation or variable ballasting of array 904. Such an array can be assembled in sections and floated into place if the levee area is underwater at the time of installation, or alternatively can be assembled module by module if dry working areas are available.

Figure 113:
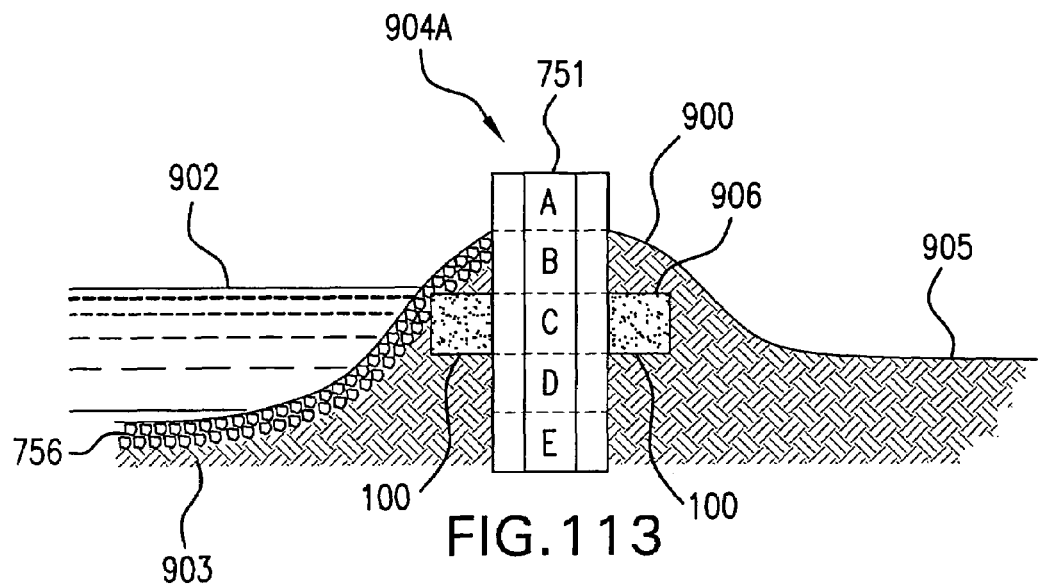
FIG. 113 is an end sectional view of hexagonal and rectangular modules forming the spine of a levee.
Figure 114:
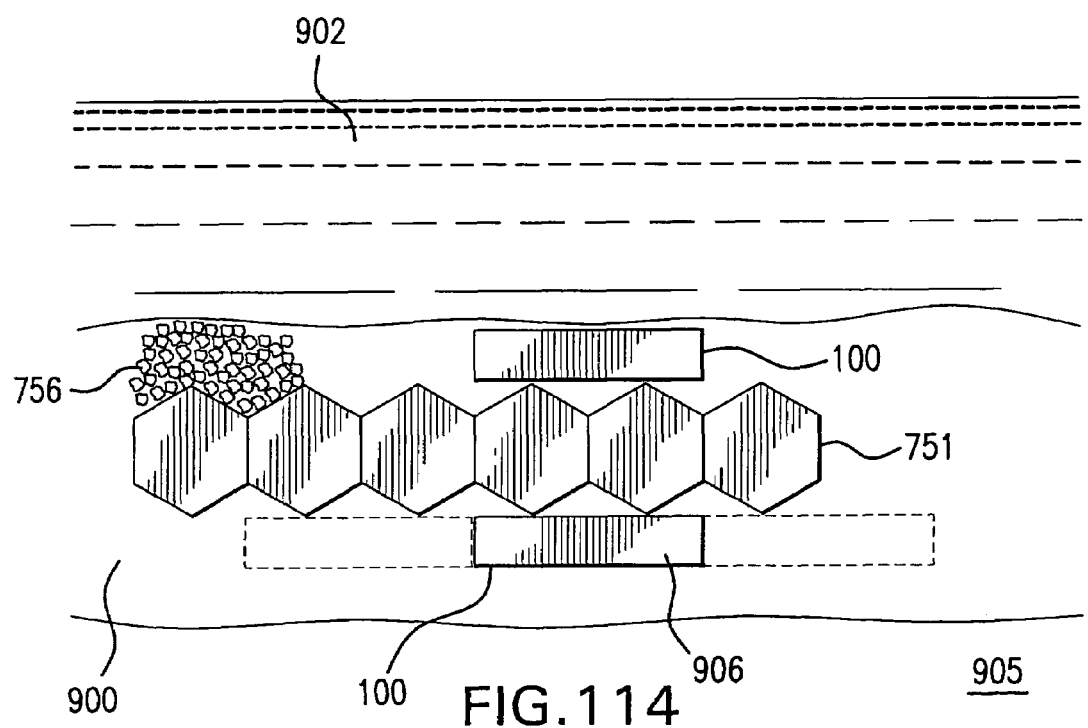
FIG. 114 is a top view of the levee and modules of FIG. 113.

FIGS. 113 and 114 illustrate the use of arrays comprising hexagonal modules of the invention to build or reinforce levees, in manners similar to those described above for rectangular modules. As in FIGS. 117-119, an array 904A of hexagonal modules 751 is incorporated into the center of levee 900 to strengthen it. The modules 751 in linear array 904A are secured together by suitable mechanical fasteners (disclosed herein, not shown here). Similar to the description of the rectangular boxes herein as levee supports, the arrays 904A of hexagonal modules 751 can have installed a "collar" 906 of rectangular boxes 100 extending over at least a portion of the length of the array and on at least one side, to enhance their stability and prevent subsidence in poor soils. "Armor stone" 756 or concrete reinforcing mats 746 such as disclosed in U.S. Pat. No. 5,697,736 can be installed along the levee's river side of the arrays 904 or 904A on the slope of levee 900 to protect the levee and array against erosion. The mass of individual modules 751 can be varied by the amount of water admitted into the multiple internal tanks such as A, B, C, D and E shown in FIG. 113 and discussed above with regard to rectangular modules.

Figure 112:
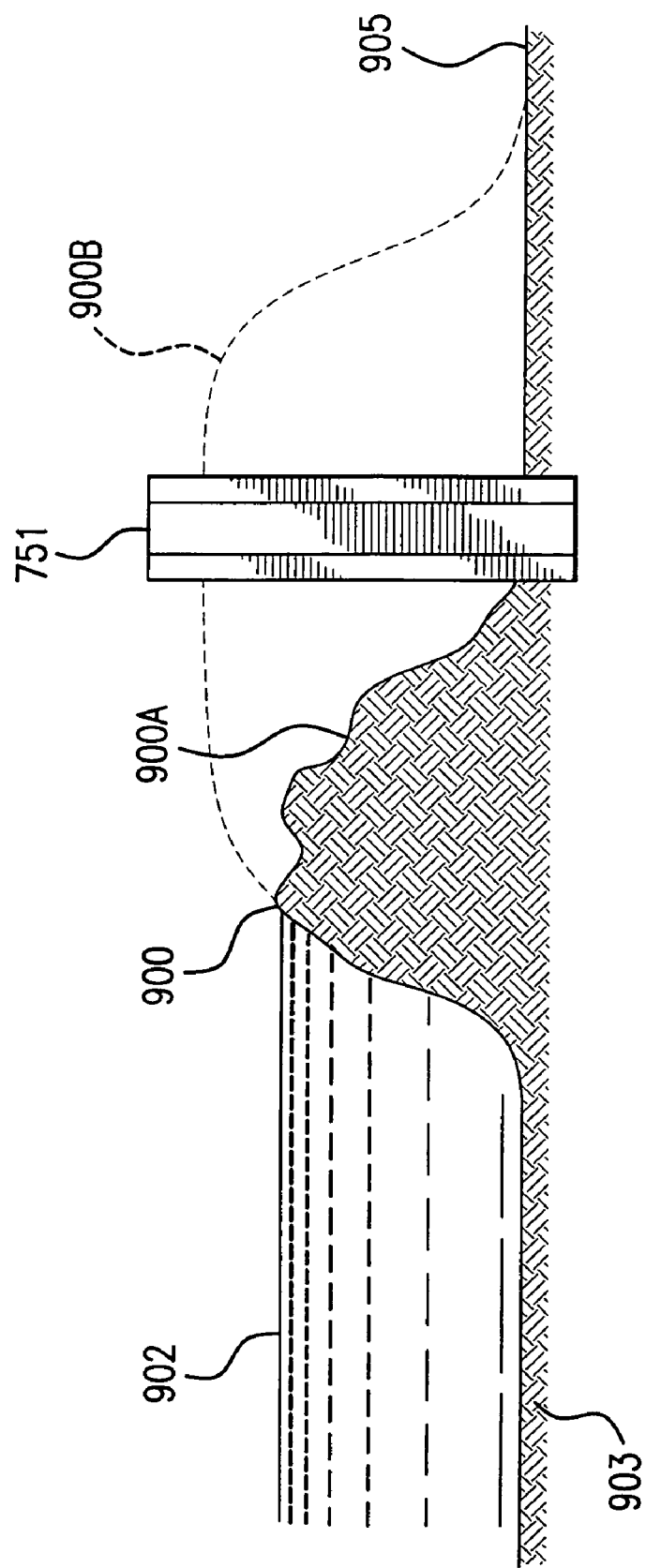
FIG. 112 is a side sectional view of a hexagonal module emplaced vertically landward to form a central spine for a new reinforced levee.

FIGS. 110, 111 and 112 illustrate further applications of hexagonal modules in the repair or reinforcement of levees. FIG. 110 shows module 751 being floated into position alongside levee 900. Once lodged against the levee, module 751 can be partially flooded to create a weight differential when tilted, maneuvered into a suitable vertical position by any suitable means such as a floating crane (not shown here) and sunk into place closely adjacent to levee 900. By excavating into the bottom 903 adjacent levee 900 and "jetting in" module 751, it can be settled into a stable upright position with its base forming part of the levee base. Using passages 811 of FIG. 86 to jet a mixture of air and water from the six corners, the module can be "steered" by differentially jetting from one or more conduits at a time. If a series or array of such modules are positioned in this way, the space between the modules and the riverside slope of the levee can be filled in with sand, rock, aggregate or other suitable fill to expand and strengthen the levee. FIG. 112 illustrates the use of hexagonal modules 751 to build up a partial levee 900 or repair an eroded levee to create a symmetrical, broad levee with the planned contour 900B. In this case module(s) 751 are moved into position from the inshore side of levee 900, then implanted firmly into shoreline surface 905. The space between surface 900A and eroded or partial levee 900 can then be filled with appropriate materials and the inshore side of the module(s) used as support to build up the inshore side as well to form a broad, symmetrical levee 900 of greater strength.

Figure 74:
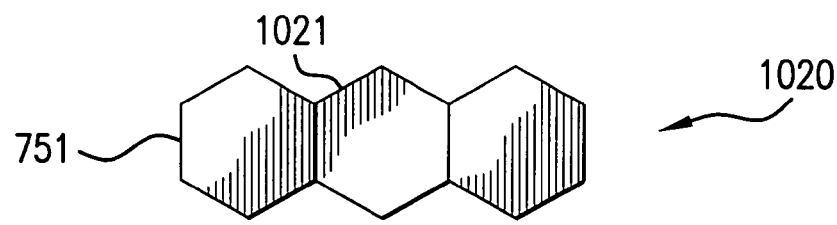
FIG. 74 is a top view of a floodgate comprising hexagonal modules.
Figure 75:
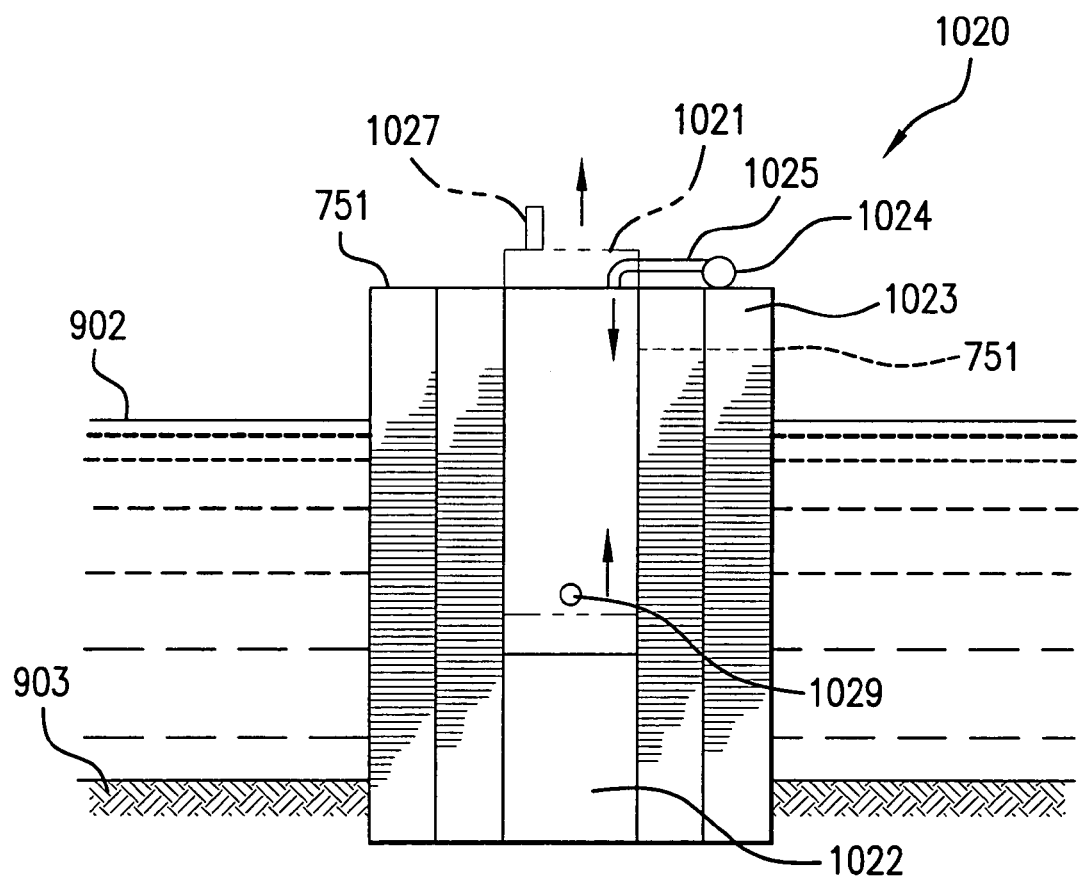
FIG. 75 is a side view of a floodgate assembly in closed position.
Figure 76:
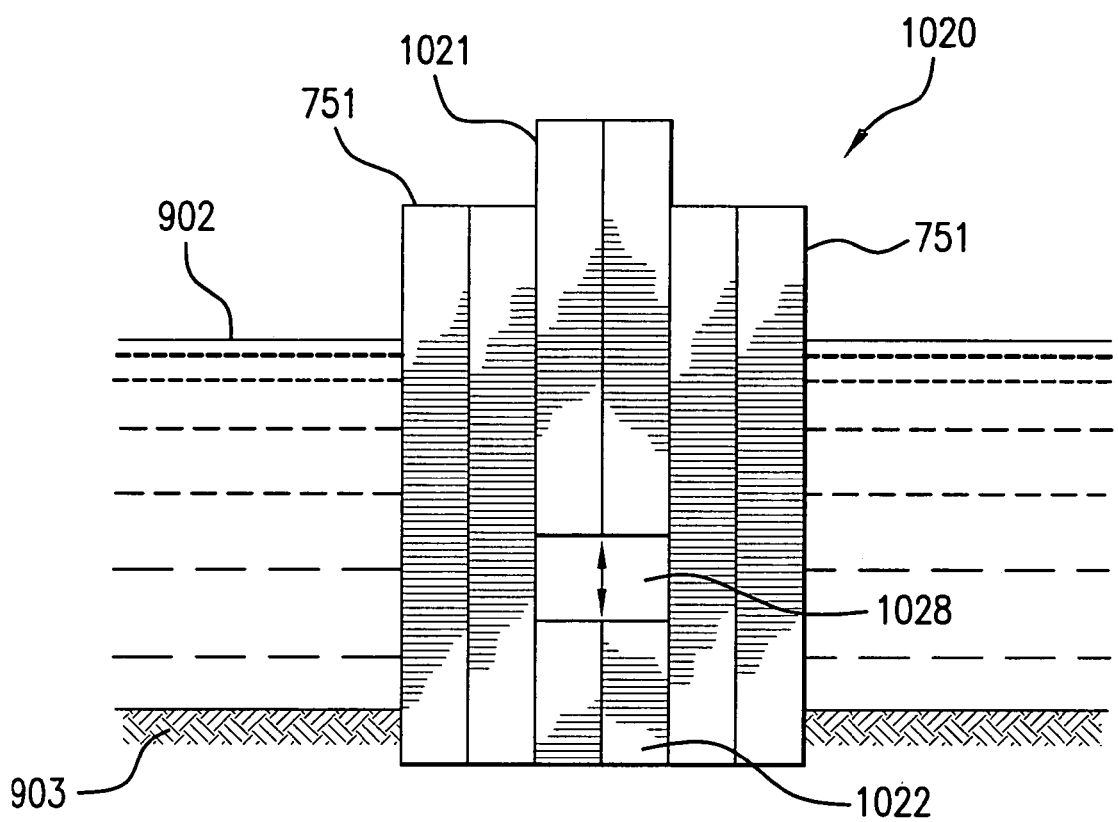
FIG. 76 is a side view of the floodgate assembly of FIG. 75 in open position.

Using vertically oriented hexagonal or rectangular modules, a flood gate can be manufactured from, for example, a hexagonal module or array thereof constructed in two portions. As shown in FIGS. 74 and 75, the lower portion is fixed to the river bottom 903 and to its adjacent module. The top portion is constrained by rails or other suitable guides to allow it to move up and down in the water surrounding it on both the river or reservoir sides and the upstream or downstream sides. FIG. 74 shows a three-module linear array 1020 having two hexagonal modules 751 flanking a floodgate assembly 1021 as shown in the side views of FIGS. 75 and 76. Assembly 1020 is immersed in water such as a river 902, extending into river bottom 903. Assembly 1020 would normally be a portion of a levee extending to the right and left from the assembly as shown, and a levee, dam or other water retention device could incorporate several such floodgate assemblies. The upper portion 1021 of a central split module or vertical array thereof which serves as the upper portion of the gate is visible in all three views. FIGS. 75 and 76 show lower portion 1022 of this central gate module.

Figure 77:
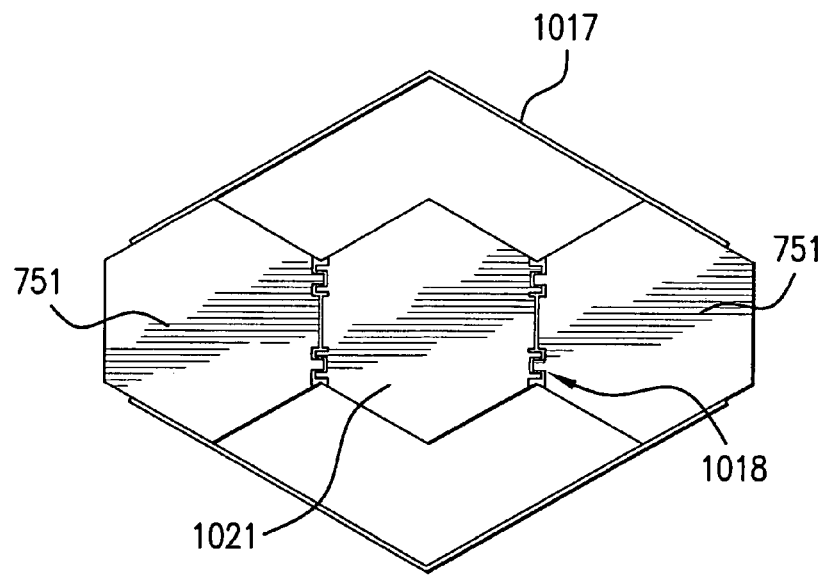
FIG. 77 is a top view of the floodgate of FIG. 74 showing supports and guides.

FIG. 77 provides a detailed top view of an embodiment of gate assembly 1020 in which gate or upper module portion 1021 is slidably mounted on hexagonal modules 751 by conventional tongue and groove slides 1018. Stiffening beams 1017 or other suitable mechanical reinforcements can be added to maintain the relative positions and rigidity of the three modules of the assembly to prevent binding of the gate during operation. Optionally, screens, shields or the like could be hung from stiffening beams 1017 on the river side of the gate to prevent debris from entering the gate.

FIG. 75 shows the floodgate in closed position, with the upper portion of the gate 1021 resting flush against the lower portion 1022. When it is desired to divert water from one side to the other, such as from a river within levees or to release more water from a reservoir, the movable top portion 1021 is made buoyant by pumping or blowing its water ballast from its chambers using, e.g. air compressor and pumping means 1024, high pressure air tank 1023 and pipe and flexible hose 1025. Ballast water can exit from outlet 1027 to either the river 902 or reservoir 1048 (shown in FIG. 78). A flood and drain opening 1029 is provided in the side of upper portion 1021, and is normally kept open unless closed for maintenance. As upper portion 1021 becomes positively buoyant it floats upward as shown by dotted lines in FIG. 75[I.2] and solid lines in FIG. 76[I.3], opening a gap 1028 between the two portions of the flood gate 1020 and allowing water to flow from the river or reservoir to the other side of the gate. As an alternative to using compressed air for deballasting as described above, pumping means (not shown here) could be installed to move water in or out of upper portion 1021 of gate 1020.

When it is desired to close this flood gate 1020, water is simply flooded or pumped into the movable top portion 1021 to make it negatively buoyant again, thereby causing it to descend and close the flood gate.

Figure 78:
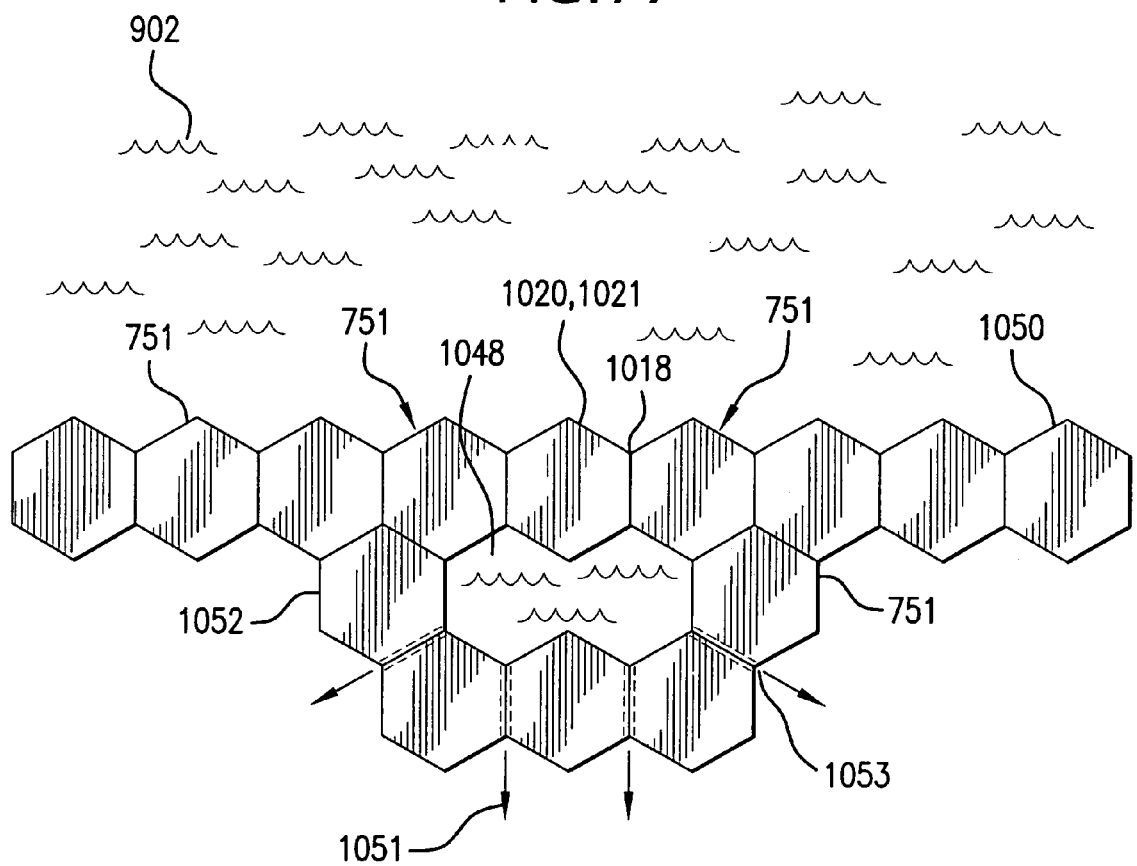
FIG. 78 is a top view of a floodgate assembly as in FIGS. 75 and 76 which is installed in a levee or dam comprising hexagonal modules.

FIG. 78 illustrates a practical installation of a floodgate assembly 1020 in a levee or dam 1050 comprising hexagonal modules 751 along, e.g. river 902. Behind the levee or dam 1050 is a small basin or reservoir 1048 enclosed by an array 1052 of hexagonal modules 751 (which can easily be arranged to form arc-shaped arrays) with a weir (which can be a V-shaped groove) or pipe 1053 to provide flotation on both sides of the floodgate. The weir 1053 would accommodate a small amount of water flow 1051 from leakage when the reservoir is full. Gate 1020 is opened as needed by raising upper module portion 1021, allowing water (with silt included) to flow into reservoir 1048. Passages 1053 can be allowed between adjacent modules 751 in array 1052 at different levels, with those at lower levels allowing both water and silt to gradually flow out into adjacent wetlands and optional upper pipes or suitable connections available to direct clear water to a potable water plant or irrigation ditches. If arranged and managed properly, a larger reservoir 1048 could be used for a community water system.

FIG. 45 is a side view showing the vessel (550) with bow section (558) and stern section (552) again connected together, box module (562) having been removed by reversing the sequence of steps described above. Thrusters or mini-tugs (not shown here) can be carried on the forward deck and/or in a forward hold and offloaded using crane (560) to facilitate this process. In FIG. 45, a portion of the module tensioning system has been loosened and crane (560) is lifting the first box (101) to be offloaded. Depending upon the depth of water near shore and the positions where the boxes are to be installed, the vessel and crane may be able to deposit the boxes in the water directly above or near the installation point, or near the installation point ashore. Alternatively, the boxes can be placed into the water near shore and maneuvered into installation position by mini-tugs or other suitable craft. Where appropriate, crane (560) and/or a similar crane installed on the stern section of vessel (550) can be used to remove individual boxes (101) which have been disconnected from box module (570) before it has been disconnected from the bow and stern sections of vessel (550).

FIGS. 46 to 48 illustrate another method of transporting and installing arrays of precast boxes of the invention. FIG. 46 is a side view of a barge (600) or similar vessel floating in water (602) over bottom (610) where a breakwater is to be installed. Vessel (600) can be self-propelled, in which case propeller (620) and associated propulsion systems are provided. Precast concrete boxes (604) are connected by stainless steel cables (606) (or other suitable mechanical means) and arranged on deck (612) in position to be unloaded as an array via ramp (608). The boxes can be the special perforated and slotted "breakwater boxes" disclosed in U.S. Pat. No. 5,697,736 and illustrated herein in FIG. 4 (having thin concrete knockouts or plugs), but can also be open boxes as in FIGS. 10 to 12 or closed boxes fixed with flood/drain and blow/vent valves as illustrated in FIGS. 16/17. Ramp (608) can be held in position during operations by using suitable mechanical restraints such as cables or hydraulic rams, as well as floats.

The array of boxes can be unloaded from the barge by dropping a heavy anchor (614) which is attached to the array by extended cable (607), then backing the barge (by self-propulsion or tug, not shown here) to exert tension on cable (607), as illustrated in FIG. 47. Barge (600) will require a smooth, level deck upon which the array of boxes can be arranged, and providing rollers or lubrication before the boxes are loaded and connected would be helpful. FIG. 47 illustrates the array of boxes (604) floating on the surface (602) and interconnected by cable (606) (not seen here), with the boxes pulled closely together. One end of cable (607) is still held by anchor (614), but the array of boxes has been moved closer to that anchor by winches or boats to bring it near the point where the breakwater is to be installed. At the other end of the array, cable (606) passes through block (618) on anchor (615), which was dropped from the barge deck after the last box slid down ramp (608). Clamps or other mechanical restraints (616) and (617) position the array of boxes at preplanned portions of cables (606) and (607) after the desired amount of tension on cable (606) and the desired position of the array is attained. This is accomplished by applying force to the barge end of cable (606) via a winch (not shown) or other appropriate device.

When the array is in optimum position for installation as determined by navigational or global positioning system fixes, all boxes are sunk sequentially or simultaneously by remote control or manual means, and allowed to settle into their installed positions to form a submerged breakwater or reef (622) as shown in FIG. 48. Cable (606) can then be simply cut from the barge deck, or if desired, a diver can be employed to secure cable (606) to block (618) on anchor (615) and the excess cut, to provide extra security for the breakwater. As discussed in the patent cited, at columns 8/9, such breakwaters can be very beneficial in reducing or eliminating the presence of swells in harbors which are at least partially exposed to open water. As an alternative, the interconnected boxes can be left floating to mitigate passing wave energy.

Figure 49:
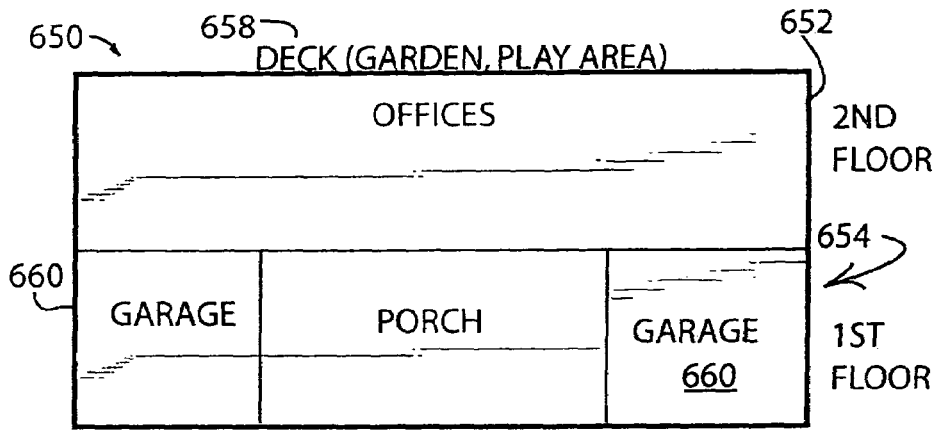
FIGS. 49 and 50 are end and plan views, respectively, of a dwelling structure assembled from precast concrete boxes.
Figure 50:
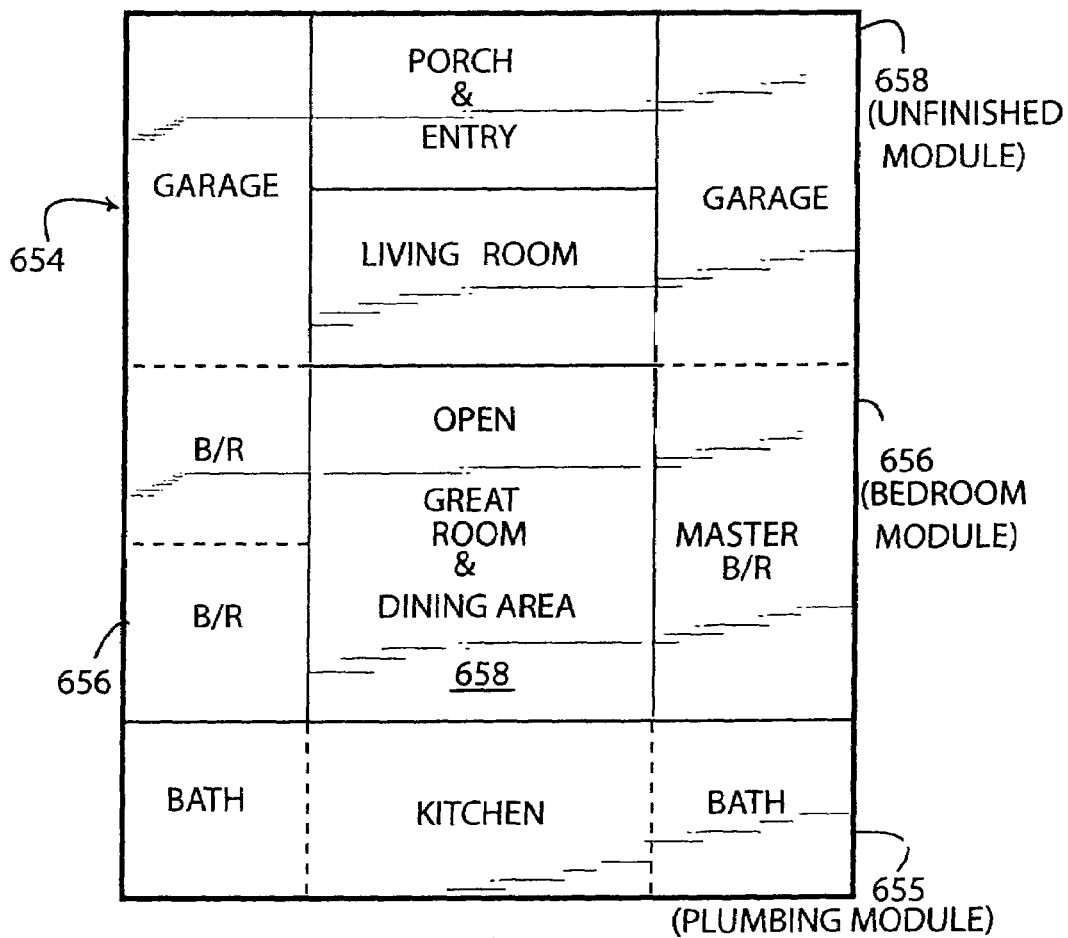

FIGS. 49 and 50 illustrate how the precast, intermodal concrete boxes can be used to construct buildings for use either above or below ground or water. Dwelling structure (650) includes first floor (654) and second floor (652), all constructed of precast concrete boxes of various standard sizes and proportions, being interconnected and stacked to form the two (or more) stories.

The concrete boxes are amenable to intermodal transportation as well as lifting and placement on the ground (or actually in water, if the bottom units are waterproof) or stacking, as illustrated in FIG. 49. Doors, windows, open walls, conduits for utilities, and the like (not shown here) can easily be included for use in these standardized boxes and/or cut during installation/assembly. The walls of the precast boxes in effect become interior and exterior walls, floors and ceilings of the various rooms or spaces contained within the structure.

Because the concrete is strong, resistant to liquids and vermin, it can be used in wet areas, acidic soils, underground, on water, under water and in other challenging environments. It is ideal for constructing strong, relocatable structures, such as for military or security areas. Such precast boxes can be ideal for constructing bunkers, fallout shelters, underground or underwater storage facilities or earth-sheltered homes. FIGS. 49 and 50 illustrate the employment of precast concrete boxes of various sizes and proportions suitable for forming various typical rooms of a combined dwelling/office structure. For example, large unfinished modules (658) can be used for garages or the like, and smaller modules (655) and (656) can be used for bathrooms and bedrooms.

Figure 54:
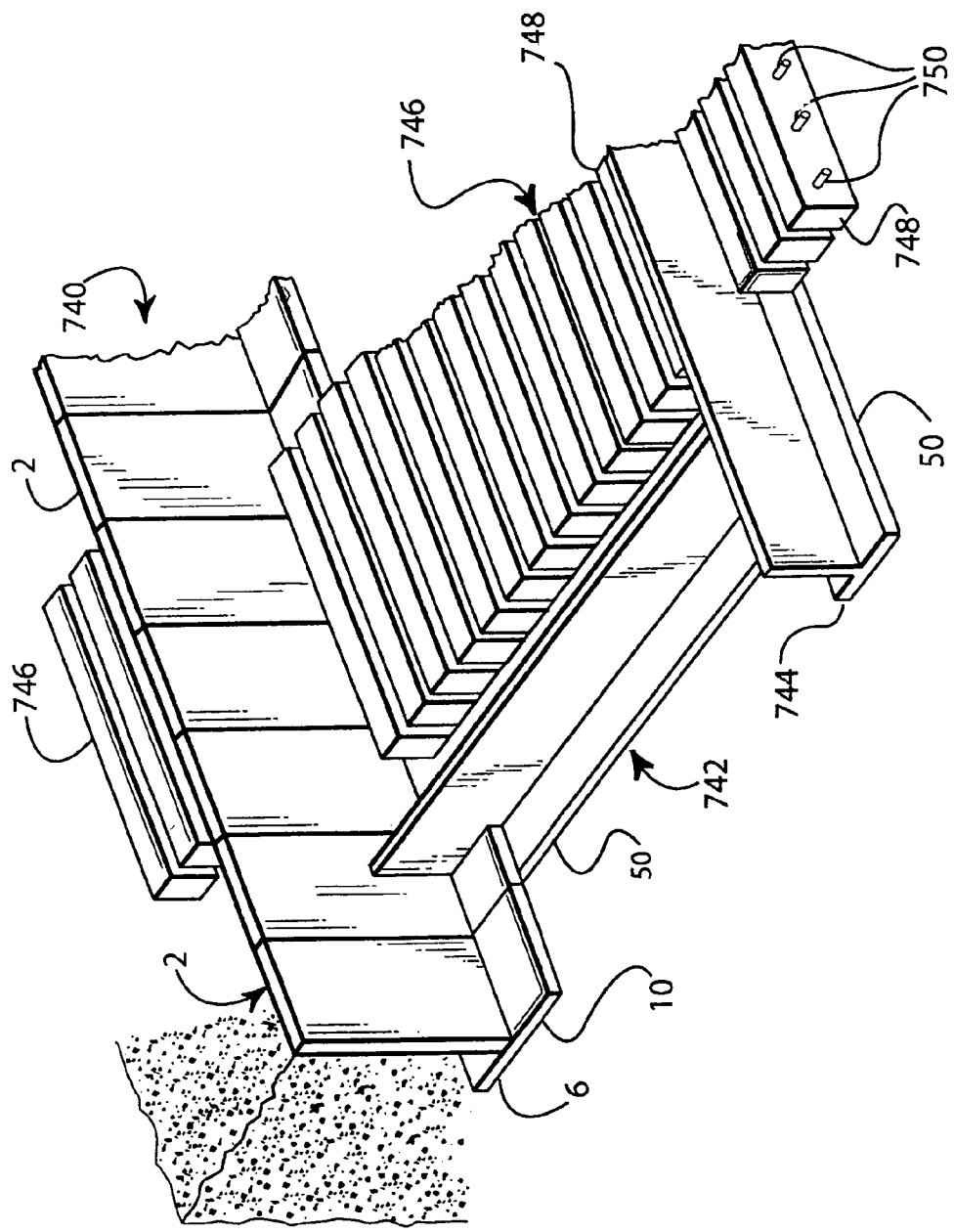
FIG. 54 illustrates a seawall and beach reinforcement system including a seawall, at least one groin built of inverted "T" structures, at least one row of inverted "T" structures parallel to the seawall, and flexible cloth-concrete cable or chain assemblies emplaced in conjunction with same.

FIG. 54 illustrates a shoreline reinforcement system installed along a shoreline having a sloping beach, a low bluff and sand dune systems shoreward of the bluff. A series of L-members of the present invention (or large T-walls) (2) are installed along the base of the low bluff to form a seawall (740), with footers (6) being covered by rubble and fill graded down from the dune systems. Splash plates (10) of the L-members protect against scouring by wave action. Preferably, small rocks under armor stone are used to cover the splash plates to further resist scour (not shown in this figure; see FIG. 4 of U.S. Pat. No. 5,697,736). Several groins (742) perpendicular to the seawall are formed by inverted T walls (50), extending down the beach and along the shoreline to protect the areas most vulnerable to erosion. Preferably the inverted T-walls are secured to the seawall, as shown in detail in FIG. 11 of U.S. Pat. No. 5,697,736, by having base sections (53) of the inverted T-walls inserted under splash plate (10) of the wall, with the stem (52) of the T passing through cut (60) in the splash plate. Additionally, at least one series (744) of inverted T-walls (50) is installed parallel to the seawall, further down the beach. This provides a stronger reinforcing structure and has the added beneficial effect of helping to form a "perched beach" or area where sand, pebbles and other desired material can accrete. Concrete reinforcing mats (746) such as Cable-Concrete or the interconnected concrete tie mats of U.S. Pat. No. 5,697,736 are installed behind the seawall and the row(s) of inverted T-walls parallel thereto to protect the beach from erosion and allow for further accretion of sand, etc.; and below the lowest line of inverted T-walls to protect against Scour Mats (746) comprise rectangular sections of concrete (748) connected together side-by-side by cables (750) or other suitable connecting means. All the concrete components are interconnected by suitable connecting means or fastening means at their points of contact.

Figure 55:
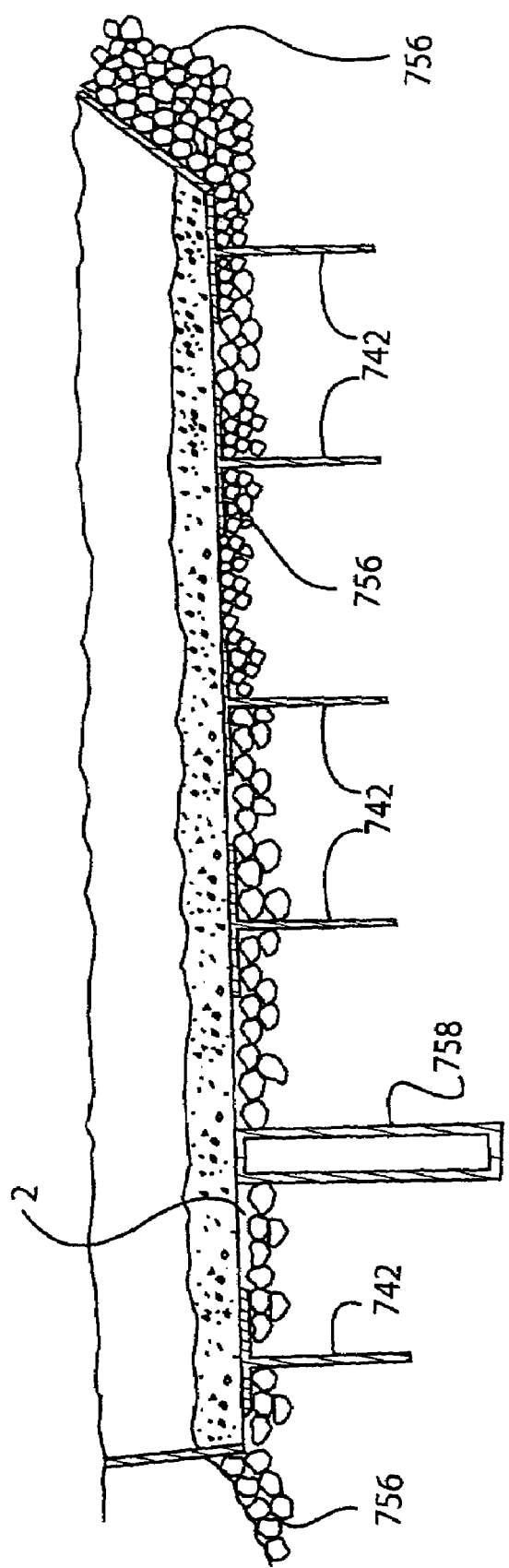
FIGS. 55 and 56 illustrate a seawall and reinforcement system designed for installation along the Potomac River shoreline in Virginia, including groins perpendicular to the seawall.
Figure 56:
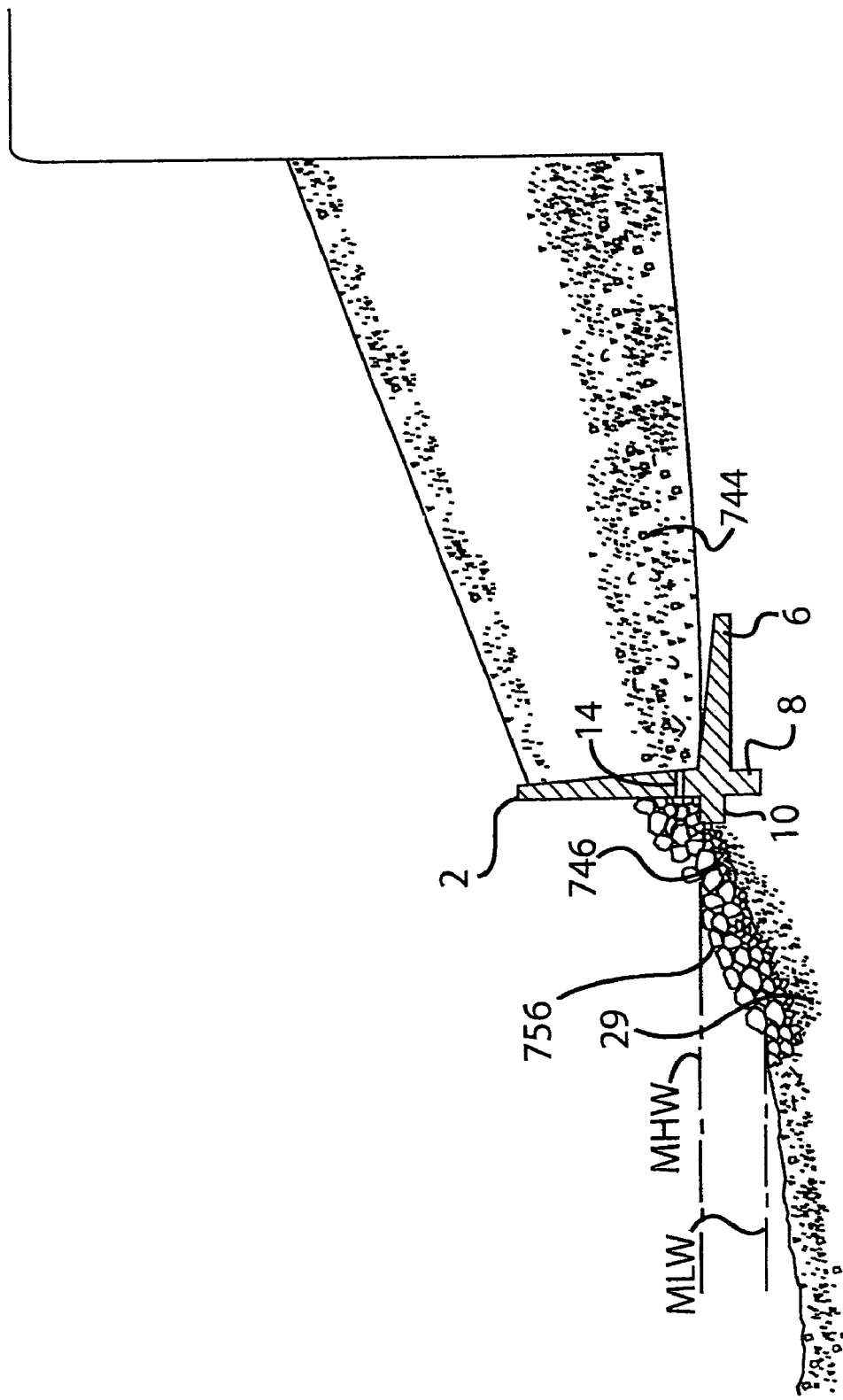

The system shown in FIGS. 55 and 56 and described in Example 3 of U.S. Pat. No. 5,697,736 was designed, built and installed for reinforcement of the Potomac River bank on residential property at Colonial Beach, Va. Starting at the right (northern, upriver portion) of FIG. 55, a portion of the bank was designed as beveled and protected by armor stone (756) against erosion by the current. The angle of the beveled portion was selected to help to deflect floating debris, ice and the like. Approximately 200 feet of the bank was reinforced by sections of L-walls (2) installed to form a sea wall. After entrenching the beach below the bank and positioning the L-walls with their keys (8) firmly placed and leveled, the upper bank was graded and used to fill over granular fill (744) (rocks, gravel and sand) that have been used to cover footers (6) of the L-walls. Weep holes (14) are provided in the L-walls for drainage, and the walls were joined end-to-end by bolts or other suitable connecting means. The splash plates (10) of the L-walls were covered first with core stone (746) over a layer of geotextile (29), then with armor stone (756) to protect against storm and ice damage. The southern/downstream (left) end of the wall was protected by armor stone (756).

A series of five groins (742) was installed, extending approximately 20 feet from the wall and approximately perpendicular thereto. The groins were formed of inverted T-walls approximately 3 feet high by 3 feet wide, and placed so as to nourish the present beach with sediment. A pier groin (758) also extends from the wall in a perpendicular direction, for about 30 feet. The pier groin was constructed of inverted "Double-T" units. This system was designed to protect the presently eroding river bank, encourage accretion on the present beach and enhance recreational use of the area.

Modular Ships Comprising Hexagonal Boxes.

FIGS. 57, 58 and 59A through 59F illustrate a vessel similar in form and function to that of FIGS. 45 to 48, but constructed of individual hollow modules of hexagonal cross section, assembled in vertical positions to form honeycomb arrays which offer a high strength-to-weight ratio and the convenience of removing and installing modules for a variety of functions in the same spaces. These hexagonal modules can be formed of a variety of materials including metal, wood, plastics, polymeric composites and precast concrete, the latter material being preferred in the present context. As with the modular concrete boxes disclosed above, the hexagonal concrete modules can be cast and outfitted with various openings, compartmentation apertures, fixtures and mechanical connectors. Methods for precasting reinforced concrete structures are also disclosed in U.S. Pat. No. 5,697,736. When used to form ship components or other floating structures, the hexagonal modules are preferably watertight.

Figure 98:
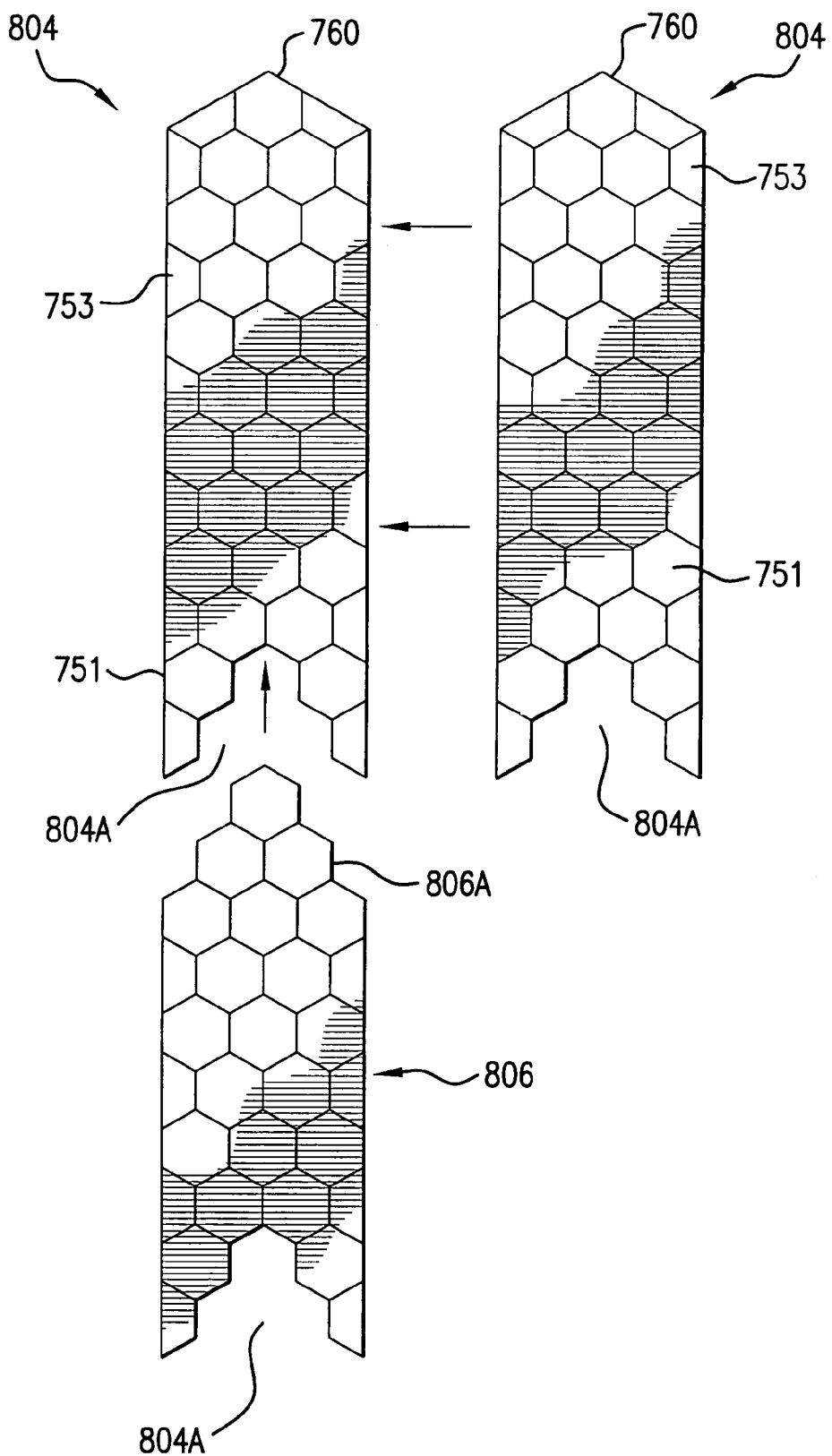
FIG. 98 is an overhead view of large arrays of hexagonal modules being joined together.

In addition to serving as ships or barges, self-propelled or otherwise, large arrays of hexagonal and half-hexagonal modules assembled in vertical orientation can be transported from an assembly point to offshore areas for assembly in larger arrays to form floating bases of various types. FIG. 98 illustrates the assembly process with three large arrays having overall contours similar to those of the vessels of FIGS. 57 and 58. Each array comprises hexagonal modules 751 and half-hexagonal modules 753. The top two arrays 804 have similar bow contours to those of the vessels of FIGS. 57 and 58, although various shapes can be used according to mission requirements. Both of these arrays have stern or after niches 804A (much like the lines of separation for the stern of the vessel of FIGS. 57 and 58).

As indicated by the arrows between the two upper arrays, they can be moved adjacent to each other in reasonably calm waters, using tugs, pusher boats or other suitable small craft discussed elsewhere herein. Once the arrays are brought into close contact along their full lengths, they can be moored together in conventional fashion, using mooring lines, chocks and bitts in classic fashion as any pair of vessels are moored side by side. Mooring lines can also be used to bring the arrays into close contact, using winches or other tensioning means (not shown), to avoid damage which might be caused by excessive momentum developed by one array or the other when pushed by a tug or the like. Conventional fenders or other cushioning materials can be used between the arrays to avoid damage as they are brought together. Depending upon the mission, such arrays could be kept moored together or fastened together in a permanent or temporary fashion using various suitable mechanical fasteners, cables and the like, as discussed elsewhere herein.

Array 806, shown below the two arrays just discussed, has a bow 806A modified to fit into stern niche 804A of those arrays, and so can be pushed into position in the stern of such an array, moored and optionally secured permanently or temporarily thereto to form a larger array. Since array 806 has the same type of stern niche 804A as the other arrays described, any number of such arrays can be brought together and joined bow to stern. Such floating platforms, if properly equipped, could be used as mobile disaster relief platforms from which helicopters, airboats or the like could operate.

Figure 99:
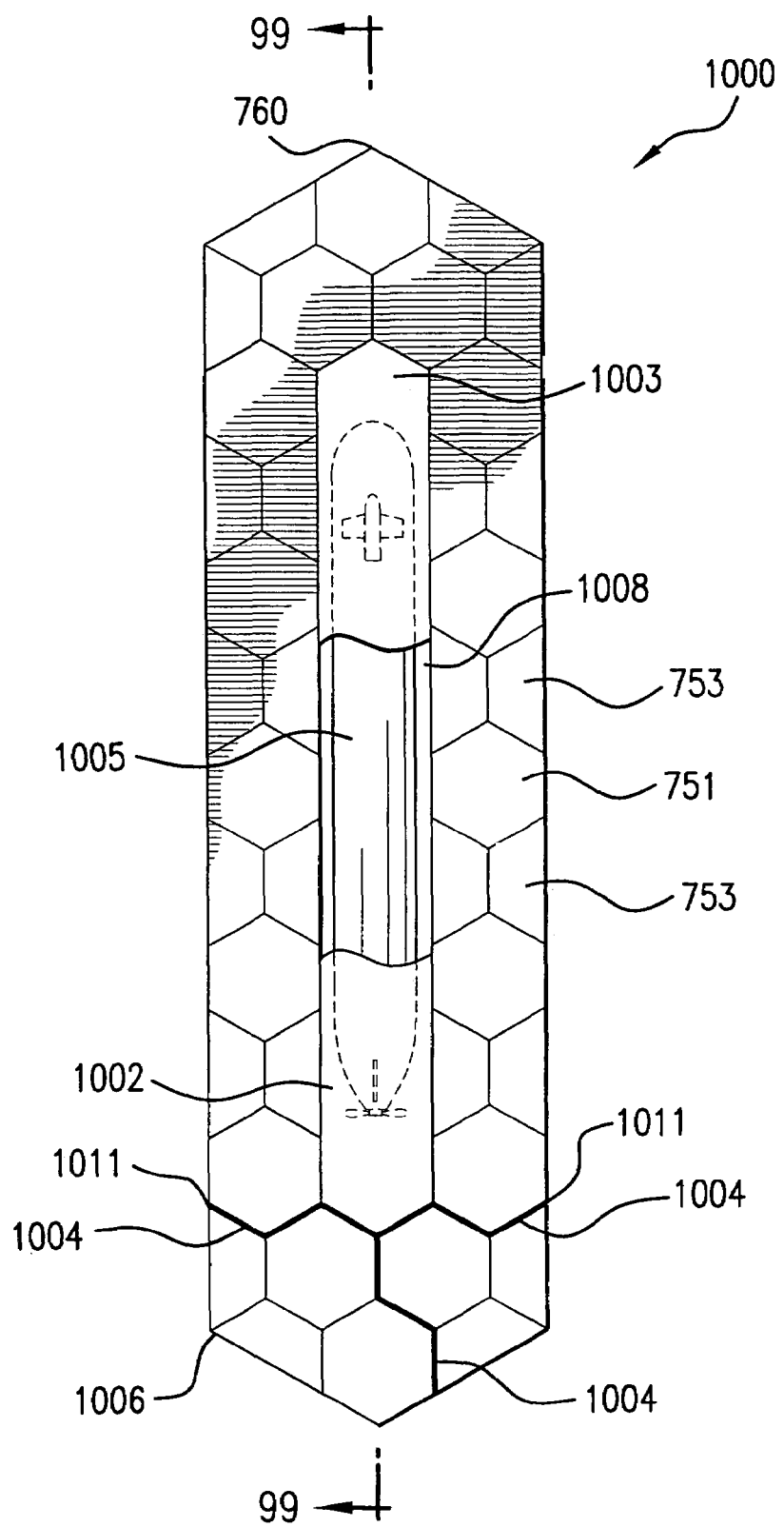
FIG. 99 is an overhead view of a floating platform which accommodates a submarine.

Vessels or other floating arrays comprising hexagonal modules can be employed for various military and civilian missions. For example, FIG. 99 is a top view of a floating platform or sub pen 1000 made up of hexagonal modules 751 and half-hexagonal modules 753 which can be a free-floating platform similar to that depicted in FIGS. 57 and 58, anchored or moored, or integrated into a floating port ("SEABASE") array as discussed herein. This platform can serve as a mobile base for submarine maintenance, resupply and crew change. The platform can be self propelled as described for the vessel of FIGS. 57 and 58.

A civilian application for arrays 804, 806, 1000 or the like could be mobile, floating "SEAHOUSES" or seagoing apartments. Interior units, "waterfront" units and hexagonal units on "moon pool" sides where private boats could be kept, would appeal to residents of various income levels. Units of various sizes such as single, one and one half or two hexagonal modules or arrays could be provided. Porches and windows would be available on the upper decks of multideck platforms as well as on open air roof spaces.

Figure 101:
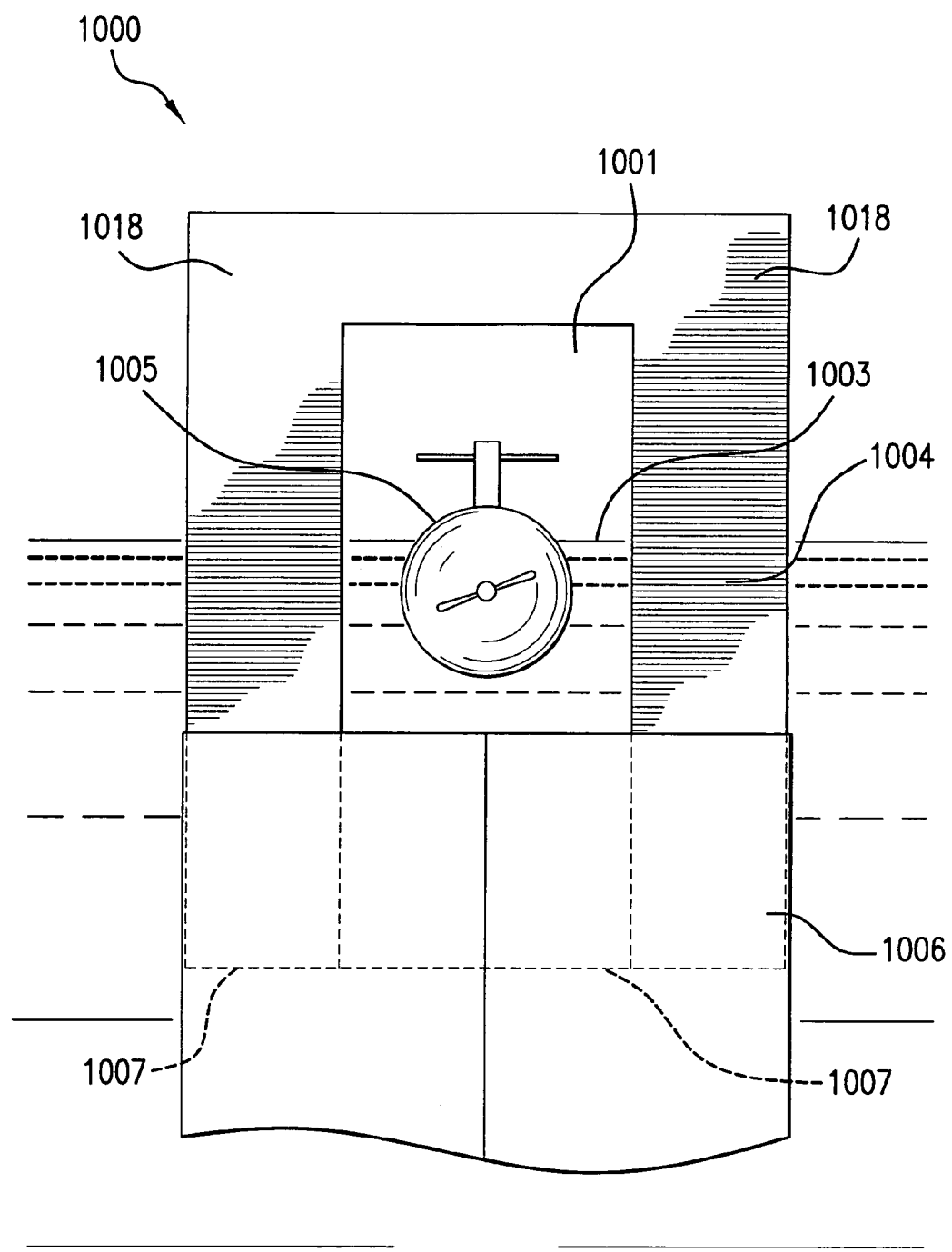
FIG. 101 is a stern view of the platform of FIG. 99.

The platform normally has at least one defined bow end 760 and optionally can have a removable stern section 1006 which separates from the main body along lines of separation 1004 and can be moved aside for submarine entry or hinged at the outer edges with hinges 1011 to open like double doors along another line of separation 1004. Alternatively, stern section 1006 can be ballasted or deballasted to sink and rise along rails or other suitable guides 1018, as shown in FIGS. 101 and 77, and discussed below. An interior cavity 1001 is provided by the structure of the platform, the cavity having length and width sufficient to accommodate the mooring of at least one model of operational submarine 1005 (as shown) or small surface vessel therein. The cavity can be completely open above the platform (as shown in cutaway portion 1008) to permit the submarine to enter directly while the removable portion 1006 is open, but preferably a top layer of modules 1002 provides a "moon pool" 1003, open to the water to allow access from below and closed above, which is dimensioned to allow a submarine to float into position from below, much as modern submarines explores polar regions, finding areas of shallow ice (by sensors including periscopes, underwater television and under ice sonars) where the vessel can gradually surface in a vertical direction to force its way through the ice.

Figure 100:
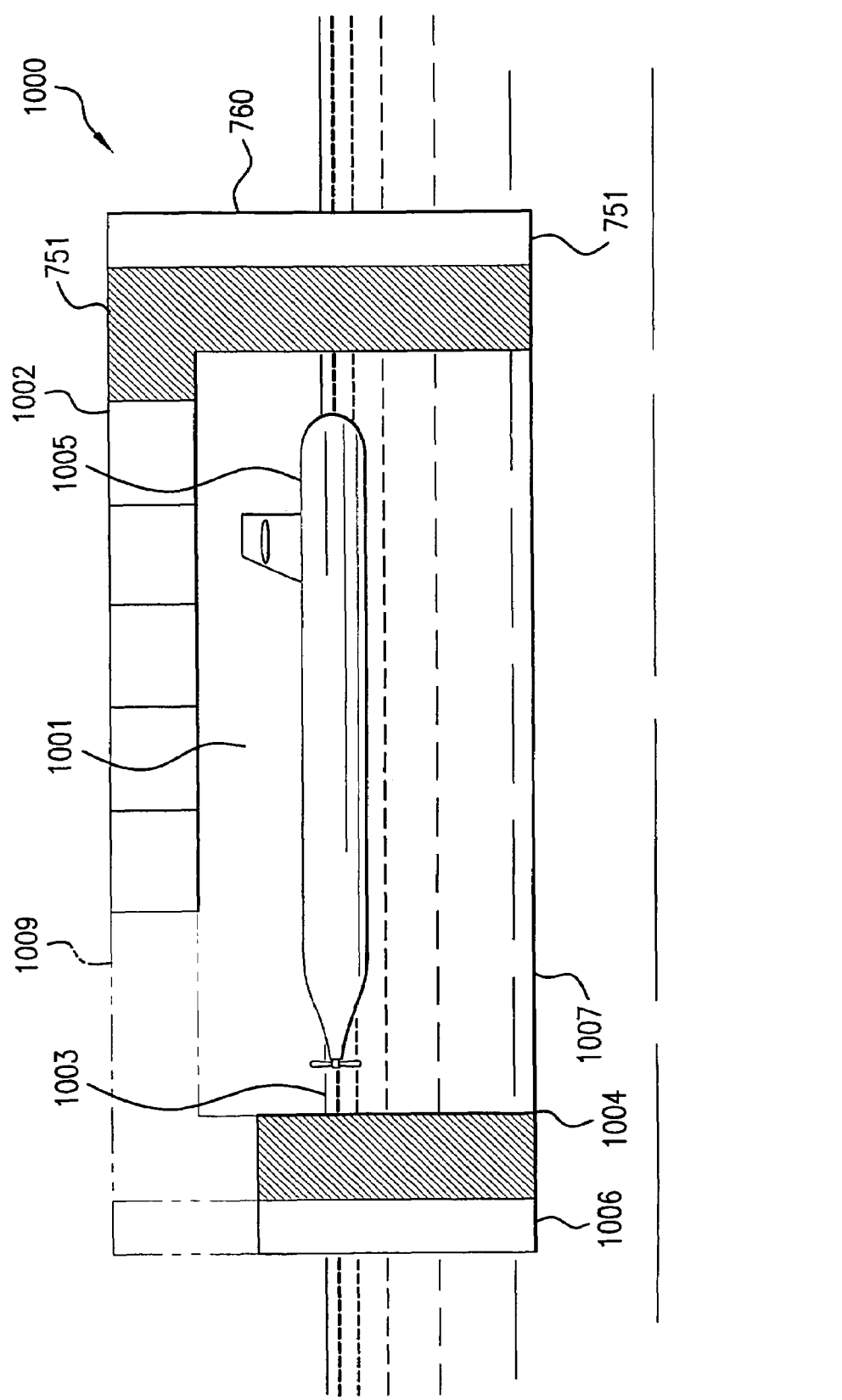
FIG. 100 is a side view of the platform of FIG. 99.

The platform 1000 is configured to provide a "moon pool" 1003 and a cavity 1001 above with sufficient clearance to allow a submarine to surface and float on the water surface therein (at various vessel drafts) without impacting the modules overhead with the uppermost projections of the submarine. The level of water in the moon pool 1003 relative to the inner surfaces of modules 751 and platform bottom 1007 can be controlled by varying the pressure of the air in a closed cavity 1001. A portion 1009 of an upper module layer or deck 1002 is shown cut away in FIG. 100 to reveal the submarine 1005. Depending upon the scale of the platform and expected operational requirements, ample clearances can be provided for a variety of submarine models, or particular models. Conventional catwalks and mooring facilities concealed within the upper layers or decks 1002 of modules 751 of platform 1000. The latter configuration of course provides secrecy as to the submarine's presence and operations, provided the surrounding water is deep and/or dark enough to preclude visibility from above. The closed top configuration also provides for better control of the depth of the moon pool 1003.

FIG. 101 is a stern view of platform 1000 with a closed top to provide a "moon pool" inside, a submarine 1005 berthed therein and stern section 1006 ballasted down to provide sufficient clearance for the submarine to enter directly on the surface. The mechanisms for lowering and elevating stern section 1006 would include rails or other guides 1018 (See FIG. 77.) along lines of separation 1004 paralleling the outer walls of adjacent modules 751 and conventional means for pumping water and air, as discussed herein in FIGS. 74-78 for a levee floodgate which can be raised and lowered in the same manner.

An alternate version of platform 1000 can employ a squared-off bow rather than the rounded configuration 760 shown here. Such a vessel could be incorporated as the midsection of the modular ship described above with regard to FIGS. 43 and 44, in the same manner as the floating drydock of FIG. 65, and transported to remote areas of use without the need for self-propulsion or the greater risks of towing.

Figure 57:
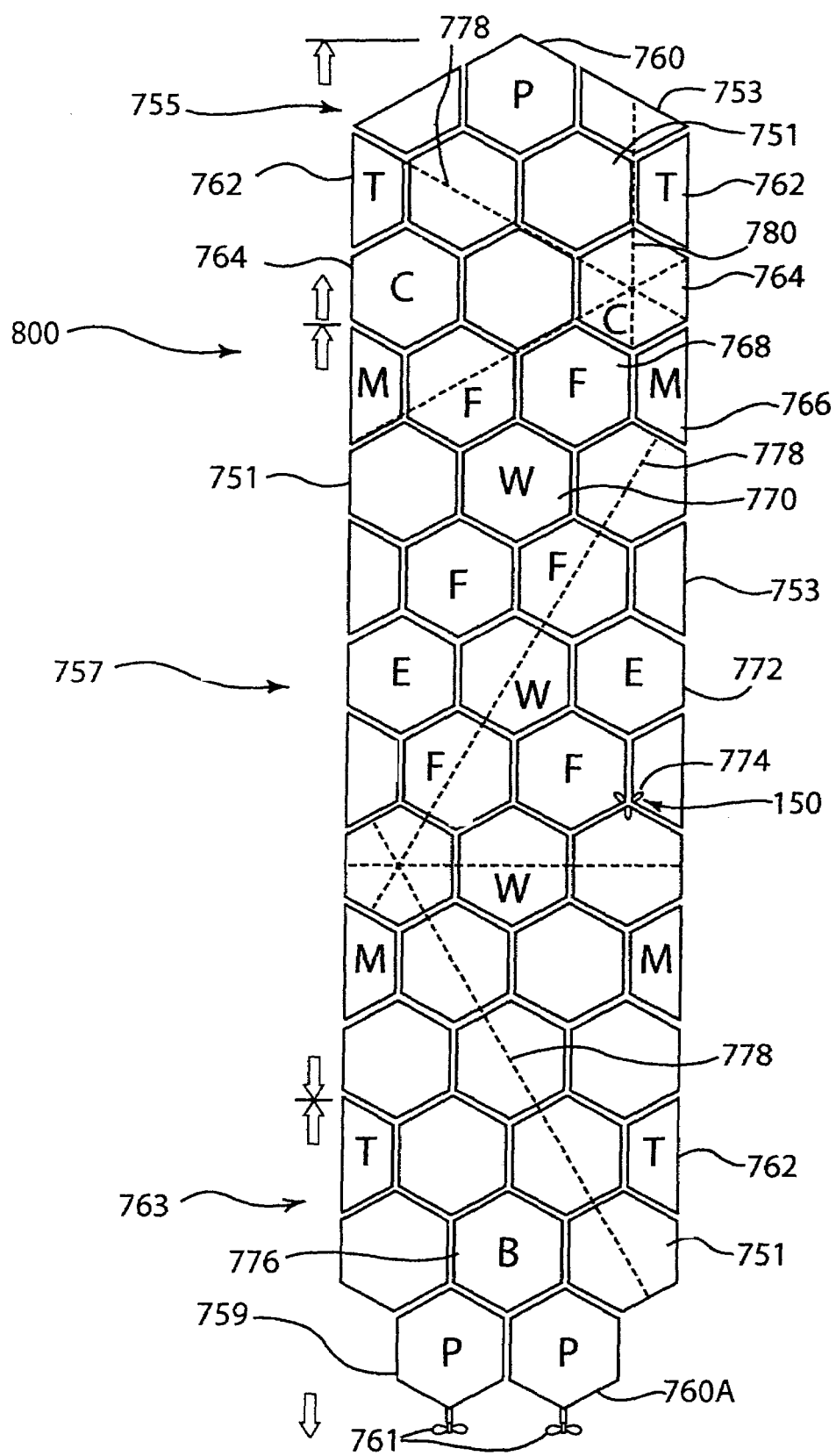
FIGS. 57 and 58 are top views of a ship constructed of preformed hollow components having a hexagonal cross section, assembled in a honeycomb array.

FIG. 57 illustrates the assembly of hexagonal modules adapted for various functions, all assembled in vertical orientations so that they combine to form a horizontally-oriented honeycomb array which forms various portions of ship (800). Plain open hexagonal modules (751) provide the basic structure of the ship, and can be left empty for buoyancy or equipped to be filled with water for ballast. Preferably, a majority of these modules are precast with substantially open and unobstructed internal cross sections for maximum versatility in use. For example, modules (770) can be filled with potable water or other water to be stored for use. Half-hexagonal modules (753) (having the cross section of a hexagon cut from edge to edge) can be used to fill in the spaces along the outer surfaces of the honeycomb arrays to provide a flush surface. Bow section (755) of ship (800) (which can be easily removable along lines of separation as with the previous vessel discussed above) is shown as including bow propulsion unit (760), two half-hexagonal modules (753), three open modules (751) and two crane modules (764). Operations of typical cranes and bow thruster units (762) are described above in reference to FIGS. 43-45. The hexagonal and half modules are configured so as to provide a blunt pointed bow section. Stern unit (763) (also optionally detachable) is shown as including two lateral thruster units (762), a bridge module (776), four open modules (751) and two propulsion modules (759), each fitted with propulsion motors (760A) and propellers (761). The parallel mid-body section (757) can take up variable amounts of space between the bow and stern units, and is shown as including (from forward to aft) a number of fuel modules (768) (which can contain fuel for aircraft and/or boats as well as ship propulsion), water modules (770), and half modules (753) to provide a flush outer surface on the sides of the section. Elevator modules (772) are provided to transport cargo or other items between the main deck and lower levels of the ship. The various modules are secured together with mechanical connectors (150), as described above, and reinforced with tensioning cables (778) (inter-module connections) and (780) (module internal reinforcements) as required.

Missile modules (766), shown in more detail in FIGS. 59D and 59E, are representative of weapons modules which can be interchangeably installed to provide the ship with offensive and/or self defense capabilities against aircraft, surface-to-surface missiles, surface craft and submarines and/or torpedoes. The same types of modules, extending to the bottom of the ship, can be employed for laying mines or launching antisubmarine torpedoes.

Figure 96:
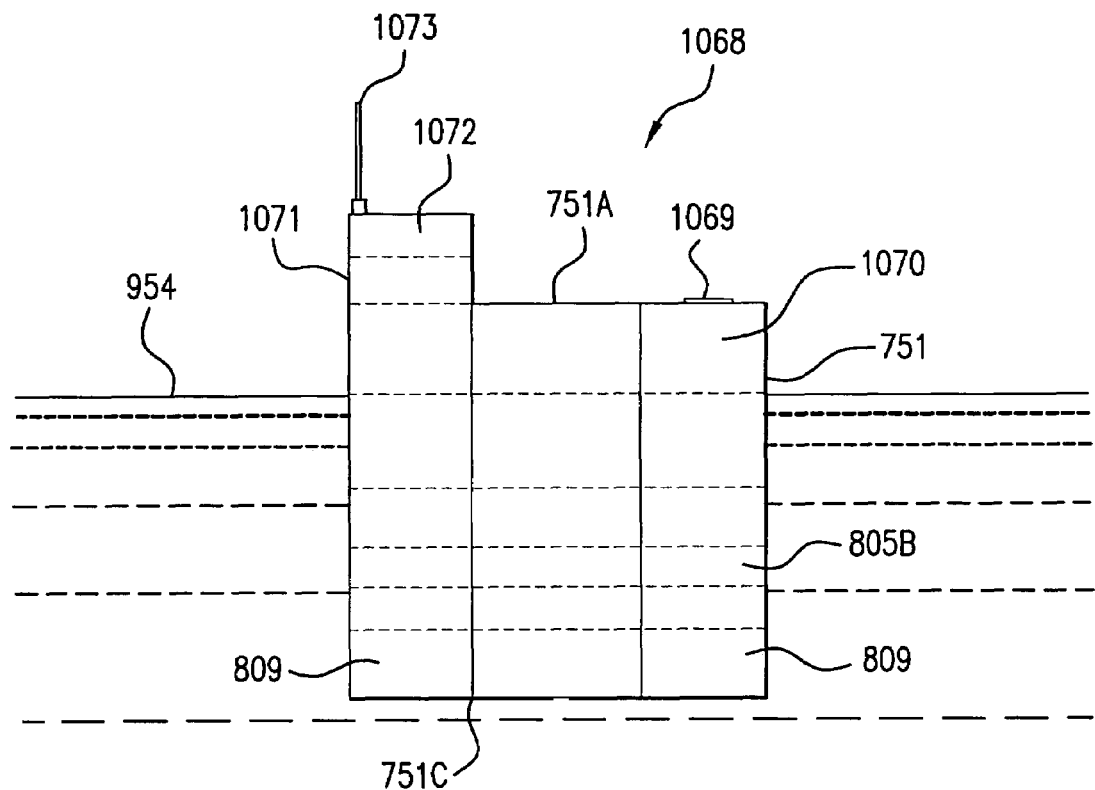
FIG. 96 is a side view of a lifeboat or escape module based upon at least one hexagonal module.

The individual hexagonal modules are designed to be waterproof, even when provided with access hatches, apertures or other fitting. Thus, a structure such as the ship of FIG. 57 need not be sealed on the outer surfaces or in the spaces between the modules. The modules are interconnected by suitable mechanical fasteners as described herein and above, and can be individually disconnected and removed in case of damage or the design of certain types of modules for use apart from the original array. At least one module can be fitted out as a lifeboat (as in FIG. 96) and removably attached for quick use in emergencies. The modules can be produced in any desired size, depending upon the intended application (e.g., from about ten to about 100 feet in length and from about twenty to about sixty feet across between sides), but may be limited in size to facilitate transport.

The modules can be arranged and interconnected to form honeycomb arrays by various suitable methods, ashore or afloat, much as described above for rectangular boxes. They can be prepared and outfitted in a shipyard or other facility, then moved via (and/or water transport to be assembled while floating in the water. Since assembly while floating could require diving services, an ideal approach is to assemble arrays or portions thereof in dry dock. Once the desired array has been formed and all modules connected, the drydock can be flooded, its gate removed and the array towed out for immediate use, further outfitting or connection with other arrays.

Figure 58:
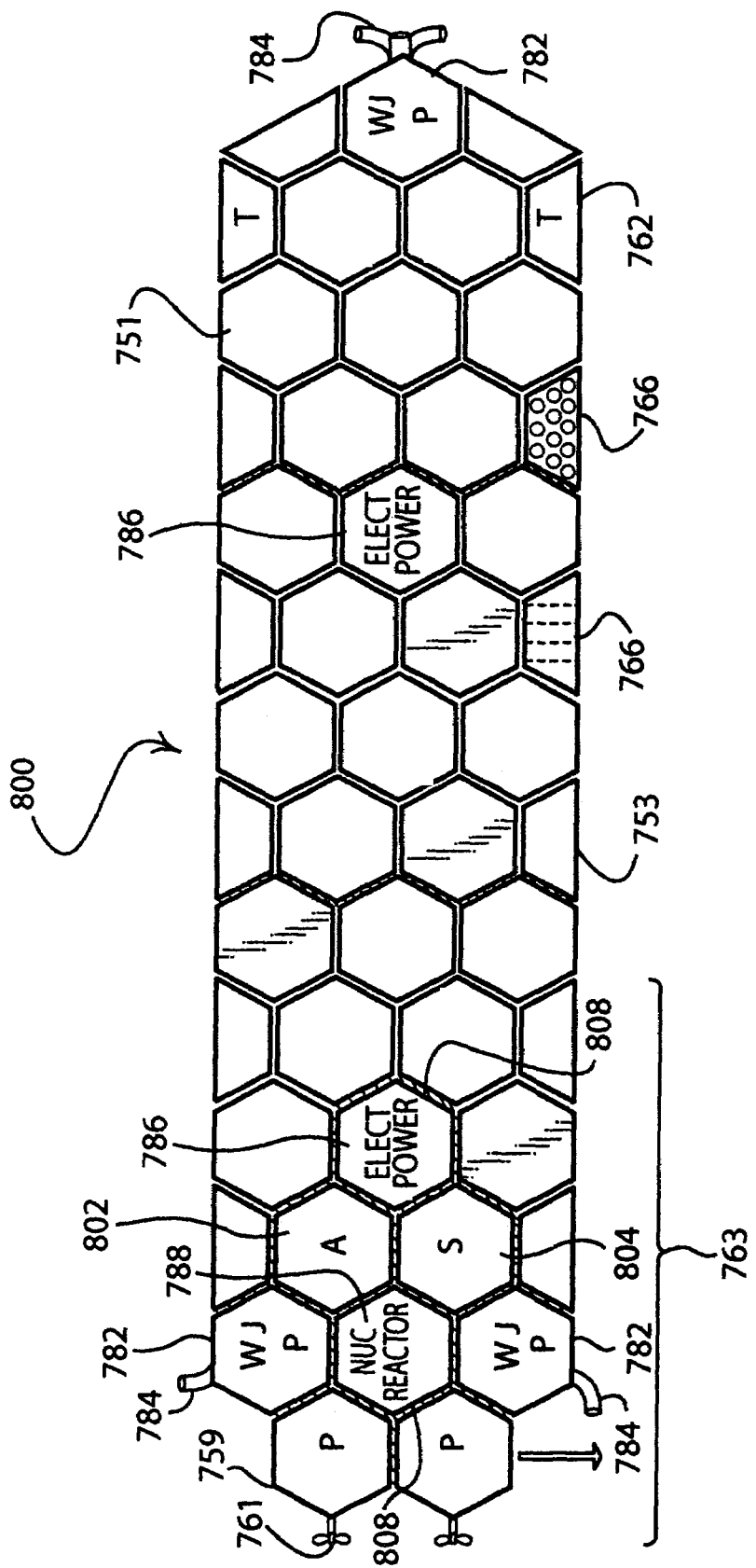

FIG. 58 illustrates variations on the modules which can be used to construct ship (800), and FIGS. 59A through 59F are side views of individual modules providing more detail. The forwardmost bow module (782) provides water jet propulsion for maneuvering, using trainable thruster nozzles (784). Missile modules (766) can provide for either vertical or horizontal launching tubes (766A) for various types of surface to air and surface to surface missiles. Electric power modules (786) provide power for the ship, and can contain a variety of power sources, including generators powered by I.C. engines, turbine-powered auxiliary power units or a variety of power units which are commercially available or in military supply inventories. As shown in FIG. 59B, these units need not extend the full depth of the modules they occupy. The stern section also includes water jet propulsion modules (782) with trainable water jets (784) on each side to facilitate maneuvering. An optional compact nuclear power module (788) can be installed to provide independence from refueling, and can be located underneath a bridge module (776) or at the top of the ship as shown here.

A substantial portion of stern section (763) can be power/propulsion "pod" or module designed for easy removal along connections or borders (808). As shown, such a module comprises electrical power module (786), nuclear reactor module (788), auxiliary power-modules (802), electro-steam generator module (804), water jet propulsion modules (782) and propulsion modules (782) and propulsion modules (759).

Figure 60:
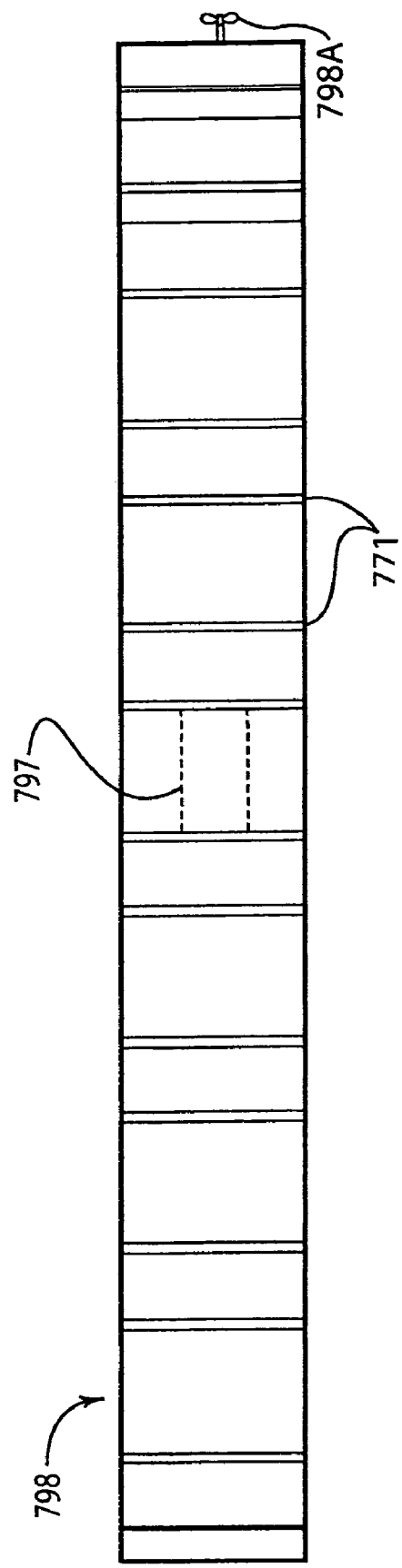
FIG. 60 is a side view of a number of hexagonal modules assembled in a single layer and honeycomb array to form a modular portion for use in a ship.

FIG. 60 is a side view of one layer (798) of hexagonal boxes interconnected to form a honeycomb array which can form one deck of a ship (800) or other floating structure.

Joints (771) indicate where the vertical edges of the hexagonal boxes and half boxes are interconnected to form a flush side for the vessel (800). Bow thruster propeller (798A) indicates the bow portion of this unit. Internal decks or partitions (797) can be provided within any of the modules using any suitable materials and methods.

Figure 93:
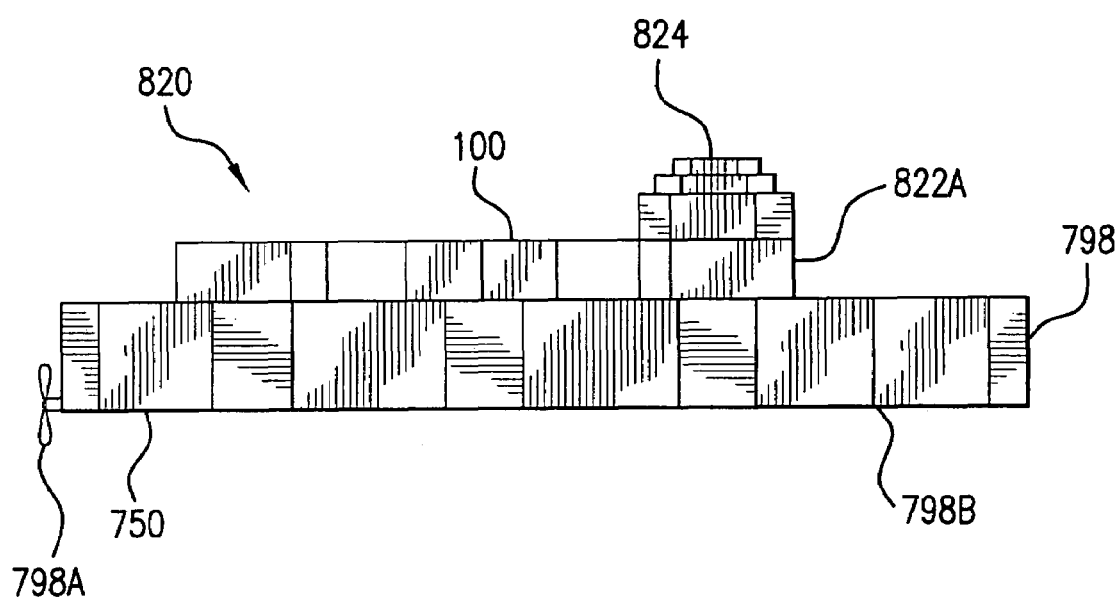
FIG. 93 is a side view of a houseboat comprising arrays of hexagonal modules.
Figure 94:
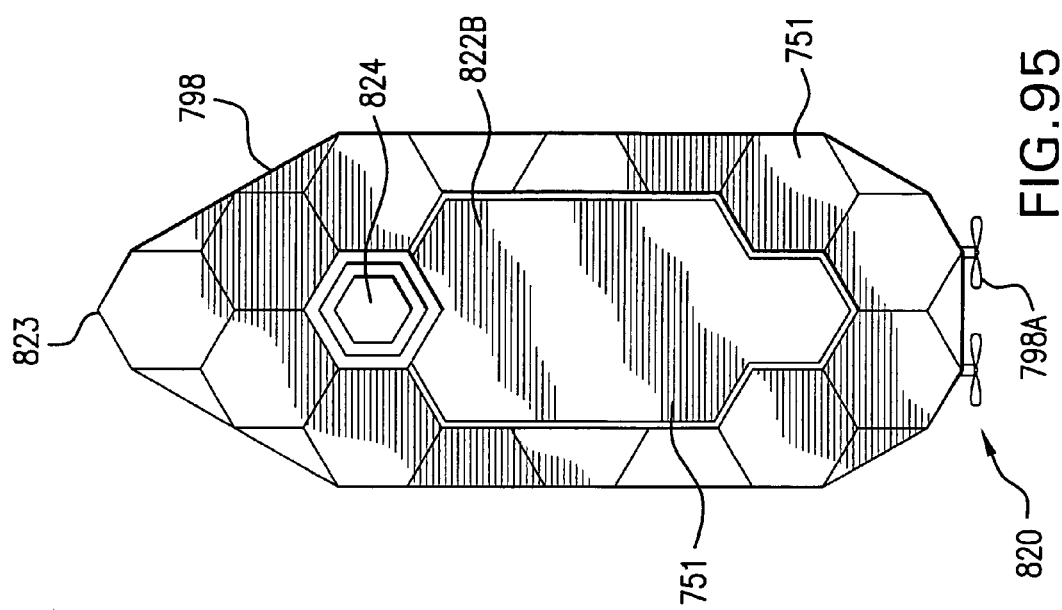
FIG. 94 is a top view of a houseboat as in FIG. 93, having a superstructure comprising rectangular modules.
Figure 95:
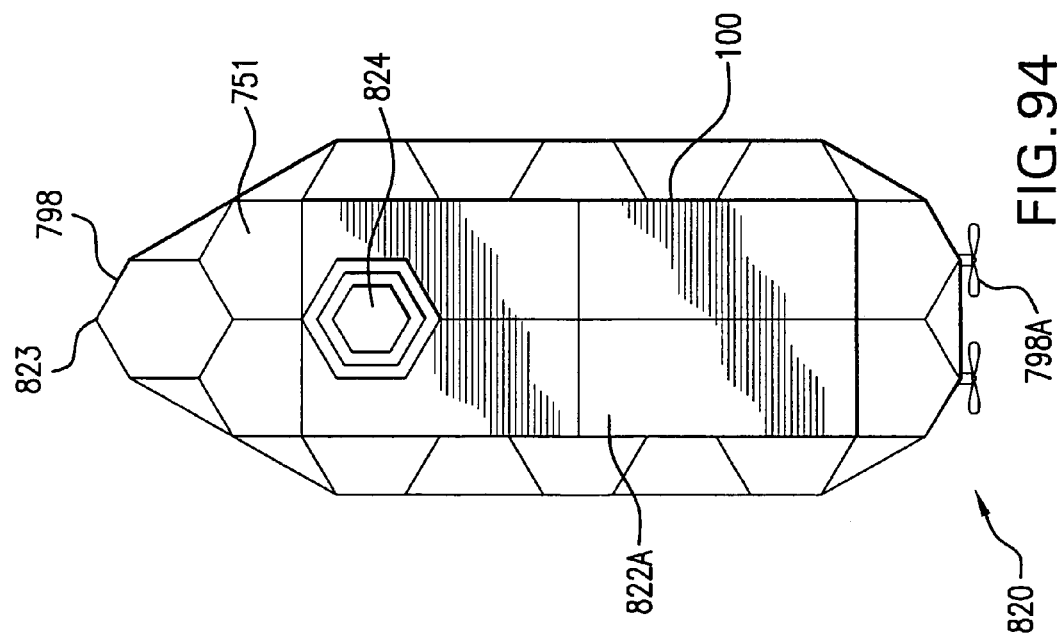
FIG. 95 is a top view of a houseboat as in FIG. 93, having a superstructure comprising hexagonal modules.

FIGS. 93, 94 and 95 (side and top views, respectively) illustrate the application of such a floating platform 798 made up of at least one layer of hexagonal modules (boundaries 798B indicating their interconnections in FIG. 93) as the hull of a houseboat or other vessel 821.

Arrangements of rectangular boxes 100 as shown previously in FIGS. 49 and 50 can be used to form a superstructure 822A for specific spaces designed for living, work or recreation (not shown here). There are various ways of arranging the topside space in accordance with the desires of the owner, using at least one layer or "story" of modules or vertical arrays of suitable length to form the superstructure. Living and working quarters are built on the decks formed by the hexagonal modules. As shown in FIG. 94, four rectangular modules 100 are interconnected to form superstructure 822A, with subdivisions, windows and doors (not seen here) provided to serve functions including bedrooms, bathrooms, kitchen and dining areas, recreation and working areas as needed. A small pilot house 824 is set atop superstructure 822A and contains various sensors and control means as required. These superstructure modules could be made of lighter materials, but still of rectangular or alternatively hexagonal modules 751, as shown in FIG. 95 as superstructure 822B. The rectangular and/or hexagonal modules used could be of various sizes, but preferably the rectangular boxes 100 are of intermodal sizes and proportions to facilitate transport from manufacturing plant to assembly site for the houseboat, other vessels or fortress-like bases.

Platform 798 is designed with at least one layer of hexagonal boxes 751 which will carry the expected load of the superstructure in a stable manner without exceeding the draft for the waters where the vessel will be moored or operated. While a platform with a defined tapered bow 823 as shown is desirable for a vessel which will be frequently moved by self-propulsion (e.g., a suitable inboard power plant and at least one propeller 798A) or towing, a houseboat which is to be permanently moored or anchored could be substantially rectangular.

Some advocate avoiding building homes on waterfront property which is subject to erosion and interference with the natural forces in the beach environment. In lieu of this people could live on floating homes using hexagonal modules along with half-hexagonal modules and triangular sections made by connecting the two ends of two adjacent sides of a hexagon with a straight line. In this fashion a boat can be made of modules having at least three sizes and/or shapes, where each are independently waterproof. Therefore the vessel would be very unlikely to sink, since many failures of modules would have to occur to allow negative buoyancy. The modules should all be substantially watertight. Most are used for buoyancy, while others can be tanks for fresh water, fuel, or waste as described above for other types of vessels. A few modules could be used for storage and machinery. Some on the periphery could be used for ballast, generating energy from waves, or trimming or stabilizing the vessel, as disclosed elsewhere herein.

Further, in residential or industrial areas subject to shallow flooding, houses or other buildings could utilize a hull containing hexagonal and/or rectangular modules as a waterproof foundation and basement. In areas prone to deeper flooding, such floatable "houses" could actually become tethered "houseboats" and survive floods relatively intact by rising with the flood waters. Even though a rising tide might not "elevate all boats", structures mounted upon what are effectively floatable foundations would have vastly improved chances of surviving most floods. In such configurations, some of the modules used to construct the floatable "basement" could have the capabilities to take on and expel ballast water to prevent undesired floating during a low or moderate flood.

Figure 97:
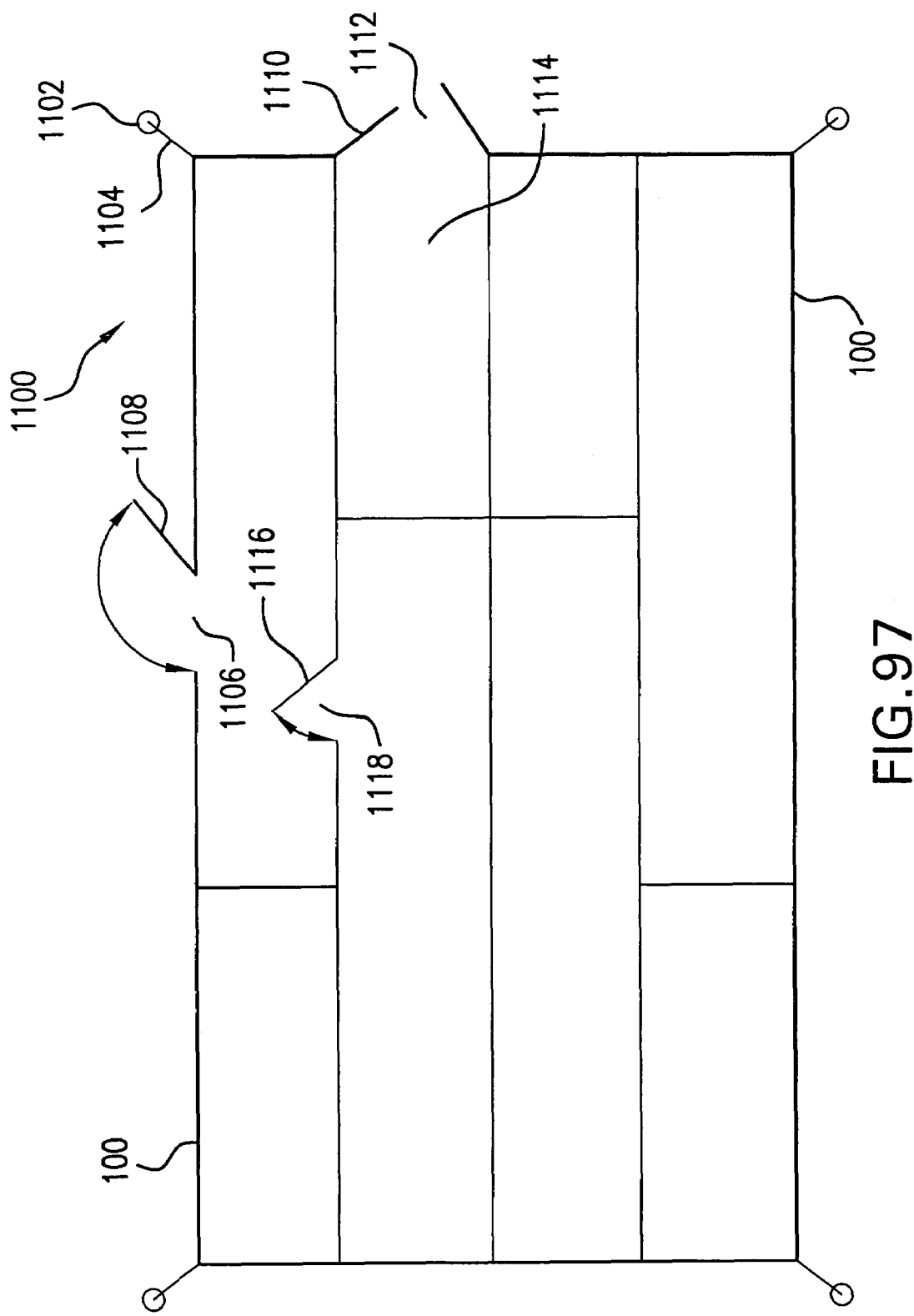
FIG. 97 is a top view of a flood-proof basement or foundation comprising rectangular modules.

FIG. 97 provides an example of a watertight basement and foundation 1100 which could be installed either in the original construction of a house or constructed under a house which has been elevated above its original foundation. Basement 1100 is constructed of a series of rectangular boxes 100 (preferably of precast concrete) which are fastened securely together with suitable mechanical fasteners and/or cement as described elsewhere herein (not shown here). The sides and ends of boxes 100 thus form both the outer walls of the basement 1100 and partitions subdividing the space therein. Although not shown extensively here, portions of these inner partitions can be removed or breached to allow passages such as 1118 between the subdivided spaces, preferably being fitted with watertight doors 1116 which can be closed in the event of flooding. Conventional doors (not shown) can be used day-to-day, with the watertight doors kept open and in reserve.

Watertight doors are commonly used in marine construction and are commercially available, as well as through Navy or maritime salvage yards. They generally include a series of hinges which can be rotated to engage with brackets or "dogs" in the doorway and press the door's metal "knife edge" firmly against a resilient gasket to seal the doorway. The optimum form provides a master lever to rotate all these parts simultaneously to provide a convenient means of opening and closing the door and sealing the knife edge effectively against the gasket.

At least one garage 1114 is provided within basement 1100, with doorway 1112 having twin doors 1110, which may be watertight. In this depiction, the basement 1100 is secured to the surrounding earth using a number of cables 1104 attached to screw anchors 1102. Windows 1106 can be provided, with watertight shutters 1108 to be closed when necessary. As mentioned above, such watertight garages can be provided with pumps, hoses and other suitable equipment as described elsewhere herein to ballast, deballast or pump the various spaces dry, depending upon the circumstances. It may be necessary to provide flexible or detachable utility connections in case floods lift the basement off its footings.

Figure 61:
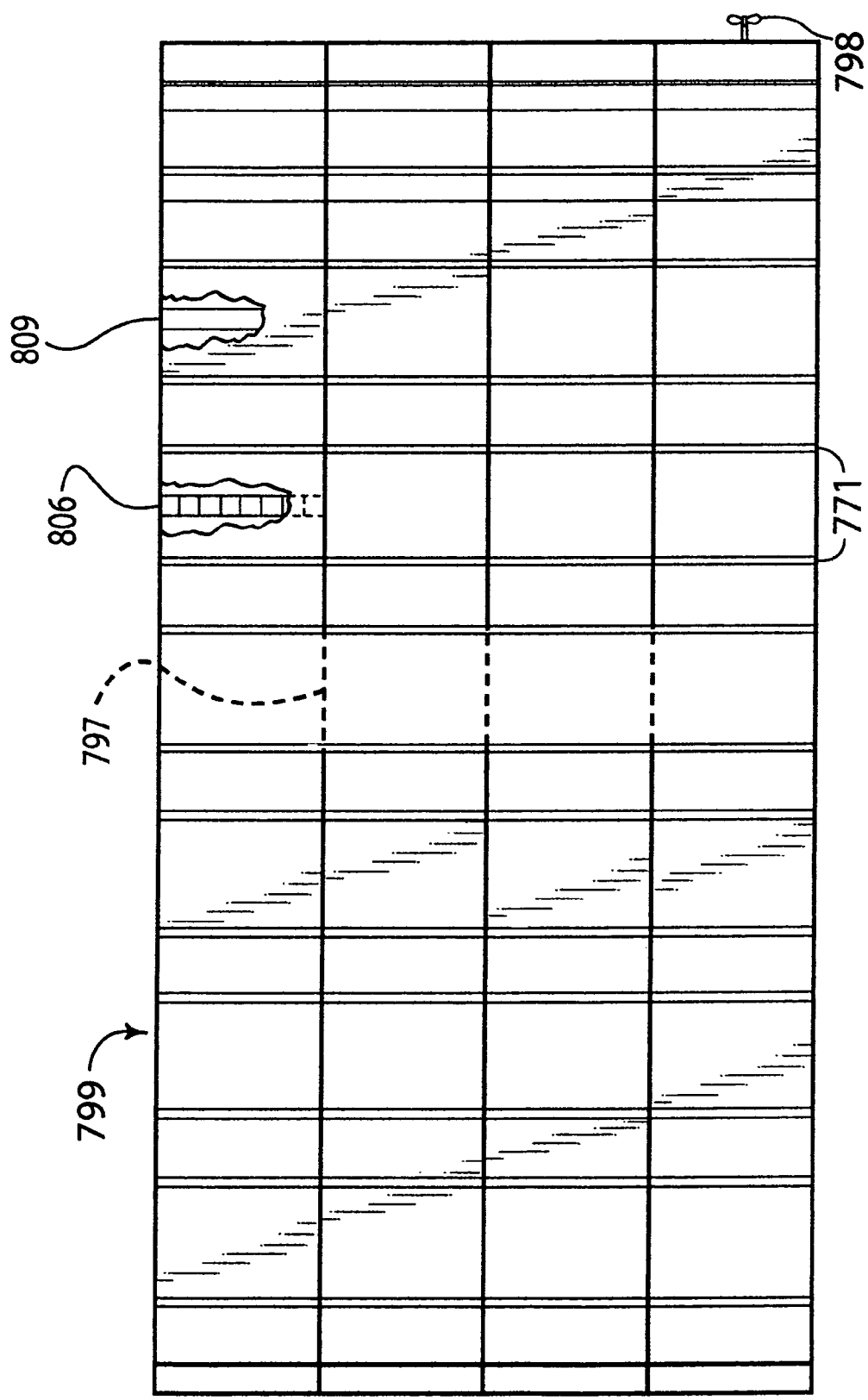
FIG. 61 is a side view of hexagonal modules assembled as in FIG. 60, but with four separate layers of honeycomb arrays superimposed, or alternatively three horizontal decks emplaced within a single deep module.

FIG. 61 is a side view of a portion (799) of a vessel (800) or other floating structure including four layers or decks of interconnected hexagonal boxes in honeycomb arrays. As with any multideck ship, the principles of naval architecture can be employed to provide for different functions on different decks, ladders, scuttles or other connections between decks, watertight integrity, etc. The hexagonal and half-hexagonal boxes meet in vertical joints (771). As an alternative to multiple layers or decks of honeycomb arrays (wherein solid horizontal lines indicate the boundaries between layers), the structure can be at least partially formed of relatively deep hexagonal boxes containing multiple decks (797) therein. Ladder (806) is exemplary of access means which can be provided within modules or between decks or module layers. Elevators (809) (shown schematically) can also be installed within modules. The lower modules or portions thereof can be designated as tankage, to improve the stability of individual modules (when afloat) of the ship or other floating structure containing such modules.

For the modular vessels described above as well as hexagonal modular floating platforms for various applications, there may be a need to have a system to raise or lower the ship or platform draft, correct a list or trim due to loading or battle damage in a static condition. Furthermore, a dynamic system located in the outboard modules to minimize roll or pitching may be desirable for smaller versions of the platforms. This allows water to be blown, flooded or pumped to minimize any rolling or pitching of the platform in a seaway or even restricted waters during storms.

By having some of the bottom tanks in the outboard modules along the length of the ship or platform open to the sea, high pressure air from the other tanks can be used to blow ballast water out of an open bottom or through an open flood and drain opening. By venting air above the air-water interface, ballast water can be flooded into the tank to increase the draft and mass of the platform. By flooding or blowing ballast out of selected ballast tanks, the trim forward and aft or list port or starboard can be corrected for load imbalance or battle damage flooding.

In a storm, small versions of the hexagonal module platforms may be subject to pitch and roll motions. These dynamic accelerations may be dampened by blowing or flooding tanks and/or pumping liquids from tank to tank, in order to counter such motions. This may be needed only in certain circumstances such as launching or recovering aircraft or smaller seacraft from a "SEABASE" platform.

Figure 79:
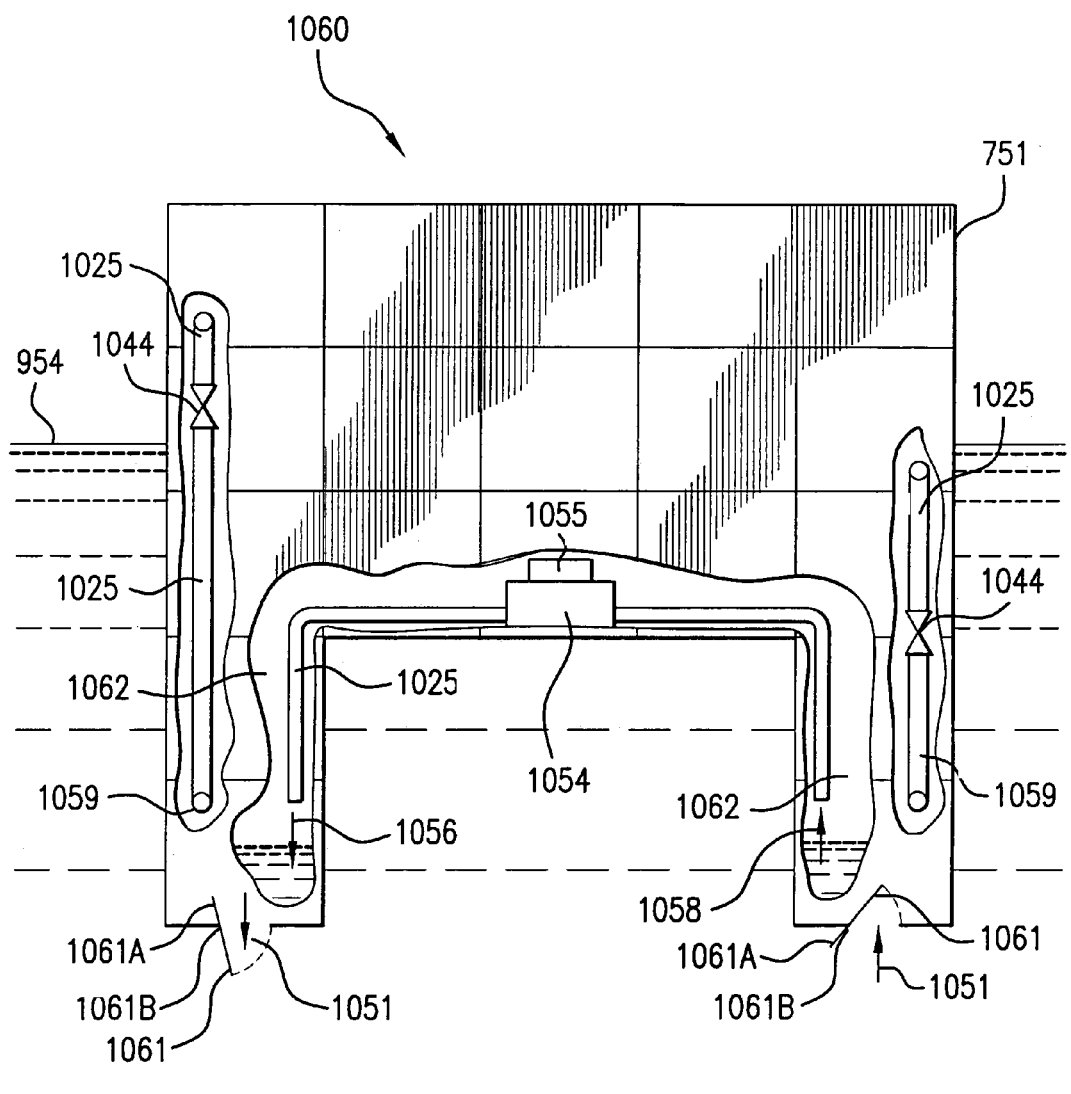
FIG. 79 is a sectional schematic side view of a modular vessel with a stabilization system installed.

FIG. 79 shows a sectional side view of a small platform 1060, representative of various floating platforms and vessels, formed of hexagonal modules 751 and half-hexagonal modules 753 (not seen in this view), floating in ocean 954. Modules 751 are shown on each side as open to the sea through their bottom surfaces using at least two one-way check valves per module and allowing water flow in or out as shown by arrows 1051. These valves are hinged (at 1061B) to allow them to open as shown when pressure is applied from above, and to swing shut to stop water flow due to underwater hydrostatic pressure when pressure from above is removed. Extended portions 1061A can be provided on the opposite sides of the hinges 1061B from the valves themselves to be used in combination with electromagnets on the bottom surfaces of these modules (not shown), plus suitable switching equipment (not shown), to maintain the valves in closed position when not ballasting or deballasting. (Details not shown here.)

This is a schematic representation illustrating that a platform as represented by 1060 should have at least one such open module on each side (e.g., port and starboard) and suitable pumping and control means to achieve the desired objectives of minimizing roll and/or pitch. At a minimum, such a platform might have only two open modules at opposing corners (for a substantially rectangular platform), at least one module in each corner to control roll only, or optionally at least one additional open module on the forward and after surfaces or corners to control pitch. Preferably, a plurality of open modules and suitable pumping, valve and control means are provided on each of the side and end surfaces of the platform to effectively control both roll and pitch.

Again as shown in FIG. 79, at least a portion of at least one module 751 adjacent the bottom of platform 1060 on each side is open at the bottom to allow ballasting with water. The ballasting volumes or air chambers can include open portions 1062 of at least one module 751 in a vertical arrangement, as illustrated here. Air and/or water pumping means 1054 are provided amidships or another suitable location, connecting to piping 1025 which extends into the air chambers 1062 of modules 751 on each side. Multiple pumps 1054 can be provided for redundancy and sufficient capacity to service multiple open modules on at least two sides of the platform.

Suitable control means, electric power and signal connections (shown schematically as 1055) connect to pump(s) 1054 to activate pumps as needed to control ballasting, roll and pitch and other functions as required based upon sensors such as inclinometers, angular velocity sensors, accelerometers, gages for external sea pressure and the like (shown schematically as part of control module 1055). Pump(s) 1054 connect to suitable valving (not shown here) to pump air into or out of air chambers 1062 of modules 751, as shown by arrows 1056 and 1058. Pumping air into such chambers will force water in these chambers out into the sea through check valve(s) 1061, as indicated by arrow 1051, while exhausting air from such chamber(s) will allow water to enter the chamber(s), also through two opposite one-way check valve(s) 1061. This is similar to classical systems for blowing and ballasting tanks open to the sea as used on submarines as well as roll stabilization systems for surface ships, so suitable control means, valving and the like are readily available.

Each vertical set of modules is also equipped with piping 1025 extending from the lower portions of air chambers 1062 (to point 1059) to upper portions of the platform for venting and using valves 1044 to open piping 1025 to high pressure air tanks (not shown here). Water and/or air pumps 1054 can be used to transfer air and/or water depending upon water level, and thus can be used for wave energy conversion, as described herein with regard to FIG. 80. At higher water levels, water can be transferred from air chambers 1062 to trim platform 1060 and for static and dynamic stabilization. At lower water levels, high pressure air can be used to blow water from chambers on the platform's port or starboard sides as needed to mitigate roll in high seas.

One feature of massive fixed or floating structures is that the ocean waves rise and fall relative to the structure without moving it significantly. The wave energy can thus be extracted as it compresses and rarefies air above a column of water in a module open to the sea below. By using one-way check valves, the air on both compression and rarefaction cycles can be sent through an air turbine which can generate electricity for immediate use or storage in batteries for later use.

Figure 80:
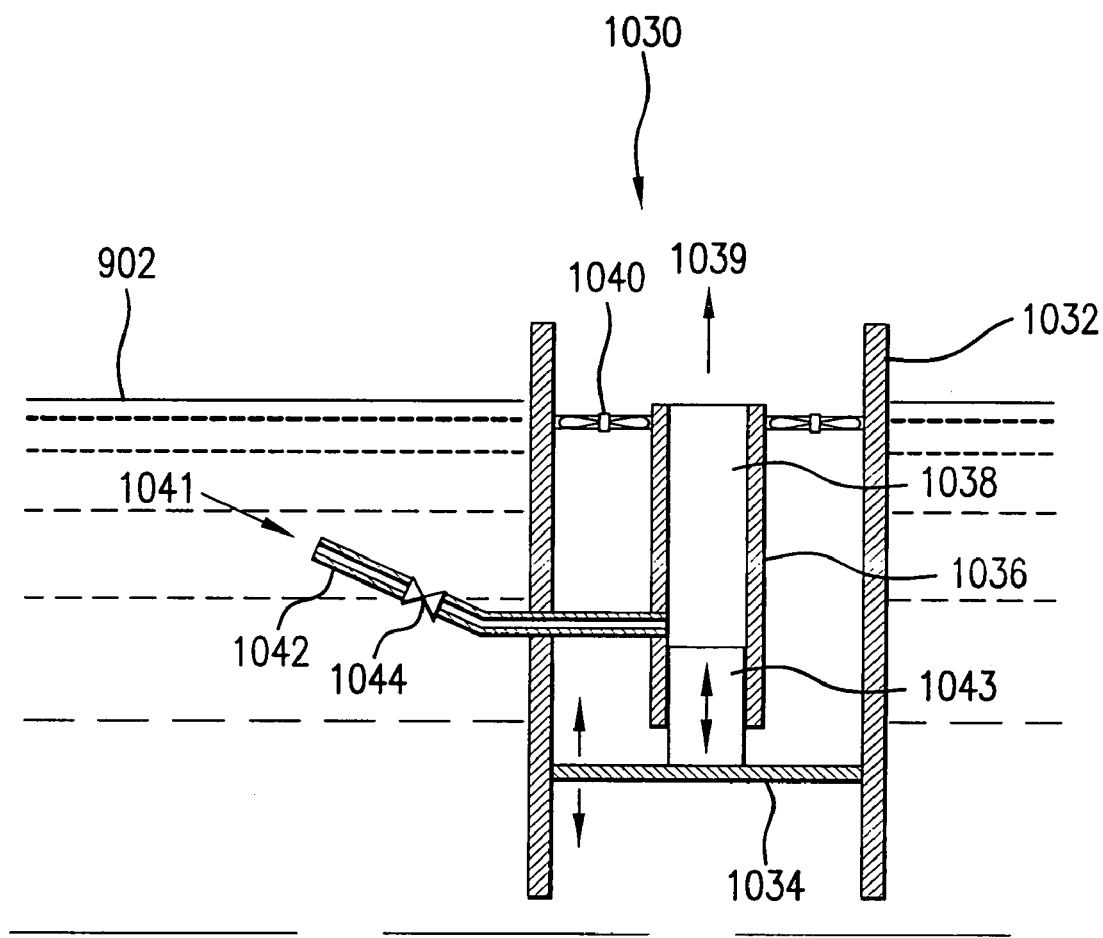
FIG. 80 is a side sectional view of a wave energy conversion apparatus.

As shown in FIG. 80, a representative energy conversion unit 1030 set in water 902 includes a circular casing 1032 installed within a hexagonal module (not shown here) which may be a part of a floating platform comprising an array of such modules. Water enters intake line 1042 at entrance 1041 and is able to pass into the apparatus via check valve 1044, which prevents the water from backing up into intake line 1042 once past valve 1044. This water enters high pressure cylinder 1038. A large disc-shaped piston 1034 is exposed to the water at the open bottom of the hexagonal module within which casing 1032 is mounted and can slide up or down within casing 1032. Small piston 1043 is mounted atop large piston 1034 and fits into small cylinder 1036 so that it can slide up and down with the movements of large piston 1034. Water pressure on the bottom of large piston 1034 presses water through high pressure cylinder 1038 and through outlet 1039 to a separate pressurized tank of water (not shown here). At the same time, air within the space between small cylinder 1036 and casing 1032 is compressed and passes through air turbine generators 1040, which can generate mechanical or electrical power for direct use and/or charging batteries.

In summary, using a differential area piston with the large area subject to small variations of water pressure, a greater pressure can be generated in proportion to the ratio of the large area to the smaller area of the piston rod acting in a smaller cylinder, where the same force acts on a small area. In this manner, using check valves, water can be pressurized in a volume tank with an air bladder to be used for various purposed such as flushing, fire fighting or washing down.

A similar application using high pressure sea water, preferably generated by wave energy as discussed above, is to make fresh potable water (i.e., desalinization) using apparatus comprising at least one semi-permeable membrane. Such membranes are generally formed of polymeric materials, sometimes containing zeolites, and are commercially available. The fresh water molecules pass through such a membrane by osmosis and the brine left behind can be discharged overboard. In times of no waves or wind generated swells, a high pressure pump using other energy sources such as solar, wind, fuel cells or fossil fuels can provide the needed pressure for making fresh water. This could be a more efficient and cost-effective way to obtain the fresh water essential for lengthy operations on station when compared with conventional fresh water evaporative stills, especially when operating in tropical waters.

Figure 120:
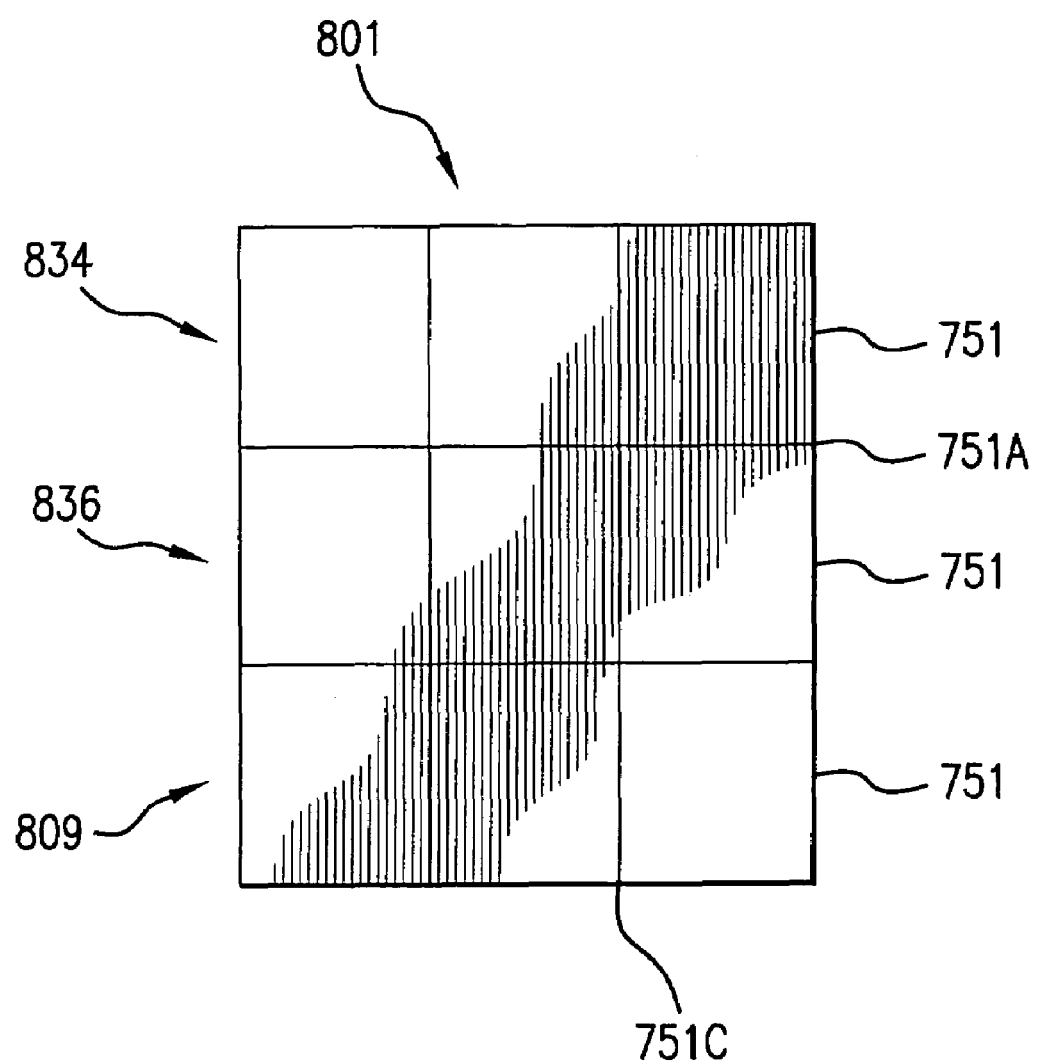
FIG. 120 is a side view of a hexagonal module used in floating platforms, showing allocation of space at various levels.

In the floating platforms and vessels disclosed herein, various spaces within the modules will be occupied with fuel, weapons, supplies of various kinds and spaces for crew messing, berthing and recreation. Such features are disclosed in connection with the vessels of FIGS. 57 and 58, and will not be shown for each platform or vessel disclosed herein for particular purposes. A representative example is shown in FIG. 120, a hexagonal array or column 801 of hexagonal modules 751 which forms a portion of a grand horizontal array. Horizontal separation lines 751A between separate modules can be seen, and the vertical module wall intersections 751C are also visible. Here, the upper module is devoted to hangar space 834 for helicopters or other aircraft, the middle module is utilized for machine shops 836 or the like and the lower module is used as a fuel tank 809. Similar or different allocations of vertical and horizontal spaces within a large floating platform will be made according to the size, mission and manning of the platform. Similarly, the roll stabilization and wave energy conversion systems disclosed above can be used with many of the useful platforms and vessels comprising the hexagonal, half-hexagonal and rectangular modules disclosed herein.

In addition to the detachable bow and stern sections disclosed in connection with FIGS. 57 and 58 and the joining of arrays of hexagonal modules into larger arrays or platforms (much like making up a log boom) depicted in FIG. 98, large hexagonal modules or arrays comprising pluralities thereof can be included in such platforms as removably attachable components thereof. Such detachable floating modules or arrays can be used for a variety of purposes, but an important example is the floating lifeboat or escape module 1068 shown in FIG. 96.

This detachable "vessel" comprises at least one hexagonal module 751 and optional half-hexagonal modules 753 as may be required to provide a shape which is easily detached from the min platform along lines of separation and can be navigated in open waters. At least one hatch 1069 is provided in upper surface or deck 751A of the vessel, and an elevated portion 1071 (comprising smaller hexagonal or rectangular modules or any suitable superstructure materials) contains space 1072 for command, control and communications, using at least one antenna 1073. An upper level such as 1070 can contain cooking, dining and recreation areas, while levels just below can contain berthing and medical care areas. Tanks 809 for fuel and water are provided at the lowest levels, where the weight of liquids will serve to ballast the vessel and stabilize it. Levels above these tanks can be devoted to storage (805B), power and auxiliary areas. Such vessels can be anchored or mobile, and several could be deployed in an operational area as weather stations, early warning sensor platforms, communications links and the like. Smaller versions such as a single floating, vertically oriented hexagonal module could be used as an anchored ocean sensing buoy. Such hexagonal buoys could be transported to their ocean locations as part of an array of similar hexagonal modules incorporated as the midship section of a modular vessel and dropped off one at a time.

Figure 62:
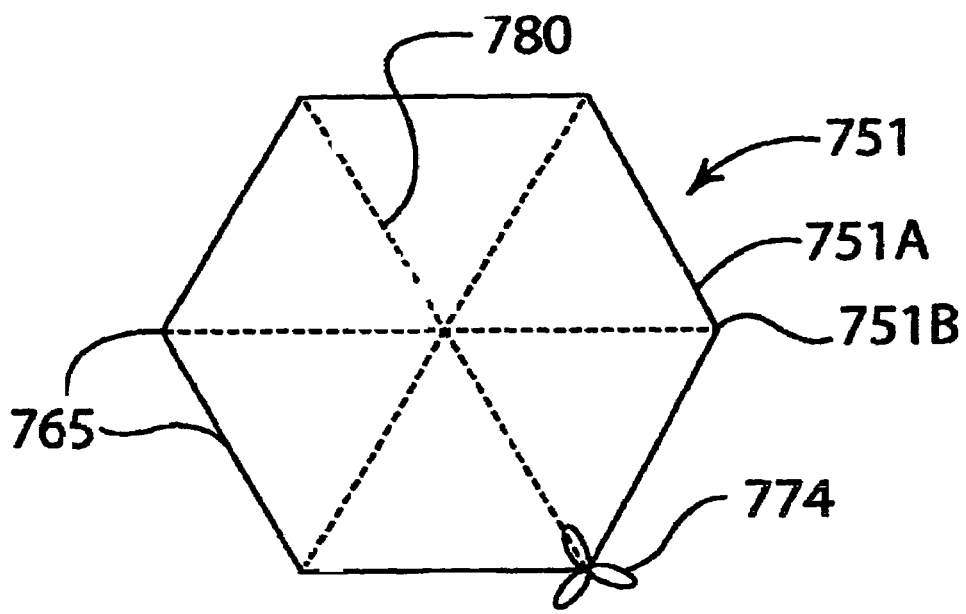
FIG. 62 is a top view of a hexagonal module suitable for use in assembling the arrays illustrated above.
Figure 63:
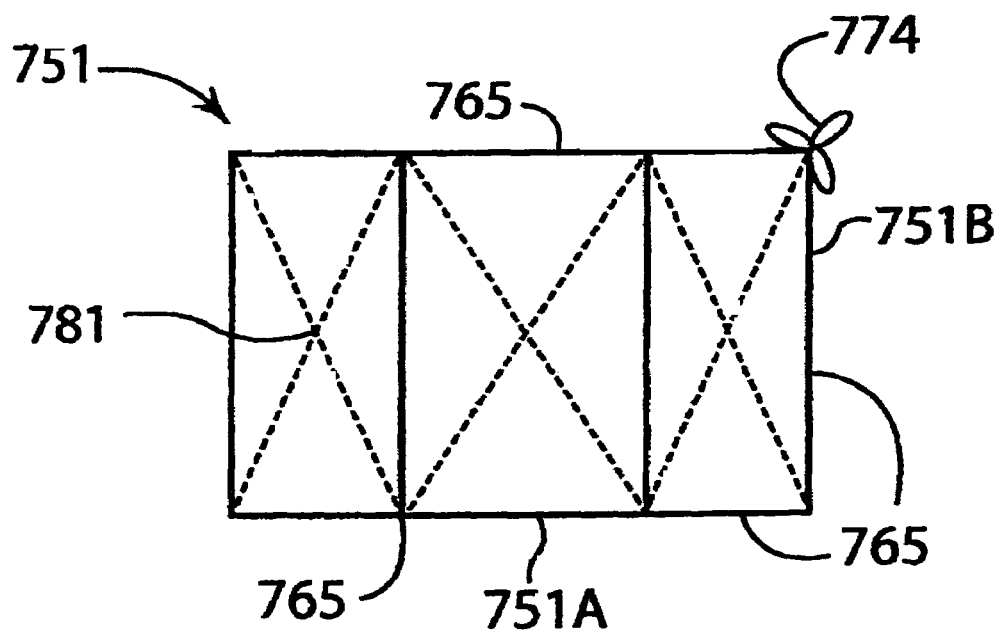
FIG. 63 is a side view of the hexagonal module of FIG. 62.

FIG. 62 is a top view and a FIG. 63 a side view of a hexagonal precast concrete box (751) as discussed for use above. Internal reinforcing materials are cast within the concrete to enhance strength. A plurality of reinforcements (780) and (781) are connected between the corners of the box, cast within the bottom, top and sides of the box. These reinforcements can be nonmetallic rods, mesh, tensioning cables, rebar, metal beams of various cross sections, or other suitable materials. Supports (765) are provided along at least a portion of the horizontal and vertical edges (751A and 751B) of the boxes. These can be round or polygonal cylinders, or standard angle iron formed of metals or other suitable materials such as polymer composites, inserted in the molds so that they are cast into the concrete during fabrication. An "angle iron" signifies an elongated sheet of metal (or other suitable material) bent to include an angle of about 90 degrees. For these hexagonal boxes, the angle can be about 120 degrees (to fit the box edges), but commercially available angle iron stock can be readily used, as the majority of the support will be cast into the concrete, leaving the edge exposed to protect the box edges from damage. Optionally, angle irons comprising ferrous metals can be galvanized or otherwise treated to resist corrosion. The supports and other reinforcing materials can be interconnected by suitable mechanical fasteners to form a framework resembling a cage which will retain its shape during casting and provide resistance to damage when the concrete boxes are cured and put into use. Suitable mechanical connecting means (774), as disclosed above and in the drawings as connectors (150), are provided at the corners as required to interconnect the boxes to form a honeycomb array.

The hexagonal and half-hexagonal boxes can be cast using typical molds, with provisions for the inclusion of reinforcing rods (rebar), tensioning cables and supports for the edges thereof, using methods similar to those used for the rectangular boxes disclosed herein and in the previous U.S. Pat. Nos. 5,697,736 and 5,697,052.

Figure 81:
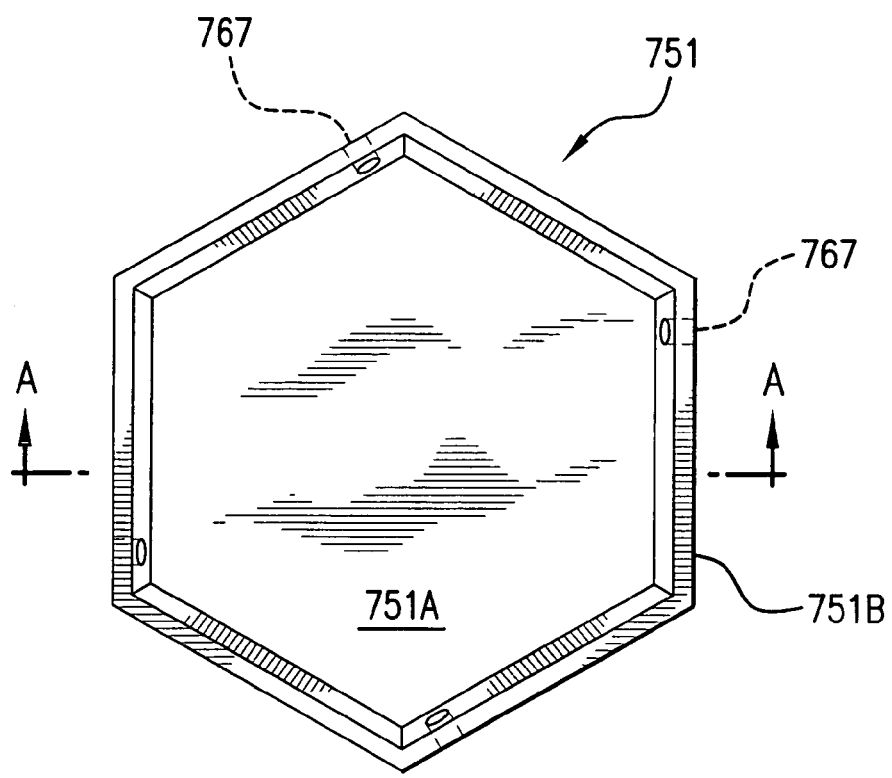
FIG. 81 is a top view of a hexagonal module illustrating molding techniques.
Figure 81A:
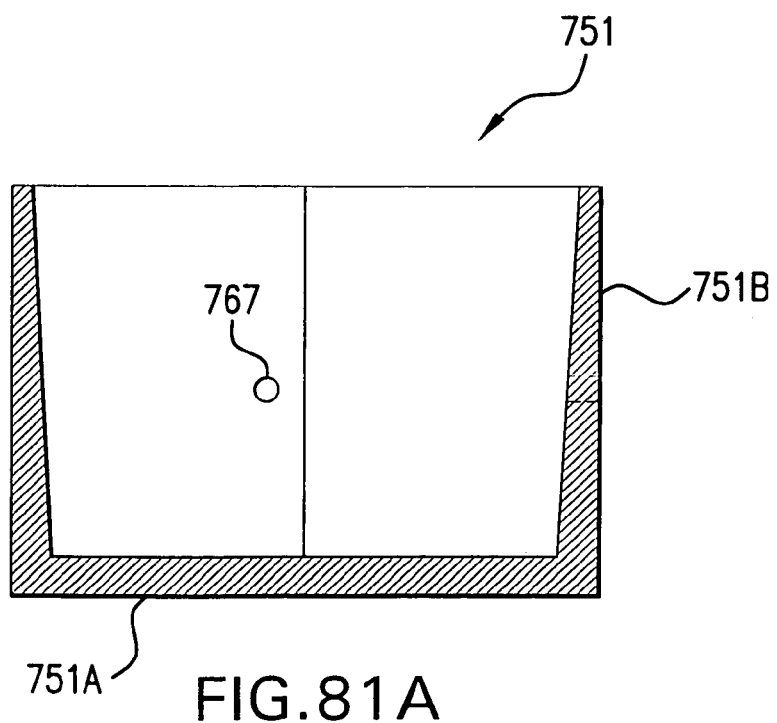
FIG. 81A is a side sectional view of the module of FIG. 80.

FIGS. 81 and 81A show top and side sectional views, respectively, of hexagonal concrete modules 751 presently cast for employment by Applicant's companies and licensees to use in shoreline installations. Module 751 has a flat bottom 751A of uniform thickness and six vertical outside walls 751B, with the thickness of these walls increasing from top to bottom. This is to provide sufficient clearance or "draft" for the casting to be easily removed from the mold. Normally sufficient clearance will be provided by allowing about two inches difference in the wall thickness for a six foot tall module, or equivalent proportions for other sized modules. However, when individual cast modules are to be stacked together to form integrated columns, stacks or "caisson" units, walls of uniform thickness may be preferable. Forms to accommodate castings without draft would be employed in such cases.

Similar casting techniques can be used for casting modules with other cross sections, such as triangular, half-hexagonal, pentagonal or octagonal if required; the hexagonal and half-hexagonal versions are presently preferred due to their ability to produce structures having high strength-to-weight ratios when joined in arrays. Reinforcing materials of metal or other suitable materials can be included in the side walls and/or bottom as discussed above with regard to FIGS. 62 and 63. Optionally, a plurality of holes 767 as shown can be cast into the walls by plugs in the mold, for the purpose of filling and draining the modules and/or connecting adjacent boxes together side-to-side to form linear arrays. Temporary plugs can be installed in these holes while floating the modules to designated locations.

Figure 83:
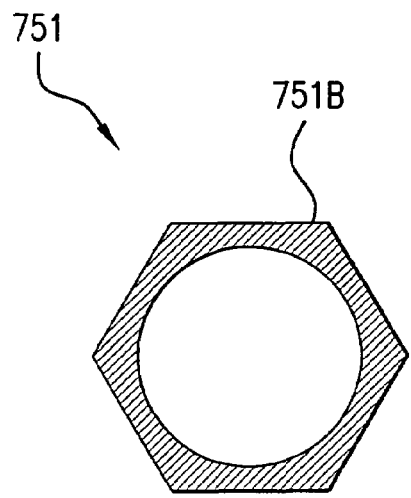
FIG. 83 is a top view of a hexagonal module with a circular inner cross section.
Figure 82:
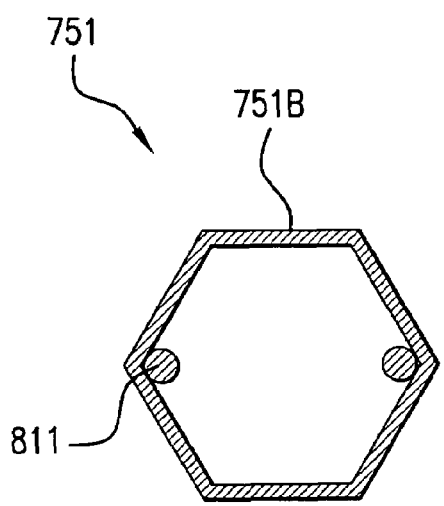
FIG. 82 is a top view of a hexagonal module containing wireways in the inner surface of intersections of the sides.

The hexagonal modules 751 can have an inner cross section that can be hexagonal or circular. While the hexagonal shape inside and out provides uniform wall thickness as shown in FIG. 82, in some cases one might want greater strength at the intersections of the outer hexagonal sides. The circular inside cross section shown in FIG. 83 provides this, which also may be more desirable for any number of module uses to construct floating base platforms, such as a missile silo or an enclosure for a large sensor, weapon or mechanical device that must rotate through 360 degrees.

Figure 85:
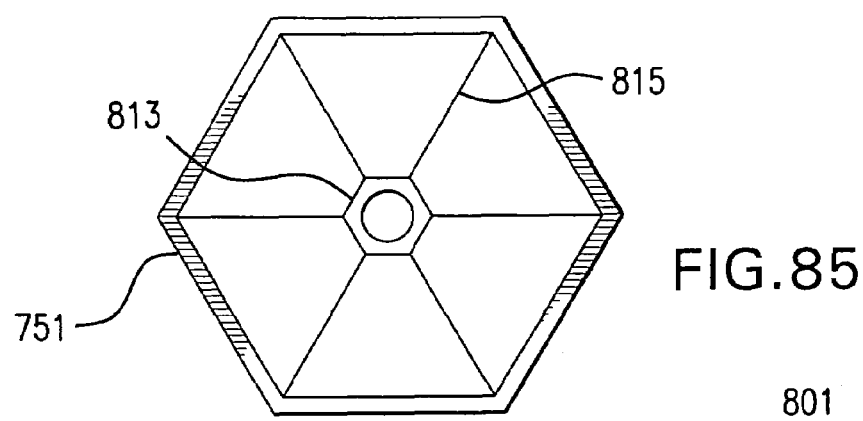
FIG. 85 is a top view of the array of FIG. 84.
Figure 84:
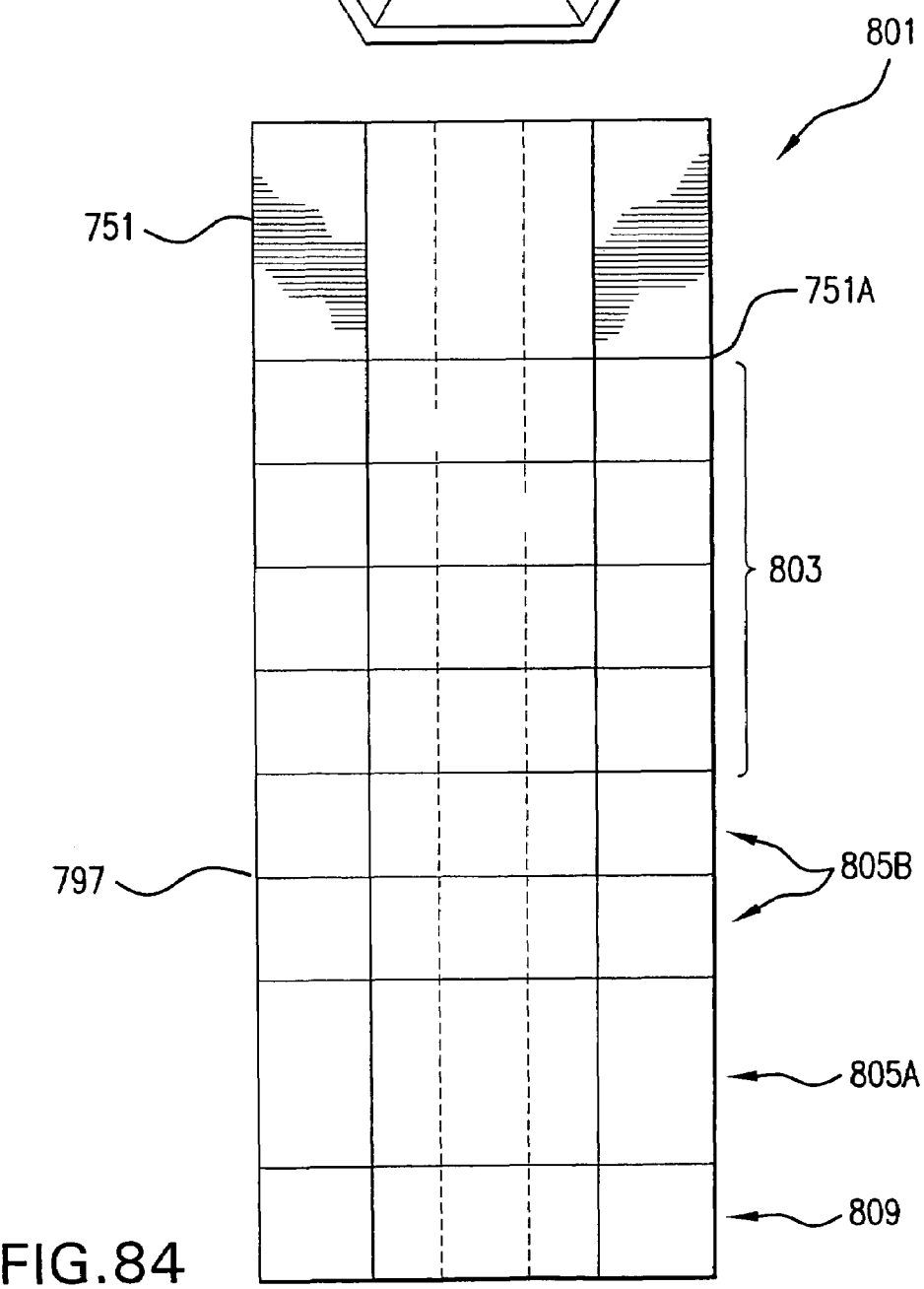
FIG. 84 is a side view of a vertical array of hexagonal modules.

The hexagonal modules 751 and vertical arrays thereof can have a number of decks and compartments installed. As such, since each module is independently waterproof, and normally there is no access provided horizontally between adjacent modules, a central ladder or elevator is useful for vertical access. Should horizontal access between modules be desired, a deck level could be chosen at approximately mid height for the installation of watertight submarine doors. As shown in FIGS. 84 and 85, a column or vertical array 801 of several modules 751 can be subdivided by the integral module bottoms 751A and/or additional decks 797 to provide spaces for purposes comprising berthing areas 803, storage levels large and small (805A and 805B, respectively) and tank spaces 809, normally at lower levels to facilitate ballasting and reduce the center of gravity of column 801 and the metacentric height of the overall floating structure containing such columns. As shown in FIG. 85, each deck level can be subdivided vertically by bulkheads or partitions 815 into a number of segments, up to about six (depending upon the size of the module) for various uses such as berthing, offices, or storage to provide more privacy and bulkhead space as needed.

Figure 87:
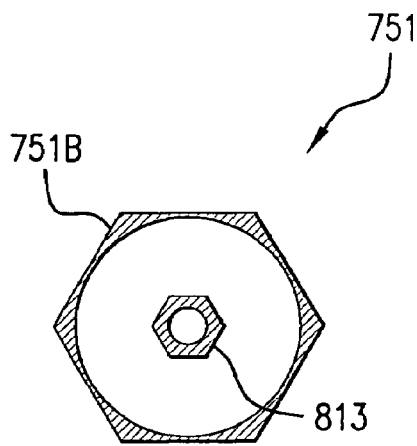
FIG. 87 is a top view of a hexagonal module with a circular inner cross section and a hexagonal inner column with a circular hole therein.
Figure 86:
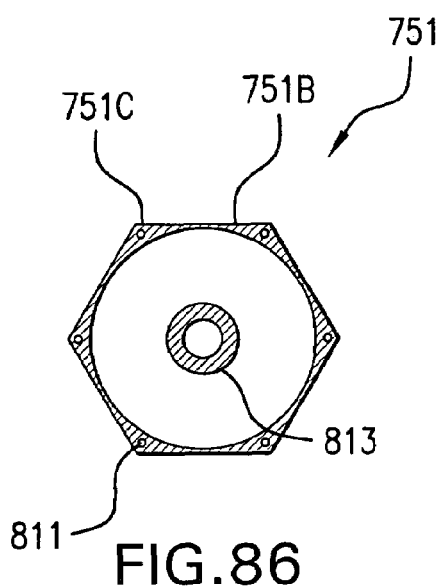
FIG. 86 is a top view of a hexagonal module with a circular inner cross section, wireways in the corners of the walls and a circular column/wireway in the center.

There will be a need for pipes, power cables, communication lines, ventilation and similar communications passing through and between the modules as well. These lines can pass through passages 811 inside the hexagonal module at the wall intersections 751C as in FIG. 82, or in conduits cast into the thickened intersection 751C of FIG. 86. Secondly, vertical access for cables, wires, pipes and ventilation can be installed in a central core 813 installed in a module 751 as in FIGS. 85, 86 and 87. Such vertical shaft surfaces (inside and outside) can be two concentric circles, two hexagons, or combinations as desired. These cores can be of any suitable cross section, such as hexagonal (FIGS. 87, 85) or circular (FIG. 86). Such central cores will also strengthen the decks by reducing the unsupported span of the deck levels.

Figure 90:
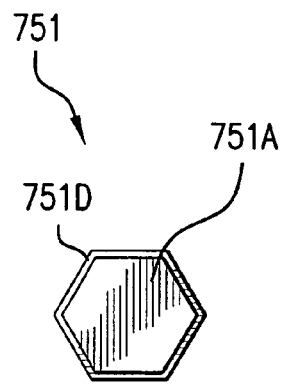
FIG. 90 is a top view of a module from FIG. 88 showing grooves on the top which allow it to interlock with other modules.
Figure 88:
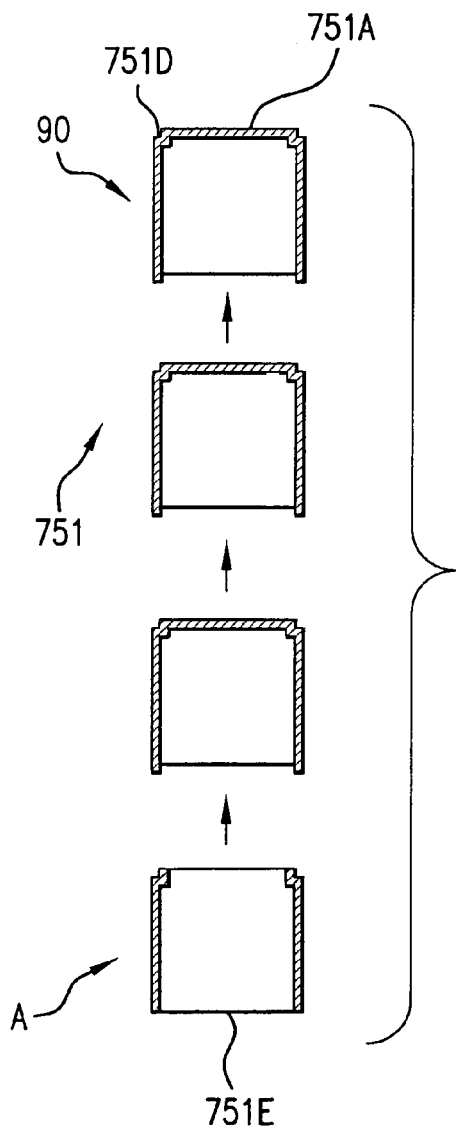
FIG. 88 is a side view of a set of vertically interlocking hexagonal modules.
Figure 89:
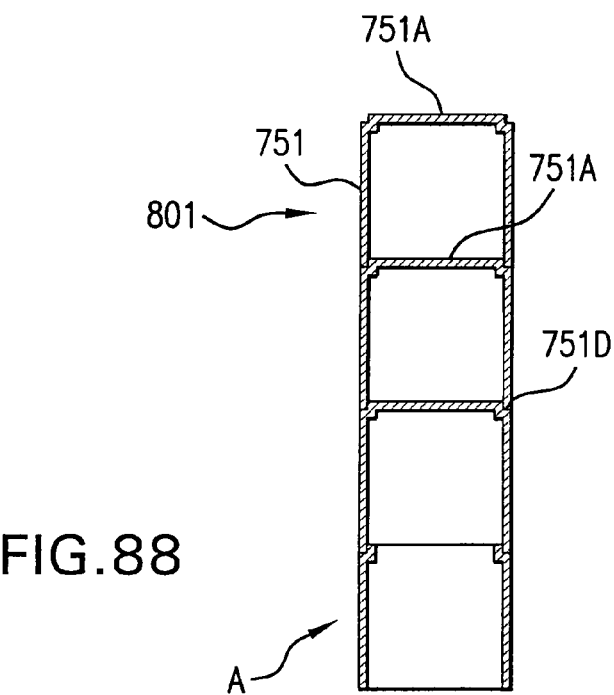
FIG. 89 is a side view of the module set of FIG. 88 joined together to form a column or vertical array.

As shown in FIG. 88, hexagonal modules 751 can be cast with notches 751D around their bases or bottoms 751A which provide a small hexagonal projection which will fit snugly in tongue and groove fashion into the open top 751E of an adjacent module in a vertical array or column. This permits a number of such modules to be joined top-to-bottom to form a more securely joined "stack" or column 801, as shown in FIG. 89 and in the top view of FIG. 90. Any of the hexagonal and other types of modules disclosed herein can be cast with open bottoms 751A and tops 751E, as shown for module A in FIGS. 88 and 89. This permits individual modules to be assembled into columns 801 having a larger proportion of their longitudinal space open inside, depending upon the requirements of an individual assembly or structure.

Figure 91:
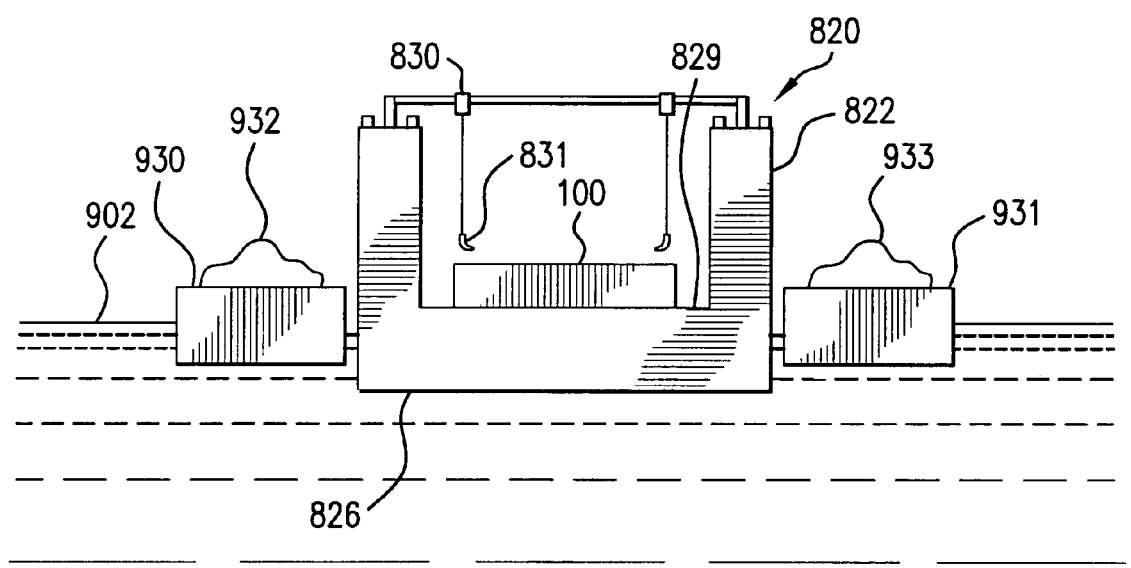
FIG. 91 is an end view of a module casting plant assembled on a floating drydock.
Figure 92:
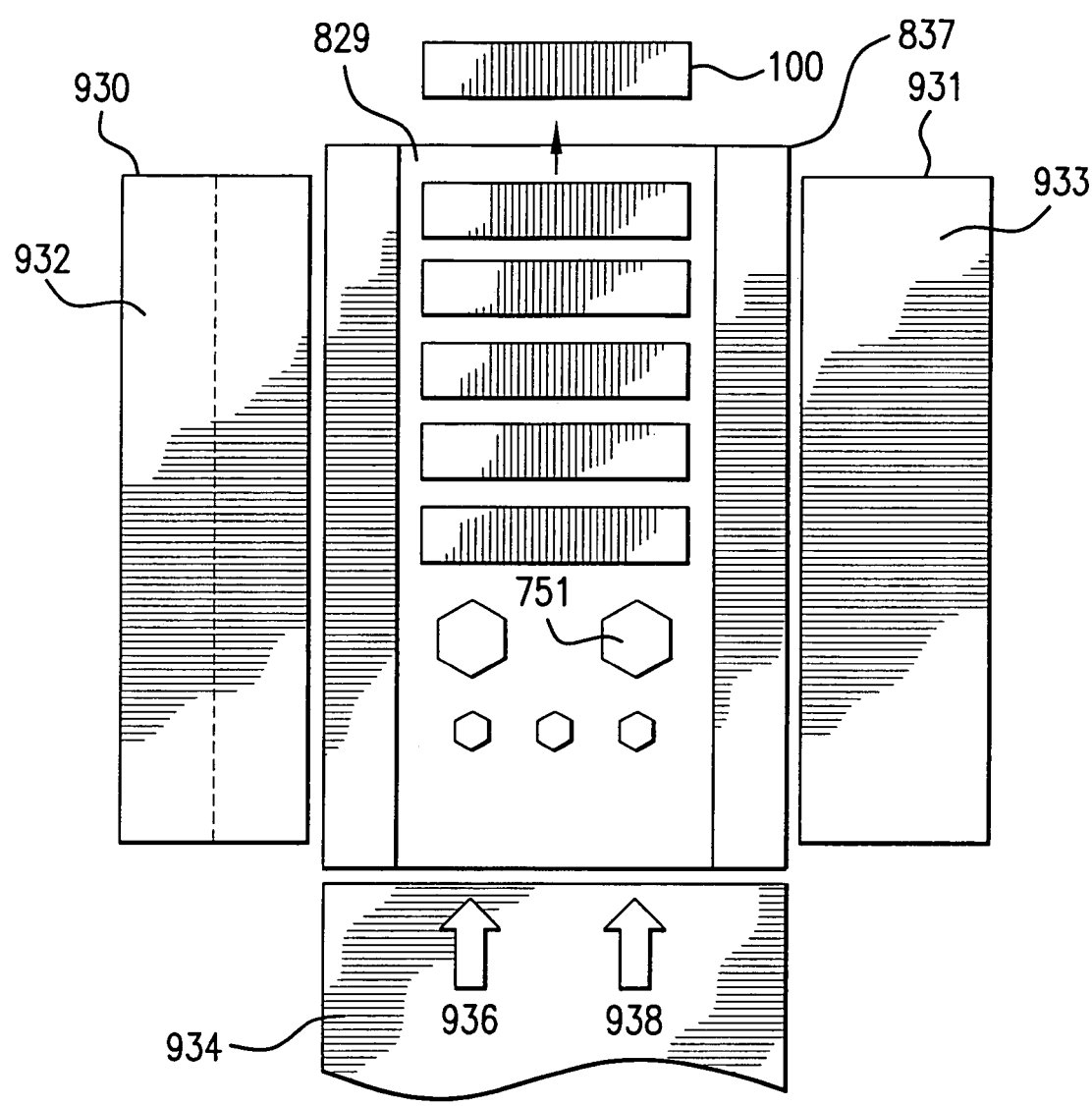
FIG. 92 is a top view of the plant and drydock of FIG. 91.

FIGS. 91 and 92 illustrate the use of a floating drydock as a mobile platform to set up a precast concrete assembly plant for the production of precast rectangular, hexagonal or other concrete modules. In order to efficiently produce concrete products primarily for shipping by water, the plant's output should be on the water. Because much of the cement and sand are cost-effectively also shipped by water, the plan depicted in the drawings is offered as perhaps the most efficient way to design such a plant.

The main concrete plant could be built on a pier or a floating drydock moored with the aft end fast to the land or wharf facility in the fashion known as a "Mediterranean moor". Then barges or smaller coastal ships can come alongside the drydock or pier to unload cement and sand from the barges directly into the plant as necessary. Crushed stone, aggregate, steel, carbon or other reinforcing fiber, personnel, etc. could come by land or also by barge alongside. The finished product could be loaded on a barge or ship from the seaward end of the plant where the water is deeper.

Floating drydocks generally have overhead cranes which would be useful for the concrete casting operation and may be available surplus, as our national shipbuilding and repair business has declined. Also, some of the products may be compatible with using a tug, integrated tug-barge (ITB) or specialized ship to transport the modules as a floating assembly directly to the desired location for use.

Time-motion studies should prove the efficacy of a system where bulk materials can flow into the port and starboard sides of a precast concrete plant established on a floating drydock; personnel, smaller components and services are brought in from the landward end; and products are off-loaded to transport vessels on the water on the seaward end of the plant. Furthermore, such a plant can be relocated closer to the next job site after the current work is finished for efficiency.

FIG. 91 shows an end view of an open-ended floating drydock 820 with characteristic pontoon hull 826 and side walls 822 afloat. As seen in FIG. 92, it is moored astern to a pier 934 (mooring lines omitted for clarity). Barges 930 and 931 are moored alongside drydock 820 to port and starboard, respectively, loaded with cement 932 and sand 933. Crane 830 can be moved along side walls 822 of drydock 820 to pick up forms and finished rectangular and hexagonal modules (100 and 751, respectively) via crane hoists 831. Forms for both hexagonal and rectangular modules are shown in this example. Concrete can be mixed in a large facility ashore or on pier 934, or reinforcing steel 936 and aggregate 938 can be transferred to drydock deck 829 from pier 934 and combined with the cement and sand to produce concrete aboard in a mixer (not shown here) so that it can be conveniently poured into molds. With sufficient space, this can be run as a sort of assembly line, with concrete poured into a series of prepared molds, the molded modules allowed to cure for a minimum period of time and then picked by crane 830 to be moved toward the drydock bow 837 where forms and molded products are separated.

The forms are then returned to the molding area to be prepared for further molding operations.

While the hexagonal and half-hexagonal boxes of the invention have been described for use in fabricating modular ships or other floating structures, they can be used as well in constructing shoreline structures as disclosed above and in previous U.S. Pat. Nos. 6,491,473 and 5,697,052, which can be attached to the shore above high tide levels, on the bottom or in floating structures attached to the shoreline or sunken structures, all in honeycomb arrays to take advantage of the high strength-to-weight ratios. Floating structures incorporating honeycomb arrays of these hexagonal modules can be transported by the vessels disclosed herein and assembled in remote locations to form complex floating structures which can serve as floating bases for a variety of aircraft, small craft and ships for various civil and military purposes. For example, such floating platforms, which can include self-propulsion and defense means, could be used to support combat or patrol operations, rescue efforts for national disasters such as Hurricane Katrina of 2005, exploration and production of minerals or oil, maritime construction projects, floating "SEAHOUSE" communities and the like.

Figure 102:
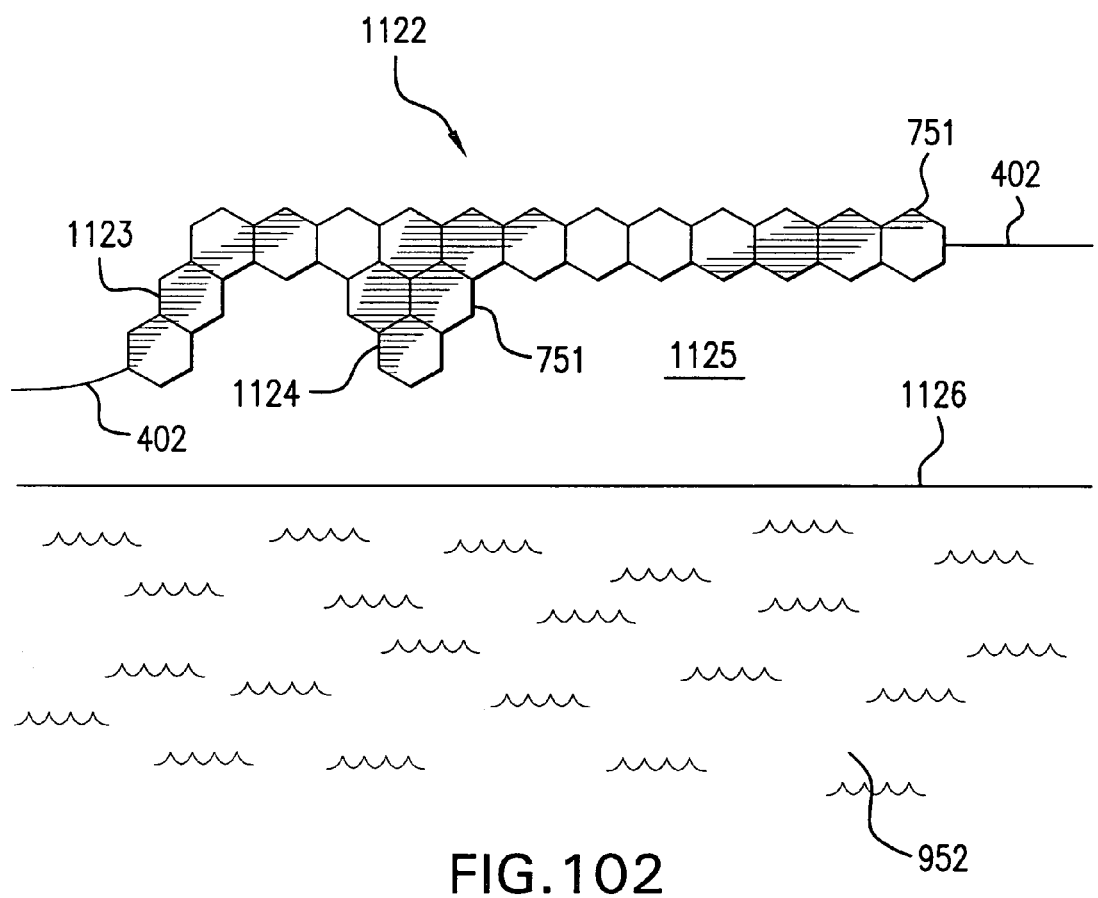
FIG. 102 is a top view of a seawall constructed of horizontal arrays of hexagonal modules.

Hexagonal modules of the invention can be used to great advantage, either combined together into various types of arrays or in combination with the rectangular modules and other structural components discussed above for constructing shoreline structures such as seawalls, bulkheads, jetties, groins, piers and breakwaters, the latter of which may be at least semi-submerged depending upon tidal state. For example, FIG. 102 illustrates a linear array of hexagonal modules 751 implanted in the beach 1125 (using techniques discussed in detail above) along a shoreline or bank 402 to form a seawall or bulkhead 1122. The linear array forming most of the structure can be a single linear array with the angular indentations where the modules meet left exposed to exert beneficial effects upon the effects of water upon the beach and accretion of sand and gravel. Alternatively, half-hexagonal modules 753 could be used (as described above) to create a flush surface facing the water or elsewhere as desired.

This figure illustrates how hexagonal and (optionally) half-hexagonal modules can be assembled to create branches extending at angles of approximately 60 or 90 degrees to the basic linear array to follow a curving shoreline contour or form the beginnings of a groin or pier. Here, two modules 751 are used to create branch 1123 forming a 60 degree angle to seawall 1122 and following the contour of shoreline 402. Such adjustments may be necessary to follow a curved natural bank or match up with a structure on adjacent properties, or can be used to provide an angled seawall to influence the flow of water and the deposition of sand and gravel. Three modules 751 are used here to form a roughly triangular section 1124 approximately perpendicular to the seawall. Such a projection could be used for space for a patio, gazebo or other recreational use, or with the use of half-hexagonal modules (not shown here) could be the base for building a groin or pier some distance out toward the waterline 1126.

In addition to their usefulness in constructing shoreline structures, arrays comprising hexagonal, half-hexagonal and optionally rectangular modules can be used in various configurations as breakwaters, which would be installed offshore from the beach and roughly paralleling it (dependent upon the direction of prevailing or seasonal winds and waves). Modifications to straight linear arrays, extending either landward or seaward, such as branch 1123 and triangular projection 1124 on array 1122 can be designed to deflect waves and/or winds when such breakwaters are installed at least partially submerged in the water 952.

Figure 103:
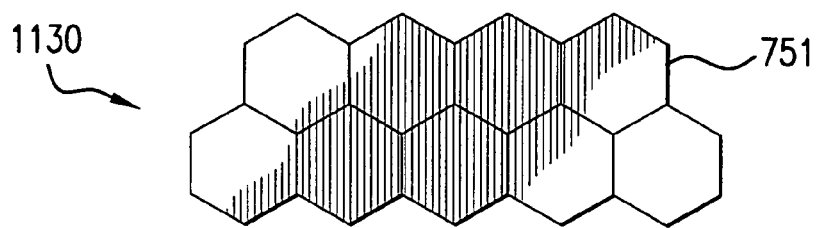
FIG. 103 is a top view of a linear array of hexagonal modules arranged two deep.
Figure 104:
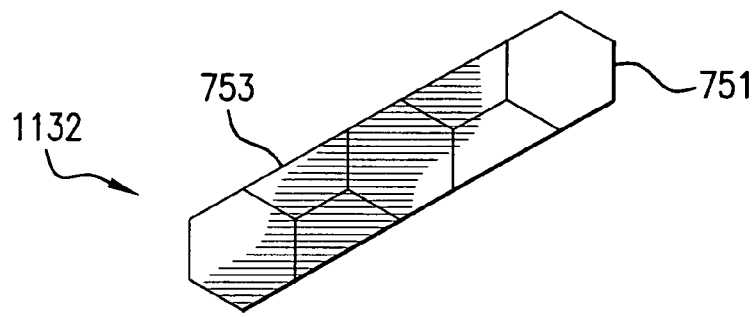
FIG. 104 is a top view of a single array of hexagonal modules including half-hexagonal modules to produce flush surfaces.
Figure 105:
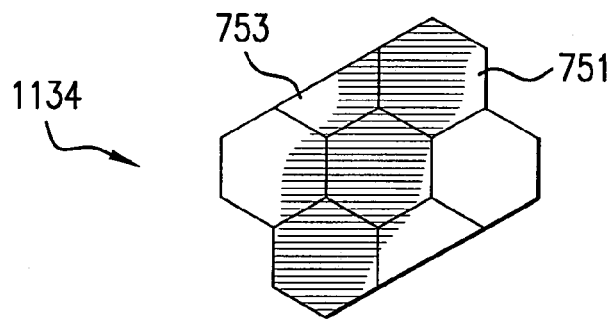
FIG. 105 is a top view of a linear array of hexagonal modules two deep and with flush sides.

FIGS. 103 through 106 illustrate forms of assembling the hexagonal modules 751 which can be useful in various structures, whether terrestrial, shoreline, floating or submerged. FIG. 103 illustrates a double linear array or wall of modules 1130 with the intersections of modules left open to form a "sawtooth" edge or surface on both sides. FIG. 104 shows a combination of hexagonal and half-hexagonal (753) modules used to form a linear array 1132 the width of one module and having a flush surface on both sides. FIG. 105 shows the use of hexagonal and half-hexagonal modules to form a portion of a linear array 1134, having the width of two modules and having flush surfaces on both sides.

Figure 106:
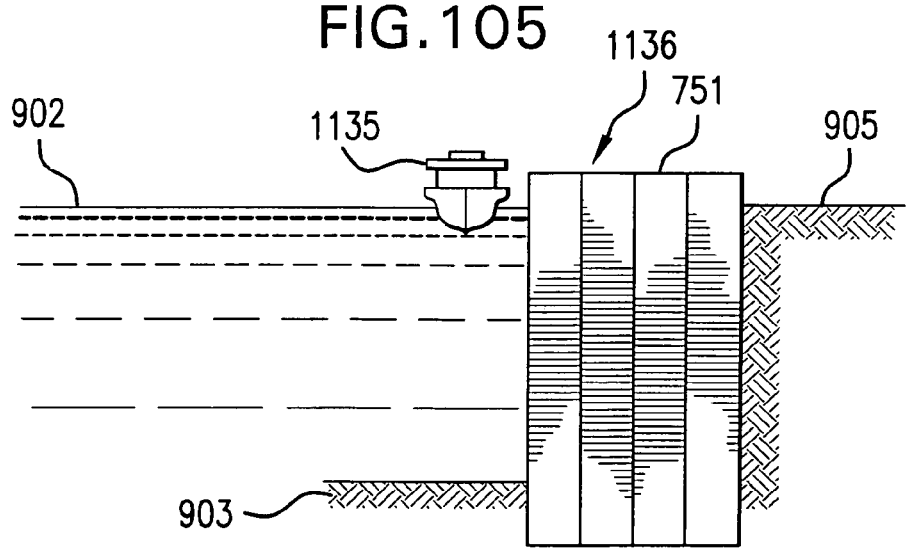
FIG. 106 is a side view of an array of hexagonal modules two deep and forming a levee or wharf.

FIG. 106 shows the use of hexagonal modules 751 (and optionally, half-hexagonal modules to form a flush riverside surface) to form a durable levee or harbor wharf 1136 approximately two modules deep (or more, as needed) set into the river (or harbor) bottom 903 and river bank (or harbor surface) 905. Such a structure can be structured as a wharf for ships 1135 of various sizes (depending upon available space for length, local draft and other conditions).

A larger version of such construction can be seen in FIG. 107, providing a sheltered harbor or offshore "SEACASTLE" port facility for a variety of ships and smaller craft, as described below.

The same large size hexagonal modules which could be used for mobile "SEABASE" platforms could also be used for a floating or bottomed modular port facility. Such a facility could accommodate large deep draft ships, which could not enter shallow ports, much like oil pumping platforms are used to load modern supertankers. Also for security reasons, the use of such port facilities could enable cargo to be inspected some distance from existing port facilities located near population centers.

If floating, these massive ports would be secured to the bottom with large anchors. Screw anchors and multi-point mooring systems similar to those used for large floating oil drilling rigs could be used.

If bottomed, the modules could be flooded to gain mass and weight to assist in jetting them into the bottom. Selected corner modules could be taller ones, which could be jetted deeper into the bottom. Their bottom sections could be filled solid with concrete for greater strength at the corners. Like the towers at the corners of castles and fortresses, these taller modules would have a good view of two sides of the port as well as an elevated view of the activity on the port's surface.

The inboard side of the fortress-like "SEACASTLE" port would be protected from wind and large waves. There, pilot boats, smaller coastal ships, barges, tankers, hovercraft and smaller ferry and personnel boats could moor. Large container, freight, bulk and tanker ships could transfer their cargo directly across the narrow sides of the facility to inboard ships without temporarily storing the material at the port. Further, trains and trucks could access a nearby shore port via connecting means such as causeways or tunnels. Similarly, pipelines could pump liquids ashore for storage and further distribution to trucks and tanker rail cars. A large tube with massive mechanisms similar to a gondola ski lift could transport containers on rollers, rails or the like to a land based facility for further shifting to trucks, trains, barges or storage.

The hexagonal modules in relatively larger sizes (e.g., from about 24 to 160 feet high and about eight to sixty feet wide between flat sides) are ideal to use alone or as components of floating or fixed port facilities inshore or in offshore waters. If they are to be fixed to the bottom, they could also be jetted down into the sand or mud bottom and then ballast water pumped out to "tune" the units to a neutral buoyancy to prevent further subsidence. If the bottom is hard, then the ballast could be maximized to achieve the greatest mass to resist storm waves and currents.

Figure 107:
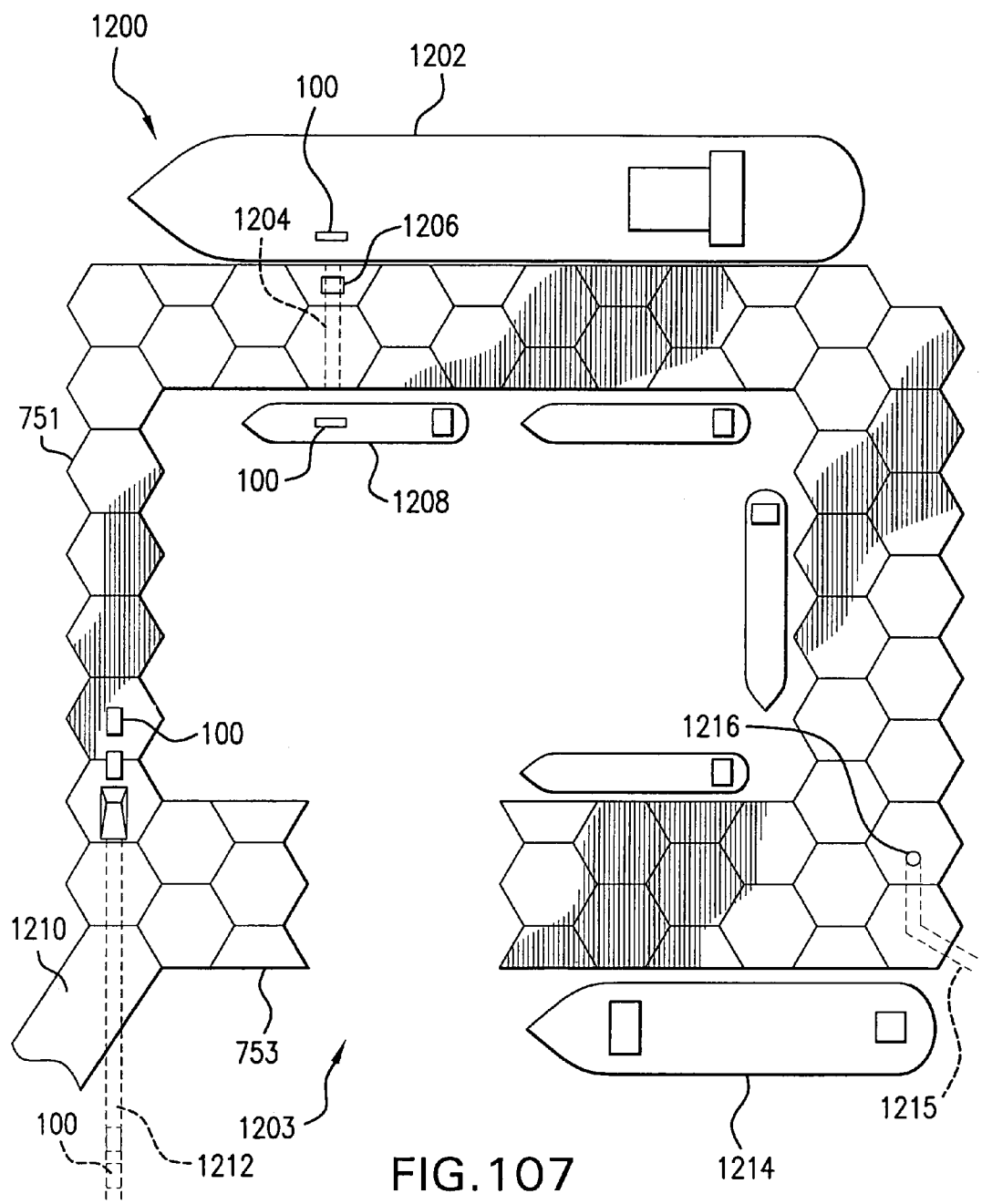
FIG. 107 is an overhead view of a port facility constructed principally of hexagonal modules.

FIG. 107 illustrates a representative use of linear and vertical arrays of hexagonal and half-hexagonal modules (751 and 753) to form a roughly rectangular port facility 1200 with exterior wharfage for large ships and interior wharfage for smaller vessels. Such facilities can be laid out in any suitable shape, employing the angular combinations possible with hexagonal modules. As illustrated in FIGS. 102-106, such modules can be assembled to form walls of single or double thickness, with flush or sawtooth surfaces. At the top of FIG. 107, a large freighter 1202 (with a shipping container 100 on deck) is shown moored (mooring lines omitted for clarity) to a wharf formed by the uppermost wall of the port, representing the seaward or most exposed side of the port. At least one rail line 1204 and associated crane 1206 can be provided for fueling and/or loading or offloading containers or other freight from such ships. A series of offloaded containers is shown at left entering tunnel 1212 and proceeding through the tunnel to a destination. A number of smaller vessels 1208 are shown moored to wharves formed by the inner surfaces of the port's walls, which can have either flush surfaces (the uppermost surface) or sawtooth (those at left and right). They are able to enter the port 1200 via an inshore entrance 1203. A bridge, causeway or tunnel 1210 joins the port at the lower left to provide access to land or another platform. At least one tube or pipeline 1212 can provide fuel or cargo from outside the port and/or transport liquids such as petroleum products which have been offloaded by ships such as 1202. Such tubes can be used to move containers to shore via conveyor belts or rollers, as discussed for the tunnel 1212 at left. A medium-size vessel 1214 is shown moored to the wharf formed by the lower (inshore) outer surface of the port.

For Homeland Security, a permanent facility at the entrance or slightly offshore of some existing port entrances would be desirable. Such a facility could be either floating or fixed to the bottom. Location would be based on site conditions such as currents, tides, prevailing winds and waves, geographic protection, bottom material, etc. At least one module would be taller than the rest to provide a central control and observation location.

Besides providing radar, lasers, visual observation, communications and other electromagnetic signatures and coding such as IFF etc., the "Sea Sentinel" Base could be a check-in location, inspection station, and traffic control tower for a busy port. Coast Guard helicopters and patrol craft as well as immigration, agricultural and Homeland Defense personnel could serve as the initial filter for the port at some distance from the main facilities and population centers.

In most cases an entrance on the leeward side protected from waves by natural geological features could protect the facility. A breakwater could provide protection if no natural features exist. In locations where rough water may be commonplace, an area of calm water could be formed by a modular breakwater comprising hexagonal and/or rectangular modules.

A movable entrance to the base can be designed to open or close as needed. One way is to have one of the hexagonal (or rectangular) modules split horizontally. The top half would be capable of being made neutrally buoyant and hinged so that it could be swung open and closed like a gate or door, using suitable mechanical means such as cables on a winch.

A second method would be to have one or more modules which could be shorter in length be connected by rails to their fixed neighbor modules. These modules could be moved up or down by blowing water ballast out to raise and close or flooding ballast to sink the "gate" to allow surface traffic in or out, as described above for a water gate system.

Figure 108:
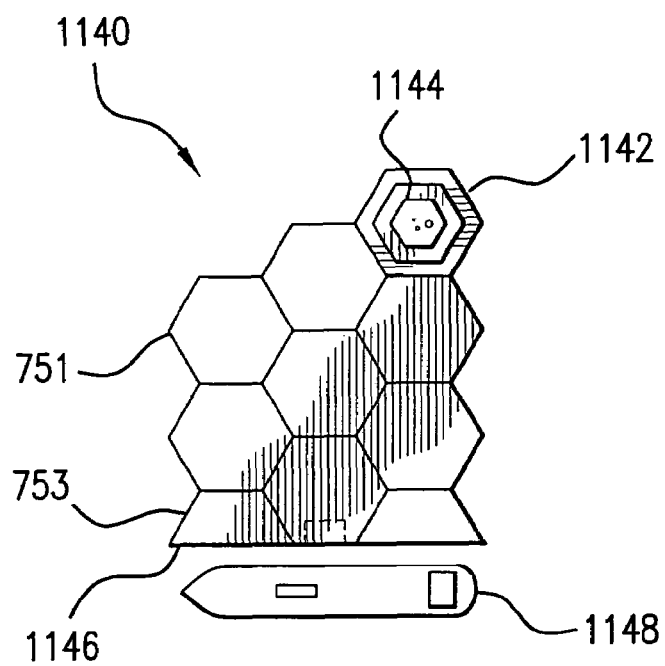
FIG. 108 is a top view of a floating or bottomed platform constructed of hexagonal modules.

FIG. 108 shows such a platform 1140 comprising an array of hexagonal and half-hexagonal modules (751 and 753), with a control and observation tower 1142 on one corner which has an elevated portion 1144, also hexagonal in form. The sides of the platform are left in a sawtooth configuration, except for the lower edge 1146 which provides mooring space for a vessel 1148 such as a small Coast Guard cutter and/or small craft.

Figure 109:
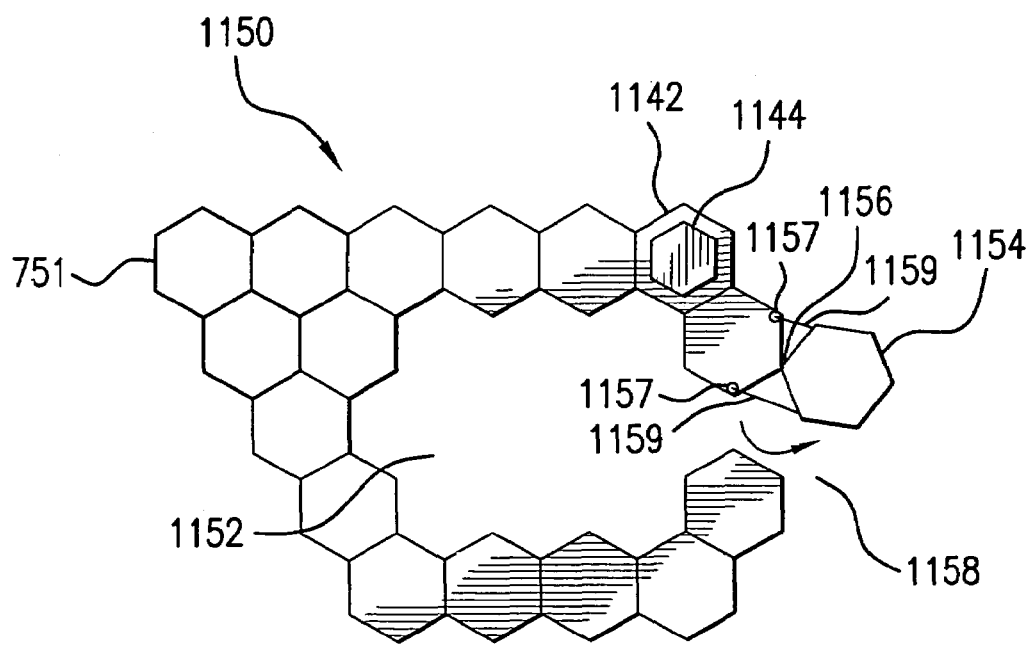
FIG. 109 is a top view of a floating platform constructed of hexagonal modules which includes an open inner area and an entrance which can be open or closed.

FIG. 109 shows a larger platform 1150, also formed of hexagonal modules 751 and providing interior space 1152 which is made accessible to shelter small craft. An observation and control tower 1142 with elevated portion 1144 similar to that of FIG. 107 is provided. As outlined above, at least one module 1154 can be displaced to provide an entrance 1158 which will allow access to interior basin 1152 and can then be closed. For example, winches 1157 and cables 1159 attached to module 1154 can be used to move module 1154 one way or the other to open or close entrance 1158. Flush surfaces for mooring can be provided by use of half-hexagonal modules. In this case, module 1154 can be moved on hinges 1156 by any suitable means. Alternatively, at least one module or a linear array thereof can be provided with ballasting equipment so that it can be ballasted and sunk, sliding along tracks or grooves, to open the gate and then deballasted to raise the module and close the gate. Details of such apparatus are illustrated and described above in connection with FIGS. 75-78.

Some applications of precast concrete boxes of the invention for shellfish habitat are illustrated in FIG. 51. In many areas, the cultivation of shellfish such as oysters and mussels has been adversely affected by pollution and silting of bottoms of bays and other bodies of water, which may be exacerbated by harvesting techniques which disturb bottom sediments. To permit the cultivation of shellfish above the bottom in such areas and facilitate harvesting without aggravating such problems, FIG. 51 provides a precast concrete box (700) with enclosed sides containing holes (702) and/or slots (704). As illustrated in FIG. 4 above, these openings can be at least partially filled with breakable, thin concrete sections to provide knockout areas to facilitate the sinking of the boxes. The openings in the box permit its use as shelter by small fish, crabs, crustaceans and shellfish. Although the box could be raised by filling it with ping-pong balls, styrofoam particles, inflatable balloons or the like, because of its weight this embodiment is more suitable for use as a permanent seed bed to remain on the bottom.

The boxes are provided with removable concrete tops (710) which can be held in place with pins (708) passing through holes (706) in both covers and the corners of the boxes. Shellfish are to be cultivated on the covers of the boxes when sunk into place, thus elevating the shellfish at least the height of the box (perhaps 4 to 8 feet) above the bottom where they are removed from silt and pollutants and exposed to currents carrying more nutrients and oxygen. The boxes preferably have dimensions and proportions which permit intermodal transport and the covers are provided with various types of projections or roughened surfaces to promote adhesion by shellfish spat. This working surface of the covers is turned inward for convenience in transport, then is reversed and secured in place before sinking and installation of the boxes. In FIG. 51, cover (710) is covered with at least one layer of projections (712) (here, three layers) having the form of rectangular parallepipeds, which can be laid down horizontally in criss-cross patterns as shown. In addition to producing boxes and covers of concrete comprising crushed bivalve shells, preferably oyster shells, the projections (712) can be cast or otherwise produced of similar materials. The objective is to provide rough, porous surfaces which are hospitable to shellfish spat, with projections which are spaced appropriately to foster rapid and productive growth of the shellfish to harvestable size. As an alternative or addition to such projections, the covers can be cast to contain large fragments of broken bivalve shells, as shown in FIG. 52 as (717) on concrete cover (710). This in itself could provide an ideal oyster bed, but oyster shells and comparable materials are in short supply and must be conserved. Also shown in FIG. 52 are rectangular projections (714) which are cast or attached perpendicular to cover (710).

Figure 53A:
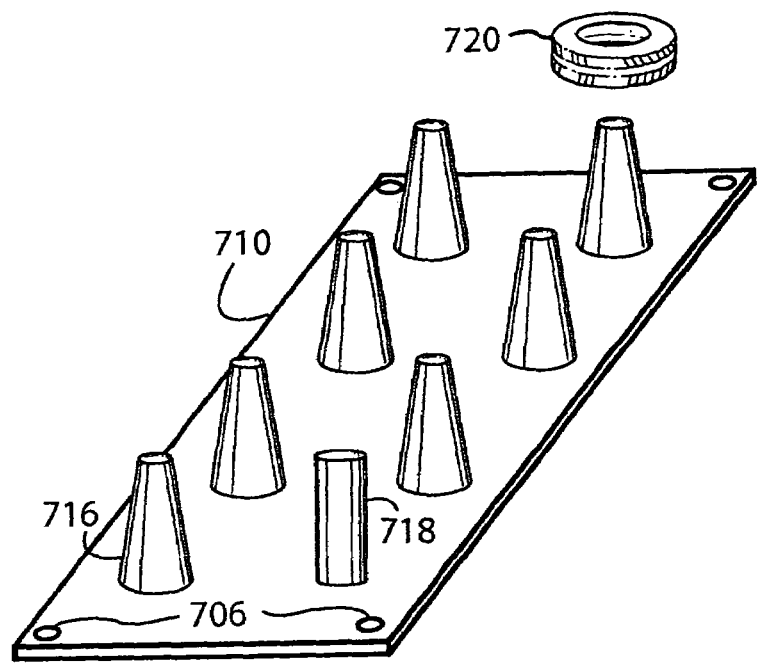
FIGS. 53 and 53A are perspective views illustrating another version of shellfish habitat with removable top, including means for hoisting the assembly from underwater.
Figure 53:
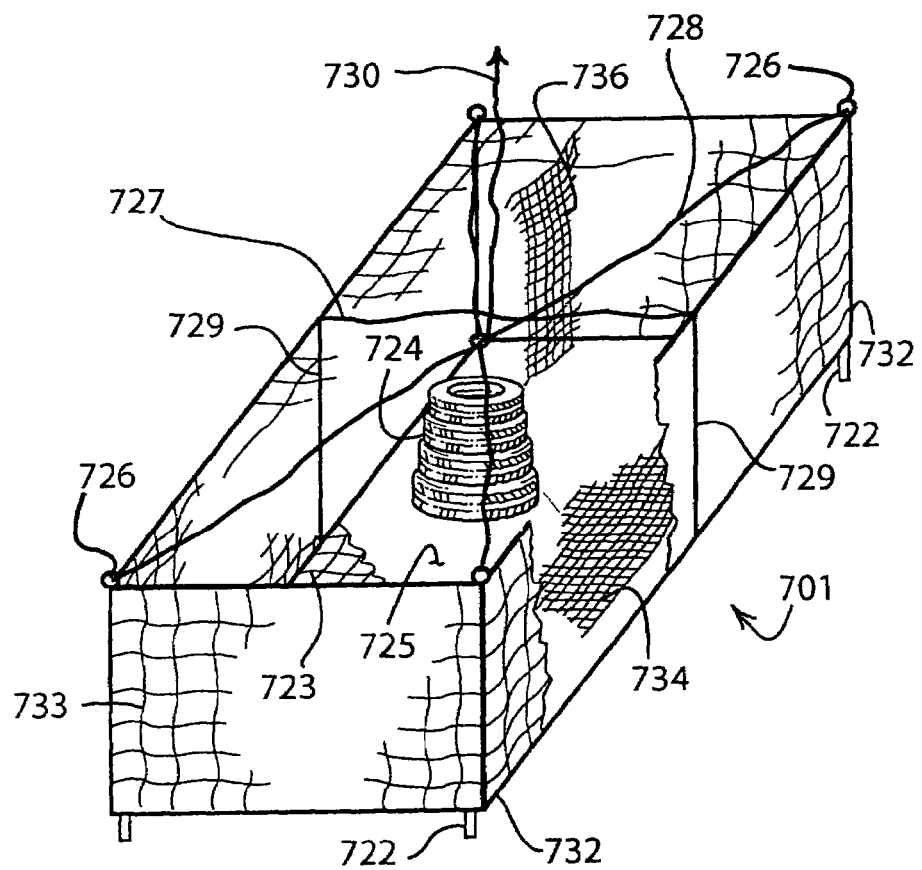

FIGS. 53 and 53A illustrate another type of shellfish habitat, with FIG. 53 schematically illustrating a meshwork container (701) with attachment points (726) at the upper corners for attaching bridle cables (728) and hoisting cable (730). Pins (722) are fitted to the lower corners so that the container can be mounted atop a precast concrete box such as box (700) of FIG. 51, or any suitable container or platform which will elevate the habitat to the proper level above the bottom. Any suitable mesh or openwork material (733) can be used to construct containers (701) about a suitable framework including rigid components (732), including expanded metal, heavy wire mesh and the like. The vertical sides of the container should be mesh as shown, but the bottom can be solid (725) and/or mesh (723). For durability, meshwork of stainless steel or synthetic polymeric materials may be preferred. Container (701) is to be filled with suitable objects for the adherence of shellfish spat, such as used tires (724), optionally filled with broken shells, stainless steel wire mesh structures, plastic pipe reinforced with steel, fragments of k concrete, and the like, any of which can contain bivalve shells or mature oysters.

Two ways of providing inner mesh structures are to install vertical sections of mesh (736) extending from a narrow end of the container (where they attach to frames (732) and/or side mesh (733) to at least the center, where they can be attached to wire or rod supports (727). Such vertical mesh sections could extend from one end of the container to the other. In addition, or alternatively, horizontal layers of mesh (734) can be attached to a narrow end of the container, extending parallel to the bottom at least to the center of the container, where they can be attached to wire or rod supports (729). Such horizontal layers of mesh can also extend the entire length of the container.

A precast concrete top (710), much like that shown in FIG. 52, is provided. Various types of projections, including those shown in FIGS. 51 and 52, can be used. FIG. 53A illustrates projections (716) and (718), which are cylindrical and conical, respectively. Conical projections are preferred, as they are easier to remove from the molds used to cast the assembly. Additional components can be mounted on these projections, such as used tires (720), optionally filled with bivalve shells, stainless steel wire mesh structures, etc.

Since container (701) is much lighter than a concrete box, even when filled with structures for shellfish culture, hoisting and bridle cables (730) and (728) can be used to lift the entire container, cover and all, or alternatively, similar cables can be connected to lift cover (710) independently. Also, if the container (701) is mounted upon a solid concrete box such as illustrated in FIG. 15 having apparatus for introducing air to expel the water, the box itself can be blown and raised to the surface, carrying the container on top. Once either component (the container or cover) is hoisted clear of the water, the contents can be hosed off to remove any silt or sand and the assembly shaken or vibrated over a vessel's deck or hold to dislodge oysters or other shellfish (e.g., mussels) for harvest.

Various changes and modifications to the presently preferred embodiments will be apparent to those skilled in the art. Such changes and modifications may be made without departing from the spirit and scope of the present invention and without diminishing its attendant advantages. Therefore, the appended claims are intended to cover such changes and modifications, and are the sole limits on the scope of the invention.

I claim:

1. A self-propelled vessel for transporting floating objects, comprising separate bow and stern sections adapted to be removably fastened together using mechanical means to form the vessel alone and also to be separated and fastened mechanically to a floating object to form a vessel incorporating said floating object as a midship section to transport same, with said bow section comprising at least one anchor, propulsion means, at least one power supply and control means to operate same and a crane unit, and said stern section comprising a propulsion system, at least one anchor, a pilot house and controls for said vessel, said vessel incorporating at least a portion of a floating drydock as said midship section.

2. The vessel of claim 1 wherein a substantially complete floating drydock comprising bottom and side hull sections is incorporated as said midship section.

3. The vessel of claim 1 wherein said mechanical means comprise connectors to interconnect said bow and stern sections to each other and said floating drydock and tensioning cables to maintain the position of said midship section.

4. The vessel of claim 1 wherein at least a portion of said bow section and said stern section comprise pluralities of precast concrete boxes having a hexagonal or half-hexagonal cross section which are assembled in a vertical orientation and interconnected in honeycomb arrays to form the structure of said bow and stern sections.

5. The vessel of claim 4 wherein at least one of said bow and stern sections further comprises precast concrete boxes having half hexagonal cross sections which are interconnected to the outer portions of said bow or stern section to form flush surfaces for said section.

6. A self-propelled vessel comprising separable bow, stern and midship sections, said bow and stern sections being removably attached to said midship section along lines of separation by suitable mechanical fasteners, each of said sections being constructed primarily of a plurality of precast concrete boxes having hexagonal or half-hexagonal cross-sections, the majority of said hexagonal boxes having substantially open and unobstructed inner cross sections, said boxes being oriented vertically and interconnected by mechanical means to form said bow, stern and midship sections into an integrated hull structure of said vessel, with said bow section having at least one anchor, propulsion means, at least one power supply and control means to handle same and at least one crane unit for handling cargo, and said stern section comprising a pilot house, at least one anchor, at least one propulsion unit and control means for said vessel.

7. The vessel of claim 6 wherein a portion of said boxes forming said midship section are adapted to serve as tanks for fuel, water and ballast.

8. The vessel of claim 6 wherein said midship section comprises cargo-carrying sections and at least one crane to handle said cargo.

9. The vessel of claim 6 wherein a plurality of said boxes in said bow, midship and stern sections are adapted for special purposes comprising operations, engineering, storage, habitability and weapons.

10. The vessel of claim 9 wherein at least one of said boxes adapted for special purposes is removably attached to an outer surface of at least one of said sections along a defined line of separation.

11. The vessel of claim 6 which comprises at least one hexagonal box or vertical array of said boxes which contains at least one of a vertical ladder or elevator.

12. The vessel of claim 6 wherein at least said midship section is large enough and is adapted to serve as a mobile base for at least one type of vehicle selected from the group consisting of large ships, smaller vessels, small craft, submarines, submersibles, hovercraft, amphibious vehicles and aircraft.

* * * * *